(12) United States Patent     (10) Patent No.:   US 12,670,632 B2

Glazberg et al.     (45) Date of Patent:    Jun. 30, 2026

---

(54) AUGMENTED REALITY SYSTEMS

(71) Applicant: Shmuel Ur Innovation LTD.,
Shorashim (IL)

(72) Inventors: Ziv Glazberg, Haifa (IL); Shmuel Ur,
Shorashim (IL)

(73) Assignee: SHMUEL UR INNOVATION LTD.,
Shorashim (IL)

( * ) Notice: Subject to any disclaimer, the term of this
patent is extended or adjusted under 35
U.S.C. 154(b) by 377 days.

(21) Appl. No.: 17/198,235

(22) Filed: Mar. 10, 2021

(65) Prior Publication Data

US 2021/0201543 A1     Jul. 1, 2021

Related U.S. Application Data

(63) Continuation-in-part of application No. 17/112,237,
filed on Dec. 4, 2020, now Pat. No. 11,217,032, and
a continuation-in-part of application No. 16/597,988,
filed on Oct. 10, 2019, now Pat. No. 11,409,903, and
a continuation-in-part of application No. 16/433,009,
filed on Jun. 6, 2019, now Pat. No. 10,991,128.

(51) Int. Cl.
| | |
|---|---|
| *G06T 11/00* | (2026.01) |
| *G06F 3/01* | (2006.01) |
| *G06F 3/04815* | (2022.01) |
| *G09G 5/02* | (2006.01) |

(52) U.S. Cl.
CPC .............. *G06T 11/00* (2013.01); *G06F 3/011*
(2013.01); *G06F 3/04815* (2013.01); *G09G*

*5/026* (2013.01); *G06T 2200/24* (2013.01);
*G06T 2210/36* (2013.01)

(58) Field of Classification Search
CPC . G06T 11/00; G06T 2200/24; G06T 2210/36;
G06T 19/006; G06T 2219/2024; G09G
5/026; G06F 3/04815; G06F 3/011
See application file for complete search history.

(56) References Cited

U.S. PATENT DOCUMENTS

| | | | | |
|---|---|---|---|---|
| 10,366,521 B1 * | 7/2019 | Peacock | ............... | G02B 27/017 |
| 2013/0238167 A1 * | 9/2013 | Stanfield | ............... | G08G 1/095 |
| | | | | 701/2 |
| 2016/0138968 A1 * | 5/2016 | Staudenmaier | ........ | G09G 3/006 |
| | | | | 250/208.1 |
| 2016/0240004 A1 * | 8/2016 | Ur | ........................... | G06T 19/20 |
| 2016/0240005 A1 * | 8/2016 | Ur | ........................ | G06Q 50/01 |
| 2016/0240006 A1 * | 8/2016 | Ur | ....................... | G06F 3/04842 |

(Continued)

*Primary Examiner* — Jin Cheng Wang

(57) ABSTRACT

A method, system and product including obtaining a frame
from a frame sensor of an Augmented Reality (AR) system
comprising an AR device; executing a first skin on the frame
or portion thereof to obtain a first overlay; executing a
second skin on the frame or portion thereof to obtain a
second overlay, wherein the first and second skins are
configured to provide an augmented overlay to be used by
the AR system in determining an AR view, wherein said
executing the second skin is performed without providing
the first overlay to the second skin; determining whether the
second overlay can be utilized for providing the AR view;
generating the AR view based on the first overlay and based
on said determining whether the second overlay can be
utilized for providing the AR view; and providing the AR
view via the AR device.

24 Claims, 33 Drawing Sheets

(56) References Cited

U.S. PATENT DOCUMENTS

| | | | |
|---|---|---|---|
| 2016/0253841 A1* | 9/2016 | Ur | G09G 5/026 |
| | | | 345/633 |
| 2017/0046876 A1* | 2/2017 | Bean | G06T 19/006 |
| 2017/0230589 A1* | 8/2017 | Severn | H04N 5/2723 |
| 2017/0236316 A1* | 8/2017 | Severn | G06Q 30/02 |
| | | | 345/633 |
| 2018/0012410 A1* | 1/2018 | Koga | H04N 23/63 |
| 2018/0165814 A1* | 6/2018 | Gulati | G06T 7/001 |
| 2019/0129715 A1* | 5/2019 | Ding | G06T 19/006 |
| 2019/0197651 A1* | 6/2019 | Johnson | G06T 1/20 |
| 2020/0198466 A1* | 6/2020 | Gulati | G06F 3/1423 |

* cited by examiner

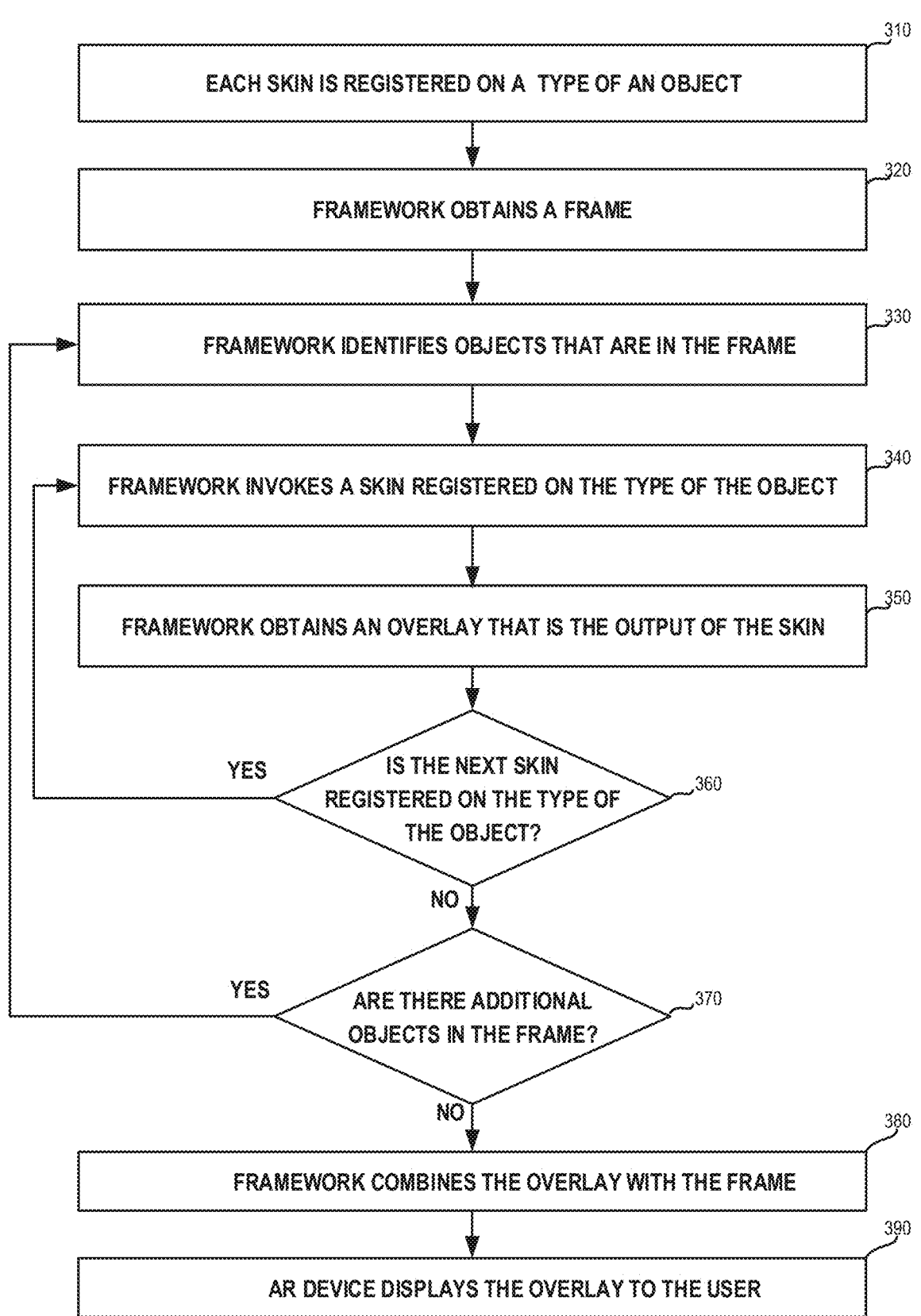

EACH SKIN IS REGISTERED ON A TYPE OF AN OBJECT — 310

FRAMEWORK OBTAINS A FRAME — 320

FRAMEWORK IDENTIFIES OBJECTS THAT ARE IN THE FRAME — 330

FRAMEWORK INVOKES A SKIN REGISTERED ON THE TYPE OF THE OBJECT — 340

FRAMEWORK OBTAINS AN OVERLAY THAT IS THE OUTPUT OF THE SKIN — 350

IS THE NEXT SKIN REGISTERED ON THE TYPE OF THE OBJECT? — 360
YES    NO

ARE THERE ADDITIONAL OBJECTS IN THE FRAME? — 370
YES    NO

FRAMEWORK COMBINES THE OVERLAY WITH THE FRAME — 360

AR DEVICE DISPLAYS THE OVERLAY TO THE USER — 390

FIG. 3

OBTAIN AN OBJECT OF A FRAME — 1800

EXECUTE A FIRST LAYER ON THE OBJECT AND A SHADOW LAYER ON THE OBJECT TO OBTAIN FIRST AND SECOND OVERLAYS — 1810

EXECUTE A SECOND LAYER ON THE SECOND OVERLAY TO OBTAIN A THIRD OVERLAY — 1820

FIRST AND SECOND OVERLAYS MATCH? — 1830

EXECUTE THE SECOND LAYER ON THE FIRST OVERLAY — 1850

YES

USE THE THIRD OVERLAY — 1840

DETERMINE RESOURCES ARE INSUFFICIENT — 1900

REDUCE RESOLUTION — 1910

USE PREVIOUS FRAME RESULTS — 1920

EXCLUDE LOW PRIORITY SKIN — 1930

REORDER EXECUTION ORDER OF SKINS — 1940

IDENTIFY AN EDGE DEVICE — 2000

DISTRIBUTE COMPUTATIONS TO THE EDGE DEVICE — 2010

DETERMINE THAT THE EDGE DEVICE HAS SENSORS — 2020

PROVIDE PARTIAL SENSOR INFORMATION — 2030

IDENTIFY ONE OR MORE EXECUTION PLATFORMS    2100

DETERMINE AN EXECUTION SCHEDULE    2110

DISTRIBUTE COMPUTATIONS ACCORDING TO THE EXECUTION SCHEDULE    2120

DETERMINE THAT AN OBJECT OF A FRAME SHOULD BE FILTERED    2200

REMOVE THE OBJECT FROM THE FRAME    2210

PROVIDE THE FRAME TO REGISTERED LAYERS    2220

ADD THE OBJECT TO THE FRAME    2230

IDENTIFY A FIELD OF VIEW OF USER IN A FRAME          2400

DETERMINE THAT THE FIELD OF VIEW IS PRIVATE          2410

SECURE THE FIELD OF VIEW          2420

OBTAIN A FINAL OBJECT — 2500

EXECUTE ONE OR MORE LAYERS ON THE FINAL OBJECT TO OBTAIN RESPECTIVE OVERLAYS — 2510

PLACE THE OVERLAYS OUTSIDE A BOUNDARY OF THE FINAL OBJECT — 2520

DETERMINE THAT ONE OR MORE FRAME PORTIONS CONSTITUTE A UNIT ⟋2600

IDENTIFY A MODIFICATION OF THE ONE OR MORE FRAME PORTIONS ⟋2610

REMOVE THE ONE OR MORE FRAME PORTIONS ⟋2620

DETERMINE THAT AN OBJECT IS A REAL-WORLD OBJECT    2700

DETERMINE AN ALERT FOR THE OBJECT    2710

ENSURE THE ALERT IS VISIBLE    2720

AUGMENTED REALITY SYSTEMS

CROSS-REFERENCE TO RELATED APPLICATIONS

This application is a Continuation In Part of the following patent applications: patent application Ser. No. 16/433,009, titled "Markers For Augmented Reality" filed Jun. 6, 2019, patent application Ser. No. 16/597,988, titled "Private And Non-Private Tasks In Augmented Reality Systems" filed Oct. 10, 2019, and patent application Ser. No. 17/112,237, titled "Augmented Reality Skin Executions" filed Dec. 4, 2020, which are hereby incorporated by reference in their entirety without giving rise to disavowment.

TECHNICAL FIELD

The present disclosure relates to computer systems in general, and to Augmented Reality (AR), in particular.

BACKGROUND

Currently AR has not yet fulfilled the expectations. Lack of Internet Protocols (IP) that can support the high bandwidth and low latency requirements as well as privacy concerns of people are holding wide adoption.

Augmented reality (AR) is an interactive experience of a real-world environment where the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real-world environment.

In order to facilitate AR applications, processing may be performed in external devices other than the AR device. However, significant bandwidth resources may be required in order to upload, in real-time, streams of frames to be analyzed.

BRIEF SUMMARY

One exemplary embodiment of the disclosed subject matter is an apparatus comprising: a frame sensor configured to obtain a frame, wherein the frame is associated with a field of view of a user; a processor configured to: execute an augmented reality framework, wherein the augmented reality framework is configured to invoke at least one skin to compute an augmented reality display for the user; wherein the augmented reality framework is configured to identify a marker in the frame, wherein in response to identifying the marker, altering functionality of the augmented reality framework.

Optionally, altering the functionality of the augmented reality framework comprises imposing a restriction on the at least one skin.

Optionally, the augmented reality framework is configured to identify a second marker in the frame or in another frame obtained by said frame sensor; and wherein in response to the augmented reality framework identifying the second marker, lifting the restriction.

Optionally, the restriction is selected from a restriction preventing execution of the at least one skin in a remote device external to said apparatus; a restriction requiring execution of the at least one skin in a predetermined edge device external to said apparatus; a restriction preventing execution of the at least one skin while said apparatus is located in a predetermined location; a restriction preventing execution of the at least one skin for a predetermined time duration; a restriction preventing applying functionality of facial recognition of the at least one skin on a person; or the like.

Optionally, the apparatus further comprising a signaling module configured to provide sensory signal, wherein said signaling module is configured to provide a signal indicative of the restriction being imposed by the augmented reality framework.

Optionally, said apparatus comprising a transmitter configured to transmit the frame; wherein the augmented reality framework is operatively coupled to said transmitter, wherein said altering the functionality comprises preventing transmission of the frame or portion thereof using said transmitter.

Optionally, the marker is associated with a marked object; wherein said altering functionality of the augmented reality framework comprises preventing the at least one skin from processing the marked object or retaining the marked object.

Optionally, said altering the functionality of the augmented reality framework comprises invoking a second skin, wherein the second skin is associated with the marker.

Optionally, the marker is not visible to a human eye.

Optionally, said apparatus is embedded, at least partially, in augmented reality glasses or in augmented reality lenses.

Another exemplary embodiment of the disclosed subject matter is a method comprising: obtaining a first frame associated with a view of a user using an Augmented Reality (AR) device; determining a first overlay display for the first frame, wherein the first overlay display is displayed to the user by the AR device, wherein said determining the first overlay display comprises executing a skin on the first frame, whereby performing a functionality on the first frame; identifying a marker in the second frame; in response to said identifying, determining an altered functionality; obtaining a second frame; and determining a second overlay display for the second frame, wherein the second overlay display is displayed to the user using the AR device, wherein determining the second overlay display comprises performing the altered functionality with respect to the second frame.

Optionally, the method comprises determining a plurality of overlay displays for a stream of frames, wherein the stream of frames comprises one or more frames that are consecutive to the second frame, wherein said determining the plurality of overlay displays comprises performing the altered functionality with respect to each frame of the stream.

Optionally, the marker is associated with an object, wherein the marker conveys an imposed restriction with respect to the object; and wherein said performing the altered functionality comprises imposing the imposed restriction on the skin.

Optionally, determining, based on the marker, a terminating condition, wherein in response to the terminating condition occurring, restoring the functionality instead of the altered functionality.

Optionally, the terminating conditions is at least one of: the AR device reaching a predetermined location; an elapsed time duration; and the AR framework capturing a second marker.

Optionally, the method further comprises in response to said identifying, requesting physical access to a restricted area, wherein said requesting comprises a notification that the functionality was altered; whereby physical access is granted automatically based on the notification.

Optionally, the altered functionality comprises restricting performing of a modification to an object appearing in a frame.

Optionally, the altered functionality comprises requiring execution of a predetermined skin, wherein the predetermined skin is selected from a redacting skin configured to redact from the user's view portions of the frame, an authority skin controlled by an entity controlling an area associated with the marker, or the like.

Optionally, said determining the altered functionality comprises: providing to the user a suggestion to activate a predetermined skin; in response to a user confirmation, activating the predetermined skin, whereby the altered functionality comprises executing the predetermined skin.

Optionally, the augmented reality framework is configured to analyze the frame to identify one or more objects in the frame, wherein the at least one skin is registered on one or more object types in the augmented reality framework, whereby the augmented reality framework is configured to invoke the at least one skin in response to identifying an object of the one or more object types in the frame.

Yet another exemplary embodiment of the disclosed subject matter is a computer program product comprising non-transitory computer readable medium retaining instructions, the instructions configured to cause a processor, when executing the instructions to perform: obtaining a first frame associated with a view of a user using an AR device; determining a first overlay display for the first frame, wherein the first overlay display is displayed to the user by the AR device, wherein said determining the first overlay display comprises executing a skin on the first frame, whereby performing a functionality on the first frame; identifying a marker in the second frame; in response to said identifying, determining an altered functionality; obtaining a second frame; and determining a second overlay display for the second frame, wherein the second overlay display is displayed to the user using the AR device, wherein determining the second overlay display comprises performing the altered functionality with respect to the second frame.

One exemplary embodiment of the disclosed subject matter is a method comprising: obtaining a privacy policy of a user, wherein the user is using an AR device; obtaining a frame from at least one frame sensor; generating an overlay display for the frame, wherein said generating is based on an execution of a non-private task on a non-trusted device and based on an execution of a private task on a trusted device, wherein the private task and the non-private task are determined based on the privacy policy; and displaying, by the AR device, the overlay display.

Optionally, the method further comprises: determining a private portion of the frame, whereby dividing the frame to the private portion and a non-private portion; wherein the execution of the non-private task comprises processing the non-private portion of the frame, whereby obtaining a first overlay; wherein the execution of the private task comprises processing the private portion of the frame, whereby obtaining a second overlay; wherein said generating the overlay display further comprises: merging the first overlay and the second overlay to obtain the overly display.

Optionally, said determining the private portion of the frame is based on a point of fixation of the user, wherein the non-trusted device is unable to ascertain the point of fixation of the user from the non-private portion.

Optionally, said determining the private portion of the frame is based on an identification of Personally Identifiable Information (PIT) appearing in the frame.

Optionally, the PII comprises visible facial features of a person, whereby the non-private portion excludes the visible facial features.

Optionally, the method further comprises: determining a peripheral portion of the frame based on a point of fixation of the user; wherein the non-private task is configured to determine a high-resolution overlay of the frame; wherein the private task is configured to obtain a low-resolution overlay of the peripheral portion of the frame; and wherein the overlay display for the frame comprises the low-resolution overlay of the peripheral portion of the frame and at least a portion of the high-resolution overlay of the frame.

Optionally, the trusted device comprises the AR device, wherein the non-trusted device comprises an external device, external to the AR device.

Optionally, the trusted device comprises a trusted server, wherein the non-trusted device comprises a non-trusted server.

Optionally, the non-trusted device comprises the AR device.

Optionally, the execution of the private task comprises: analyzing the frame to determine a private portion of the frame and a non-private portion of the frame; and providing the non-private portion of the frame to the non-trusted device, whereby the non-trusted device performing the execution of the non-private task with respect to the non-private portion of the frame.

Optionally, the execution of the private task further comprises: obtaining a first overlay from the non-trusted device, wherein the first overlay is generated by the execution of the non-private task; executing one or more skins on the private portion of the frame, whereby generating a second overlay; and merging the first overlay with the second overlay, whereby generating the overlay display.

Optionally, the overlay display is determined by applying skins on the frame or a portion thereof; based on the privacy policy, identifying, in the skins, one or more private skins and one or more non-private skins; wherein the execution of the non-private task comprises applying the one or more non-private skins, whereby obtaining a first overlay; and wherein the execution of the private task comprises applying the one or more private skins, whereby obtaining a second overlay; wherein said generating further comprises combining the first overlay and the second overlay, whereby generating the overlay display.

Optionally, the execution of the non-private task further comprises applying the one or more redundant skins, wherein the private task comprises ignoring output of the one or more redundant skins.

Optionally, said applying the one or more private skins is performed on a first object in the frame, wherein the execution of the non-private task comprises applying the one or more private skins on a second object in the frame.

Another exemplary embodiment of the disclosed subject matter is an AR system comprising: an AR device having an AR display; a memory configured to retain a privacy policy of a user of the AR device; and a processor configured to: determine a trust score for each execution environment of one or more execution environments; based on the trust score of an execution environment and based on the privacy policy, determine a set of skins to be executed by the execution environment; generate overlay displays corresponding frames, wherein the frames are obtained by a frame sensor, wherein the overlay displays are generated, at least in part, by utilizing the execution environment to apply the set of skins on the frames; and display the overlay displays using the AR display.

Optionally, said determining the set of skins comprises excluding one or more skins from being executed by the execution environment due to the trust score being below a threshold.

Optionally, said determining the set of skins comprises determining to apply a first set of skins with respect to a first execution environment having a first trust score above a threshold and determining to apply a second set of skins with respect to a second execution environment having a second trust score below the threshold.

Optionally, said determining comprises for each skin of a plurality of skins, determining an execution environment out of the one or more execution environments to apply the each skin, wherein said determining the execution environment to apply is based on the privacy policy and the trust scores of the one or more execution environments.

Optionally, the execution environment is characterized by a communication channel from the AR system to the execution environment, wherein the trust score of the execution environment is determined based on a trust score of the communication channel.

Optionally, the execution environment is characterized by a controlling entity having control of the execution environment, communication channel from the AR system to the execution environment, wherein the trust score of the execution environment is determined based on a trust score of the controlling entity.

One exemplary embodiment of the disclosed subject matter is a method performed by an AR system, wherein the AR system is configured to provide an AR view, wherein the AR system comprises an AR device and at least one frame sensor, wherein the AR system is configured to utilize a first skin and a second skin, each of which is configured to provide an augmented overlay to be used by the AR system in determining the AR view, wherein the first and second skins are configured to process an augmented display according to a skin execution order, wherein the skin execution order defines that the second skin processes an augmented overlay provided by the first skin. The method comprises: obtaining a frame from the at least one frame sensor; executing the first skin on the frame or portion thereof to obtain a first overlay; executing the second skin on the frame or portion thereof to obtain a second overlay, wherein said executing the second skin is performed without providing the first overlay to the second skin; determining whether the second overlay can be utilized for providing the AR view; generating the AR view based on the first overlay and based on said determining whether the second overlay can be utilized for providing the AR view; and providing the AR view via the AR device.

Optionally, determining whether the second overlay can be utilized for providing the AR view comprises determining whether the first and second overlays are inconsistent with each other.

Optionally, upon determining that the first and second overlays are inconsistent with each other, the second overlay is modified based on the first overlay to obtain a modified second overlay, wherein said generating the AR view comprises utilizing the modified second overlay.

Optionally, modifying the second overlay comprises amending pixels of the second overlay, regenerating the second overlay by executing the second skin on the first overlay, or the like.

Optionally, upon determining that the first and second overlays are consistent with each other, the second overlay is utilized, without modifications, for generating the AR view.

Optionally, determining whether the first and second overlays are inconsistent with each other comprises utilizing first metadata of the first overlay or the first skin, and second metadata of the second overlay or the second skin.

Optionally, determining whether the first and second overlays are inconsistent with each other comprises identifying overlapping pixels between the first and second overlays.

Optionally, said executing the first skin and said executing the second skin are performed in parallel, simultaneously, in overlapping timeframes, or the like.

Optionally, said executing the first skin is performed at a first execution platform and said executing the second skin is performed at a second execution platform.

Optionally, the method comprises determining, based on a predictor, whether to perform said executing the second skin, wherein the predictor is configured to predict a probability that the first overlay will be inconsistent with the second overlay.

Optionally, the method comprises performing a partial execution of said executing the second skin, wherein said partial execution comprises generating a partial second overlay that is predicted to have a low probability of being inconsistent with the first overlay, wherein said generating the AR view comprises utilizing the first overlay, utilizing the partial second overlay, and completing execution of the second overlay based on the first overlay.

Optionally, the second skin is registered on an object type; the frame comprises a first object of the object type and a second object of the object type; the second overlay comprises a first sub overlay and a second sub overlay, the first sub overlay is an output provided by the second skin in response to processing the first object, wherein the second sub overlay is an output provided by the second skin in response to processing the second object; wherein said determining whether the second overlay can be utilized for providing the AR view comprises: determining that the first sub overlay is consistent with the first overlay; determining that the second sub overlay is inconsistent with the first overlay; and determining a third sub overlay based on the first overlay, wherein the third sub overlay is an overlay for the second object, wherein the third sub overlay is consistent with the first overlay; wherein said generating the AR overlay for the frame is based on the first sub overlay and on the third sub overlay.

Optionally, said determining whether the second overlay can be utilized for providing the AR view comprises: determining, based on the first overlay, that the second overlay is inconsistent with the first overlay; wherein said generating comprises executing again the second skin based on the frame and on the first overlay to obtain a new second overlay; and wherein said generating the AR overlay for the frame is based on the new second overlay.

Optionally, said executing the first skin is performed at a first execution platform; wherein the method further comprises executing the first skin on a second execution platform to obtain a shadow overlay; wherein said executing the second skin is performed at the second execution platform based on the shadow overlay.

Optionally, the method comprises obtaining a first order of execution, wherein the first order of execution defines an order of skin executions of a plurality of skins comprising the first and second skins, wherein the plurality of skins are registered on a same object in the frame, wherein the first order of execution comprises the skin execution order; obtaining a second order of execution between the plurality of skins, wherein the second order of execution defines that the second skin is to be executed before the first skin; executing the plurality of skins according to the first order of execution to obtain a first result; executing the plurality of skins according to the second order of execution to obtain a second result; and based on a determination that the first and second results are identical, determining that the first order of execution is replaceable with the second order of execution. The method of claim 16 comprising determining that the second order of execution utilizes less resources than the first order of execution, and based on said determining, setting the second order of execution for executing skins instead of the first order of execution.

Optionally, the method comprises obtaining priority rankings of the plurality of skins, wherein the priority rankings indicate that the first skin has a higher priority than the second skin, and upon determining that execution of the first skin and the second skin utilizes resources that exceed a threshold, refraining from executing the second skin.

Optionally, the method comprises determining to perform speculative execution of the second skin prior to availability of the first overlay; and wherein said executing the second skin that is performed without providing thereto the first overlay is contingent on said determining to perform the speculative execution.

Optionally, the second skin is configured to be executed on a first execution platform, a first latency of a communication between the AR device to the first execution platform is above a threshold, a second latency of a communication between the AR device and a second execution platform is below the threshold; said determining whether the second overlay can be utilized for providing the AR view comprises determining that the second overlay cannot be utilized for providing the AR view; said executing the second skin comprises executing the second skin on the second execution platform; and said generating the AR overlay for the frame is based on the second overlay.

Optionally, the method comprises performing object recognition on the frame to obtain one or more object types; determining a refresh timeframe; obtaining one or more subsequent frames from the at least one frame sensor during the refresh timeframe; estimating that the one or more subsequent frames comprise the one or more object types; and utilizing the one or more object types for the processing the one or more subsequent frames without performing object recognition to the one or more subsequent frames during the refresh timeframe.

Optionally, the method comprises reducing a resolution level of the frame prior to said executing the first skin, thereby providing to the first skin a low-resolution frame; executing the first skin on the low-resolution frame; and restoring the resolution level after said executing the first skin.

Optionally, the method comprises distributing execution to an edge device in proximity of the AR device, wherein the edge device has one or more sensors, wherein said distributing comprises providing partial information of the frame to the edge device, thereby enabling the edge device to complete the partial information based on the one or more sensors.

Optionally, the method comprises distributing executions of the first and second skins to one or more execution platforms based on a policy, wherein the policy is configured to determine an execution schedule for executing the frame by the first and second skins, wherein the execution schedule defines for each patch of the frame a corresponding execution platform from the one or more execution platforms, wherein the execution schedule defines for each patch of the frame an execution timing, wherein the execution schedule complies with one or more constraints of the one or more execution platforms and with one or more constraints of the frame, wherein the execution schedule is configured to reduce resource utilization.

Optionally, the method comprises determining an estimated execution time for the frame, wherein the estimated execution time is determined based on a plurality of identified objects in the frame and based on corresponding layers that are registered on each of the identified objects, wherein said determining the estimated execution time comprises determining for each identified object corresponding execution times of registered layers that are registered on the each identified object.

Optionally, upon identifying that an object of the plurality of identified objects has an execution time that is greater than execution times of remaining objects from the plurality of the identified objects, determining that the object is an execution bottleneck, and distributing execution of registered layers that are registered on the object to an execution platform, wherein the execution platform is configured to have greater computational resources than the AR device.

Optionally, the method comprises upon determining that execution of the first skin utilizes resources that exceed a threshold, executing a limited version of the first skin.

Optionally, the method comprises determining that the first and second skins are real-world skins that utilize real-world frames, and executing the first and second skins on the frame simultaneously based on said determining.

Optionally, the method comprises determining that the first skin is a real-world skin that utilizes real-world frames, and that the second skin is not a real-world skin, wherein the first overlay from the first skin comprises a real-world alert of a real-world object in the frame, and determining whether to utilize the second overlay based on whether the second overlay is inconsistent with the alert or with the real-world object.

Optionally, the method comprises reducing a resolution level of a first portion the frame prior to executing the first and second layers on the frame; obtaining a subsequent frame from the at least one frame sensor; and reducing a resolution level of a second portion the subsequent frame prior to executing layers on the subsequent frame, wherein the first and second portions comprise different coordinate areas in a frame structure.

Optionally, the method comprises reducing a resolution level of a first portion the frame prior to executing the first layer on the frame; and reducing a resolution level of a second portion the frame prior to executing the second layer on the frame, wherein the first and second portions comprise different areas of the frame.

Optionally, the method comprises segmenting the frame into two or more patches; distributing executions of the two or more patches to two or more execution platforms based on an execution schedule; obtaining from the two or more execution platforms two or more corresponding overlays; and combining the corresponding overlays to generate the AR view.

Another exemplary embodiment of the disclosed subject matter is computer program product comprising a non-transitory computer readable storage medium retaining program instructions, which program instructions when read by a processor, cause the processor to: obtain a frame from at least one frame sensor of an AR system comprising an AR device and the at least one frame sensor; execute a first skin that is configured to be utilized by the AR system, on the frame or portion thereof to obtain a first overlay; execute a second skin that is configured to be utilized by the AR system, on the frame or portion thereof to obtain a second overlay, wherein the first and second skins are configured to provide an augmented overlay to be used by the AR system in determining an AR view, wherein said execute the second skin is performed without providing the first overlay to the second skin; determine whether the second overlay can be utilized for providing the AR view; generate the AR view based on the first overlay and based on said determine whether the second overlay can be utilized for providing the AR view; and provide the AR view via the AR device.

Yet another exemplary embodiment of the disclosed subject matter is a system comprising a processor and coupled memory, the processor being adapted to: obtain a frame from at least one frame sensor of an AR system comprising an AR device and the at least one frame sensor; execute a first skin that is configured to be utilized by the AR system, on the frame or portion thereof to obtain a first overlay; execute a second skin that is configured to be utilized by the AR system, on the frame or portion thereof to obtain a second overlay, wherein the first and second skins are configured to provide an augmented overlay to be used by the AR system in determining an AR view, wherein said execute the second skin is performed without providing the first overlay to the second skin; determine whether the second overlay can be utilized for providing the AR view; generate the AR view based on the first overlay and based on said determine whether the second overlay can be utilized for providing the AR view; and provide the AR view via the AR device.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 3 shows a flowchart diagram of a method, in accordance with some exemplary embodiments of the disclosed subject matter;

DETAILED DESCRIPTION

Figure 1:
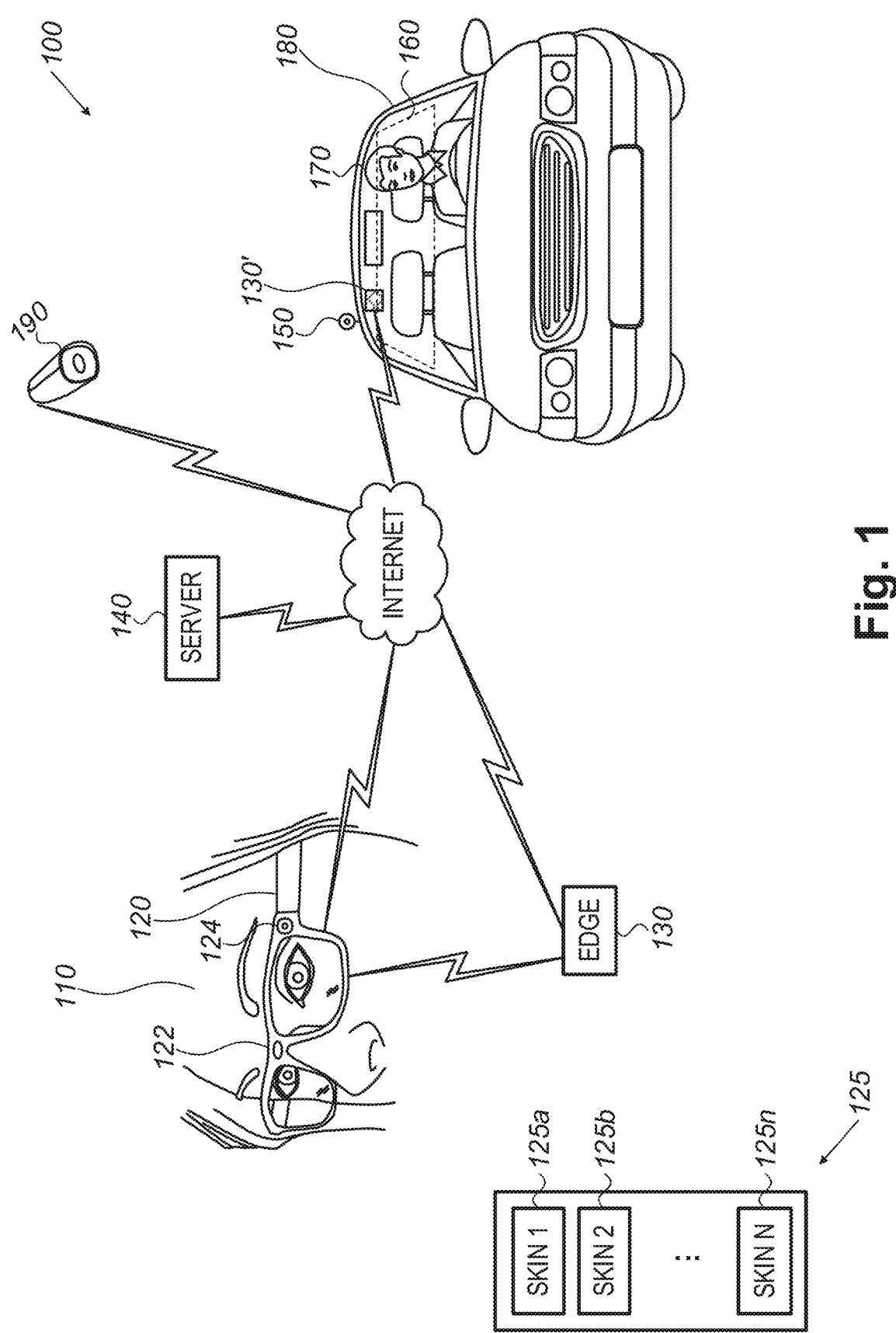
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to impose restrictions on an AR framework that is executing a skin. In some exemplary embodiments, a skin may be a software executed by an AR framework. A skin may register on an object in order to augment the object, such as in a destructive or in a constructive manner. In some exemplary embodiments, a skin may be executed locally on an AR device, such as for example AR glasses, Head-Up Display (HUD), an augmented windshield, or the like, on a nearby edge computer, on a cloud server, or the like. In some exemplary embodiments, the AR device may have relatively fewer resources than external devices. For example, the AR device may have limited power supply, limited computational resources, or the like. The edge computer may be an external device that is relatively close to the AR device, such as a computer directly paired with the AR device, a computer in the same local network as the AR device, or the like. The edge computer may be, for example, a local computer at the user's residence, a computer installed at the vehicle that the user is using, a server in a shopping mall where the user is located, a mobile device of the user, or the like. It is noted that as the edge computer is physically close to the AR device, communication latency therebetween is relatively lower than latency to a cloud server. In some exemplary embodiments, different entities may control different devices. For example, the user may own and control the AR device, the edge computer but not the cloud server. In another example, the user may not control the AR device, which may be rented. As yet another example, the edge computer may be controlled by a different entity, such as the owner of premises, an owner of the vehicle, or the like.

In some exemplary embodiments, a frame sensor that is associated with an AR framework may obtain sensitive images such as people that are not fully dressed, images of minors, or the like. It may be desired to process such images in a restricted computerized environment. Additionally or alternatively, the computerized environment executing a skin may be configured to obtain data regarding skins that a user is using and provide the data to a third party.

In some exemplary embodiments, it may be desired to allow people to impose restrictions on the AR frameworks, such as a restriction not to process their images. In some exemplary embodiments, an AR framework may add paintings to people's images, undress them, or the like. As people may not have control on who is taking their images, it may be desired to signal AR framework not to process their images.

Additionally or alternatively, the restriction may be a restriction regarding storing images of bystanders and other people that are not the users of the AR framework and whose image is captured and analyzed by the AR framework. As an example, someone may be in a video chat with her boyfriend. She may feel comfortable that the AR framework of her boyfriend will add to her image a mustache, but may not feel comfortable that the chat, or a portion thereof, will be stored for future use. In some cases, frames may be stored and processed for future purposes, and the bystander may wish to indicate her refusal to allow storage of her images.

Additionally or alternatively, local restrictions may be imposed on AR frameworks. As an example, in case of hospitals, security areas, or the like, it may be desired to impose restriction on AR frameworks while the AR device is within the restricted premises. The restriction may prevent the AR framework from processing some images, storing images of certain areas or objects, transmitting information to a computer external to the premises, manipulating display or portion thereof, either in constructive or destructive manner, or the like. In some exemplary embodiments, the restriction may require that the processing be performed on a trusted computerized environment, such as an edge computer owned by the proprietor of the premises, or the like.

Additionally or alternatively, temporal restrictions may be imposed on the AR framework. As an example, in a court room, it may be desired to impose restrictions on AR frameworks while the court is in session.

Additionally or alternatively, a bystander may wish to prevent the AR framework from identifying personal information regarding her. For example, the bystander may wish to signal the AR framework not to use facial recognition algorithms on her image, so as to prevent any executed skin from identifying her using such technique.

Additionally or alternatively, people may want to set a privacy restriction on AR devices that they do not own but are taking their images. In some exemplary embodiments, a person may be worried that an AR device is performing non-legitimate operations with respect to his appearance and may wish to ensure that the AR device is restricted from performing such operations thereon.

One technical solution is to configure an AR framework to identify a marker. A marker may be an object, an image, or the like, that is sensed by the sensors of the AR framework and which conveys information to the AR framework. The marker may be placed in a static location, such as in entrance of a building, of a room, or the like. Additionally or alternatively, the marker may be coupled with a person, such as having the person wear the marker in a visible spot. Additionally or alternatively, the marker may be an image printed on a clothing item, a tattoo, or the like. Additionally or alternatively, the marker may be embedded in a neckless, in earrings, or the like. In some exemplary embodiments, the marker may not be visible to a human eye, but may be sensible to sensors of the AR framework. For example, the marker may be captured by a camera, but may be displayed in a light frequency that is not perceived by a human being. As yet another example, the marker may be sensed using IR camera, and invisible to the naked eye. As yet another example, the marker may be concealed, but emit radio signal, such as RFID, that can be sensed by an appropriate sensor.

In response to identifying an image comprising a marker, or otherwise identifying a marker, the AR framework may be configured to alter its functionality. The functionality may be altered based on the information conveyed by the marker.

In some exemplary embodiments, altering the AR framework functionality may comprise imposing restrictions on at least one skin. The restrictions may comprise a restriction on the execution environment of the skin. For example, the restriction may prevent execution of the skin in a remote device external to the device that the AR framework is being executed on. In some exemplary embodiments, the external device may be an edge device, a cloud server, or the like. Additionally or alternatively, an external device may be a smartphone, a tablet, or the like. As a result, the skin may not be executed on a non-trusted execution environment. In some exemplary embodiments, such marker may ensure information obtained by the AR framework is not exposed to third parties, and is processed on trusted execution environments only.

Additionally or alternatively, the restriction may comprise requiring executing the at least one skin in a predetermined edge device that is external to the AR framework. As an example, a kindergarten manager may want to allow children to play, learn, or the like, with AR glasses. However, due to privacy limitations, it may be desired to prevent the AR frameworks used by the kids to send information to a remote device. Additionally or alternatively, in order to ensure that data redaction is performed when a military base is being recorded, it may be desired to force the AR framework to initially execute a skin that is issued by the military and which ensures all confidential information captured is redacted and is not presented to the user. As yet another example, a school may require execution of a redacting skin to redact any sexually explicit content from the eyes of the children who use AR devices. Additionally or alternatively, the skin may prevent analysis of some objects, may prevent storing of confidential information, or the like. Additionally or alternatively, the restriction may require that the skin is executed on the edge device of the military base. In accordance with the disclosed subject matter, a marker may be placed on the relevant premises, such as in the kindergarten or in the military base, conveying the restriction information to the AR framework. In some exemplary embodiments, the marker may comprise information regarding the edge device on which an AR framework should execute the skin. The information may be an IP address, a server name, or the like. The information may be displayed in letters and numbers, in a Quick Response (QR) code, or the like. Additionally or alternatively, the marker may be associated with an identifier that can be retrieved, and the information conveyed by the marker may be obtained from a server, such as a server accessible through the Internet, which retains a mapping that indicates, for each identifier the relevant restriction associated therewith.

Additionally or alternatively, the restriction may comprise preventing the execution of the at least one skin for a predetermined time. As an example, a user may hold a private meeting. It may be desired to set restrictions during the private meeting. As another example, a person may be giving a lecture to children. In order to keep the privacy of the children, it may be desired to set a restriction on at least one skin, for the duration of the lecture.

Additionally or alternatively, the restriction may comprise preventing at least one skin from applying functionality of facial recognition. Facial recognition may introduce privacy issues. People may not want to be constantly identified. As an example, a restaurant may place a marker in the entrance, signaling AR glasses not to execute at least one skins that is utilizing a facial recognition algorithm. As yet another example, a person who wishes to remain anonymous may wear a marker that prevents AR frameworks from identifying him. As yet another example, the person may wear a marker that requires that the AR framework would execute a skin, concealing his identity, such as by removing facial features and other identifying imagery of the person. In some cases, the skin may provide such functionality with respect to the augmented display of the user. Additionally or alternatively, the functionality may be applied with respect to stored images captured by the AR device, so as to allow the user to interact with the person on the one hand, and on the other hand, to prevent the person's image from being stored for future use without his consent.

Additionally or alternatively, altering the functionality of the AR framework may comprise preventing the AR framework from transmitting a frame or a portion thereof. In some exemplary embodiments, an AR framework may be operationally coupled with a transmitter. The transmitter may be a cellular modem, a WIFI™ chip, a BLUETOOTH™ chip, an NFC chip, or the like. As an example, a football match provider may have sold the broadcasting rights. A game provider may place a marker in the entrance of the stadium, preventing from AR frameworks to broadcast a portion of the match. In some exemplary embodiments, the images of the audience and in the crowd may still be transmitted but any portion of the field and the match itself may be excluded from being transmitted. Additionally or alternatively, no frame may be transmitted at the time of the game.

Additionally or alternatively, the marker may be associated with a marked object. In some exemplary embodiments, altering the functionality may comprise not processing or not retaining an image of the marked object. As an example, a person may be wearing a badge that constitutes a marker. The AR framework may be configured to prevent a skin may from processing the image of the person, an object associated with the person, or the like. Additionally or alternatively, the AR framework may be configured to prevent any skin from saving frames comprised by the marked object, or may be configured to redact the person from stored images.

In some exemplary embodiments, the marker may be identified by the AR framework before any of the skins are executed. In some exemplary embodiments, the skins may not be able to modify the restrictions or other altered functionality defined by the marker, thereby ensuring compliance with the instructions conveyed by the marker. Additionally or alternatively, an authority skin may be executed last to ensure that the overlay display generated by the skins is indeed in compliance with the altered functionality defined by the marker. For example, the authority skin may be registered on unmodifiable objects and ensure that the overlay display does not modify their appearance. As another example, the authority skin may be registered on objects to be redacted and ensure that no such object remains in the AR display, such as ensuring that it is redacted by the overlay display. In some exemplary embodiments, a skin, such as the authority skin, may also analyze the frame itself regardless of the objects recognized by the AR framework. This may be useful to ensure that another skin did not delete metadata about an existing object without deleting the object itself.

In some cases, a skin may be authorized to remove the restrictions that were applied due to the marker, so as to allow the authorized skin or succeeding skins to perform restricted operations, or otherwise avoid performing the altered functionality. For example, an authority skin may be executed and for users who are authorized, such as officers, may remove all restrictions applied due to the marker. The authority skin may be executed before executing other skins, thereby ensuring that other skins, which do not have permission to override marker instructions, indeed operate as they should on all objects, regardless of the marker.

Another technical solution is to provide an indication that the AR framework has identified the marker and that it is imposing the restriction. In some exemplary embodiments, a provider of a marker may wish to receive indication that AR framework is imposing the restriction. The indication may be provided using a Light-Emitting Diode (LED), a screen, an acknowledgment packet that is sent to a server, or the like. In some exemplary embodiments, an external device may be configured to receive the indication so as to ensure compliance. In some exemplary embodiments, the indication may be received using computer vision techniques. Additionally or alternatively, the marker may indicate an address of a server to which the indication is to be provided. In some exemplary embodiments, a marker may be placed in the entrance of a room, an office, at the entrance of a building, a compound, a site camp, or the like. Entrance to the premises may be prevented until it is verified that the restriction is applied. As an example, a barrier may prevent entrance to the premises, and upon receiving the indication that the restriction is applied the barrier may be removed to grant entry.

Yet another technical solution is to use a second marker in order to lift the restriction imposed by the first marker. As an example, a building may have an entrance and an exit. A marker in the entrance of the building may signal an AR framework not to execute skins that apply facial recognition. A second marker may be located at the exit of the building, indicating that the AR framework may lift the restriction and continue executing skins that restricted skins once again.

One technical effect of utilizing the disclosed subject matter is to allow people to control their privacy over AR frameworks that are being used by others. The marker may convey privacy setting of the person that is wearing the marker, which may be respected by the AR framework with respect to the marker, to associated object thereto, to a predetermined location, or the like. The privacy setting may be a restriction that the person may wish to impose on AR frameworks that capture his likeness. The restriction may be a restriction preventing from the AR framework to process the image of the person, preventing the AR framework from storing the image of the person, preventing from the AR framework from utilizing facial recognition to identify the person, preventing the AR framework from modifying his likeness, such as removing a clothing item, adding makeup to his face, modifying his hairstyle, or the like.

Additionally or alternatively, proprietors may utilize the disclosed subject matter to control functionality of AR frameworks of third parties that are being utilized on their premises. In some exemplary embodiments, markers may be utilized to impose restriction in specific locations. Non-limiting examples of such restrictions may include restrictions preventing data leakage, such as preventing the AR devices from sending captured images, redacting captured information before transmitting the data to external devices, requiring processing be performed in a trusted execution environment controlled by the proprietor, or the like; enforcing execution of desired functionality, such as monitoring visitors in the premises by executing a skin that reports their location, forcing reports of suspicious or illegal activity captured by the AR framework while in the premises, or the like.

Additionally or alternatively, entities controlling an area may utilize the disclosed subject matter to impose restrictions on AR frameworks that are being used in the area. The area may be a military base, a hospital, a playground, a court of law, or the like. An entity controlling the area may place an image of a marker in the entrance to the area, signaling entering AR frameworks the required privacy policy in that area. As an example, a hospital manager may wish to prevent from people entering the compound to use AR frameworks for identifying patients. In some exemplary embodiments, the AR framework may be embedded in eyeglasses, sunglasses, or the like. It may not be practical to band people from wearing AR glasses in a compound, however, it may be desired to restrict the functionality of the AR, which may infringe bystanders' privacy.

Another technical effect of utilizing the disclosed subject matter is to grant entry of people using AR devices only to those using AR devices that obey a desired policy. A barrier, such as a gate or a door, may be configured to open automatically upon obtaining a signal from the AR framework that acknowledges that the restriction is being imposed. In some cases, the restriction may be imposed for a predetermined timeframe or until another marker is identified and processed.

One technical problem dealt with by the disclosed subject matter is to provide an augmented reality experience to a user while utilizing computational power of computerized devices while hiding sensitive information from a non-trusted computerized device. In some exemplary embodiments, there may be several options for processing visual information, for executing skins, or the like. In some exemplary embodiments, a skin may be an application, a software, or the like. A skin may be configured to provide an AR overlay for an AR system, AR device, or the like, to be used to construct an AR view for the user. In some exemplary embodiments, a skin may be configured to process a portion of a frame, an object comprised by the frame, or the like. A skin may be applied locally, applied on an edge server, applied on a remote cloud server, or the like. In some exemplary embodiments, an AR device, such as AR glasses, a Virtual Retinal Display (VRD), or the like, may be owned and controlled by the user, as opposed to other external devices which are not owned or controlled by the user. As a result, the AR device may be considered as the most trusted device. The AR device may be configured to use an edge device, a cloud server, or the like in order to harness their additional resources, such as computational power and energy. As the user may not have control over the external devices, it may be desired desirable to limit the amount of information that is shared with such devices. However, it is noted that in some cases, the trustiness property of a device may differ based on the context. For example, an AR device that is lent to the user by third parties may be considered a non-trusted device. An edge device that is owned by the user, such as an edge device installed in his car or in his home or a mobile device acting as an edge device, may be considered as a trusted device, while an edge device installed in a rental car, in a hotel room, in a shopping mall, or the like, may be considered as a non-trusted device. As another example, the trustiness property of the cloud server may differ. In some cases, the user may trust the cloud server as it is owned and controlled by a company that he trusts, even more so than an edge device controlled by a third party. In other cases, the cloud server may not be trusted. In some cases, different amount of information may be exposed to a same third party depending on different governing laws. For example, in a territory where the government respects the privacy of citizens, more information may be exposed than in a territory where the government has control and is able to force the third party to reveal privately-held confidential information.

In some exemplary embodiments, the sensitive data may comprise images that are being captured by a frame sensor that is operationally coupled with the AR device. The sensitive images may comprise images of faces, children, confidential documents, places such as security zones, or the like.

Additionally or alternatively, the sensitive data may comprise the skins that a user is using. As an example, a married woman may use a dating skin. She may wish to hide the usage of the skin and to prevent it from being executed on an external device.

Additionally or alternatively, the sensitive data may comprise metadata determined by the AR framework or by applied skins. For example, using facial recognition, identities of bystanders may be ascertained. The facial recognition may be applied by the AR framework itself or by a specific skin. The information regarding the identity of the bystander may be retained in metadata within the AR framework for future processing. The exposure of the metadata to non-trusted devices may be limited, such as to prevent a wife from learning the identity of her husband's mistress.

Another technical problem dealt with by the disclosed subject matter is to utilize information about the field of view of the user, while avoiding sharing, directly or indirectly, such information with a non-trusted device. In some exemplary embodiments, an AR device may be configured to monitor, e.g., using a sensor, an eye tracking device, a camera, an infrared camera, or the like, the point of fixation of the user. The AR device may be configured to utilize field of view information in preparing the AR display. For example, in order to decrease power consumption of the AR display, resolution of the AR display may be reduced in the areas of a frame that are outside the point of fixation of the user, or are captured by the peripheral vision of the user. As another example, in some cases, objects that are not in the point of fixation of the user, may not be processed by skins. As an example, a skin may analyze people and provide additional information about that person, such as name, position, or the like. It may be desired to only process people that the user is looking at—e.g., within the user's focal point. Although the eye tracking information may be useful and required for such processing, the user may wish to guard his privacy and avoid sharing such information. As an example, a user may be watching a football with her spouse. She may not wish to reveal that she was looking at the coach the entire match. As yet another example, a person looking at a crowd, may not wish to share with third-parties the fact that he is looking at a woman's bosom.

One technical solution is to break the operation of providing an augmented reality experience to a user to a private task and to a non-private task. The non-private tasks may be executed by a non-trusted device, the private task may be executed by a trusted device. An overlay display that may comprise the output of a private task or of a non-private task may be generated and presented to a user. In some exemplary embodiments, determining the private task and the non-private task may be based on a privacy policy. As an example, the privacy policy may comprise a restriction requiring executing a skin that is configured to identify faces, on a trusted device. The private task may comprise applying the skin, and such private task may be executed by a trusted device, such as an edge server, the AR device, or the like. Additionally or alternatively, the non-private task may comprise executing other skins on non-trusted devices. As yet another example, the privacy policy may comprise a restriction on portions of the frame that are conveyed to non-trusted devices. The privacy policy may require redaction of a content of any visible document having a predetermined marking, such as a "CONFIDENTIAL" marking thereon. The private task may identify confidential content and remove such content from a frame before transmitting the frame to be processed (e.g., by applying skins thereon) by a non-trusted device. As yet another example, the privacy policy may indicate for a target skin, properties of objects that are to be processed only by trusted devices. The private task may accordingly identify for each object to be processed by the target skin, whether it complies with the properties defined in the privacy policy. If the object is to be processed by trusted devices only, the target skin is applied on the object by a trusted device. The target skin may be applied on other objects using non-trusted devices.

In some exemplary embodiments, The AR framework may obtain frames from at least one frame sensor. In some exemplary embodiments, the private task and the non-private task may be executed, such as with respect to the frames. The AR framework may obtain an overlay display. In some exemplary embodiments, obtaining the overlay display may comprise obtaining a first overlay, which may be the output of the non-private task. Additionally, or alternatively, obtaining the overlay display may comprise obtaining a second overlay which may be the output of the private task. Additionally, or alternatively, obtaining the overlay display may comprise merging or otherwise combining the first overlay and the second overlay. The overlay display may be displayed to the user using the AR device, providing the user with an AR experience.

In some exemplary embodiments, a private portion of the frame may be determined. The private portion of the frame may be determined based on an identification of Personally Identifiable Information (PII) appearing in the frame. The PII may be information that may be used in order to trace the user, identify the user, or the like. As an example, the PII may comprise visible facial features of the user (e.g. when looking at a mirror). Additionally, or alternatively, the PII may comprise visible facial features of a person. The person may be the users' siblings, images of the users' parents, images of the users' spouse, or the like. In some exemplary embodiments, the non-private portion of the frame may be obtained by excluding the private portion of the frame from the frame. In some exemplary embodiments, obtaining the non-private portion may comprise deleting the private portion, such as by overwriting pixels thereof. Additionally, or alternatively, the private portion may be removed, and pixel values thereof may not be provided as part of the non-private portion.

In some exemplary embodiments, executing the private task may comprise processing the private portion of the frame. As a result from determining the private portion of the frame, the frame may be divided to a private portion and a non-private portion. In some exemplary embodiments, executing the non-private task may comprise processing the non-private portion of the frame. In some exemplary embodiments, the AR device may merge the first and second overlays in order to generate an overlay display that is displayed to the user. As an example, the private portion of the frame may be determined based on the field of view of the user. The non-private portion of the frame may be the frame without the private portion. In some exemplary embodiments, the portion in the frame that is being watched by the user, constituting the private portion, may be processed by the private task on a trusted device such as on the AR device, on a trusted cloud server, on a trusted edge server, or the like. Additionally, or alternatively, the non-private portion of the frame, that is not being watched by the user may, may be processed by the non-private task on a non-trusted device.

In some exemplary embodiments, it may be desired to save power by downscaling the overlay display in the peripheral portion of the frame. Additionally, or alternatively, it may be desired to hide from a non-trusted device the non-peripheral portion of the frame, at least by not disclosing is the non-peripheral portion of the frame. In some exemplary embodiments, based on the field of view of the user, a peripheral portion of the frame may be determined. The non-private task may be configured to determine a high-resolution overlay of the frame. Additionally, or alternatively, the non-private task may be configured to determine a high-resolution overlay and a low-resolution overlay of the frame. Additionally, or alternatively, the private task may be configured to obtain a low-resolution overlay of the peripheral portion of the frame. In some exemplary embodiments, upon obtaining a high-resolution overlay of the frame, the AR device may downscale a portion of the overlay corresponding to the peripheral portion of the frame. Additionally, or alternatively, the AR device may use the output of the private task, the second overlay that may be a low resolution overlay of the peripheral objects of the frame and merge it with the first overlay.

In some exemplary embodiments, a portion of the metadata may not be sent to a non-trusted device. The metadata may comprise data such as people that are with the user, the location of the user, the point of fixation the user, or the like. A private task may be considered as private due to comprising private metadata. By not sending the metadata the private task may become a non-private task, allowing to utilize resources of a non-trusted device.

In some exemplary embodiments, an AR system may determine a set of skins to be executed. A skin may require a computerized device having a trust above a predetermined threshold to be applied thereon. In case that there are no computerized devices having a trust score that is above the threshold, the AR system may exclude that skin from the set of skins.

One technical effect of utilizing the disclosed subject matter is to exploit computational resources external to the AR device while keeping the privacy of the user. In some exemplary embodiments, the AR device may use a battery and it may be desired to save electrical power by executing some tasks on another device. Additionally, or alternatively, the AR framework may be configured to execute tasks requiring a large amount of computational power. Hence, it may be desired to execute some tasks on another computerized device. The disclosed subject matter may be used to determine the private task and the non-private task, to determine another computerized device to execute the tasks thereon in order to save battery power and execute CPU intensive tasks while keeping the privacy settings.

Another technical effect of utilizing the disclosed subject matter is to exploit a trusted network and a non-trusted network based on privacy settings. In some exemplary embodiments, an AR device may be able to connect both to a private network and to a non-private network, such as a private WIFI™ and a public cellular network. The AR device may utilize the private network in order to send private data to be processed by a private device and the non-private data to be processed by a non-trusted device.

One technical problem dealt with by the disclosed subject matter is providing to a user an enhanced Augmented Reality (AR) experience, e.g., to provide a low-latency AR experience, a reliable AR experience, or the like. In some exemplary embodiments, an AR experience may be generated by obtaining visual information, processing the visual information by executing software or firmware layers referred to as skins (also referred to as "layers", "applications", and "filters") thereon, and displaying an output AR view. In some exemplary embodiments, skins may be relatively small pieces of software or firmware, a software application, or the like, that may be configured to change objects in a frame, add objects to a frame, add labels to objects, add descriptive elements to objects, or the like. In some exemplary embodiments, a skin may be registered to one or more object types of interest, e.g., a human object, a cat, a human nose, or the like. As an example, skins may be used to identify humans and display their identification information near them, to replace cats with dogs, to enhance an esthetic appearance of the user's surroundings, to modify viewed humans to be seen without their clothes, to replace a first type of advertisement with a second type of advertisement, or the like. In some exemplary embodiments, a user of an AR device may select skins or filters as he desires, and they may be activated all at once, e.g., upon identifying registered objects by the AR device, continuously, periodically, upon identifying an event, upon obtaining a user activation instruction, or the like. For example, a skin may not share with the AR device a target object type, e.g., for privacy reasons, and thus may continuously search for the object type itself without relying on the object recognition of the AR device. In some exemplary embodiments, the skins may be obtained, installed, selected, or the like, from a skin store, an application store, a web source, a network source, or the like. In some exemplary embodiments, a platform may be configured to process a captured frame or image in real time, recognize objects in the frame, and provide each object or patch thereof to the relevant skins.

In some exemplary embodiments, visual information may be initially processed to identify types of objects, e.g., using one or more object recognition techniques, and each skin that is registered on an identified object type may be applied thereto. The AR framework may support a variety of objects types, such as but not limited to a person, an animal, a cat, a house, a road, a plant, a tree, a face, an eye, or the like. In some exemplary embodiments, an object may comprise other objects. As an example, an object of type person may comprise objects of types face, eyes, arms, clothes, or the like. In some exemplary embodiments, a skin may be configured to process a patch of a frame, an object in the frame, an entire frame, or the like. In some exemplary embodiments, a frame patch may refer to a portion of a frame that may be provided to one or more skins or execution platforms. In some exemplary embodiments, each skin may register on one or more object types, frame portions, or the like, and be applied only to objects of those types. In some exemplary embodiments, a skin may be configured to provide an AR overlay for an AR system, AR device, or the like, to be used to construct an AR view for the user.

In some exemplary embodiments, in case that more than one skin is registered on a same identified frame object or frame portion, on different objects that have one or more overlapping portions, on non-overlapping objects that cannot be processed simultaneously, or the like, the skins may be executed sequentially according to an order, which may slow down the system. In some exemplary embodiments, the order may affect the outcome. For example, an object of type "cat" may be registered to a first layer that colors the cat in purple, and to a second layer that replaces the cat's head with a dog's head. According to this example, changing the order of the layers may provide different results; in one order the dog's head will be purple, and in the other order the dog's head will not be colored. It may be desired to obtain the original output that is a result of executing the registered layers according to the defined order, while reducing a latency that results from the sequential manner of processing.

One technical effect of utilizing the disclosed subject is reducing a latency of executing skins for the AR view. In some exemplary embodiments, the disclosed subject matter enables to run in non-sequentially two or more subsequent skins that are registered on a same frame portion, instead of processing the skins sequentially. Additionally or alternatively, the disclosed subject matter enables to run shadow layers on different platforms in order to reduce a communication period, which in some cases may be totally eliminated due to the usage of the shadow layer. In some exemplary embodiments, implementing the disclosed subject matter may save time, reduce an overhead, and enhance an AR experience due to providing AR functionality with a lower latency.

Another technical problem dealt with by the disclosed subject matter is saving computational and power resources of an AR device. It may be desired to enhance a speed and reduce battery usage of the AR device, e.g., without compromising on the user experience. In some exemplary embodiments, the AR device that the user is using may be limited in terms of central processing unit (CPU), battery, or the like. The CPU of the AR device may not be fast enough to execute a large number of skins simultaneously, per frame, in compliance with strict latency requirements, or the like. Additionally or alternatively, executing a skin may require graphical calculations that may cause high power consumption resulting in battery drain. It may be desired to find an enhanced distribution of execution platforms and an enhanced order of execution at each device. An enhanced execution distribution may be enhanced in terms of latency and execution time, while complying with one or more constraints.

One technical solution for reducing a latency of an AR experience is to execute one or more skins that are registered on a same or overlapping object simultaneously, in parallel, without waiting for an overlay input from pervious skins, or the like. In some exemplary embodiments, an AR system may be configured to provide an AR view, e.g., as part of an AR experience. In some exemplary embodiments, the AR system may comprise at least one AR device, e.g., wearable or non-wearable, one or more frame sensors configured to capture visual input, or the like.

In some exemplary embodiments, the AR device may be configured to communicate with the frame sensors to obtain visual information, to process the visual information using one or more layers, and to display to the user the resulting AR view. In some exemplary embodiments, the AR device may comprise at least a first skin and a second skin, which may each be configured to provide an augmented overlay to be used by the AR system in determining the AR view. For example, in case the first layer is configured to replace cats with dogs, and the second layer may be configured to color noses red, a first overlay from the first layer may comprise a dog that is to replace a depicted cat object, and a second overlay from the second layer may color the dog's nose red.

In some exemplary embodiments, since more than one layer may be applied to a same object or frame patch, a skin execution order between registered skins defining an order for processing an augmented display may be determined, defined, obtained, or the like. In some exemplary embodiments, the skin execution order may define that in case the first and second skins are registered on a same object, the first skin is to be executed first and the second skin is to be executed subsequently, or vice versa. In some exemplary embodiments, the skin execution order may define that in case the first skin is to be executed before the second skin, the first skin may be configured to provide to the second skin an augmented overlay, and the second skin may be configured to process the augmented overlay as an input.

In some exemplary embodiments, the frame sensor may capture one or more frames, images, or the like. In some exemplary embodiments, the AR device may obtain a frame from the frame sensor of the AR system. In some exemplary embodiments, the frame captured by the frame sensor may depict one or more identified objects, portions, or the like, each of which may have one or more registered layers, skins, or the like. In some exemplary embodiments, in case the frame comprises portions with a single registered layer, the single registered layers may be executed in parallel. In some exemplary embodiments, in case the frame comprises overlapping portions or objects with at least two registered skins, the layers may be required to comply with the order of execution dictating the order between the registered layers.

In some exemplary embodiments, the frame may depict one or more overlapping portions or objects that are registered by both the first and second layer. For example, in case the first layer is registered on noses and the second layer is registered on human faces, a human object that comprises both a face and a nose may be considered an overlapping object having overlapping portions. In some exemplary embodiments, based on identifying that the first and second layers are registered on an overlapping portion, instead of utilizing the skin execution order, a different execution policy may be performed.

In some exemplary embodiments, the first skin may be executed on the registered portion of the frame, thereby obtaining a first overlay. In some exemplary embodiments, the second skin may be executed on the registered portion of the frame, thereby obtaining a second overlay, e.g., without obtaining the first overlay from the first skin. In some exemplary embodiments, the executions of the first and second skins may be performed simultaneously, in parallel, without waiting for an overlay input from pervious skins, or the like.

In some exemplary embodiments, before combining the overlays to obtain the AR view, the AR device may determine whether the second overlay can be utilized for providing the AR view. In some exemplary embodiments, based on whether the second overlay can be utilized for providing the AR view, and the first overlay, the AR view may be generated. In some exemplary embodiments, in case the second overlay is determined to be used for providing the AR view, the first and second overlays may be utilized and combined to generate the AR view. In some exemplary embodiments, in case the second overlay is determined not to be used for providing the AR view, the second overlay may be modified or omitted, e.g., to be regenerated using the first overlay. In some exemplary embodiments, the resulting overlays may be combined to provide the AR view via the AR device.

In some exemplary embodiments, instead of waiting, at each registered layer, for overlay inputs from previous layers according to the order of execution, the layers may process the frame in parallel, prior to obtaining a previous overlay. In some exemplary embodiments, executing the second layer prior to obtaining from the first layer the first overlay may reduce a latency caused by the waiting time to the first layer. In some exemplary embodiments, executing the first and second skins may be performed partially or fully in parallel, simultaneously, or the like. In some exemplary embodiments, executing the first and second skins may be performed at different non-parallel times, e.g., without obtaining the first layout at the second skin.

In some exemplary embodiments, after executing the skins, the output overlays from each skin may be analyzed to determine whether they can be utilized in combination with each other and potentially with previous skins, e.g., to comply with the required outcome according to the order of execution. In some exemplary embodiments, determining whether the second overlay can be utilized for providing the AR view may comprise determining whether the first and second overlays are inconsistent with each other. In some exemplary embodiments, determining whether the first and second overlays are inconsistent with each other may comprise utilizing first metadata of the first overlay and second metadata of the second overlay. In some exemplary embodiments, determining whether the first and second overlays are inconsistent with each other may comprise identifying overlapping pixels between the first and second overlays.

In some exemplary embodiments, layers may be considered to be inconsistent in case that the overlay of one layer affects the overlay of the other layer. In some exemplary embodiments, the first and second layers may be considered to be inconsistent in case implementing the first layer on a registered object causes the second layer to become irrelevant. For example, in case both layers are registered on a person object, the first layer removes the person's head and the second layer applies makeup to the person's face, then upon implementing the first layer, the second layer may become irrelevant as there may not remain any face to apply makeup to. In some exemplary embodiments, metadata regarding the skins may be utilized to identify potential inconsistencies. In some exemplary embodiments, metadata of a skin may describe one or more types of objects the skin is registered to, and one or more functionalities or effects to the objects that are configured to be performed by the skin, e.g., changing an object, removing an object, or the like. In some exemplary embodiments, the first and second layers may be considered to be inconsistent in case implementing the first layer on a registered object provides a first layout that overlaps at least on part with a layout of the second layer. For example, in case the first layer dyes hair of a dog object to purple, and the second layer adds a hat to the dog, then pixels of the dog's head that are colored in purple may overlap with pixels that are hidden by the hat, thereby causing the overlays to become inconsistent.

In some exemplary embodiments, pixels that were added or modified by each skin may be compared to identify any pixel overlaps, similar affected areas in the frame, same target objects, or the like. In some exemplary embodiments, in case no overlap of pixels, target objects, target patches, or the like, is identified, it may be determined that the output overlays of the two or more skins may be utilized by the AR system in order to display an AR view, e.g., in combination with each other. In such cases, a latency of the AR framework may be reduced, as there may be no need for sequential execution that may slow down the system. In some exemplary embodiments, in case the skins' overlays overlap or affect the same frame or object areas, an overlay outcome of the later skin (in relation to the order of execution) may be amended or dropped. In case the overlay outcome is dropped, it may be later re-computed, regenerated, or the like, while utilizing the previous overlay according to the sequential order of executions.

In some exemplary embodiments, upon determining that the first and second overlays are consistent with each other, the second overlay may be utilized, without modifications, for generating the AR view. In some exemplary embodiments, upon determining that the first and second overlays are inconsistent with each other, the second overlay may be modified based on the first overlay, e.g., to obtain a modified second overlay. In some exemplary embodiments, the second overlay may be modified by amending pixels of the second overlay to be consistent with the first overlay. In some exemplary embodiments, the second overlay may be modified by regenerating the second overlay by executing the second skin on the first overlay. In some exemplary embodiments, the AR view may be generated by utilizing the modified second overlay and the first overlay.

As an example, for a first skin or layer (L1) and a second skin (L2) that are configured to be executed according to an order of first L1 and then L2 utilizing L1's output layout, both skins may be executed in a non-sequential form and overlay results may be compared, analyzed, or the like. Alternatively, metadata of the layers may be utilized to identify whether both skins relate to an overlapping portion or object of the frame in an inconsistent manner. In case an overlap is not identified, indicating that both results can be used without interfering with each other, overlay results of both layers may be combined to create the AR view. In case an overlap is identified and is determined to be a minor overlap or an easily fixed overlap, the overlapping pixels or their area may be amended and utilized to create the AR view. In case an overlap is identified and is determined to be a major overlap that is difficult to fix, the overlay of L2 may be dropped and regenerated based on the overlay generated by L1, which may be used as an input.

In some exemplary embodiments, determining whether the second overlay can be utilized for providing the AR view may comprise determining, based on the first overlay, that the second overlay is inconsistent with the first overlay. In some exemplary embodiments, generating the AR view may comprise executing again the second skin based on the frame and based on the first overlay, e.g., to obtain a new second overlay. In some exemplary embodiments, generating the AR overlay for the frame may be performed based on the new second overlay.

As another example, layers L1, L2, L3, may all be registered on a same object type that is identified in a captured frame, the order of execution being L1, L2, and then L3. Instead of processing the layers according to the order of execution by executing L1 on the image, providing the output overlay of L1 to L2, processing the received information at L2, and providing an output overlay to L3 for further processing, they can all be processed in a non-sequential manner, e.g., simultaneously, simultaneously in part, or the like. Alternatively, the frame may be fully processed by L1, and L1's overlay output may be provided to both L2 and L3, which may both process the output of L1 in a non-sequential manner, e.g., simultaneously, simultaneously in part, or the like. In some exemplary embodiments, consistent portions of the overlays that are not affected by the order of execution may be maintained, while inconsistent portions may be recalculated using the original execution order or amended. In case L2 and L3 both perform non-sequential execution of L1's overlay, frame areas that are modified by both L2 and L3 may be identified, and the output overlay of L3 may be reprocessed with the output overlay of L2 as an input, or alternatively, the overlapping area may be amended without dropping previous calculations, e.g., in case such an amendment would require a minor computation.

As another example, the second skin may be registered on an object type, e.g., a human, an animal type, an inanimate object, or the like. In some exemplary embodiments, the frame may comprise a plurality of objects of the registered type, e.g., first and second objects of the object type. In some exemplary embodiments, the second overlay may comprise first and second sub overlays corresponding to the first and second objects. In some exemplary embodiments, the first sub overlay may comprise an output provided by the second skin in response to processing the first object, and the second sub overlay may comprise an output provided by the second skin in response to processing the second object. In some exemplary embodiments, determining whether the second overlay may be utilized for providing the AR view may comprise determining that the first sub overlay is consistent with the first overlay, and determining that the second sub overlay is inconsistent with the first overlay. In such cases, a third sub overlay may be determined or generated by the second skin, e.g., based on the first overlay. In some exemplary embodiments, the third sub overlay may comprise an overlay for the second object, that is consistent with the first overlay. In some exemplary embodiments, the AR overlay may be generated for the frame based on the first sub overlay and on the third sub overlay.

In some exemplary embodiments, non-sequential execution (also referred to as "speculative execution") of the second skin may be determined to be performed prior to an availability of the first overlay from the first skin. In some exemplary embodiments, executing the second skin that is performed without providing thereto the first overlay may be contingent on the determination as to whether or not to perform the speculative execution.

In some exemplary embodiments, a predictor, a software agent, a classifier, or the like, may be deployed to estimate outcomes of skins, e.g., to provide a determination as to whether or not to perform the speculative execution. In some exemplary embodiments, prior to performing non-sequential execution of two or more skins that are registered to a same frame portion, a predictor may estimate outcomes of each of skin and determine whether they will be inconsistent with each other. In some exemplary embodiments, the predictor may comprise a data-derived predictor, a machine learning predictor, a heuristic-based predictor, or the like. In some exemplary embodiments, the predictor may be utilized to determine whether to perform a non-sequential execution of the second skin, or whether the second skin is to be executed sequentially after obtaining the first overlay from the first skin. In some exemplary embodiments, the predictor may be configured to predict a probability that the first overlay will be inconsistent with the second overlay, e.g., based on a predicted functionality of each skin, on metadata of each skin, on identified objects in the frame, or the like.

In some exemplary embodiments, the predictor may identify whether a skin relates to a same object as another skin, whether they relate to overlapping objects, whether they relate to a same portion of a same object as another skin, whether they relate to an adjacent area of an object as another skin, or the like. In some exemplary embodiments, in case two skins are not registered to a same object or area, the skins may be estimated to be consistent. In some exemplary embodiments, in case outcomes of layers are estimated to be inconsistent, sequential processing may be performed according to the original execution order, e.g., at least for the inconsistent skins. For example, a person object that is estimated to be engaged in an activity of running towards another person object may be estimated to potentially be inconsistent with layers of the other person, e.g., as the persons may have an overlapping frame area with overlapping pixels, which may cause the layers to be inconsistent with each other, and thus sequential layer execution may be advantageous to non-sequential execution.

In some exemplary embodiments, in response to identifying that the first and second overlays are inconsistent in a certain frame area, such as a small frame area, a partial execution of the second skin may be performed, e.g., excluding the certain area. In some exemplary embodiments, a partial execution may be performed in case the inconsistent area is determined to be smaller than a threshold, in case the layers' objective is determined to have a low score of inconsistence, e.g., below a threshold, in case the layers' execution time is estimated to be time consuming, in case the layers are estimated to use heavy computation sources, or the like. For example, a first layer that is configured to change legs of a human and a second layer that is configured to change a shirt of the human may be considered to have a low score of inconsistence, e.g., as the objective to not necessarily contradict, and even in case they do contradict, the overlapping area is estimated to be small. In some exemplary embodiments, an objective of a skin may be determined based on metadata thereof, history data thereof, registered objects thereof, or the like.

In some exemplary embodiments, a partial parallel execution may include generating a skin overlay on portions of the frame that are not estimated to be affected by another skin. In some exemplary embodiments, the partial execution may be implemented by generating a full first overlay of the first skin and generating a partial second overlay that is predicted to have a low probability of being inconsistent with the first overlay. In some exemplary embodiments, the first overlay and the partial second overlay may be generated in a non-sequential way, e.g., simultaneously, in parallel, or the like. In some exemplary embodiments, generating the AR view may comprise utilizing the first overlay, utilizing the partial second overlay, and completing execution of the second overlay based on the first overlay. In some exemplary embodiments, a supplement second overlay may be obtained by executing the second skin on the missing frame area using the first overlay, e.g., which may be a low latency execution as it comprises a partial execution. In some exemplary embodiments, since the partial second overlay may not be executed sequentially compared to the first overlay, generating the partial second overlay may have a reduced latency, thereby reducing the overall latency.

In some exemplary embodiments, a partial parallel execution may include generating a lower quality skin overlay for such portions, e.g., in low resolution. This may save computational power and reduce latency. In some exemplary embodiments, in addition to or instead of generating a full first overlay of the first skin and generating a partial second overlay of the second skin, the second skin may be executed on a low resolution version of the frame, e.g., to reduce a latency thereof, and the supplement second overlay may be generated on a non-consistent portion of the frame, e.g., in full or low resolution.

Another technical solution for reducing a latency of an AR experience is executing one or more shadow layers, in addition to executing the defined layers. In some exemplary embodiments, skins may be executed by one or more devices such as a server, the AR device, an edge device of the same user, remote cloud server, or the like. In some exemplary embodiments, skins may be executed on different execution platforms according to one or more execution schedules or allocations, e.g., executing the first skin may be performed at a first execution platform, and executing the second skin may be performed at a second execution platform.

In some exemplary embodiments, in addition to implementing the one or more execution schedules or allocations of execution platforms for each skin, additional shadow skins may be executed, e.g., in order to reduce an execution latency. In some exemplary embodiments, a shadow layer or skin may refer to executing a layer in an addition execution platform, e.g., in parallel, simultaneously, in a non-sequential manner, or the like. In some exemplary embodiments, the shadow layer may perform a partial or full execution of the original layer, may be executed on a reduced-resolution of full resolution version of the frame, may obtain the entire skin or metadata thereof, or the like. In some exemplary embodiments, a shadow layer of a skin may be executed on a server or any other execution platform while a corresponding layer is processed at the AR device, an edge device, or the like.

In some exemplary embodiments, shadow layers of skins may be executed in case an execution platform is at least partially idle during an estimated execution period of the layers or has extra computational power or time that may be utilized for generating an overlay of the shadow layer. In some exemplary embodiments, shadow layers may be executed in case an execution platform is configured to process a subsequent layer. In such cases, the subsequent layer may be processed on the outcome of the shadow layer, prior to receiving outcome from the original layer processed at the original execution platform, e.g., thereby reducing a communication latency.

In some exemplary embodiments, executing the first skin may be determined to be performed at a first execution platform, e.g., according to an execution schedule. In some exemplary embodiments, the first skin may be executed on a second execution platform, in addition to the first execution platform, in order to obtain a shadow overlay of the first skin. In some exemplary embodiments, execution of the second skin may be determined to be performed at the second execution platform, e.g., according to the execution schedule. In some exemplary embodiments, the second skin may be executed on the shadow overlay instead on the first overlay provided from the execution on the first execution platform. In some exemplary embodiments, instead of waiting for the first overlay to be provided via a communication medium to the second execution platform, the second execution platform may generate the second overlay without any latency or waiting time using the shadow overlay.

In some exemplary embodiments, upon receiving the first overlay at the second execution platform from the first execution platform, the first overlay and the shadow overlay may be compared, e.g., to identify whether they are consistent, identical, match, or the like. In some exemplary embodiments, in case the first overlay and the shadow overlay are consistent with each other, the second overlay generated by the second execution platform may be utilized to provide to AR view. In some exemplary embodiments, layers may be considered consistent in case the pixel are identical or in case a difference between the layers is identified as being a non-semantic difference such as a resolution difference, a lighting difference, or the like. In some exemplary embodiments, in case the first and shadow overlays do not match, are inconsistent, or the like, the second overlay may be amended or regenerated using the first overlay instead of the shadow overlay.

For example, in case a first layer (L1) is being executed at the AR device, but a second layer (L2) that is registered to the same object as L1 is scheduled to be executed at a server, the server may reduce a latency of communicating the output overlay of L1 to the server by executing a shadow layer of L1, referred to as L1', at the server. In some exemplary embodiments, L1' may be executed at the server during the execution of L1 at the AR device, e.g., enabling the server to immediately execute L2 on the outcome of L1' without waiting to receive the outcome of L1. Upon receiving the output of L1 from the AR device, the server may compare the outcomes of L1 and L1' to verify that they are identical. In case a difference is found between the outcomes of L1 and L1', the server may reprocess L2 on the original L1, or perform minor amendments to L2, e.g., if possible.

Yet another technical solution is prioritizing layers, e.g., in case not all layers can be implemented due to a lack of resources. In some exemplary embodiments, some skins that are registered to frame objects may not be performed, implemented, or the like, e.g., in order to reduce an overall latency of the AR view. In some exemplary embodiments, skins may be determined not to be performed based on priority levels of the skins. In some exemplary embodiments, a user may indicate his priorities regarding the registered layers, e.g., via a user interface. In some exemplary embodiments, priorities may be indicated indirectly, based on default settings, or the like. In some exemplary embodiments, priorities may be determined automatically, e.g., based on heuristics, based on a popularity criteria, or the like. In some exemplary embodiments, based on the obtained priorities, low priority skins may not be performed in case an estimated execution time is longer than required timeframes, in case the system is determined to be lacking sufficient CPU resources to execute all layers, or the like.

In some exemplary embodiments, priority rankings of a plurality of skins may be obtained. In some exemplary embodiments, the priority rankings may indicate that a first subset of the skins has priority over a second subset of skins, which may have priority over a third subset, and so on. In some exemplary embodiments, the priority rankings may represent a utility of each skin relative to the resources it consumes, user preferences, or the like. In some exemplary embodiments, resources that are required for performing the skins may be estimated, e.g., based on metadata of the skins, a code of the skins, or the like. In some exemplary embodiments, upon determining that executing the plurality of skins has one or more drawbacks, e.g., utilizing more CPU than available, draining the battery of the AR device, or the like, one or more skins may be refrained from being executed. In some exemplary embodiments, skins may be determined to be refrained from execution based on a calculation considering parameters such as the priority of the skins, the resource required by each skin, the utility of each skin, alternative heuristics, or the like. In some exemplary embodiments, the parameters used for the calculation may be weighted evenly, differently, based on the rules, based on user determined weights, default settings, or the like.

In some exemplary embodiments, the priority rankings may indicate that the first skin has a higher priority than the second skin, e.g., or vice versa. In some exemplary embodiments, a possibility of executing both skins may be predicted, calculated, or the like. In some exemplary embodiments, upon determining that execution of the first skin and the second skin utilizes resources that exceed a threshold, and that the first skin is indicated as having a higher priority than the second skin, the AR framework may refrain from executing the second skin, or vice versa. In some exemplary embodiments, upon determining that execution of the first skin and the second skin utilizes resources that comply with a threshold, both skins may be executed.

Yet another technical solution is running a limited version of one or more skins, e.g., in case computational and time resources are not sufficient to perform a full execution of the registered skins, upon determining that execution of a skin utilizes resources that exceed a threshold, in case a reduced latency is desired, or the like. In some exemplary embodiments, a limited skin version may be implemented by limiting skin computations such as object recognition computations, limiting resolution levels of the frame, or the like.

In some exemplary embodiments, implementing a limited version of one or more skins may comprise limiting an object recognition functionality. In some exemplary embodiments, upon obtaining a frame, the frame may be processed using one or more object recognition techniques that are configured to identify objects in the frame, e.g., thereby enabling to detect which skins are registered to which object, and to process the skins to obtain the AR view. In some exemplary embodiments, object recognition techniques may utilize one or more resources such as computational resources, time resources, power resources, or the like. In some exemplary embodiments, instead of implementing object recognition functionality for each frame separately, results of a previous object recognition execution determined for a previous frame may be utilized by registered skins.

In some exemplary embodiments, object recognition may be performed, implemented, executed, or the like, on a determined frame to obtain one or more object types identified in the frame. In some exemplary embodiments, a refresh timeframe for performing object recognition may be determined, defined, or the like, such as periodically, every determined event, upon obtaining user input, or the like. In some exemplary embodiments, one or more subsequent frames that are subsequent to the frame may be obtained from the frame sensor during the refresh timeframe, e.g., before the refresh period is expired. In some exemplary embodiments, instead of performing object recognition to each of the one or more subsequent frames, the one or more subsequent frames may be estimated to comprise the same one or more object types that were detected for the determined frame. In some exemplary embodiments, the one or more object types may be utilized for the processing the one or more subsequent frames without performing object recognition to the one or more subsequent frames during the refresh timeframe.

In some exemplary embodiments, object recognition calculations may be performed every defined refresh timeframe so that the results will be refreshed and new objects that enter the user's AR view will be detected. In some exemplary embodiments, upon expiration of the refresh timeframe, object recognition may be performed to the following frame and results may be utilized until expiration of a subsequent refresh timeframe, and so on. In some exemplary embodiments, since object identities do not tend to change entirely in a high frequency, performing object recognition for each and every frame may not be always necessary. In some exemplary embodiments, using already existing results may reduce calculation time and resource consumption.

In some exemplary embodiments, implementing a limited version of one or more skins may comprise limiting a resolution level of one or more frames portions, frame patches, or the like. In some exemplary embodiments, an entire or partial resolution level of the frame may be degraded or reduced, e.g., by 10 percent, 5 percent, or by any other percentage, prior to execution of one or more layers. In some exemplary embodiments, a resolution of an image may be reduced during processing of one or more layers. In some exemplary embodiments, after execution of the layers, the resolution may be restored or enhanced, e.g., to a High Definition (HD) level, to a previous resolution level, or to any other resolution level. In some exemplary embodiments, the resolution may be restored or enhanced using one or more super-resolution techniques, one or more graphic enhancement techniques, or the like. In some cases, the resolution may not be enhanced after execution.

In some exemplary embodiments, in order to provide an overall high-resolution experience in which the quality degradation is not noticeable, the degradation may be performed in a different portion of the image every captured frame, every skin execution, or the like. For example, a first portion of 2/50 of the frame may be degraded in a first frame, a different 2/50 portion of the frame may be degraded in the next frame, or the like. In some exemplary embodiments, a portion of the frame that is converted to lower resolution may be selected randomly, selected based on an importance score of frame objects, selected based on objects of interest, selected based on user priorities, or the like. In some cases, the size of the portion that is degraded in quality may be determined randomly or defined.

In some exemplary embodiments, a different portion of a frame may be reduced in resolution for each captured frame, for one or more selected frames, for each nth frame, n being a selected number, or the like. In some exemplary embodiments, a resolution level of a first portion a frame may be reduced prior to executing first and second layers on the frame. In some exemplary embodiments, a subsequent frame may be obtained from the frame sensor. In some exemplary embodiments, a resolution level of a second portion the subsequent frame may be reduced prior to executing layers on the subsequent frame. In some exemplary embodiments, the first and second portions may comprise different or randomly selected coordinate areas in a frame structure.

In some exemplary embodiments, for each skin registered on a frame, a different portion of the frame may be reduced in resolution. In some exemplary embodiments, a resolution level of a first portion a frame may be reduced prior to executing a first skin on the frame. In some exemplary embodiments, a resolution level of a second portion the frame may be reduced prior to executing a second skin on the frame. In some exemplary embodiments, the first and second portions may comprise different areas in the same frame.

Yet another technical solution of the disclosed subject matter is determining an enhanced order of skin executions for skins that are registered to a same or overlapping frame object, portion, or the like. Additionally or alternatively, the order of execution may be determined for skins that are registered to different objects but cannot be processed simultaneously, e.g., due to a lack in computational resources, in power resources, or the like. In some exemplary embodiments, a user may define an original order of execution. Alternatively, an original order of execution may be obtained from a computing device such as a server, determined by the AR framework, or the like. In some exemplary embodiments, an order of execution may be dynamically modified, selected or controlled based on a context. For example, in case a user is outside, the user may wish to utilize a selected order of execution that provides useful real-world information. In case the user is playing a social game indoors, e.g., where the actors are replaces with virtual historical figures, the user may wish to obtain factious information of the historical figures, e.g., using a different order of execution.

In some exemplary embodiments, the order of execution may define an order of skins receiving overlay from previous skins, processing the overlays, and providing outcome overlays as an input to the next skin in the order. In some exemplary embodiments, the order of execution may define that an object that is created by a layer will not be processed by any previous layer. For example, an order of execution may define an order of execution between a deepfake skin that replaces depicted people with famous people, and a face recognition skin that indicates an identity of the depicted people. In case the deepfake skin is executed first, replacing a person with a famous person, e.g., Donald Trump, the face recognition skin may indicate that the person is Donald Trump. Otherwise, in case the face recognition skin is executed first, the depicted Donald Trump may be indicated as having the identity of the previously-depicted person. In some exemplary embodiments, although an order of execution may be defined, it may be desired to identify alternative ordering that may provide the same result while using less resources. Specifically, a more efficient order of layer executions may be desired.

In some exemplary embodiments, an attempt of modifying the order of execution may be performed. In some exemplary embodiments, the attempt may include grouping non-consecutive layers in a consecutive order, reordering the order of execution, or the like. In some exemplary embodiments, the modified order may be selected based on determining an order with reduced resource utilization, an enhanced speed, or the like, which may be determined based on one or more classifiers, predictors, or the like. In some cases, the modified order may be determined randomly, based on instruction, based on rules, or based on any other information. In some exemplary embodiments, in some cases, the modified order may be configured to omit one or more layers that are estimated as having no influence on a resulting view. For example, a first skin that dresses a person with yellow clothes may be followed by a second skin that dresses the person with purple clothes. As the output overlay of the first skin is overrun by the overlay of the second skin, omitting the first skin from the order of execution may not modify an overall outcome.

In some exemplary embodiments, a first order of execution, a skin execution order, an original order of execution, or the like, may be obtained. In some exemplary embodiments, the first order of execution may determine or define an order of skin executions of a plurality of skins comprising the first and second skins. In some exemplary embodiments, the plurality of skins may be registered on a same object in the frame, or may not be processed together for any other reason. In some exemplary embodiments, the plurality of skins may be executed according to the first order of execution, e.g., to obtain a first result.

In some exemplary embodiments, a second order of execution between the plurality of skins may be obtained, determined, defined, or the like. In some exemplary embodiments, the second order of execution may be determined to utilize less resources than the first order of execution. In some exemplary embodiments, the second order of execution may define that the second skin is to be executed before the first skin. In some exemplary embodiments, the plurality of skins may be executed according to the second order of execution to obtain a second result.

In some exemplary embodiments, the first and second results may be compared. In some exemplary embodiments, based on a determination that the first and second results are identical, the first order of execution may be determined to be replaceable with the second order of execution. In some exemplary embodiments, in case the second order of execution is determined to utilize less resources than the first order of execution, and the first and second results are determined to be identical, the second order of execution may be set for executing skins instead of the first order of execution.

Yet another technical solution is distributing computations of the AR device to an edge device. In some exemplary embodiments, skins may be executed on different execution platforms, e.g., while complying with one or more constraints. In some exemplary embodiments, since the AR device may be comparatively weak in its computations, and communicating with a remote cloud server may be time consuming and battery consuming, it may be advantageous to execute skins on one or more nearby edge devices having greater computational power that the AR device, which may enable swift communications with the AR device without draining the AR device's battery for communication and execution purposes.

In some exemplary embodiments, an edge device may include a user's car's computer, a computing device of the user, e.g., at his home, an office device, or the like, that is nearby the user. In some exemplary embodiments, it may be desired that an execution of a layer, including the roundtrip between the executing device and the AR device, will be performed swiftly, e.g., not longer than $\frac{1}{50}$ of a second, or any other time threshold. In some exemplary embodiments, in order to further enhance a computational speed of executing a layer, different portions or patches of the frame may be cropped and processed separately in different devices, and then returned to form the full overlay output of the layer. For example, one object of a frame may be cropped and processed at the edge device, while a remaining object may be processed at the AR device.

In some exemplary embodiments, execution of skins, e.g., the first and second skins, may be distributed to an edge device in proximity of the AR device. In some exemplary embodiments, the edge device may comprise one or more sensors, e.g., imaging sensors. In some exemplary embodiments, the edge device may be associated with the sensors, communicate therewith, or the like. Alternatively or additionally, sensors may be integrated as part of the edge device. In some exemplary embodiments, in case the edge device comprises one or more sensors, the entire frame data from the AR device may not be required to be provided to the edge device, e.g., since the edge device may be able to independently accumulate supplement sensor information and recreate the original frame based thereon. In some exemplary embodiments, in case the sensors capture visual information that overlaps at least in part with the captured frame, the edge device may utilize the sensor information from the sensors in order to obtain supplement frame information. In some exemplary embodiments, in such cases, distributing the execution to the edge may comprise providing partial information of the frame to the edge device, thereby enabling the edge device to complete the partial information based on its supplement frame information from the one or more sensors.

For example, the AR device may provide the edge device with partial information of the captured frame, and the edge device may complete the missing frame information based on sensor information gathered at from the one or more sensors of the edge device of the same area, e.g., in a slightly different angle. In some exemplary embodiments, image processing techniques or any other technique may be utilized by the edge device in order to align its sensor information with the angle of the AR device. In some exemplary embodiments, the AR device may provide to the edge device sufficient sensor information so that an angle of the AR device's sensors may be determinable based thereon. In some exemplary embodiments, distributing only a portion of the AR device's sensor information may reduce the AR device's latency, battery drain, transmission costs, or the like. In some exemplary embodiments, calculations performed by the edge device may be provided to the AR device to be used thereby. As an example, the AR device and the edge device may observe the same scene, e.g., including an object such as a person identified by the edge device. In some exemplary embodiments, the edge device may provide the AR device with the identification of the object, thereby reducing the load of the AR device.

Yet another technical solution is determining an enhanced work distribution between a plurality of execution platforms. In some exemplary embodiments, the AR device may distribute its executions to a the plurality of execution platform, e.g., edge devices, servers, or the like. In some exemplary embodiments, a skin in a distributed AR system may be applied locally on the AR device, applied on one or more edge devices which may be trusted or not, applied on one or more servers such as remote cloud servers, or the like. In some exemplary embodiments, a user may indicate preferred or required execution locations indicating which devices are to execute what layers, thus constituting a user constraint in the AR framework. In some exemplary embodiments, certain layers may technically not be able to be executed on certain devices or platforms, thereby constituting an additional technical constraint. For example, a facial recognition layer that is configured to recognize faces of the user's friends may require a personal database of friend images, which may only be accessible at certain devices such as the AR device, a cloud server, or the like. As another example, devices that don't have an installed version of AR applications or layers may not be able to execute them.

In some exemplary embodiments, executions of the first and second skins may be distributed to one or more execution platforms based on a policy. In some exemplary embodiments, the policy may be configured to determine an execution schedule for executing a frame by a plurality of registered skins, e.g., including the first and second skins. In some exemplary embodiments, the execution schedule may be configured to schedule executions while reducing resource utilization. In some exemplary embodiments, the execution schedule may define for each patch of the frame, for the entire frame, or the like, a corresponding execution platform from one or more execution platforms. In some exemplary embodiments, the execution schedule may define for each patch of the frame an execution timing, order, or the like.

In some exemplary embodiments, when determining or generating the execution schedule, the policy may ensure that the schedule complies with one or more technical constraints of the one or more execution platforms, with the one or more user constraints of the frame such as a privacy constraints, with the expected power usage (battery power), or with any other constraint. In some exemplary embodiments, a privacy constraint may constitute a soft constraint, e.g., which may be overwritten in an overall calculation, or a hard constraint, which must require full compliance. For example, in case a user wishes to keep his usage of a certain skin private, e.g., an undressing skin, the user may indicate that the skin is only to be executed on trusted devices, as a hard constraint. In some exemplary embodiments, regarding soft constraints, the schedule allocator may be configured to determine an average cost of complying with the soft constraints, and upon reaching a constraint threshold, e.g., indicating a soft constraint is too expensive to be complied with, the schedule allocator may overrun the soft constraint. In some exemplary embodiments, the policy may configure the execution schedule to reduce overall computational cost, performance speed, communication costs, battery usage, overhead, latency, or the like, e.g., using one or more resource allocation algorithms.

In some exemplary embodiments, the schedule allocator may determine a number of layers that are registered on each object in a frame and determine a predicted execution time of each patch, e.g., based on indications from a predictor that is configured to estimate execution times, based on metadata of skins indicating a type of functionality of the skin, based on a binary analysis of each layer, based on previous execution time lengths that were measured, based on a number of objects for each type, obtained from one or more devices, or the like. In some cases, an object that has a large number of registered layers that have a long estimated execution time, may be sent to an execution platform with a strong CPU in order to complete the execution in line with the latency requirements. As an example, the schedule allocator may consider that a certain device, e.g., the user's laptop, has a strong CPU and based on this consideration, allocate computationally challenging tasks to the laptop, e.g., in case the user constraints and technical constraints enable it to do so. In some exemplary embodiments, bottleneck skins may be identified according to estimated execution times of layers, a count of layers that are registered on same objects, or the like. As an example, a predictor may estimate an execution time of a cat-processing layer on a frame by identifying a number of cats in the frame and multiplying the number of cats with an estimated execution time of the layer on each cat, e.g., based on previous executions of the layer on a cat, based on analysis of the skin's binary or program code, or the like. In some exemplary embodiments, during runtime, execution estimations may be updated accordingly.

In some exemplary embodiments, a frame may be segmented into two or more patches, prior to being distributed. In some exemplary embodiments, executions of the two or more patches may be distributed to two or more execution platforms based on the execution schedule. For example, a first patch depicting a first object may be distributed to a first execution platform that was scheduled to executed a first skin registered on the first object, and a second patch of the frame depicting a second object may be distributed to a second execution platform that was scheduled to executed a second skin registered on the second object. In some exemplary embodiments, instead of patching or segmenting the frame, the entire frame may be provided to one or more execution platforms. For example, an entire frame depicting first and second objects may be distributed to a first execution platform that was scheduled to executed a first skin registered on the first object, and a patch or segment of the frame depicting the second object without the first object may be distributed to a second execution platform that was scheduled to executed a second skin registered on the second object. In some exemplary embodiments, after performing the execution tasks, resulting overlays may be obtained from the execution platforms, e.g., respectively. In some exemplary embodiments, the corresponding overlays may be combined to generate the AR view.

One technical effect of utilizing the disclosed subject matter is to reduce battery consumption of an AR device. In some exemplary embodiments, distributing execution tasks to different devices may be useful for a plurality of scenarios, reducing the AR resource consumption and providing a high level AR experience with lower latency and less consumption of electrical power. In some exemplary embodiments, bottleneck tasks requiring a large amount of computational power may be distributed to an execution platform that has a strong CPU, thereby solving bottleneck issues and reducing a latency.

Another technical effect of utilizing the disclosed subject matter is enabling to detect and utilize advantageous skin execution orders, e.g., in order to reduce a latency, a CPU utilization, a battery drain, or the like. Additionally or alternatively, the disclosed subject matter enables to prioritize different layers, e.g., according to personalized preferences, in order to provide to the user high-priority functionality in case not all the functionality can be provided, in case a latency level impairs the AR experience, or the like. Additionally or alternatively, the disclosed subject matter enables reducing an overall latency without reducing an overall experience by reducing a resolution level of a different portion of a frame for each skin or captured frame, in a manner that does not damage the AR experience and is unnoticeable. Additionally or alternatively, the disclosed subject matter enables to reduce unnecessary computations, such as of object recognition computations, thereby reducing a latency with a reduced damage to a quality of the AR view.

Another technical problem dealt with by the disclosed subject matter is to provide an augmented reality experience to a user while hiding sensitive information from non-trusted computerized devices. In some exemplary embodiments, there may be several options for processing visual information, for executing skins, or the like. A skin may be applied locally, applied on an edge server, applied on a remote cloud server, or the like. In some exemplary embodiments, an AR device, such as AR glasses, a Virtual Retinal Display (VRD), or the like, may be owned and controlled by the user, as opposed to other external devices which are not owned or controlled by the user. As a result, the AR device may be considered as the most trusted device. The AR device may be configured to use an edge device, a cloud server, or the like in order to harness their additional resources, such as computational power and energy. As the user may not have control over the external devices, it may be desired to limit the amount of information that is shared with such devices, e.g., to non-sensitive information. In some exemplary embodiments, it may be desired to preserve a user's privacy so that untrusted devices will not process private information, gain access to private information, or the like. In some exemplary embodiments, as the mere view of a user may be considered to be private information, this may prevent the AR device from sharing basic information with untrusted devices, including certain objects, a captured field of view, or even the entire frame such as in case the user's location is private.

In some exemplary embodiments, private information may comprise certain images that are being captured by a frame sensor that is operationally coupled with the AR device. Sensitive images may comprise images of faces, children, confidential documents, places such as security zones, or the like. Additionally or alternatively, the private information may comprise one or more skins that a user is using. As an example, a married woman may use a dating skin. She may wish to hide the usage of the skin and to prevent it from being executed on an external device, e.g., in order to prevent possible data leaks. Additionally or alternatively, the private information may comprise information about the field of view of the user. Additionally or alternatively, the private information may comprise metadata determined by the AR framework or by applied skins. For example, using facial recognition, identities of bystanders may be ascertained. The facial recognition may be applied by the AR framework itself or by a specific skin. The information regarding the identity of the bystander may be retained in metadata within the AR framework for future processing. It may be desired that exposure of the metadata to non-trusted devices will be limited, such as to prevent a wife from learning the identity of her husband's mistress.

One technical solution is to provide a filter application. In some exemplary embodiments, certain types of objects or portions thereof may be determined to be filtered. For example, faces of human objects may be determined to be filtered. In some exemplary embodiments, objects that are classified as sensitive may be filtered by removing or cropping the object from the image so that the layers will not be executed on the sensitive object. In some exemplary embodiments, skins may register to remaining objects in the frame or remaining portions of an object that remain after filtering out the sensitive portions. In some exemplary embodiments, after executing the skins on the remaining portions and obtaining a resulting overlay, the sensitive objects may be added back to the frame to obtain a full AR view. In some exemplary embodiments, filtered objects may be stored as short-term memory that cannot be loaded out of the cache and saved at a long-term memory location, e.g., due to privacy requirements.

In some exemplary embodiments, the filter application may be configured to filter out sensitive frame portions. In some exemplary embodiments, the filter application may identify, classify, or categorize frame portions as sensitive. In some exemplary embodiments, certain categories of objects, skins, or portions thereof, may be determined as sensitive information by default. In some exemplary embodiments, the user may select or indicate that certain categories of objects are sensitive. In some exemplary embodiments, the user may indicate a classification of people of interest such as roommates, friends, or the like. For example, a user's spouse may not wear full clothing when inside the house, and the user may wish that certain body areas of her husband should not be shared with other devices when not covered. In some exemplary embodiments, the user may indicate a category of non-human objects of interest such as knives, guns, illegal drugs, or the like. In some exemplary embodiments, a classifier may be applied on a captured frame to recognize one or more objects in the frame and match them against sensitive categories to identify as sensitive objects, sensitive patches, sensitive object parts, or the like, e.g., using facial recognition techniques, image processing techniques, or the like. In some exemplary embodiments, facial recognition may be performed to human objects to classify them to corresponding groups, e.g., of acquaintances, friends, strangers, romantic partners, or the like, some of which may be indicated as sensitive categories. In some exemplary embodiments, non-human objects may be recognized according to any image processing technique as intimate objects, dangerous objects, or the like. In some exemplary embodiments, certain types of objects may automatically be filtered. For example, a law may require that driving signs will not be filtered out with AR layers at all. According to this example, when identifying a driving sign in a frame, the driving sign may be filtered out and may not be processed by any layer. Additionally or alternatively, authenticated skins such as translation skins may be permitted to process the frame.

Another technical solution is defining trust levels that are required from computerized devices in order to execute certain skins thereon, execute skins on certain sensitive objects, or the like. In case that there are no computerized devices having a trust score that is above a determined threshold that is necessary for executing a skin on an object or portion thereof, the AR system may refrain from executing the skin, refrain from executing skins of the object, or the like.

In some exemplary embodiments, the trustiness property of a device may be determined by the user, determined based on heuristics such as ownership of the device, or the like. In some exemplary embodiments, the trustiness property of a device may differ based on context. For example, an AR device that is lent to the user by third parties may be considered a non-trusted device. An edge device that is owned by the user, such as an edge device installed in his car or in his home or a mobile device acting as an edge device, may be considered as a trusted device, while an edge device installed in a rental car, in a hotel room, in a shopping mall, or the like, may be considered as a non-trusted device. As another example, the trustiness property of the cloud server may variate. In some cases, the user may trust the cloud server as it is owned and controlled by a company that he trusts, even more so than an edge device controlled by a third party. In other cases, the cloud server may not be trusted.

In some exemplary embodiments, the operation of providing an augmented reality experience to a user may comprise performing tasks that can be classified as private tasks and to non-private tasks. The non-private tasks may be executed by a non-trusted device, while the private tasks may be executed by a trusted device, e.g., as a privacy constraint on the execution schedule, the policy, or the like. An overlay display that may comprise the output of a private task or of a non-private task may be generated and presented to a user.

In some exemplary embodiments, determining whether a task is private or non-private may be based on a privacy policy of a user. In some exemplary embodiments, a private task may comprise executing a private skin on a frame, or executing a skin on private information or frame portions. As an example, the privacy policy may comprise a restriction requiring executing certain skins such as a skin that is configured to identify faces, on a trusted device. According to this example, the private task may comprise applying the skin on a frame, and such private task may be executed by a trusted device, such as an edge server, the AR device, or the like. Additionally or alternatively, the non-private task may comprise executing other skins on non-trusted devices or on trusted devices. As another example, the privacy policy may comprise a restriction requiring depicted faces of a frame, or any other frame portion, to be processed on trusted devices only.

In some exemplary embodiments, some skins may be defined as private, e.g., so that information regarding the skin will not leak. In some exemplary embodiments, a user may not want other devices to receive access to data indicating one or more active layers. For example, an active layer may include an embarrassing layer such as an undressing application. In some exemplary embodiments, in order to prevent from such information to be obtained by untrusted devices, some layers may be defined as private. In some exemplary embodiments, private layers may only be executed and processed on trusted devices, or alternatively, may not be shared in full to an untrusted device. In some exemplary embodiments, metadata of private layers, such as metadata indicating an objective or functionality of the layer, metadata indicating a type of object that the layer is registered to, or the like, may not be shared with untrusted devices, and in some cases, may not be shared with trusted devices either.

Yet another technical solution is to utilize information about the field of view of the user, while avoiding sharing, directly or indirectly, such information with a non-trusted device. In some exemplary embodiments, an AR device may be configured to monitor the point of fixation of the user, e.g., using a sensor, an eye tracking device, a camera, an infrared camera, or the like. The AR device may be configured to utilize field of view information in preparing the AR display. In some exemplary embodiments, it may be desired to save power by downscaling the overlay display in the peripheral portion of the frame. For example, in order to decrease power consumption of the AR display, resolution of the AR display may be downscaled in the areas of a frame that are outside the point of fixation of the user or are captured by the peripheral vision of the user, e.g., thereby utilizing the user's field of view. As another example, in some cases, objects that are not in the point of fixation of the user, may not be processed by one or more skins. For example, a skin may analyze people that the user is looking at and provide additional information about them, such as name, position, or the like. Although the eye tracking information may be useful and required for such processing, the user may wish to guard his privacy and avoid sharing such information. As an example, a user may be watching a football with her spouse and may not wish to reveal that she was looking at the sofa the entire match.

In some exemplary embodiments, in order to conceal the user's field of view, information about the field of view may not be provided to layers that process the skin. In some exemplary embodiments, in case the viewing direction is used to enhance a resolution of the viewed area, a resolution of the viewing direction may be degraded prior to being sent to the untrusted device, and after receiving the output overlay, may be enhanced again at the trusted device. In such cases, the skins may process entire frames in high resolution, and the AR device may downscale a resolution of objects that were outside the field of view portion of the frame.

In some exemplary embodiments, in order to conceal the user's field of view, information about the field of view may be provided implicitly to processing layers. As an example, the AR device may provide an indication of a number of portions of the frame that are to be processed in high resolution, while the portions include the field of view portion of the frame. In some cases, the additional portions may comprise randomly selected portions, or any other portions. In some exemplary embodiments, a number of areas may be randomly determined to have an enhanced resolution, including the viewing direction, so that the viewing direction may not be determinable at the untrusted device. In some exemplary embodiments, the AR device may downscale a resolution of the additional portions upon receiving results from the layers. As another example, in case only objects that are in the field of view of the user are to be processed, the AR device may provide one or more additional patches of the frame to be processed, in addition to patches depicting the objects that are included in the user' field of view.

In some exemplary embodiments, in order to conceal the user's field of view from external execution platforms, information about the field of view may be utilized at trusted devices only. In some exemplary embodiments, in order to conceal the user's field of view, information about the field of view may be disabled, may not be shared, or the like. In some exemplary embodiments, while using untrusted devices to execute a layer, the viewing direction may not be shared, or alternatively, the identity of the user may not be shared.

One technical effect of utilizing the disclosed subject matter is to exploit computational resources external to the AR device while keeping the privacy of the user. In some exemplary embodiments, executing some tasks on external devices without compromising on the user' privacy may reduce the AR device's battery drain and electricity consumption while retain the privacy. Additionally, or alternatively, the AR framework enables to execute tasks requiring a large amount of computational power on another computerized device that are not trusted, without compromising on the user's privacy. The disclosed subject matter may be used to distribute computations with a trusted edge device, thereby retaining the privacy of the user and reducing a communication overhead. In some exemplary embodiments, the disclosed subject matter enables to communicate only partial sensor information to an edge device in case the edge device has its own sensors. Thereby, a usage of communication resources is further reduced, thus saving the AR device time, battery power, and computational power. In some exemplary embodiments, the disclosed subject matter enables to classify tasks as private or non-private, and schedule the tasks accordingly to private and non-private platforms, thereby reducing resource utilization without compromising on the privacy.

Another technical effect of utilizing the disclosed subject matter is keeping a privacy of a user while considering user-specific preferences, such as preferred execution platforms. In some exemplary embodiments, the disclosed subject matter enables to utilize field of view functionalities without sharing such information with other platforms. In some exemplary embodiments, the disclosed subject matter enables to filter frame features or objects without providing them to be processed at execution platforms, e.g., in order to retain a privacy of the features by not providing them to other platforms.

Yet another technical problem dealt with by the disclosed subject matter is modifying the AR view according to an overall vision, plan, or the like, which may be configured to ensure a harmonic and high level experience. In some exemplary embodiments, the overall vision may comprise, for example, ensuring that one or more object types of portions thereof will not be modified, that boundaries of certain objects will not be corrupted, that overlays that are partly modified will not maintain meaningless portions, or the like. In some exemplary embodiments, It may be desired to define one or more portions of a frame as non-touchable portion, e.g., to enhance an AR experience of the user, or the like.

One technical solution is defining unmodifiable objects or portions thereof (referred to as "final objects") of a frame. In some exemplary embodiments, certain frame regions or objects may be defined as final portions that are untouchable, unmodifiable, or the like. In some exemplary embodiments, regions or objects in a frame may be determined to be final based on instructions, user indications, rules, classifiers, heuristics, or the like. For example, a graphic designer may determine that certain objects should not be modified, e.g., in order to enhance an esthetic aspect of the AR experience. In some exemplary embodiments, regions or objects of overlays that are artificial may also be defined as final.

In some exemplary embodiments, in contrary to filtered objects that are not processed by any layer, and are not shared with external execution platforms, an object that is indicated as final may be processed by any layer at any execution platform, as long as the output does not overwrite any part of the final object. In case a layer modifies the object itself, the layer may not be applied. For example, an AR application that adds descriptive labels near objects, may process balloon objects that may are defined to be final, and add the label "balloons" near the balloons without modifying any pixel of the balloons themselves. In some exemplary embodiments, registered skins may be analyzed to determine whether they are expected to modify the registered object, e.g., based on skin metadata, based on historic skin execution, based on binary analysis of the skin, based on a classification of the object, or the like. Alternatively, all registered skins may be applied on the object, and after applying the skins, the result overlays may be compared to the original object to ensure they do not overlap with the object's pixels.

In some exemplary embodiments, a final object may be implemented by a bitmap indicating which pixels of the frame are allowed to be modified (e.g., having a value of "0") and which pixels depict final objects and thus are forbidden from being modified (e.g., having a value of "1", or vice versa). In some exemplary embodiments, a final output of the AR view may be examined prior to being provided to the user, to ensure that the final objects are visible and were not modified.

In some exemplary embodiments, an end stage may be configured to ensure no final pixels were overwritten. In some exemplary embodiments, the end stage may comprise a final processing stage of the frame before providing the resulting AR view to the user. In some exemplary embodiments, the end stage may be configured to apply resulting overlays that were provided from one or more skins on the frame, e.g., in case the overlays were not applied by the layers themselves. In some exemplary embodiments, a layer may output an indication that a certain action is to be performed to one or more areas of the frame, and the end stage may be configured to implement the action. For example, a skin that outputs labels may provide a label and indicate that the label should be placed anywhere near a certain object, in a manner that matches the final AR view configuration. According to this example, at the end stage, the label may be inserted near the object at a frame location that does not conflict with other overlays provided by other layers, that is not considered to be important by a semantic analyzer, or the like.

Another technical solution is identifying one or more objects or portions thereof as a closed unit that is to be kept together in order to remain meaningful. In some exemplary embodiments, for each unit, one or more conditions regarding the unit may be utilized. In some exemplary embodiments, the one or more conditions may indicate when to remove portions of the unit, the entire unit, or the like. For example, a label that is placed near an object to describe the object may be considered useless if part of the text is hidden, or if the object is removed. In such cases, when only a portion of the unit is available, the entire unit should be removed. In some exemplary embodiments, in case a final object hides a portion of a closed unit, the unit may be entirely removed. As an example, a peanut alert may be indicated as a final portion that is forbidden to be overwritten, and may hide a portion of the label "balloons" which may be placed near a balloon object. According to this example, the entire "balloons" label may be removed, or in case the augmented unit include the balloons as well, e.g., in case the balloons are part of an overlay, the balloons may be removed too. In some exemplary embodiments, portions of the unit may be classified as necessary, and only when those portions are modified the unit is to be removed entirely.

One technical effect of utilizing the disclosed subject matter is enhancing an AR experience by enabling to define untouchable features, e.g., for a plurality of functionalities such as to enhance an esthetic aspect of the AR view. In some exemplary embodiments, the disclosed subject matter enables to indicate connections between different frame features that are part of a same content unit, depicting unit, or the like, and that are meaningful only as a unit. This enables to remove any meaningless portions in the AR view.

Yet another technical problem dealt with by the disclosed subject matter is providing real-world functionalities. In some exemplary embodiments, it may be desired to differentiate between original portions of a frame that depict objects that are present in the real-world environment surrounding the user, and AR portions that are artificial, manipulated, generated, include one or more generated overlays, or the like. In some exemplary embodiments, the real-world functionalities may comprise keeping one or more real-world portions of a frame as non-touchable portions, performing one or more actions in response to identifying a real-world object, providing an alert to the user, or the like.

One technical solution is verifying if an object is real or not, e.g., in order to determine whether real-world functionalities should be implemented. For example, for a user that is allergic to peanuts, it may be desired to identify whether a displayed peanut in a frame is a real world peanut, or whether the peanut is an overlay from a previous layer, is manufactured by a skin, is displayed by a screen in the real-world surroundings of the user, is displayed by a sign in the real-world surroundings of the user, or the like. In case the peanut is indeed a real-world peanut, it may be desired to alert the user and indicate the danger. In some exemplary embodiments, false positives alerting the user of a fake peanut, e.g., that is filmed in a movie, may not be desired.

In some exemplary embodiments, in order to differentiate between original real objects and artificial objects, a plurality of techniques may be utilized such as image processing techniques, three-dimensional (3D) analysis of distances within the frame, identification of screens, a semantic analyzer, or any other classification technique. In some exemplary embodiments, an entire frame may be classified as a real-world frame or not, or each object or patch in the frame may be classified as a real-world object or not. In some cases, a semantic analyzer may be used to identify minor changes to the original frame that do not change a semantic meaning of the frame, e.g., different lighting configurations, visual filters changing color scheme, or the like. In some exemplary embodiments, some portions of a raw frame that is captured may not be considered to be real-world portions, e.g., in case the original frame depicts a virtual object such as a virtual banana depicted in a real-world television screen.

In some exemplary embodiments, one or more skins may be defined as real-world skins that are configured to utilize real-world input. In some exemplary embodiments, the real-world skins may be tagged as such, may be indicated as such in their metadata, may be classified as such, or the like. In some exemplary embodiments, based on identifying layers as real-world layers, semi real-world layers, or regular layers, an optimization algorithm may be implemented to determine desired execution configurations, execution orders, and execution platforms of the layers, that comply with any constraints (if exist).

In some exemplary embodiments, prior to determining an order of execution of registered layers that are registered on a frame, the registered layers may be classified as real-world layers that are registered on real-world data, semi real-world layers that are registered on at least some real-world data, or regular layers that are not sensitive in any way to real-world data and may receive as an input one or more overlays or manipulated frames from previous layers (if such exist). In some exemplary embodiments, real-world layers or applications may be processed based on the original frame alone or portions thereof, while semi real-world layers may be processed based on the original frame or based on a combination of the original frame and an output overlays from previous layers. In some exemplary embodiments, real-world layers may be executed in parallel to layers that are first in the order of execution, as a first layer in the order of execution, in a non-sequential manner, or the like.

In some exemplary embodiments, first and second skins may be determined to be real-world skins that utilize real-world frames. In some exemplary embodiments, the first and second skins may be executed on the frame simultaneously based on determining that they are real-world frames. In some exemplary embodiments, based on determining that they are real-world frames, the first and second skins may be executed on the frame in a non-sequential way that may or may not be simultaneous.

In some exemplary embodiments, outputs of real-world layers and semi-real-world layers may or may not be considered to be high priority outputs. For example, real-world layers that produce lifesaving alerts may be considered a high priority layer, while real-world layers that are directed to entertainment objectives may not be considered a high priority layer. In some exemplary embodiments, real-world layers that are not prioritized may include, for example, a real-world layer that adds glasses to real-world cats only. In some exemplary embodiments, layers may be determined as being high-priority layers in case they are real-world layers, semi-real-world layers, or the like, and that they are indicated as being high priority by a user, based on heuristics, by default, based on the skin's metadata, or the like.

In some exemplary embodiments, after executing all the layers, at an end stage, output overlays may be combined to create one harmonious display. In some exemplary embodiments, the final output of all layers may be examined to ensure that results from high priority layers are fully viewable, are not hidden, or the like, e.g., that warnings, alerts, or any other high priority cue is visible. In some exemplary embodiments, the end stage may be configured to ensure no final pixels were overwritten, that real-world alerts or other high priority outputs are visible, or the like.

In some exemplary embodiments, a first skin may be determined to be a real-world skin that utilizes real-world frames, and a second skin may be determined to not be a real-world skin. In some exemplary embodiments, a first overlay obtained from the first skin may comprise a real-world alert of a real-world object in the frame, e.g., in high priority. In some exemplary embodiments, a second overlay may be obtained from a second skin. In some exemplary embodiments, based on whether or not the second overlay is inconsistent with the alert or with the real-world object, the final stage may determine whether or not to utilize the second overlay.

In some exemplary embodiments, high priority outputs of the real-world layers may have priority over other layers in when generating the final output at the final stage, and in some cases, they may cancel previous AR effects. In some exemplary embodiments, outputs of the real-world layers, the real-world objects themselves, or the like, may be defined as final, may be filtered, or the like, so that any conflicting frame portion may be removed or overwritten. For example, an application may warn a person that is allergic to pickles of a real pickle that is detected. In some cases, the pickle warning may cancel any processing that was done to the pickle, any post-processing that was done to the warning, that was done to a location of the warning, or the like.

One technical effect of utilizing the disclosed subject matter is enabling to differentiate between real life objects and artificial objects, and utilizing this classification for a plurality of applications, functionalities, or the like. In some exemplary embodiments, the disclosed subject matter enables to provide real-time alerts of real-life identified objects, while ensuring the alerts are accurate and were not based on artificial data.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an environment, in accordance with some exemplary embodiments of the disclosed subject matter. Environment 100 may be an environment where an AR framework is implemented. The AR framework may be a framework for providing augmented reality experience to a user, by executing skins. Skins and AR frameworks are disclosed, inter alia, in U.S. Pat. No. 9,865,088, entitled "Evaluation of Augmented Reality Skins", dated Jan. 9, 2018, U.S. Pat. No. 9,953,462, entitled "Augmented Reality Skin Manager", dated Apr. 24, 2018, U.S. Pat. No. 9,990,772B2, entitled "Augmented reality skin evaluation", dated Jun. 5, 2018, and U.S. Patent Application Publication 2016/0,240,005, entitled "Subject selected augmented reality skin", dated Aug. 18, 2016, all of which are incorporated herein by reference in their entirety without giving rise to disavowment.

Environment 100 may comprise a Person 110. Person 110 may be wearing AR Glasses 120. AR Glasses 120 may comprise a frame sensor such as Camera 124 for capturing images that are processed by the AR framework. Lenses of the AR Glasses 120 may be configured to display an overlay display that is seamlessly interwoven with the physical world as perceived by Person 110, such as by adding layers over perceived objects, modifying perceived objects, removing perceived objects, or the like.

In some exemplary embodiments, AR Glasses 120 may comprise Signaling Module 122. Signaling Module 122 may be a LED providing a visual signal, a speaker, a wireless transmitter providing a signal using radio frequency, or the like. Signaling Module 122 may be configured to provide a signal indicative of the restriction being imposed by the AR framework. In some exemplary embodiments, other persons may perceive the signal and be aware that a restriction is imposed by the AR framework. Additionally or alternatively, a computerized device may be configured to perceive the signal indicating that the AR framework is imposing a restriction. In some exemplary embodiments, Signaling Module 122 may provide a signal that cannot be perceived by a person, such as in an audio frequency that is not within a human hearing range, a visual indication in an infrared light invisible to the human eye, or the like.

Environment 100 may comprise a Car 180. Car 180 may be driven by a Person 170. Car 180 may comprise a Frame Sensor 150. Frame Sensor 150 may be associated with the field view of Person 170.

Car 180 may comprise an AR Display 160 embedded within the windshield of Car 180. An AR framework may display the overlay display using AR Display 160, so as to provide an augmented display of the physical world. In some exemplary embodiments, frames from Frame Sensor 150 may be analyzed by the AR framework, which may generate overlay display to be presented using AR Display 160.

In some exemplary embodiments, Skins 125 may be utilized to provide the augmented display. Skins 125 may comprise a plurality of skins, Skin 125a, Skin 125b, . . . , Skin 125n, or the like, each of which configured to analyze the frame or portion thereof and provide an overlay display thereon. The overlay displays may be combined, on top of each other, to provide the final overlay display that is presented to the user (e.g., Person 110, Person 170) to provide augmented reality experience. In some exemplary embodiments, the AR framework may be configured to analyze the frame, identify objects therein, invoke the Skins 125 or portion thereof, collect output therefrom, and provide the final output for display. In some exemplary embodiments, the AR framework may be configured to invoke a skin, schedule an invocation of a skin, determine the order in which skins are invoked, determine which execution environment would execute each skin, or the like.

Environment 100 may comprise an Edge 130. Edge 130 may comprise a processor, a receiver, a transmitter, a memory, or the like. Edge 130 may be a computer, a smartphone, or the like. Similarly, an Edge 130' may be an edge computer that is installed within Car 180. Additionally or alternatively, Edge 130' may be a smartphone of Person 170, the infotainment system of Car 180, or the like. Edges 130, 130' may be utilized by the AR framework to execute one or more skins. In some exemplary embodiments, Edges 130, 130' may constitute an execution environment for executing skins. Edges 130, 130' may communicate with the AR framework, or components via a computerized network.

Environment 100 may comprise Server 140. Server 140 be a remote cloud server. In some exemplary embodiments, Server 140 may be configured to obtain information from the AR framework, execute a skin, provide the output of the skins to the AR framework, or the like. Additionally or alternatively, Server 140 may be utilized by the AR framework to execute one or more skins. In some exemplary embodiments, Server 140 may constitute an execution environment for executing skins.

Environment 100 may comprise Frame Sensor 190 that is external to AR Glasses 120 and to Car 180. Frame Sensor 190 may be associated with the field view of Person 170 or Person 120. Frame Sensor 190 may transmit frames to Edge 130, 130' or to Server 140. An AR framework may utilize frames sent from Frame Sensor 190, such as to augment the display of the user, to identify objects to be analyzed, or the like.

In some exemplary embodiments, the AR device, such as AR Glasses 120, AR Display 160, or the like, may be connected to an edge computer, such as Edges 130, 130', and to cloud server, e.g., Server 140. The edge computer, however, may be closer to the AR device than the cloud server, such as having a reduced latency thereto, requiring reducing power consumption to reach it, or the like. For example, the edge computer may be directly connected, such as using a BLUETOOTH™ connection, using WIFI™ connection, using local cellular connection, or the like. Additionally or alternatively, the edge computer may be connected to a same Local Area Network (LAN) as the AR device, may be physically connected thereto using a cabled connection, or the like. In some exemplary embodiments, communication to Server 140 may be provided through a Wide Area Network (WAN), through the Internet, or the like. For example, Server 140 may be a cloud computing platform that is used by various AR devices that are located remotely therefrom and from one another.

In some exemplary embodiments, different execution environments may have different resources. For example, Server 140 may have more computational resources, memory resources, or the like than Edge 130. Additionally or alternatively, each execution environment may have different power resources. The AR device, such as AR Glasses 120 may have limited power supply. Additionally or alternatively, Edge 130, which may be implemented by a mobile device, may also have limited power supply. Additionally or alternatively, different execution platforms may retain, locally, or have connectivity to, different data storages. For example, a database used for identifying a person using facial recognition may be retained on Server 140. AR Glasses 120 may have limited memory capacity and may be able to retain only a portion of such database, such as a portion comprising frequently identified persons, people who are known to be at the same location, people that are deemed VIPs for the user, or the like. As a result, it may be desired to perform some computations off-device, on Edge 130 or on Server 140. As an example Skin 125*a* may be executed on AR Glasses 120, Skin 125*b* may be executed on Edge 130 and Skin 125*n* may be executed on Server 140. In some exemplary embodiments, each skin may receive, as input, the output of the previous skin, in accordance with an order of execution, so as to add a layer on top thereof. As an example, Skin 125*a* may add an image of a cat, and Skin 125*b* may process the image of the cat and modify its appearance. The AR framework may be configured to invoke execution of each skin, in accordance with predetermined rules and based on the content of the frame, to select for each skin an execution environment, to gather input for the skin and obtain the output of the skin, and generate the final overlay display to be displayed by the AR device.

Figure 2:
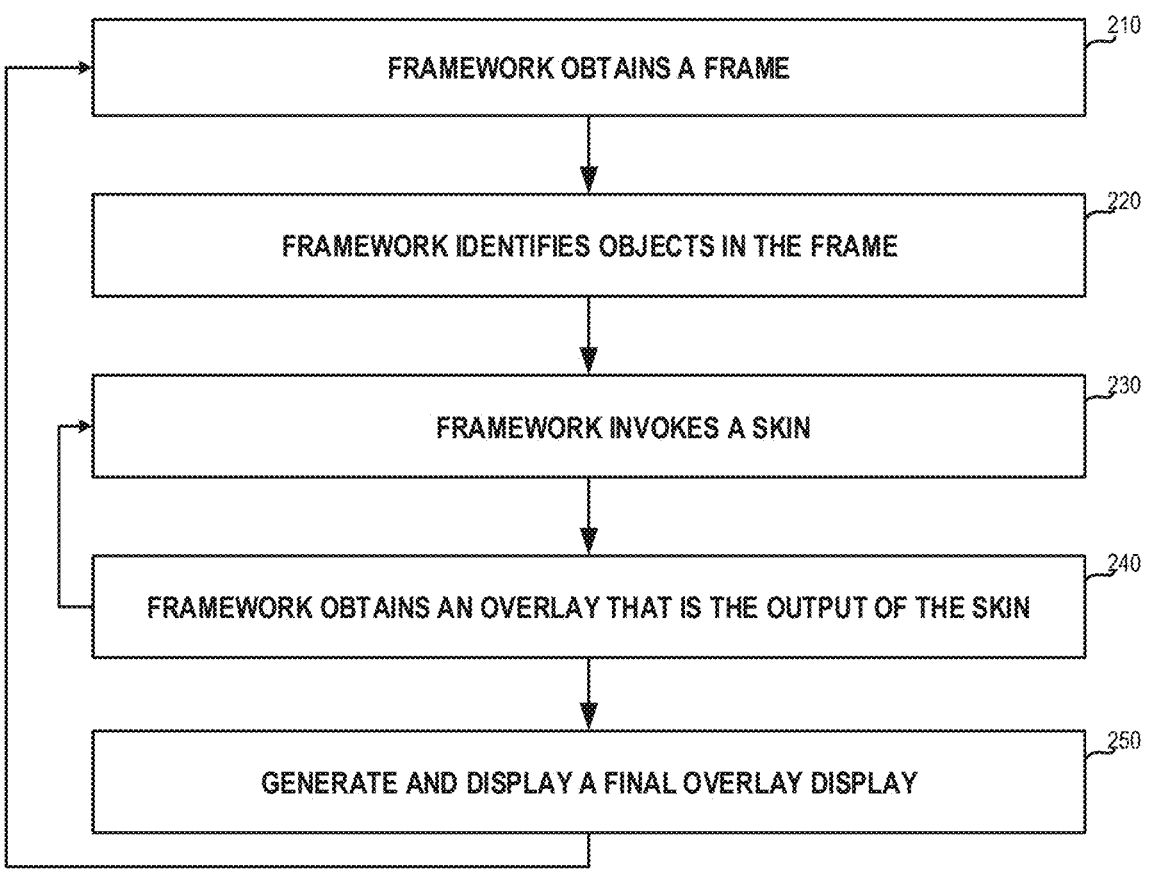
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, the framework obtains a frame. The frame may be obtained by a frame sensor, such as camera, that may be operatively coupled with the framework. The frame may be obtained directly from a frame sensor that is associated with a view of a user, such as a camera embedded in AR glasses (e.g., 124 of FIG. 1). Additionally or alternatively, the frame may be obtained from a computerized environment such as an edge device, a remote cloud server, or the like. Additionally or alternatively, the frame may be obtained from an external frame sensor, such as 190 of FIG. 1, that may be utilized to capture information that may be obscured and blocked from the view of the user. In some exemplary embodiments, images may be obtained from a plurality of sources and may be integrated together to create the frame.

On Step 220, the framework identifies objects that are in the frame. The framework may be configured to identify objects using algorithms such as Regions Convolutional Neural Network (RCNN), Faster RCNN, Scale-Invariant Feature Transform (SIFT), template matching, edge matching, or the like. In some exemplary embodiments, each skin may register on one or more object type. In some exemplary embodiments, in order to improve performance, the framework may only try to identify objects on which at least one skin is registered. As an example, in case that skins are registered on objects of type "face" and "hat", the framework may skip large objects such as a car, a house, or the like. In some exemplary embodiments, the framework may analyze the frame and maintain a metadata record representing the frame identifying each object appearing in the frame. Additionally or alternatively, the metadata may be indicative to the surrounding of the user, to people that may be with the user, or the like.

On Step 230, the framework may invoke a skin. The framework may hold a list of available skins and objects that the skins are registered on. The framework may be configured to iterate over the list of skins and in response to identifying that a skin is registered on a type of an object that the frame comprises, the framework may invoke the skin. In some exemplary embodiments, the framework may invoke the skin with the identified object and provide only the object for processing instead of the entire frame. In some exemplary embodiments, the list of skins may be provided in an order of processing, which may affect the end outcome. In some exemplary embodiments, if several skins are registered over the same object type, the same object may be processed by the several skins, in accordance with their relative order. In some exemplary embodiments, invoking the skin may comprise providing the skin with a frame. Additionally or alternatively, invoking the skin may comprise providing the skin with a metadata record that is associated with the frame.

In some exemplary embodiments, the skin may be invoked once and receive the frames and the metadata as a stream, yielding a performance improvement compared to invoking the skin per each frame that is captured. The skin may process the frame, the stream of frames, or the like. In some exemplary embodiments, per each frame, the skin may check if the metadata comprises new privacy restriction and change its operation based thereon. As an example, a woman may be walking on a beach, with her AR glasses. The AR glasses may execute a skin that is configured to recognize face and pull information regarding the faces from a social network database. The woman may enter a nudist beach. At the entrance to the nudist beach, there may be a marker signaling the AR glasses not to perform facial recognition. The AR framework may embed that restriction in a metadata. The skin may obtain the metadata and pause its operation until the restriction is lifted. In some exemplary embodiments, the skin may unregister from the objects in the AR framework, and register with the AR framework for a notification when the altered functionality is lifted. Upon receiving such notification, the skin may re-register on the objects of interest. As a result, performance improvement is achieved as the skin is never invoked when it is unable to perform its intended operation due to the marker-related instructions. Additionally or alternatively, the AR framework may manage the unregistration and registration of pertinent skins, instead of the skin itself unregistering and re-registering itself.

On Step 240, the framework obtains an overlay that is the output of the skin. In some exemplary embodiments, in case that the skin was not executed locally (e.g. executed on an edge computer, on a cloud server, or the like), the overlay may be obtained therefrom via a communication channel. In some exemplary embodiments, the skin may be executed locally as function. The overlay may be the output of the function. Additionally or alternatively, the skin may be executed remotely. The overlay may be provided to the AR framework as a stream. Additionally, or alternatively, the overlay may comprise a bitmap image and a bitmap mask. The bitmap image may comprise the content of the pixels to be drawn, while the bitmap mask may comprise a corresponding bitmap, where each cell corresponds to a bit. The value of the bit in the bitmap mask may indicate whether or not the value of the overlay is to be used. As an example, consider a frame f, an overlay bitmap image, o, and a mask, m. For each pixel (x,y), the output value (out) representing the AR final display may be computed as dis $(x,y)=o(x,y) \cdot m(x,y)+f(x,y) \cdot (1-m(x,y))$. The overlay display (od), however, may be computed as od$(x,y)=o(x,y) \cdot m(x,y)$. Bitwise operations may be performed on the bitmasks, such as dis=(o AND m)XOR (f AND ¬m), and od=o AND m. In some exemplary embodiments, the mask may be either 0 (do not use the overlay bit) or 1 (use the overlay bit). Additionally, or alternatively, values in between 0 and 1 may be used to provide for opaqueness and transparency properties.

In some exemplary embodiments, the overlay may be an image in the size of the frame. As the AR framework may combine the overlay with the frame, the overlay may comprise pixels that are the output of the skin and transparent pixels otherwise. Additionally or alternatively, the overlay may comprise an image that may be the output of the skin and its relative position in the frame. In some exemplary embodiments, the overlay may comprise information regarding the importance the position of the overlay in the frame. As an example, an informative skin that adds labels to object may be agnostic regarding the position of the label. Additionally or alternatively, a skin that adds lipstick may configured to set its location requirement to "high" to "1", or the like.

In some exemplary embodiments, if the view is shared or stored, the overlay display may be overlayed over the frame to generate the AR frame, which represents the view that is perceived by the user using the AR device.

In some exemplary embodiments, Steps 230-240 may be performed iteratively, while invoking different skins, until all skins that are registered on available objects are invoked. In some exemplary embodiments, an overlay is obtained from one skin, incorporated into the frame, and potentially provided to the next skin that processes the affected area. Additionally or alternatively, the overlays may be combined with one another, and maintained separately from the frame itself. The skins may receive the frame and the combined (previous) overlays. Additionally or alternatively, the skins may receive an augmented frame, comprising the frame and combined (previous) overlays, for processing.

On Step 250, the final overlay display that is generated, based on the combined overlays of the invoked skins, may be displayed. It is noted that the overlay is seamlessly interwoven with the physical world, which is represented by the original frame of Step 210. As a result, the overlay display is overlaid over the physical world, without combing the frame itself.

In some exemplary embodiments, an AR framework may be operatively coupled with one or more frame sensors. The frame sensors may produce a stream of frames. The AR framework may obtain the streams. In the case that there are several frame sensors, the AR framework may combine multiple streams of frames into a single stream. In case that a skin is registered on types of objects that the single stream comprises, the AR framework may apply the skin on an appropriate object for each frame. In some exemplary embodiments, steps 210-250 may be repeated.

In some exemplary embodiments, a user may configure the AR framework to execute a skin at a specific location, for a specific time duration, or the like. As an example, a user may be using his AR glasses constantly. When he enters the supermarket, a skin that shows prices of products may be invoked, added to the list of active skins, and be invoked as long as the user is in the supermarket. When the user leaves the supermarket, the skin may be deactivated. In some exemplary embodiments, activation or deactivation may be defined to occur when a marker is identified, as explained hereinbelow. Additionally or alternatively, upon identifying a marker, a suggestion to activate a skin may be presented to the user and the user may confirm or reject the suggestion. In some cases, the user may set his personal preferences, such as based on identifying markers, based on his location, based on a context, based on a time of day, based on a social environment in which he his located, or the like.

Referring now to FIG. 3 showing a flowchart diagram of a method, in accordance with some exemplary embodiments of the disclosed subject matter.

On Step 310, each skin is registered on a type of an object. In some exemplary embodiments, each skin may register with the AR framework to receive notification and handle specific types of objects. An object appearing in the frame may be identified and classified to a type. The AR framework may support a variety of objects types, such as but not limited to a person, an animal, a house, a road, a plant, a tree, a face, an eye, or the like. In some exemplary embodiments, an object may be classified with a plurality of object types, such as objects that are an abstraction or instantiation of one another (e.g., a police officer may be an instantiation of the more abstract type, person), may be a different view of the same object (e.g., a person may be both an adult, a female and a Caucasian), or the like. In some exemplary embodiments, an object may comprise other objects. As an example, an object of type person may comprise objects of type face, eyes, arms, cloths, or the like.

On Step 320, the AR framework obtains a frame. The frame may be obtained from a frame sensor such as a camera that is embedded in an AR Glasses, from a camera that is embedded in a mobile phone, from a surveillance camera, from a thermographic camera, from an infrared camera, or the like. The frame sensor may capture one frame after the other and produce a stream of frames. The frame sensor may obtain frames that may be processed to generate output overlays for the frames in a rate such as 90 Frames per Second (FPS), 60 FPS, or the like. In some exemplary embodiments, a rate which is lower than 60 may result in a quality which may be poor for human users.

The AR framework may obtain a frame from a frame sensor and may send the frame, transmit the frame, save the frame, or the like for future processing. In some exemplary embodiments, the AR framework may obtain several frames from multiple sources in a single time unit and merge frames to a single frame prior to processing the frame. As an example, the AR framework may not have access to a frame as viewed from the point of view of the user. Using a plurality of cameras, several different images may be transformed and merged together to provide an estimated frame of the view of the user. The image of the room or of the person may be taken from several image sensors. Frames from different image sensors may be merged to a single frame.

On Step 330, the AR framework identifies objects that appear in the frame. The AR framework may employ object recognition, computer vision techniques, Artificial Intelligent (AI) algorithms, or the like, to identify the objects in the frame. Additionally or alternatively, metadata about objects may be available in other manners, such as using wireless transmission, RFID, consultation with 3D maps, or the like.

In some exemplary embodiments, the AR framework may classify the objects by types and may build a list comprising the types of the objects that comprises the frame. In some exemplary embodiments, the AR framework may create or maintain a metadata record. The metadata record may be updated to comprise each identified object and properties thereof. For example, the metadata record may indicate for an object its type, its location in the frame, its dimensions, or the like. In some cases, skin that are executed by the AR framework may access the metadata record, utilize its content, and potentially update its.

In some exemplary embodiments, an object may not have existed in the frame as captured by the frame sensor. A skin may process the frame or portion thereof, and add an object to the metadata record to indicate the existence of the new record, to ensure it is processed correctly. As an example, a skin may add a label to be presented near an existing object, a skin may add an object of a cat, a navigation skin may add a graphical representation of a route on top of the road, or the like. As another example the AR framework may add images of family members of a person that is shown in a frame, a garden near a house, or the like.

On Step 340, the AR framework invokes a skin is registered on the type of the object. As each skin may have registered on types of objects of interest to it (e.g., Step 310), the AR framework may invoke only skins that have objects of interest in the frame and avoid having each skin determine, dynamically, whether objects of interest appear in the frame, requiring resource consumption, such as energy and processing resources.

In some exemplary embodiments, the AR framework may be executed by a device, such as but not limited to the AR device (e.g., AR Glasses 120) itself, an edge computer (e.g., Edge 130, 130' of FIG. 1), a server (e.g. Server 140 of FIG. 1). The skins may be executed on different devise. In some cases, each skin may be executed on an AR device (e.g., AR Glasses 120 of FIG. 1), on an edge computer (e.g., Edges 130,130' of FIG. 1), on a server (e.g., Server 140 of FIG. 1), or the like. The AR framework may invoke the skin on the relevant computing environment to process the objects of interest. As an example, the skin may begin execution upon a command of the AR framework. As another example, the skin may be executed by a daemon process that pre-exists and is begins processing in response to a command from the AR framework. In some cases, if several skins are registered on the same object, the AR framework may invoke them one after the other.

In some exemplary embodiments, the AR framework may provide the invoked skin with a frame, a portion of the frame (also referred to as a "sub frame" or "patch"), or the like. In some exemplary embodiments, the AR framework may provide the skin with the sub frame that comprises the object of interest. If several objects appear, the AR framework may invoke the skin a plurality of times, each of which with a different sub frame. Additionally, or alternatively, the AR framework may provide the skin with the metadata of the object, for accessing and potentially for updating. For example, in the skin performs facial recognition, the skin may update the metadata properties of the object to indicate the identified persona of the object. Other skins that perform facial recognition may avoid performing facial recognition and rely on the output of a previous skin. Additionally or alternatively, the output of the previous skin may be verified prior to being relied upon.

Additionally or alternatively, the AR framework may provide the skin as an input an editable section of the frame. The editable section may be an area in the frame or patch on which the output of the skin may be drawn.

Additionally or alternatively, the input provided to the skin may comprise the metadata record. The metadata record may comprise data such as a list of objects that are in the frame or patch, properties of the objects, coordinates on which the skin is allowed to draw on, the context in which the frame was taken, properties regarding the person using the AR device, or the like. In some exemplary embodiments, a context of the frame may comprise the location in which the frame was taken, information about the location (e.g. a private house, a work place, information from Geographic Information System (GIS), or the like), the date in which the frame was taken, data regarding the date (e.g. a birthday, an anniversary, or the like), data regarding the frame sensor used to obtain the frame, or the like.

The skin may change the object, add another object thereto, or the like. In some exemplary embodiments, the skin may modify the object in a constructive manner, such as by augmenting the object with additional objects, decorations, ornaments, or the like. Additionally or alternatively, the skin may modify the object in a destructive manner, such as painting over the object to remove the object, replace the object by another object, or the like.

In some exemplary embodiments, the skin may provide an output. The output may comprise an overlay to be displayed over the frame or patch, as determined by the skin. As an example, a skin may add a balloon to appear in a hand of a child. The output may thus by an overlay that, when applied over the frame, adds the balloon at the determined location. As another example, a skin may add a green line on a road, indicating a route on the road. In that case, the output of the skin may be provided using a set of coordinates and a corresponding color, defining the overlay implicitly. As yet another example, the output of the skin may comprise a label with text comprising information about the input object.

Additionally or alternatively, the skin output may comprise the metadata record. In some cases, the metadata record may be updated by the skin to add information gathered by the skin to existing objects, to add new objects (e.g., the balloon added in the example above), or the like. Additionally or alternatively, the metadata record may comprise painting instructions to be implemented by the AR framework. As an example, if a skin paints a label before having the final augmented frame, labels may be positioned in a sub-optimal location, such as in a distribution that is too dense, blocking important objects or other visual information, or the like. The skins may add instruction for the AR framework to add labels to objects, such as a name near a person, a material of a structure near the structure, a price tag near a merchandise, a speed indication near a windshield, or the like. After all the skins are executed, and after the overlay display is generated (Step 380), the AR framework may determine the location, size, and other visual properties of the labels, and draw them, to add an additional overlay layer, referred to as a label overlay.

In some exemplary embodiments, the metadata record outputted by the skin may be the updated metadata record. Additionally or alternatively, the metadata record may comprise the added information only, so as to allow the AR framework to modify the metadata record accordingly at its discretion.

On Step 350, the AR framework obtains an overlay that is the output of the skin. In case that the skin is being executed in the same apparatus as the AR framework, the overlay may be pointed by a pointer that was the input of the skin, or the like. In some exemplary embodiments, the skin may be executed on a different execution platform, such as an edge computer, a server, or the like. The remote platform may send, transmit, or the like, its output as a stream to the AR framework. Additionally or alternatively, the executing platform may store the output of the skin on a local storage device, on a remote cloud server, or the like. The AR framework may access the medium on which the output of the skin is retained and pull the overlay.

In some exemplary embodiments, the skin may output the first overlay followed by outputting updates when its output changes. Each output beside the first overlay may be the delta from the previous output.

As explained above, in some cases, labels may be added at a later stage, allowing other objects to be drawn, as the location of the label may be less important compared to the location of other objects. As an example, in some cases, the label may be drawn far from the object it is associated with and connected thereto using an arrow, a line, or the like. As an example, a label with information about an historical place may be above, below, on the left or on the right of the image of that place. The AR framework may determine the exact location of the label, its size, and other graphical properties after the overlay display is generated.

On Step 360, it may be determined if there is another skin that is registered on the same type of object. If so, Steps 340 and 350 may be performed again with the respect to the next skin, which may process the same objects. Otherwise, Step 370 may be performed.

On Step 370, in case there is another object in the frame that was not yet processed, Steps 330-360 may be repeated with respect to the additional object. As a result, the AR framework may iterate over each object that is in the frame and invoke skins thereon. Otherwise, Step 380 may be performed.

It may be noted that in some cases, skins may be executed in parallel. In some cases, skins that are registered on different types of objects may be executed in parallel to reduce overall computation time. In some cases, a first skin may be registered on a first type of object before a second skin. The second skin may also be registered on another type of object. The first skin may process an object of the first type in parallel to the second skin processing an object of the second type. After the first skin completes its processing, the second skin may process the object of the first type. As another example, if there are a plurality of objects of the first type, the first skin may process the first object, provide an output for the second skin to process the first object sequentially. While the second skin processes the first object, the first skin may continue to process, in parallel, a next object of the same type. In some exemplary embodiments, parallel execution may be performed on different execution platforms. Additionally, or alternatively, parallel execution may be useful to reduce latency caused by processing time. In some cases, the final output may be provided within a target time, so as to enable an output display stream at a desired rate, such as for example, a rate of at least about (e.g., ±10%) 20 FPS, 60 FPS, 90 FPS, or the like.

On Step 380, the AR framework may combine overlays from different skins to provide an output overlay. The output overlay may be displayed to the user, providing an augmented reality experience with augmentation over the frame viewed by the user. Additionally, or alternatively, a label overlay may be generated by the AR framework and combined with the skin-generated overlays.

In some exemplary embodiments, the AR framework may add the overlay of each skin to as soon as the overlay is available. Additionally or alternatively, it may be useful to postpone adding an overlay order to save processing time. A second skin may be registered on an object that is the output of the first skin. The second skin may change the objects that the first skin generated. Hence, there may be no need to draw the output of the first skin, and any computation time spent in adding it may be wasted.

In some exemplary embodiments, the metadata record which may be passed and potentially modified by the skins, may comprise privacy settings. The privacy settings may be settings of an object appearing in the frame or in the overlay display. As an example, the privacy settings may indicate whether the image may be retained, may be shared with other people, or the like. Privacy settings may be defined by the user, may be updated by the skins, may be updated by the AR framework in response to identification of a marker, or the like. In some cases, the AR framework may enforce the restrictions defined by the privacy settings. For example, if the privacy settings allow retaining and sharing of the frame, that information may be retained and shared. Additionally, or alternatively, the AR framework may combine the frame and display overlay for generating the AR view to be shared and retained for future use. If the privacy settings do not allow sharing of the frame, the frame itself may not be shared with others. Additionally, or alternatively, if the privacy settings prevent the sharing or storage of specific objects in the frame, the AR framework may redact portions of the frame, of the display overlay, combination thereof, or the like, based on the privacy settings.

On Step 390, the overlay display is displayed using the AR device. As a result, the overlay display is overlaid over the physical world, without combing the frame itself. In some exemplary embodiments, the overlay display is displayed by the AR glasses, providing personalized AR view of the world to the user. Additionally, or alternatively, the AR device may be the windshield of a vehicle, providing a passenger of the vehicle with an augmented view of the surroundings of the vehicle.

Figure 4:
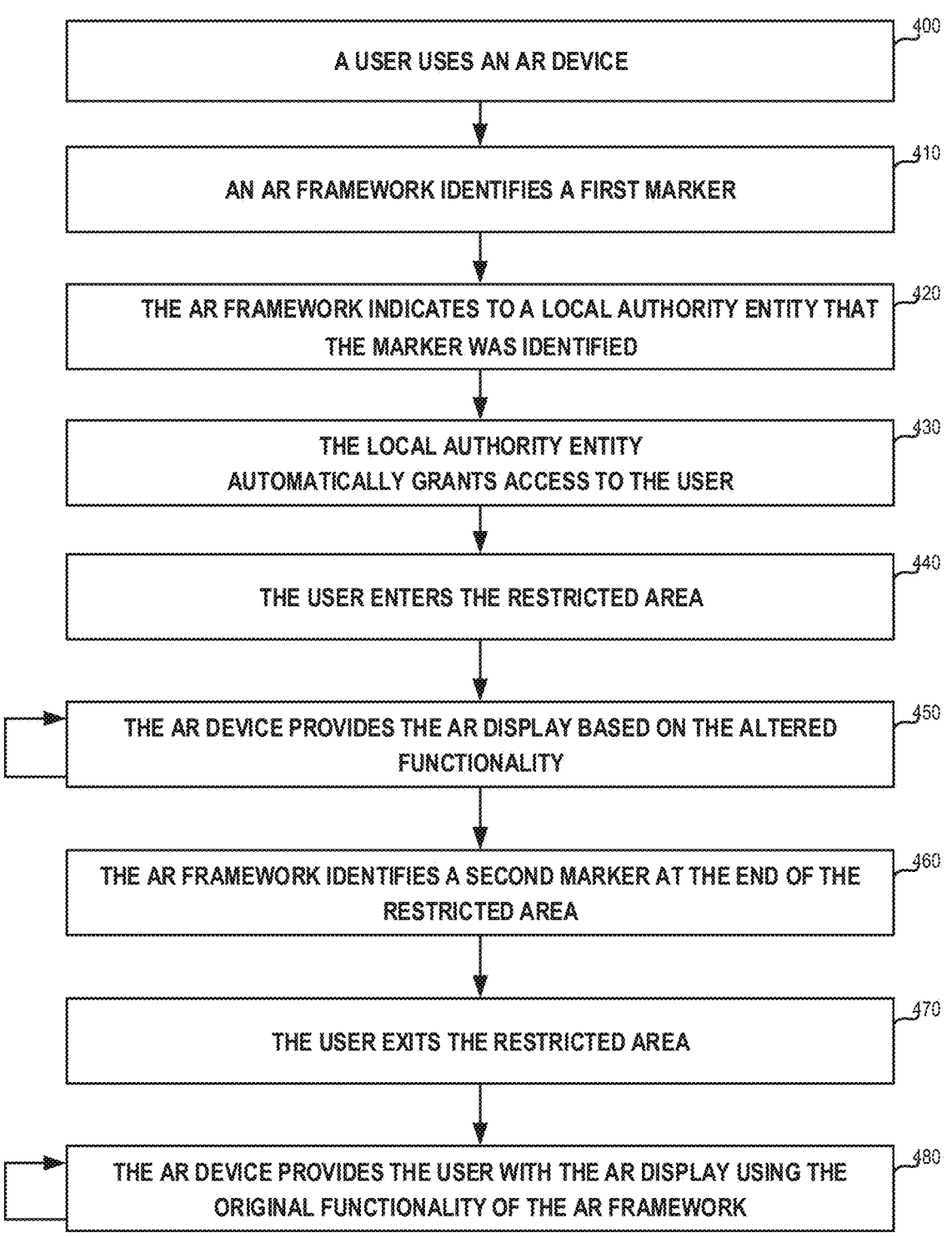
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

On Step 400, a user uses an AR device. The AR device operatively coupled to an AR framework for providing an AR display to the user via the AR device.

On Step 410, an AR framework identifies a first marker. As a result, the AR framework alters its functionality based on the instructions conveyed by the first marker.

On Step 420, the AR framework indicates to a local authority entity that the marker was identified and altered functionality was implemented.

On Step 430, the local authority entity automatically grants access to the user using the AR device of the AR framework to a restricted area. In some exemplary embodiments, the access may be granted by lifting a barrier preventing physical access to the restricted area. For example, a gate, a door, or the like may be automatically opened.

On Step 440, the user enters the restricted area.

On Step 450, the AR device provides the AR display based on the altered functionality. The AR display is continually provided to the user while the user is located within the restricted area, and as long as the restrictions conveyed by the first marker are applied On Step 460, the AR framework identifies a second marker at the end of the restricted area. In some cases, the user may be near the end of the restricted area, and the second marker may be located so as to be captured after leaving the restricted area or immediately prior to that. As a result, the AR framework undoes the altered functionality performed on Step 810. Additionally or alternatively, the second marker may indicate that the altered functionality is to be undone when reaching a predetermined location, such as after exiting the restricted area. Additionally or alternatively, instead of identifying a second marker, the first marker may define a timeframe during which the altered functionality is active and upon reaching the end of the timeframe, the original functionality may be restored. Additionally or alternatively, the first marker may define the predetermined location, that when reached, the original functionality is restored. In some exemplary embodiments, the predetermined location may be identified using a beacon, an RF transmitter, or the like.

On Step 470, the user exits the restricted area.

On Step 480, the AR device provides the user with the AR display using the original functionality of the AR framework.

Figure 5:
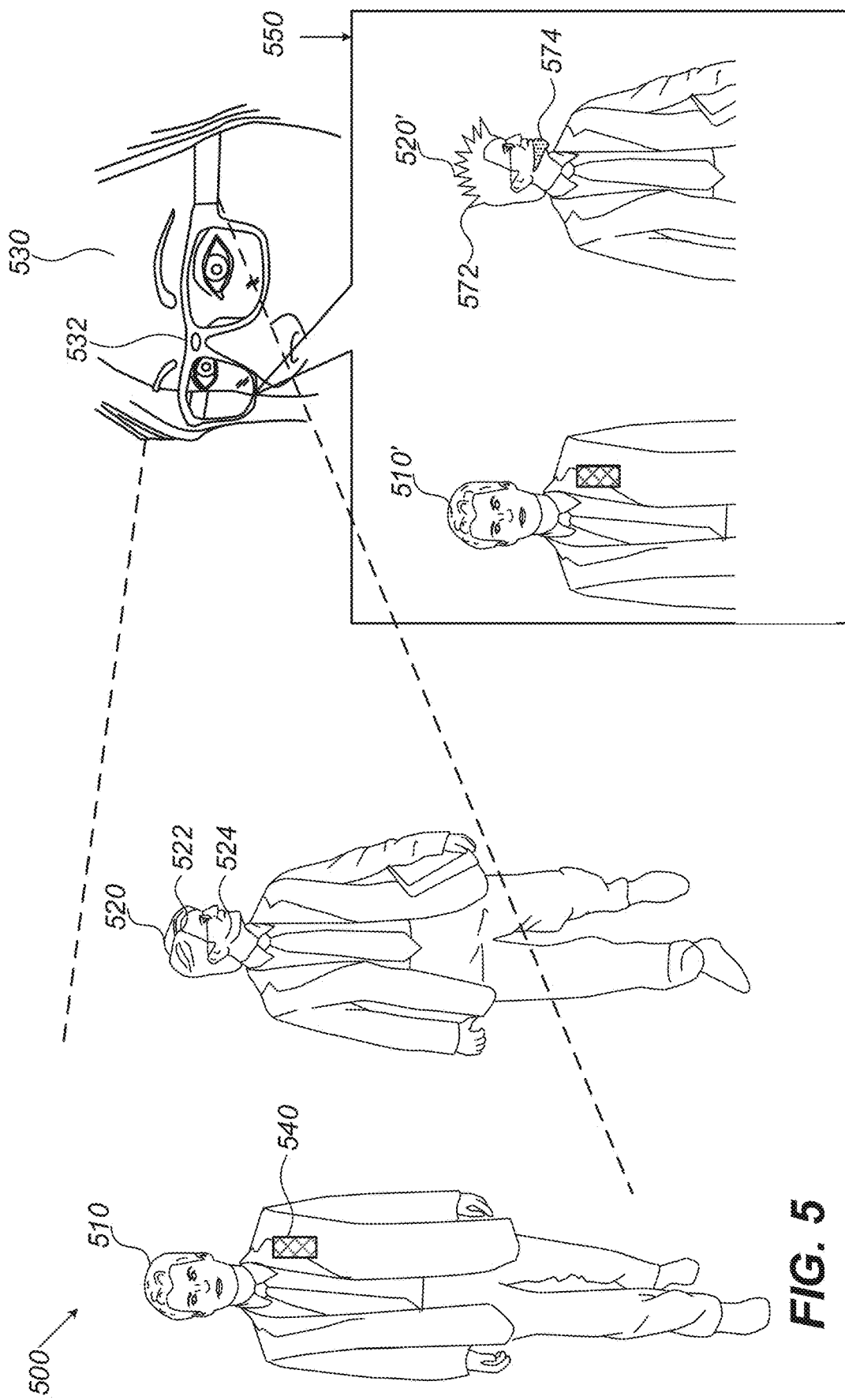
FIG. 5 shows a schematic illustration of an environment in which the disclosed subject matter may be utilized, in accordance with some exemplary embodiments of the disclosed subject matter.

Referring now to FIG. 5 showing a schematic illustration of an environment in which the disclosed subject matter may be utilized, in accordance with some exemplary embodiments of the disclosed subject matter.

FIG. 5 illustrates Environment 500. In Environment 500, there are two people, Person 510, and Person 520. Person 510 is wearing a Marker 540. It is noted that Marker 540 is visible on Person 510 or otherwise can be perceived by the sensors of an AR framework (not shown). The AR framework may be configured to identify that Person 510 is wearing Marker 540. In response to identifying Marker 540, the AR framework may alter its functionality based on instruction conveyed by Marker 540. For example, Marker 540 may indicate restrictions on a skin that is configured to augment the image of Person 510. Additionally, or alternatively, Marker 540 may indicate other restrictions, such as but not limited to preventing performing facial recognition, preventing storing of the image of Person 510, preventing from sharing the image of Person 510 or limiting subjects with which the image is shared (e.g., only to social network friends of Person 510, only to his friends and friends of friends, to a specific group of people, to a group of people and excluding a second group, or the like). In some exemplary embodiments, altering the functionality of the AR framework may comprise processing the image of an object that comprises a marker in order to enhance the object privacy. As an example, AR framework may delete the face of Person 510 that is wearing Marker 540, may not execute a skin that performs facial recognition thereon, requiring that the object be processed by a specific skin, setting a different order between skins execution, or the like.

In some exemplary embodiments, AR framework may be configured to perform object tracking with respect to Person 510. As Marker 540 is identified to be associated with the object of Person 510, the privacy preferences that are enforced with respect to Person 510 may be continued to enforce regarding Person 510 in the next frames as well. In some exemplary embodiments, AR framework may retain the privacy settings and use them for the next frames. In some cases, the AR framework may retain the information that Person 510 is wearing a Marker 540. In case that Person 510 turns around and Marker 540 is not visible in the next frames, the privacy preferences as defined by Marker 540 may continue to be enforced regardless of the Marker 540 no longer being visible.

User 530 is wearing AR Glasses 532 and may be watching the first person and the second person. AR Glasses 532 may be operatively coupled with AR framework. In the illustrated example, the AR framework is defined to execute two skins: a skin that modifies a person's hair, and a skin that adds a beard to people's face. AR Glasses 532 may be utilized to provide User 530 with an AR View 550.

AR View 550 may be the augmented view as seen by User 530 through AR Glasses 532. As User 530 is looking at Persons 510, 520, and as the two skins are executed, augmented features may be added to Persons 510, 520. As can be appreciated, AR Person 520' appears with augmented features due to the execution of the two skins. Namely, Hair 522 is modified to Augmented Hair 572, while Cheek 524 is covered with Augmented Beard 574. As Person 510 is wearing a Marker 540, the functionality of the AR framework with respect to Person 510 may be altered. AR Person 510' may appear identical to Person 510 real life appearance. As a result, privacy settings and preferences defined by Person 510 may be enforced on an AR framework that is not controlled by Person 510 and to which he does not have any access. In some exemplary embodiments, the relationship between Person 510 and the AR framework is merely the fact that the AR framework captures and potentially processes his image, as a subject of potential AR manipulation.

In some exemplary embodiments, AR View 550 may comprise Marker 540 without a change. Marker 540 may be a final object. A final object may be an object that the AR framework prevents skins from removing, processing, or the like. As a result, even if Marker 540 is delivered to other skins, they may be prevented from obscuring it, so as to allow User 530 to understand that Person 510 was processed differently due to his preferences, as exhibited by Marker 540.

Additionally, or alternatively, Marker 540 may be invisible to the naked eye. A graphical representation of Marker 540 may be added in AR View 550 to inform the user of the privacy settings applied. Additionally, or alternatively, AR View 550 may provide a different visual representation of Marker 540 or of privacy settings conveyed thereby, while removing the appearance of Marker 540. As an example, people for which no skin is executed may be outlined using a red line. People for which a specific skin is not executed may be outlined using a yellow line. People for which privacy settings prevent sharing their image may be outlined using a dashed line. Using different visual representations, User 530 may be visually informed of the different privacy settings enforced by different markers on different objects.

Additionally, or alternatively, AR View 550 may remove the appearance of Marker 540. This may be desired, for example, if User 530 does not want such information indicated to her. Additionally, or alternatively, Marker 540 may indicate whether or not AR View 550 is to include a visual representation of Marker 540.

Figure 6A:
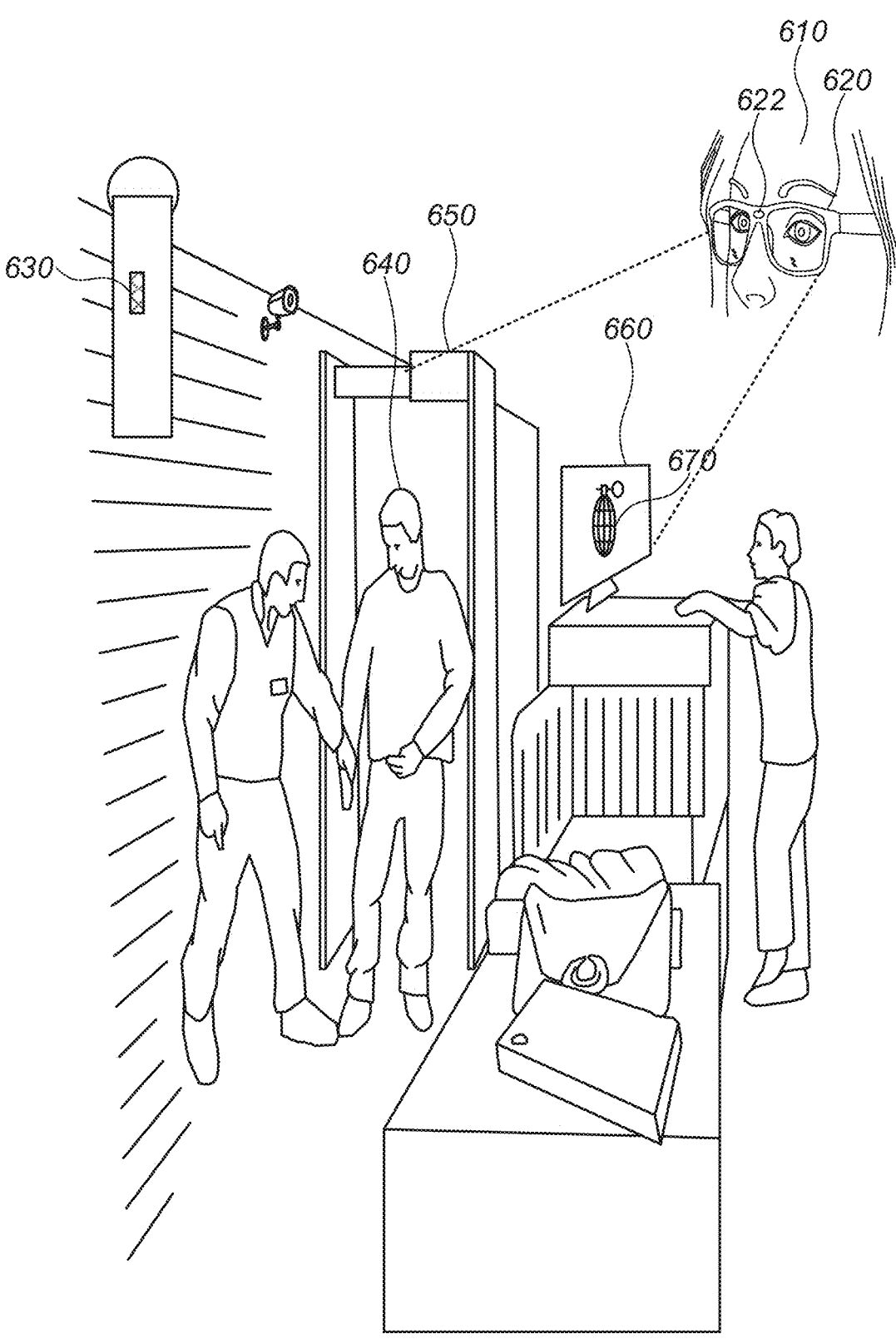
FIGS. 6A-6B show flowchart diagrams of methods, in accordance with some exemplary embodiments of the disclosed subject matter.

Referring now to FIG. 6A showing an environment, in accordance with some exemplary embodiments of the disclosed subject matter.

Figure 6B:
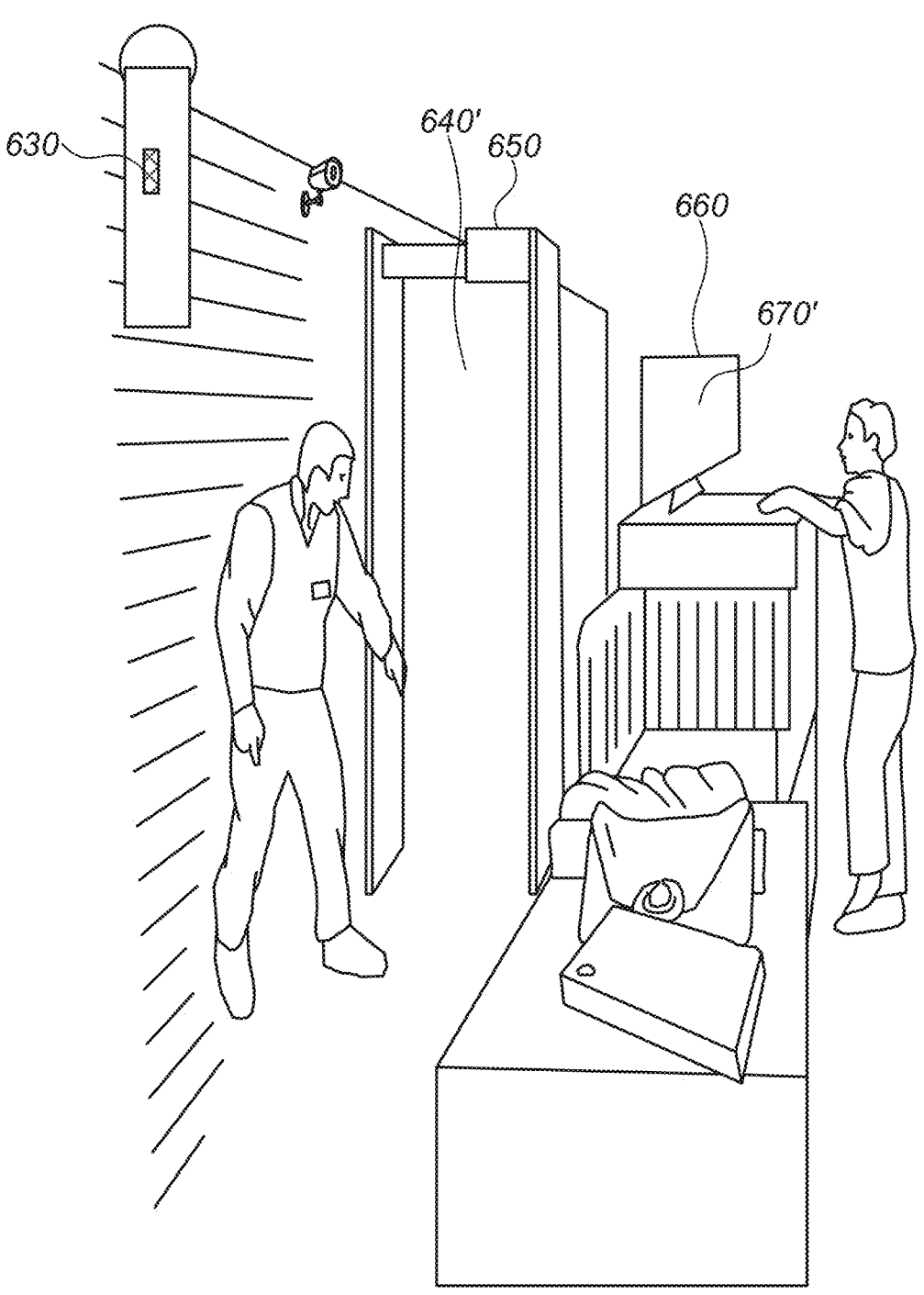

FIG. 6A illustrates a security check zone as may be found in an airport, in an entrance to a secure location, or the like. Marker 630 is on the wall. Marker 630 may signal AR frameworks that obtain frames of the room to alter their functionality. FIG. 6B shows the AR view provided by the AR framework based on the altered functionality. As can be appreciated, the altered functionality may comprise removing objects from the frame so as to not be viewed by User 610, not be transmitted to a remote location, or the like. In FIG. 6A, depicting the actual real physical environment, Person 640 is being scanned in a Full Body Scanner 650. FIG. 6A also includes Screen 660 showing the X-Ray imaging of the luggage and bags that are being screened. In the illustrated example, a Hand-grenade 670 is shown on Screen 660.

In some exemplary embodiments, Marker 630 may be a physical object, an image, a QR code or the like. In some exemplary embodiments, data regarding the restriction that AR frameworks may impose may be embedded in Marker 630. As an example, the data may comprise commands such preventing transmission of frames, of augmented overlays, of combinations thereof, preventing processing on the cloud, requiring processing on a local edge computer controlled by the security authority responsible for the security check zone, preventing from performing facial recognition to Transportation Security Administration (TSA) officers, preventing from performing facial recognition to bystanders, forcing execution of a redacting skin, or the like. Additionally or alternatively, the data may include an IP address conveyed by Marker 630. An AR framework that captures an image of Marker 630 may obtain an altered functionality description by accessing the computer at the IP address. The altered functionality description may be retained on a cloud server, on a local edge computer, or the like.

In some exemplary embodiments, the AR framework may be configured to transmit the image of Marker 630 to a predetermined server, such as a general certification server, a server identified by the marker, or the like.

Additionally or alternatively, AR Glasses 620 may comprise Signaling Module 622. In response to applying restrictions or otherwise altering the functionality based on Marker 630, Signaling Module 622 may transmit signals indicating that the altered functionality is being implemented. The signal may be a visual signal, such as using a LED, a wireless signal, such as using an RF transmission, or the like. In some exemplary embodiments, the signal may encode which altered functionality is being implemented.

In some exemplary embodiments, upon starting to impose restriction and implementing the altered functionality, the AR framework may send to a server that is associated with an IP address conveyed by Marker 630, a message confirming that the AR framework is imposing the restriction. The message may comprise data such as the location of AR Glasses 620, the model of the AR Glasses 620, the restriction policy that the framework is imposing, a combination thereof, or the like. Additionally, or alternatively, the message may comprise an augmented frame, comprising the frame and a display overlay overlaid thereon. The server may analyze the frame and determine whether or not the altered functionality is imposed properly. Additionally or alternatively, the message may comprise an image of Marker 630 as seen through AR glasses 620. The server may validate that the image is indeed of the correct marker, such as by comparing the transmitted image with a stored image of the marker.

In some exemplary embodiments, Marker 630 may be associated with a physical barrier (not shown). The barrier may be configured to open upon determining that the AR framework that User 610 is using implements the altered functionality. For example, the barrier may open upon receiving a message from an AR framework that it has captured the image of Marker 630 and that the AR framework is imposing the required restrictions. Additionally, or alternatively, the barrier may open in response to capturing a signal issued by Signaling Module 622.

In some exemplary embodiments, Marker 630 may be a wireless beacon, implemented by medium such as WIFI™, BLUETOOTH™, Near-Field Communication (NFC), or the like. AR Glasses 630 may comprise a receiver/transmitter and may communicate directly with Marker 630. As an example, Marker 630 may comprise an Ultra High Frequency (UHF) transmitter and AR Glasses 620 may comprise a UHF receiver. Additionally or alternatively, UHF transceivers may be utilized to implement two-way communication. When User 610 is about to enter the compound, AR Glasses 620 may communicate with Marker 630. Marker 630 and AR Glasses 620 may exchange messages indicating that the AR framework is implementing the altered functionality.

In some exemplary embodiments, User 610 may be an employee of the compound (e.g., a security guard), a police officer, or the like. The AR framework associated with the AR Glasses of User 610 may be configured to prevent the limitations imposed by Marker 630. In some exemplary embodiments, AR framework may be configured to receive authorization to override the instructions of Marker 630. As an example, The AR framework may send a message to the IP address indicating that Marker 630 was seen, that the restriction was obtained and that the AR framework is not imposing the restriction due to the role, permissions, tasks, or the like of User 610.

For example, FIG. 6B illustrates the AR view when the altered functionality defined by Marker 630 is implemented. The AR view may remove security-related information for the user's view, such as content of Screen 660, which may be changed and blocked from the user's view (670'). However, a TSA officer working in the security check zone may be allowed (and in fact required) to view the content of Screen 660. For the TSA officer, who may employ an AR device on his own, the restrictions may not be applied.

FIG. 6B illustrates the AR view of the real-world shown in FIG. 6A, as may be seen by User 610 via AR Glasses 620. In some exemplary embodiments, the AR framework may identify Marker 630. Marker 630 may provide privacy configurations to AR Glasses 620, the privacy configurations may impose restrictions such as requiring the execution of a redacting skin, configured to redact information. The redacting skin may be configured to redact the content of Screen 660, thereby blocking the view of Hand-grenade 670, and instead displaying an empty screen (670') displaying a black screen, displaying a censored banner, or the like. Additionally or alternatively, the redacting skin may be configured to implement security protocols such as blocking from the view of User 610 security-related information. Additionally or alternatively, the forcedly executed skin may be configured to perform operations such as but not limited to privacy-related actions, providing authority-related information, or the like. As an example, Person 640 may be undergoing a full body scanning, potentially compromising his privacy. The skin may remove Person 640 from view, may hide his face to protect his privacy, may cover any exposed skin areas to protect his modesty, or the like. Additionally or alternatively, authority-related information may provide on-screen instructions (not shown) for User 610, visually indicate TSA officers and provide authorized information about them, such as their name and rank, or the like.

Figure 7:
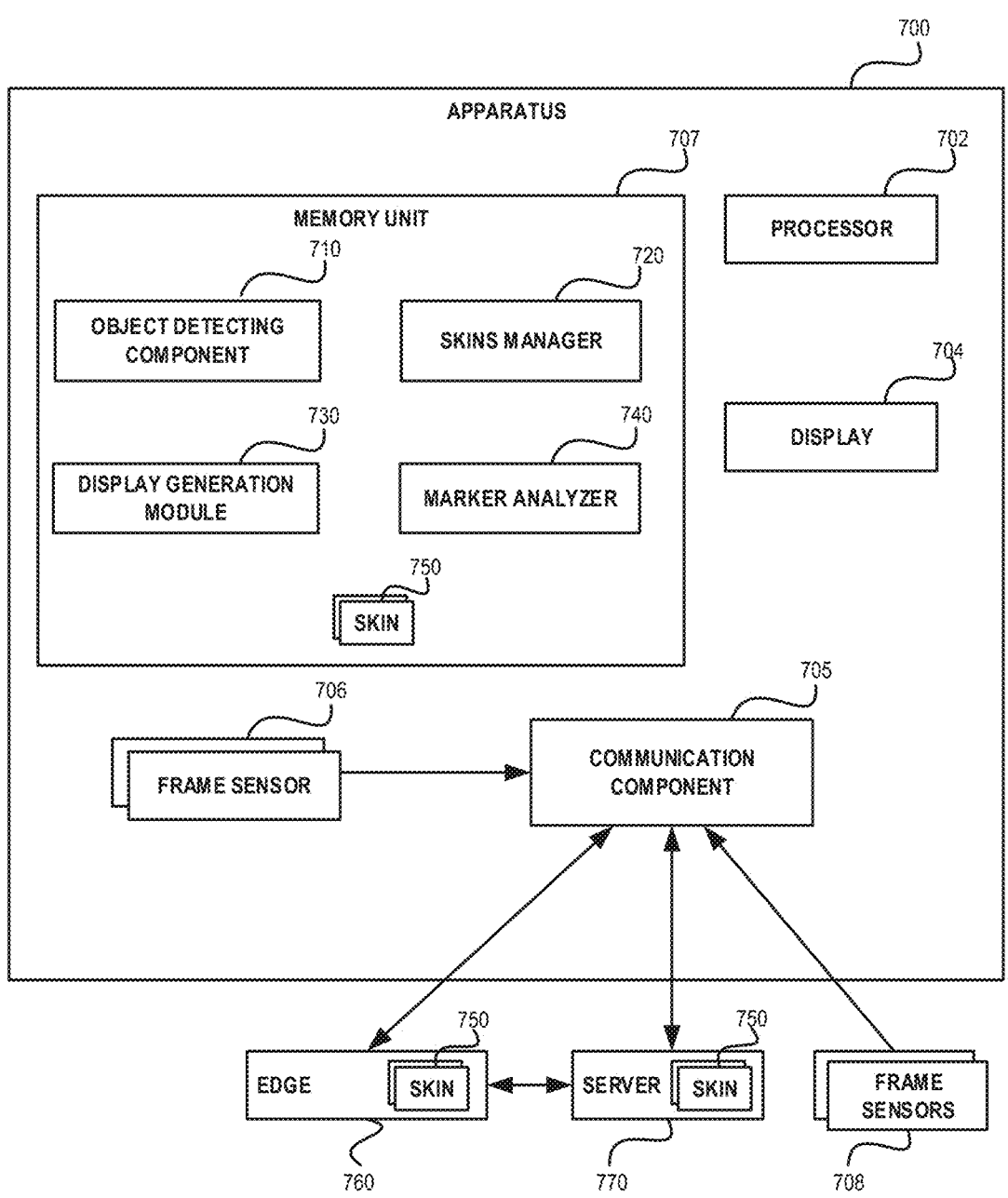
FIG. 7 shows a block diagram of an apparatus, in accordance with some exemplary embodiments of the disclosed subject matter.

Referring now to FIG. 7 showing an apparatus, in accordance with some exemplary embodiments of the disclosed subject matter.

In some exemplary embodiments, Apparatus 700 may comprise Processor 702. Processor 702 may be a Central Processing Unit (CPU), a microprocessor, an electronic circuit, an Integrated Circuit (IC) or the like. Additionally or alternatively, Apparatus 700 can be implemented as firmware written for or ported to a specific processor such as Digital Signal Processor (DSP) or microcontrollers, or can be implemented as hardware or configurable hardware such as Field Programmable Gate Array (FPGA) or Application Specific Integrated Circuit (ASIC). Processor 702 may be utilized to perform computations required by Apparatus 700 or any of its subcomponents.

It is noted that Apparatus 700 is illustrated as an apparatus that both executes the AR framework and implements the AR device. However, the disclosed subject matter is not limited to such embodiment and the AR device may be implemented externally to Apparatus 700.

In some exemplary embodiments, Apparatus 700 may comprise Display 704. Display 704 may display to a user overlay displays, thereby providing the user with an augmented view. The overlay displays may be generated based on frames captured by Frame Sensor 706, 708, representing the view of the user.

In some exemplary embodiments, Apparatus 700 may utilize frames obtained from a Frame Sensor, such as 706, 708. In some exemplary embodiments, Frame Sensor 706 may be an integral part of Apparatus 700. For example, Frame Sensor 706 may be embedded in AR glasses worn by the user, and positioned to capture the view of the user. Additionally or alternatively, Frame Sensor 708 may be external to Apparatus 700. Frame Sensor 708 may be an integral part of a mobile device, such as a cellular phone; a standalone camera; a webcam; or the like. Frames obtained from Frame Sensor 708 may be transformed to provide the expected view of the user. In some cases, a frame representing the view of the user may be created by merging outputs of different cameras and sensors.

In some exemplary embodiments, Apparatus 700 may comprise Communication Component 705. Apparatus 700 may utilize Communication Component 705 as an interface to transmit and/or receive information and instructions between Apparatus 700 and external devices, such as a Server 770, Edge 760, Frame Sensor 708, or the like. Additionally or alternatively, Communication Component 705 may be used by Apparatus 700 in order to send frames to Edge 760, to Server 770, or the like. Additionally or alternatively, Communication Component 708 may be utilized in order to obtain overlays from Edge 760, from Server 770, or the like.

Additionally or alternatively, Communication Component 705 may be utilized to communicate with an active marker (not shown). Additionally or alternatively, information from a passive marker may be obtained by Communication Component 705, such as using RFID reader. Additionally or alternatively, information may be obtained from a marker based on visual perception thereof, such as by Frame Sensor 706, 708.

In some exemplary embodiments, Edge 760 may be connected to Apparatus 700. Apparatus 700 may utilize Edge 760 in order to invoke skins thereon.

In some exemplary embodiments, Server 770 may be a remote server, a web server, a cloud server, or the like. Communication Component 705 may be connected to Server 770 directly or indirectly, such as via Edge 760, via the Internet, vis a WAN, or the like. Apparatus 700 may utilize Server 770 in order to invoke skins thereon.

Invoking skins on Edge 760 or on Server 770 may reduce power consumption by Apparatus 700 compared to invoking skins locally, on Apparatus 700. Additionally or alternatively, invoking skins on Edge 760 rather than on Server 770 may reduce latency, due to communication delay between Apparatus 700 and Edge 760 compared to that between Apparatus 700 and Server 770. In some cases, the frame or portion thereof is transmitted from Apparatus 700 to Edge 760 to allow the skin to execute. Additionally or alternatively, each computerized device—Apparatus 700, Edge 760, and Server 770—may have access to different databases. For example, a database for implementing facial recognition may require a substantial amount of data and may not be retained locally in Apparatus 700 but rather on Server 770 or on a Network-Associated Storage connected thereto. As another example, Edge 760 may have access to employee records, including portrait photos of the employees, while Server 770 may not have access to such information, which may be restricted, confidential, private, or the like. As a result, skin that requires identification of employees must be executed on Edge 760.

Additionally or alternatively, Edge 760 or Server 770 may be controlled by different entity than Apparatus 700. In some cases, it may be desired to ensure execution of a skin in a trusted execution environment, and accordingly, Edge 760 or Server 770 may be selected. It is noted that any of Apparatus 700, Edge 760 and Server 770 may be either trusted or not trusted, independently, based on the specific implementation details.

In some exemplary embodiments, Edge 760 may be located locally in a location near the marker, such as in proximity to the security check zone of FIG. 6A. Edge 760 may be controlled by the proprietor of the security check zone or by the entity controlling it. Edge 760 may retain the redacting skin, security-related skin, privacy-related skin, or the like, that is required, as indicated by the marker (not shown) to be executed.

In some exemplary embodiments, a marker may be configured to signal to Apparatus 700 to invoke a skin on Edge 760 rather than on Server 770, or vice versa, for privacy sake.

In some exemplary embodiments, Skin 750 may be executed locally in Memory Unit 707 or remotely on a computerized environment such Edge 760, Server 770, or the like. Choosing where to execute the skin may comprise considerations such as privacy, battery consumption, CPU consumption, data availability, or the like. As an example, a user may be in a private meeting, not wishing that data regarding the meeting is processed remotely. Additionally or alternatively, the AR glasses battery may be running out. Hence, processing remotely may require less power compared to processing locally. Additionally or alternatively, the manufacturer of the AR glasses designed a non-expensive AR glasses with a slow CPU.

In some exemplary embodiments, Apparatus 700 may comprise a Memory Unit 707. Memory Unit 707 may be persistent or volatile. For example, Memory Unit 707 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or the like; a semiconductor storage device such as Flash device, memory stick, or the like. In some exemplary embodiments, Memory Unit 707 may retain program code to activate Processor 702 to perform acts associated with any of the steps shown in FIGS. 2-4.

The components detailed below may be implemented as one or more sets of interrelated computer instructions, executed for example by Processor 702 or by another processor. The components may be arranged as one or more executable files, dynamic libraries, static libraries, methods, functions, services, or the like, programmed in any programming language and under any computing environment.

In some exemplary embodiments, Object Detecting Component 710 may be configured to detect objects that are comprised by a frame. In some exemplary embodiments, Object Detecting Component 710 may be operatively coupled with Frame Sensors 706, 708. In some exemplary embodiments, the AR framework may utilize Object Detecting Component 710 to identify objects in the frame, and invoke skin that are registered on such objects. Additionally or alternatively, Object Detecting Component 720 may generate metadata information for each identified object. In some exemplary embodiments, Object Detecting Component 710 may detect, using a facial recognition module, an object that is a face of a person. Additionally or alternatively, Object Detecting Component 710 may be configured to use previous frames and objects detected therein to track the same objects in the analyzed frame In some exemplary embodiments, Skins Manager 720 may be configured to execute a skin, to obtain an overlay of a skin, or the like. Skins Manager 720 may be configured to retain a list of skins that are available to a user that is using Apparatus 700. In some exemplary embodiments, a skin may have been acquired, downloaded, or the like from a skin store similar to an application store for mobile applications (e.g., GOOGLE PLAY™ and APP STORE™), from a skin repository, or the like. In some exemplary embodiments, each skin may be registered on types of objects of interest. Skin Manager 710 may retain and manage such registration information to be used when an AR view is to be provided.

In some exemplary embodiments, Skins Manager 720 may be configured to invoke execution of a skin locally, remotely on Edge 760, on Server 770, or the like. The determination where to execute each skin may depend, for example, on privacy settings, on marked-based instructions, user preferences or the like.

Additionally or alternatively, Skins Manager 720 may be configured to provide an executed skin with the frame, a patch of the object of interest, metadata record, an editable section, or the like. Additionally or alternatively, Skins Manager 720 may be configured to obtain from an executed skin an overlay generated thereby, updated metadata record, information regarding added or removed objects, or the like.

In some cases, after execution of all skins is performed, Display Generation Module 730 may merge the overlays generated by the skins, one on top of the other, based on the order of the skins, to generate the display overlay that is displayed in Display 704. Additionally or alternatively, Display Generation Module 730 may implement drawing instructions from the skins on top of the merged overlays. For example, the instruction may be to draw an object in a relative location. The final location of the object may be determined by Display Generation Module 730 after all skins completed drawing on top of the frame. As an example, the object may be a label, whose location is defined to be relative to an object appearing in the frame (or in an augmented layer on top thereof). The exact positioning of the label, its final size, color, or the like, may be determined by Display Generation Module 730 taking into account other objects to be drawn (e.g., other labels), existing objects in the AR frame, or the like. It is noted that the same skin may generate an overlay to be part of the overlay display and add instructions that later on cause the creation of another object to be added to the AR frame. In between the creation of the overlay of the skin and prior to the creation of the additional object based on the instructions of the skin, other skins may be executed and generate overlays. In some exemplary embodiments, the final AR frame may comprise a first object, a second object, and a third object, where the first object is below the second object, which in turn is below the third object. The first and third objects may be added to the AR frame due to a first skin, while the second object may be added due to a second skin. Such framework provides flexibility, and enables deferring some decisions regarding added objects to a later stage, if possible.

In some exemplary embodiments, Marker Analyzer 740 may be configured to identify a marker. In some exemplary embodiments, Marker Analyzer 740 may be configured to identify the marker in the frame, such as based on a visual appearance thereof. Additionally or alternatively, Marker Analyzer 740 may be configured to identify the maker using non-visual means, such as based on audio signals, using wireless communication, or the like. In some exemplary embodiments, Marker Analyzer 740 may be configured to extract the information conveyed by the marker, such as obtain the information from a repository using an identifier of the marker, receiving the information from an active marker by communicating therewith, or the like. In some exemplary embodiments, Marker Analyzer 740 may be configured to determine an altered functionality defined by the marker and enforce such altered functionality to be performed. In some exemplary embodiments, Marker Analyzer 740 may update the metadata record to include restrictions on objects. Additionally or alternatively, Marker Analyzer 740 may instruct Skins Manager 720 to add a skin, to remove a skin, to force a skin to be executed on a desired location, or the like.

Figure 8:
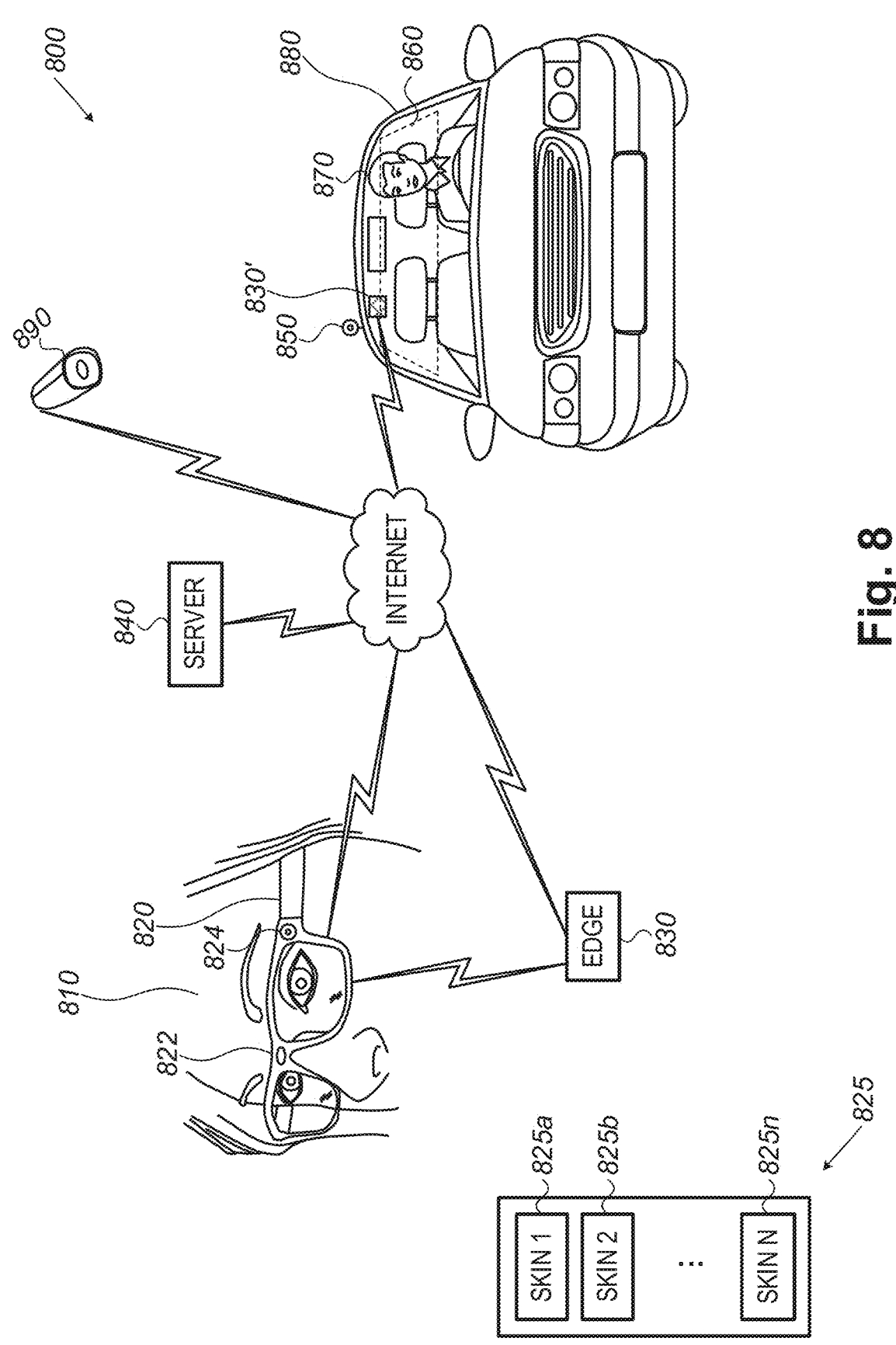
FIG. 8 shows a schematic illustration of an exemplary environment and architecture in which the disclosed subject matter may be utilized, in accordance with some exemplary embodiments of the disclosed subject matter.

Referring now to FIG. 8 showing an environment, in accordance with some exemplary embodiments of the disclosed subject matter. Environment 800 may be an environment where an AR framework is implemented. The AR framework may be a framework for providing augmented reality experience to a user, by executing skins. Skins and AR frameworks are disclosed, inter alia, in U.S. Pat. No. 9,865,088, entitled "Evaluation of Augmented Reality Skins", dated Jan. 9, 2018, U.S. Pat. No. 9,953,462, entitled "Augmented Reality Skin Manager", dated Apr. 24, 2018, U.S. Pat. No. 9,990,772B2, entitled "Augmented reality skin evaluation", dated Jun. 5, 2018, and U.S. Patent Application Publication 2016/0,240,005, entitled "Subject selected augmented reality skin", dated Aug. 18, 2016, all of which are incorporated herein by reference in their entirety without giving rise to disavowment.

Environment 800 may comprise a Person 810. Person 810 may be wearing AR Glasses 820. AR Glasses 820 may comprise a frame sensor such as Camera 824 for capturing images that are processed by the AR framework. Lenses of the AR Glasses 820 may be configured to display an overlay display that is seamlessly interwoven with the physical world as perceived by Person 810, such as by adding layers over perceived objects, modifying perceived objects, removing perceived objects, or the like.

In some exemplary embodiments, AR Glasses 820 may comprise Signaling Module 822. Signaling Module 822 may be a LED providing a visual signal, a speaker, a wireless transmitter providing a signal using radio frequency, or the like. Signaling Module 822 may be configured to provide a signal indicative of the restriction being imposed by the AR framework. In some exemplary embodiments, other persons may perceive the signal and be aware that a restriction is imposed by the AR framework. Additionally or alternatively, a computerized device may be configured to perceive the signal indicating that the AR framework is imposing a restriction. In some exemplary embodiments, Signaling Module 822 may provide a signal that cannot be perceived by a person, such as in an audio frequency that is not within a human hearing range, a visual indication in an infrared light invisible to the human eye, or the like.

Environment 800 may comprise a Car 880. Car 880 may be driven by a Person 870. Car 880 may comprise a Frame Sensor 850. Frame Sensor 850 may be associated with the field of view of Person 870.

Car 880 may comprise an AR Display 860 embedded within the windshield of Car 880. An AR framework may display the overlay display using AR Display 860, so as to provide an augmented display of the physical world. In some exemplary embodiments, frames from Frame Sensor 850 may be analyzed by the AR framework, which may generate overlay display to be presented using AR Display 860.

In some exemplary embodiments, Skins 825 may be utilized to provide the augmented display. Skins 825 may comprise a plurality of skins, e.g., Skin 825*a*, Skin 825*b*, and Skin 825*n*, or the like, each of which configured to analyze the frame or portion thereof and provide an overlay display thereon. The overlay displays may be combined, on top of each other, to provide the final overlay display that is presented to the user (e.g., Person 810, Person 870) to provide augmented reality experience. In some exemplary embodiments, the AR framework may be configured to analyze the frame, identify objects therein, invoke the Skins 825 or portion thereof, collect output therefrom, and provide the final output for display. In some exemplary embodiments, the AR framework may be configured to invoke a skin, schedule an invocation of a skin, determine the order in which skins are invoked, determine which execution environment would execute each skin, or the like.

Environment 800 may comprise an Edge 830. Edge 830 may comprise a processor, a receiver, a transmitter, a memory, or the like. Edge 830 may be a computer, a smartphone, or the like. Similarly, an Edge 830' may be an edge computer that is installed within Car 880. Additionally, or alternatively, Edge 830' may be a smartphone of Person 870, the infotainment system of Car 880, or the like. Edges 830, 830' may be utilized by the AR framework to execute one or more skins. In some exemplary embodiments, Edges 830, 830' may constitute an execution environment for executing skins. Edges 830, 830' may communicate with the AR framework, or components via a computerized network.

Environment 800 may comprise Server 840. Server 840 be a remote cloud server and/or any other network server. In some exemplary embodiments, Server 840 may be configured to obtain information from the AR framework, execute a skin, provide the output of the skins to the AR framework, or the like. Additionally, or alternatively, Server 840 may be utilized by the AR framework to execute one or more skins. In some exemplary embodiments, Server 840 may constitute an execution environment for executing skins.

Environment 800 may comprise Frame Sensor 890 that is external to AR Glasses 820 and to Car 880. Frame Sensor 890 may be associated with the field view of Person 870 or Person 820. Frame Sensor 890 may transmit frames to Edge 830, 830' or to Server 840. An AR framework may utilize frames sent from Frame Sensor 890, such as to augment the display of the user, to identify objects to be analyzed, or the like.

In some exemplary embodiments, the AR device, such as AR Glasses 820, AR Display 860, or the like, may be connected to an edge computer, such as Edges 830, 830', and to cloud server, e.g., Server 840. The edge computer, however, may be closer to the AR device than the cloud server, such as having a reduced latency thereto, requiring reducing power consumption to reach it, or the like. For example, the edge computer may be directly connected, such as using a BLUETOOTH™ connection, using WIFI™ connection, using local cellular connection, or the like. Additionally, or alternatively, the edge computer may be connected to a same Local Area Network (LAN) as the AR device, may be physically connected thereto using a cabled connection, or the like. In some exemplary embodiments, communication to Server 840 may be provided through a Wide Area Network (WAN), through the Internet, or the like. For example, Server 840 may be a cloud computing platform that is used by various AR devices that are located remotely therefrom and from one another.

In some exemplary embodiments, different execution environments may have different resources. For example, Server 840 may have more computational resources, memory resources, or the like than Edge 830. Additionally, or alternatively, each execution environment may have different power resources. The AR device, such as AR Glasses 820 may have limited power supply. Additionally, or alternatively, Edge 830, which may be implemented by a mobile device, may also have limited power supply. Additionally, or alternatively, different execution platforms may retain, locally, or have connectivity to, different data storages. For example, a database used for identifying a person using facial recognition may be retained on Server 840. AR Glasses 820 may have limited memory capacity and may be able to retain only a portion of such database, such as a portion comprising frequently identified persons, people who are known to be at the same location, people that are deemed VIPs for the user, or the like. As a result, it may be desired to perform some computations off-device, on Edge 830 or on Server 840. As an example, Skin 825*a* may be executed on AR Glasses 820, Skin 825*b* may be executed on Edge 830 and Skin 825*n* may be executed on Server 840. In some exemplary embodiments, each skin may receive, as input, the output of the previous skin, in accordance with an order of execution, so as to add a layer on top thereof. As an example, Skin 825*a* may add an image of a cat, and Skin 825*b* may process the image of the cat and modify its appearance. The AR framework may be configured to invoke execution of each skin, in accordance with predetermined rules and based on the content of the frame, to select for each skin an execution environment, to gather input for the skin and obtain the output of the skin, and generate the final overlay display to be displayed by the AR device.

Figure 9:
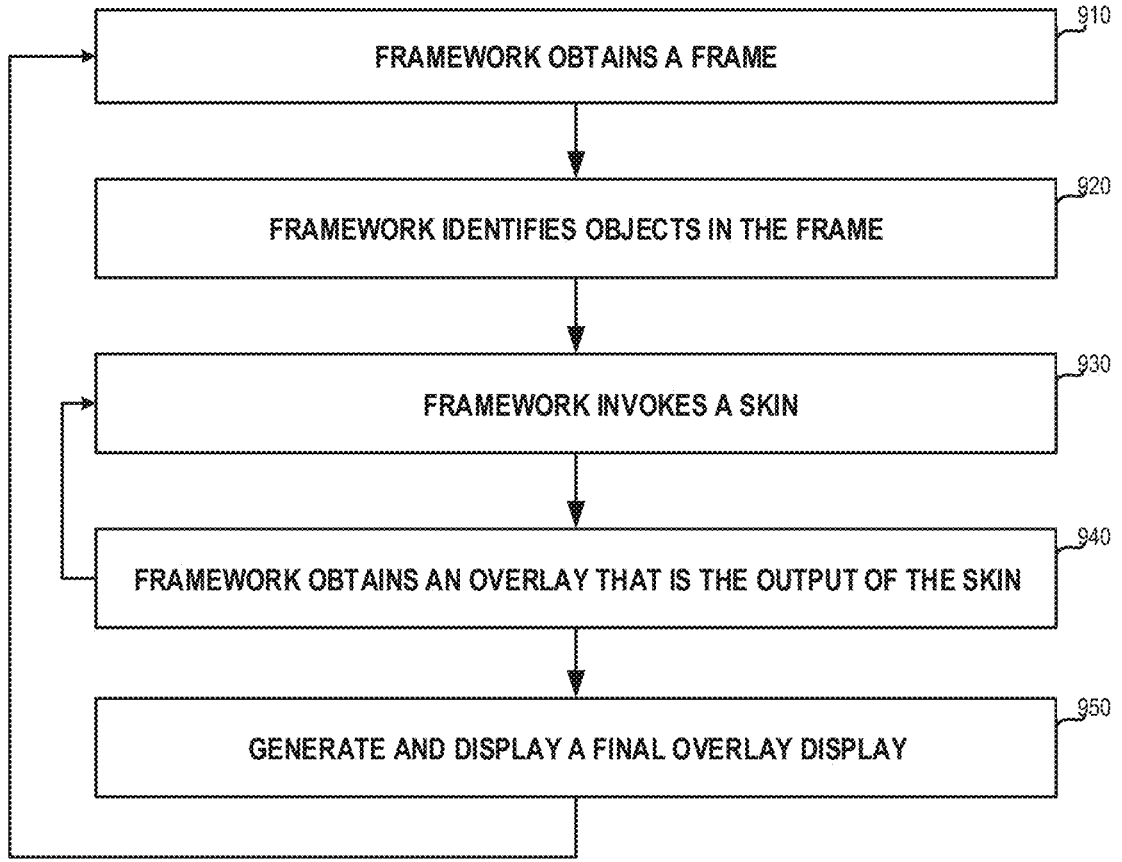
FIG. 9 shows a flowchart diagram of a method, in accordance with some exemplary embodiments of the disclosed subject matter.

Referring now to FIG. 9 showing a flowchart diagram of a method, in accordance with some exemplary embodiments of the disclosed subject matter.

On Step 910, the framework obtains a frame. The frame may be obtained by a frame sensor, such as camera, that may be operatively coupled with the framework. The frame may be obtained directly from a frame sensor that is associated with a view of a user, such as a camera embedded in AR glasses (e.g., 824 of FIG. 8). Additionally or alternatively, the frame may be obtained from a computerized environment such as an edge device, a remote cloud server, or the like. Additionally or alternatively, the frame may be obtained from an external frame sensor, such as 890 of FIG. 8, that may be utilized to capture information that may be obscured and blocked from the view of the user. In some exemplary embodiments, images may be obtained from a plurality of sources and may be integrated together to create the frame.

On Step 920, the framework identifies objects that are in the frame. The framework may be configured to identify objects using algorithms such as Regions Convolutional Neural Network (RCNN), Faster RCNN, Scale-Invariant Feature Transform (SIFT), template matching, edge matching, or the like. In some exemplary embodiments, each skin may register on one or more object type. In some exemplary embodiments, in order to improve performance, the framework may only try to identify objects on which at least one skin is registered. As an example, in case that skins are registered on objects of type "face" and "hat", the framework may skip large objects such as a car, a house, or the like. In some exemplary embodiments, the framework may analyze the frame and maintain a metadata record representing the frame identifying each object appearing in the frame. Additionally or alternatively, the metadata may be indicative to the surrounding of the user, to people that may be with the user, or the like.

On Step 930, the framework may invoke a skin. The framework may hold a list of available skins and corresponding objects and pull information regarding the faces from a social network database. The woman may enter a nudist beach. At the entrance to the nudist beach, there may be a marker signaling to the AR glasses not to perform facial recognition. The AR framework may embed that restriction in a metadata. The skin may obtain the metadata and pause its operation until the restriction is lifted. In some exemplary embodiments, the skin may unregister from the objects in the AR framework, and register for a notification from the AR framework when the altered functionality is lifted. Upon receiving such a notification, the skin may re-register on the objects of interest. As a result, performance improvement is achieved as the skin is never invoked when it is unable to perform its intended operation due to the marker-related instructions. Additionally or alternatively, the AR framework may manage the unregistration and registration of pertinent skins, instead of the skin itself unregistering and re-registering itself.

On Step 940, the framework obtains an overlay that is the output of the skin. In some exemplary embodiments, in case that the skin was not executed locally (e.g. executed on an edge computer, on a cloud server, or the like), the overlay may be obtained therefrom via a communication channel. In some exemplary embodiments, the skin may be executed locally as function. The overlay may be the output of the function. Additionally or alternatively, the skin may be executed remotely. The overlay may be provided to the AR framework as a stream. Additionally or alternatively, the overlay may comprise a bitmap image and a bitmap mask. The bitmap image may comprise the content of the pixels to be drawn, while the bitmap mask may comprise a corresponding bitmap, where each cell corresponds to a bit. The value of the bit in the bitmap mask may indicate whether or not the value of the overlay is to be used. As an example, consider a frame f, an overlay bitmap image, o, and a mask, m. For each pixel (x,y), the output value (out) representing the AR final display may be computed as dis $(x,y)=o(x,y) \cdot m(x,y)+f(x,y) \cdot (1-m(x,y))$. The overlay display (od), however, may be computed as $od(x,y)=o(x,y) \cdot m(x,y)$. Bitwise operations may be performed on the bitmasks, such as dis=(o AND m)XOR (f AND ¬m), and od=o AND m. In some exemplary embodiments, the mask may be either 0 (do not use the overlay bit) or 1 (use the overlay bit). Additionally or alternatively, values in between 0 and 1 may be used to provide for opaqueness and transparency properties.

In some exemplary embodiments, the overlay may be an image in the size of the frame. As the AR framework may combine the overlay with the frame, the overlay may comprise certain pixels from the output of the skin and transparent pixels when no skin output is received for a certain location in the frame. Additionally or alternatively, the overlay may comprise an image that may be the output of the skin and its relative position in the frame. In some exemplary embodiments, the overlay may comprise information regarding the importance the position of the skin output in the frame. As an example, an informative skin that adds labels to objects may be agnostic regarding the position of the label. Additionally or alternatively, a skin that adds lipstick may configured to set its location requirement to a high and/or maximal score, e.g., such as "high", "1", or the like.

In some exemplary embodiments, if the view of the AR device is shared, the overlay display may be overlaid over the frame to generate the AR frame, which represents the view that is perceived by the user using the AR device.

In some exemplary embodiments, Steps 930-940 may be performed iteratively, while invoking different skins, until all skins that are registered on available objects are invoked. In some exemplary embodiments, an overlay is obtained from one skin, incorporated into the frame, and potentially provided to the next skin that processes the affected area. Additionally or alternatively, the overlays may be combined with one another, and maintained separately from the frame itself. The skins may receive the frame and the combined (previous) overlays. Additionally or alternatively, the skins may receive an augmented frame, comprising the frame and combined (previous) overlays, for processing.

On Step 950, the final overlay display that is generated, based on the combined overlays of the invoked skins, may be displayed. It is noted that the overlay is seamlessly interwoven with the physical world, which is represented by the original frame of Step 910. As a result, the overlay display is overlaid over the physical world, without combing the frame itself.

In some exemplary embodiments, an AR framework may be operatively coupled with one or more frame sensors. The frame sensors may produce a stream of frames. The AR framework may obtain the streams. In the case that there are several frame sensors, the AR framework may combine multiple streams of frames into a single stream. In case that a skin is registered on types of objects that the single stream comprises, the AR framework may apply the skin on an appropriate object for each frame. In some exemplary embodiments, steps 910-950 may be repeated.

In some exemplary embodiments, a user may configure the AR framework to execute a skin at a specific location, for a specific time duration, or the like. As an example, a user may be using his AR glasses constantly. When he enters the supermarket, a skin that shows prices of products may be added to the list of active skins and may be invoked as long as the user is in the supermarket. When the user leaves the supermarket, the skin may be deactivated. In some exemplary embodiments, activation or deactivation may be configured to occur when a marker is identified, as explained hereinbelow. Additionally or alternatively, upon identifying a marker, a suggestion to activate a skin may be presented to the user and the user may confirm or reject the suggestion. In some cases, the user may set his personal preferences for activation or deactivation of skins, such as based on identifying markers, based on his location, based on a context, based on a time of day, based on a social environment in which he his located, or the like.

Figure 10:
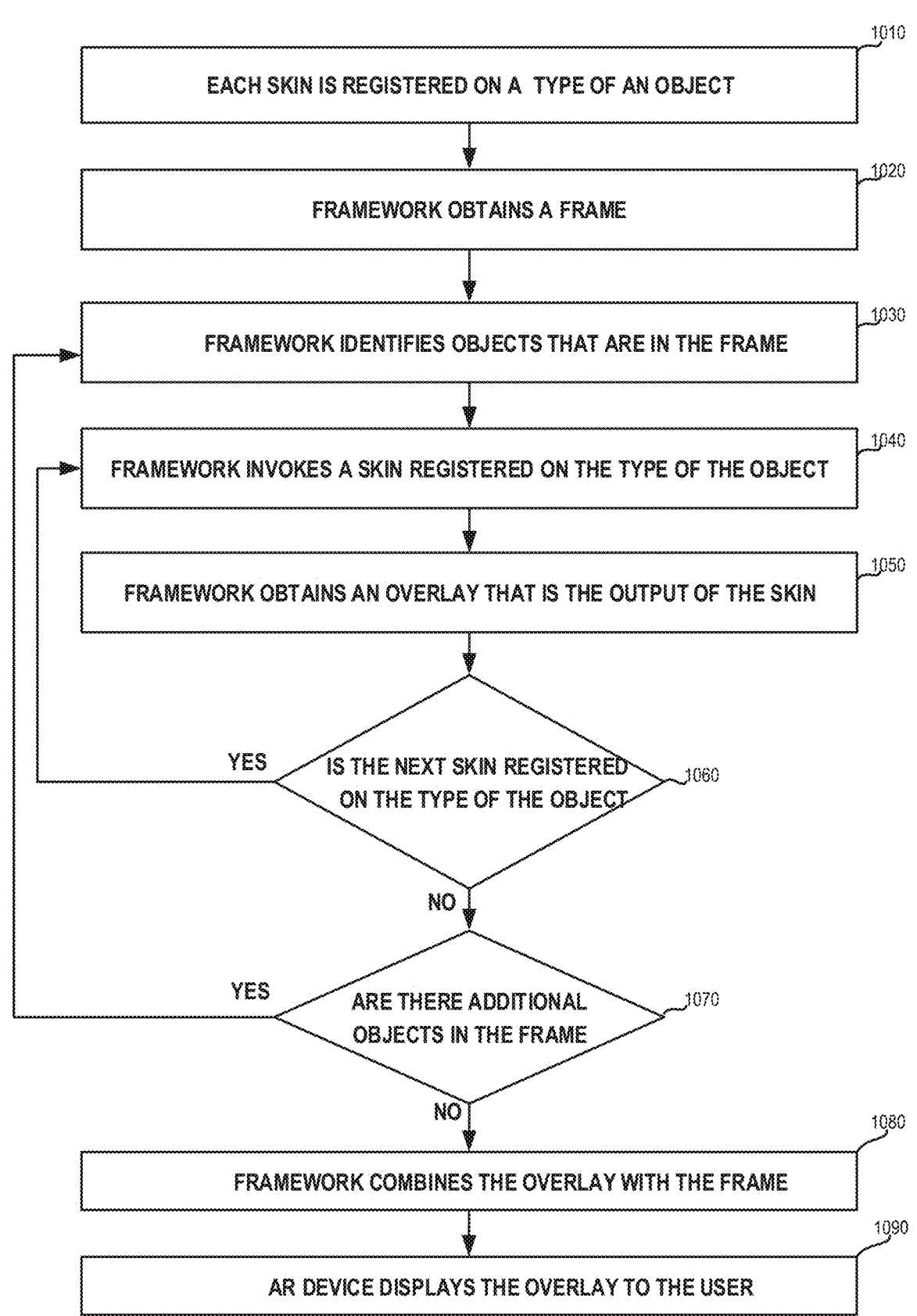
FIG. 10 shows a flowchart diagram of a method, in accordance with some exemplary embodiments of the disclosed subject matter.

Referring now to FIG. 10 showing a flowchart diagram of a method, in accordance with some exemplary embodiments of the disclosed subject matter.

On Step 1010, each skin is registered on a type of an object. In some exemplary embodiments, each skin may register with the AR framework to receive notification and handle specific types of objects. An object appearing in the frame may be identified and classified to a type. The AR framework may support a variety of objects types, such as but not limited to a person, an animal, a house, a road, a plant, a tree, a face, an eye, or the like. In some exemplary embodiments, an object may be classified as having a plurality of object types, such as objects that are an abstraction or instantiation of one another (e.g., a police officer may be an instantiation of an abstract person type), objects that have more than one attribute corresponding to an object type (e.g., a person may be both an adult, a female and a Caucasian), or the like. In some exemplary embodiments, an object may comprise other objects. As an example, an object of type person may comprise objects of type face, eyes, arms, clothes, or the like.

On Step 1020, the AR framework obtains a frame. The frame may be obtained from a frame sensor such as a camera that is embedded in an AR Glasses, from a camera that is embedded in a mobile phone, from a surveillance camera, from a thermographic camera, from an infrared camera, or the like. The frame sensor may capture one frame after the other and produce a stream of frames. The frame sensor may obtain frames that may be processed to generate output overlays for the frames in a rate such as 90 Frames per Second (FPS), 60 FPS, or the like. In some exemplary embodiments, a rate which is lower than 60 may result in a quality which may be poor for human users.

The AR framework may obtain a frame from a frame sensor and may send the frame, transmit the frame, save the frame, or the like for future processing. In some exemplary embodiments, the AR framework may obtain several frames from multiple sources in a single time unit and merge the frames to a single frame prior to processing the frame. As an example, the AR framework may not have access to a frame as viewed from the field of view of the user. Using a plurality of cameras, several different images may be transformed and merged together to provide an estimated frame of the view of the user. The image of the room or of the person may be taken from several image sensors. Frames from different image sensors may be merged to a single frame.

On Step 1030, the AR framework identifies objects that appear in the frame. The AR framework may employ object recognition, computer vision techniques, Artificial Intelligent (AI) algorithms, or the like, to identify the objects in the frame. Additionally or alternatively, metadata about objects may be available in other manners, such as using wireless transmission, RFID, consultation with 3D maps, or the like.

In some exemplary embodiments, the AR framework may classify the objects to types and may build a list comprising the types of the objects that comprised by the frame. In some exemplary embodiments, the AR framework may create or maintain a metadata record. The metadata record may be updated to comprise each identified object and properties thereof. For example, the metadata record may indicate for an object its type, its location in the frame, its dimensions, or the like. In some cases, skins that are executed by the AR framework may access the metadata record, utilize its content, and potentially update it.

In some exemplary embodiments, an object may not have existed in the frame as captured by the frame sensor. A skin may process the frame or portion thereof, and add an object record to the metadata record to indicate the existence of the new object, to ensure it is processed correctly. As an example, a skin may add a label to be presented near an existing object, a skin may add an object of a cat, a navigation skin may add a graphical representation of a route on top of the road, or the like. As another example, the AR framework may add images of family members of a person that is shown in a frame, a garden near a house, or the like.

On Step 1040, the AR framework invokes a skin which is registered on the type of the detected object in the frame. As each skin may have registered on types of objects which are of interest to it (e.g., Step 1010), the AR framework may invoke only skins that have objects of interest in the frame to avoid having each skin determine, dynamically, whether objects of interest appear in the frame, requiring resource consumption, such as energy and processing resources.

In some exemplary embodiments, the AR framework may be executed by a device, such as but not limited to the AR device (e.g., AR Glasses 820) itself, an edge computer (e.g., Edge 830, 830' of FIG. 8), a server (e.g. Server 840 of FIG. 8). In some cases, each skin may be executed on a different device, for example, on an AR device (e.g., AR Glasses 820 of FIG. 8), on an edge computer (e.g., Edges 830,830' of FIG. 8), on a server (e.g., Server 840 of FIG. 8), or the like. The AR framework may invoke the skin on the relevant computing environment to process the objects of interest. As an example, the skin may begin execution upon a command of the AR framework. As another example, the skin may be executed by a daemon process that pre-exists and begins processing in response to a command from the AR framework. In some cases, if several skins are registered on the same object, the AR framework may invoke them one after the other.

In some exemplary embodiments, the AR framework may provide the invoked skin with a frame, a portion of the frame (also referred to as a "sub frame" or "patch"), or the like. In some exemplary embodiments, the AR framework may provide the skin with the sub frame that comprises the object of interest. If several objects appear, the AR framework may invoke the skin a plurality of times, each of which with a different sub frame. Additionally or alternatively, the AR framework may provide the skin with the metadata of the object, for accessing and potentially for updating. For example, if the skin performs facial recognition, the skin may update the metadata properties of the object to indicate the identified person of the object. Other skins that perform facial recognition may avoid performing facial recognition and rely on the output of a previous skin. Additionally or alternatively, the output of the previous skin may be verified prior to being relied upon.

Additionally or alternatively, the AR framework may provide the skin as an input an editable section of the frame. The editable section may be an area in the frame or patch on which the output of the skin may be drawn.

Additionally or alternatively, the input provided to the skin may comprise the metadata record. The metadata record may comprise data such as a list of objects that are in the frame or patch, properties of the objects, coordinates on which the skin is allowed to draw on, the context in which the frame was taken, properties regarding the person using the AR device, or the like. In some exemplary embodiments, a context of the frame may comprise the location in which the frame was taken, information about the location (e.g. a private house, a work place, information from Geographic Information System (GIS), or the like), the date in which the frame was taken, data regarding the date (e.g. a birthday, an anniversary, or the like), data regarding the frame sensor used to obtain the frame, or the like.

In some exemplary embodiments, the skin may modify the object in a constructive manner, such as by augmenting the object with additional objects, decorations, ornaments, or the like. Additionally or alternatively, the skin may modify the object in a destructive manner, such as painting over the object to remove the object, replacing the object by another object, or the like.

In some exemplary embodiments, the skin may provide an output. The output may comprise an overlay to be displayed over the frame or patch, as determined by the skin. As an example, a skin may add a balloon to appear in a hand of a child. The output may thus by an overlay that, when applied over the frame, adds the balloon at the determined location. As another example, a skin may add a green line on a road, indicating a route on the road. In that case, the output of the skin may be provided using a set of coordinates and a corresponding color, defining the overlay implicitly. As yet another example, the output of the skin may comprise a label with text comprising information about the input object.

Additionally, or alternatively, the skin output may comprise the metadata record. In some cases, the metadata record may be updated by the skin to add information gathered by the skin to existing objects, to add new objects (e.g., the balloon added in the example above), or the like. Additionally, or alternatively, the metadata record may comprise painting instructions to be implemented by the AR framework. As an example, if a skin paints a label before having the final augmented frame, labels may be positioned in a sub-optimal location, such as in a distribution that is too dense, blocking important objects or other visual information, or the like. The skins may add instruction for the AR framework to add labels to objects, such as a name near a person, a material of a structure near the structure, a price tag near a merchandise, a speed indication near a windshield, or the like. After all the skins are executed, and after the overlay display is generated (Step 1080), the AR framework may determine the location, size, and other visual properties of the labels, and draw them, to add an additional overlay layer, referred to as a label overlay.

In some exemplary embodiments, the metadata record outputted by the skin may be the updated metadata record. Additionally, or alternatively, the metadata record may comprise the added information only, so as to allow the AR framework to modify the metadata record accordingly at its discretion.

On Step 1050, the AR framework obtains an overlay that is the output of the skin. In case that the skin is being executed in the same apparatus as the AR framework, the overlay may be pointed by a pointer that was the input of the skin, or the like. In some exemplary embodiments, the skin may be executed on a different execution platform, such as an edge computer, a server, or the like. The remote platform may send, transmit, or the like, its output as a stream to the AR framework. Additionally or alternatively, the executing platform may store the output of the skin on a local storage device, on a remote cloud server, or the like. The AR framework may access the medium on which the output of the skin is retained and pull the overlay.

In some exemplary embodiments, the skin may output the first overlay followed by outputting updates when its output changes. Each output beside the first overlay may be the delta from the previous output.

As explained above, in some cases, labels may be added at a later stage, allowing other objects to be drawn, as the location of the label may be less important compared to the location of other objects. As an example, in some cases, the label may be drawn far from the object it is associated with and connected thereto using an arrow, a line, or the like. As an example, a label with information about an historical place may be above, below, on the left or on the right of the image of that place. The AR framework may determine the exact location of the label, its size, and other graphical properties after the overlay display is generated.

On Step 1060, it may be determined if there is another skin that is registered on the same type of object. If so, Steps 1040 and 1050 may be performed again with the respect to the next skin, which may process the same objects. Otherwise, Step 1070 may be performed.

On Step 1070, in case there is another object in the frame that was not yet processed, Steps 1030-1060 may be repeated with respect to the additional object. As a result, the AR framework may iterate over each object that is in the frame and invoke skins thereon. Otherwise, Step 1080 may be performed.

It may be noted that in some cases, skins may be executed in parallel. In some cases, skins that are registered on different types of objects may be executed in parallel to reduce overall computation time. In some cases, a first skin may be registered on a first type of object before a second skin. The second skin may also be registered on another type of object. The first skin may process an object of the first type in parallel to the second skin processing an object of the second type. After the first skin completes its processing, the second skin may process the object of the first type. As another example, if there are a plurality of objects of the first type, the first skin may process the first object, provide an output for the second skin to process the first object sequentially. While the second skin processes the first object, the first skin may continue to process, in parallel, a next object of the same type, creating a pipeline between the first skin and the second skin. In some exemplary embodiments, parallel execution may be performed on different execution platforms. Additionally or alternatively, parallel execution may be useful to reduce latency which may be caused by extra processing time. In some cases, the final output may be provided within a target time, so as to enable an output display stream at a desired rate, such as for example, a rate of 20 FPS, 60 FPS, 90 FPS, or the like (e.g., ±10%).

On Step 1080, the AR framework may combine overlays from different skins to provide an output overlay. The output overlay may be displayed to the user, providing an augmented reality experience with augmentation over the frame viewed by the user. Additionally or alternatively, a label overlay may be generated by the AR framework and combined with the skin-generated overlays.

In some exemplary embodiments, the AR framework may add the overlay of each skin to the overlay as soon as the overlay is available. Additionally or alternatively, it may be useful to postpone adding an overlay in order to save processing time. A second skin may be registered on an object that is the output of the first skin. The second skin may change the objects that the first skin generated. Hence, there may be no need to draw the output of the first skin, and any computation time spent in adding it may be wasted.

In some exemplary embodiments, the metadata record which may be passed between the skins and the framework and potentially modified by the skins, may comprise privacy settings. The privacy settings may be settings of an object appearing in the frame or in the overlay display. As an example, the privacy settings may indicate whether the image may be retained, may be shared with other people, or the like. Privacy settings may be defined by the user, may be updated by the skins, may be updated by the AR framework in response to identification of a marker, or the like. In some cases, the AR framework may enforce the restrictions defined by the privacy settings. For example, if the privacy settings allow retaining and sharing of the frame, the frame may be retained and shared. Additionally or alternatively, the AR framework may combine the frame and display overlay for generating the AR view to be shared and retained for future use. If the privacy settings do not allow sharing of the frame, the frame itself may not be shared with others. Additionally or alternatively, if the privacy settings prevent the sharing or storage of specific objects in the frame, the AR framework may edit and redact portions of the frame, of the display overlay, combination thereof, or the like, based on the privacy settings.

On Step 1090, the overlay display is displayed using the AR device. As a result, the overlay display is overlaid over the physical world, without combining the frame itself. In some exemplary embodiments, the overlay display is displayed by the AR glasses, providing personalized AR view of the world to the user. Additionally or alternatively, the AR device may be the windshield of a vehicle, providing a passenger of the vehicle with an augmented view of the surroundings of the vehicle. In other embodiments, the AR device may be located at any other location and/or device.

Figure 11A:
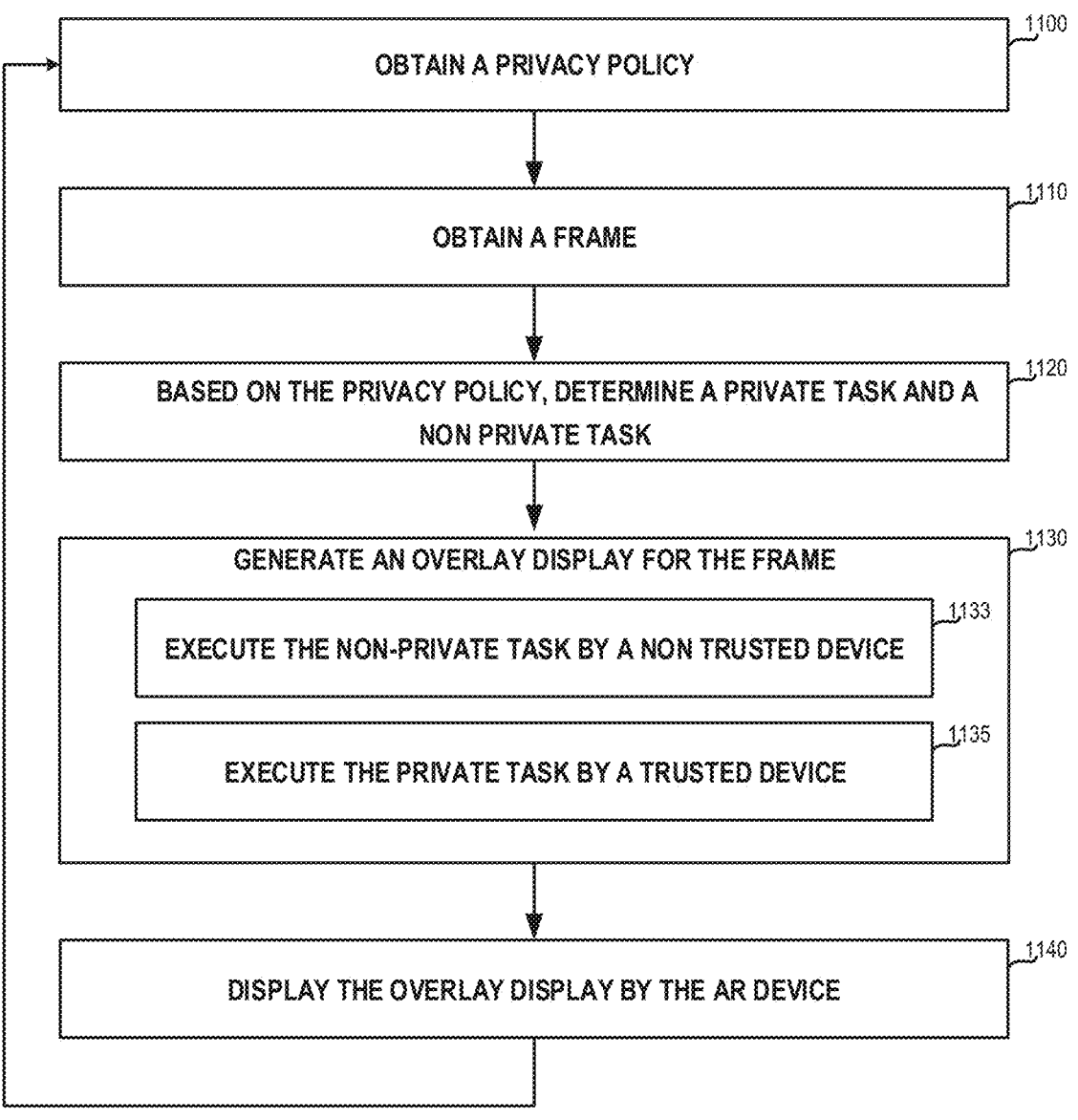
FIGS. 11A-11E show a flowchart diagram of a method, in accordance with some exemplary embodiments of the disclosed subject matter.

Referring now to FIG. 11A showing a flowchart diagram of a method, in accordance with some exemplary embodiments of the disclosed subject matter.

On Step 1100, a privacy policy of a user may be obtained. The privacy policy may comprise instructions instructing on which computerized environment to execute the trusted task and on which computerized environment to execute the non trusted tasks. Additionally or alternatively, the privacy policy may define what tasks are private tasks, what tasks are non-private tasks, or the like. Additionally or alternatively, the privacy policy may define which devices are trusted devices, which devices are non-trusted devices, or the like. In some exemplary embodiments, it may be desired to execute private tasks on trusted devices, non-private tasks on a non-trusted device, or the like. Additionally or alternatively, non-private tasks may be executed on any device that may be available in terms of computational resources. In some exemplary embodiments, the decision of which device to utilize to execute the non-private task may be based on an optimization of the resources available in the system, which include the trusted and non-trusted devices. Additionally or alternatively, the privacy policy may define what data is private, and what data is non-private. Additionally, or alternatively, the privacy policy may define networks that are private, networks that are non-private, or the like. As an example, the privacy policy may define that facial recognition is a private task. As another example, the privacy policy may define that the AR device are a trusted device, that a first cloud server is a trusted device and that a second cloud server is a non-trusted device. Additionally, or alternatively, the operation of the skin itself, its output, the functionality thereof, or the like may be the private data that is not to be disclosed. In some cases, a skin may declare that an output it provided is private.

In some exemplary embodiments, a trusted device for processing a private task may not be available. The device may not be available due to an overload on the device itself, due to an internet overload, or the like. The privacy policy may comprise instructions regarding the operation of the AR device in the absence of a trusted devices. As an example, in the absence of a trusted device, the AR device may pause the execution of the private task. Additionally, or alternatively, in the absence of a trusted device, the AR device may pause its operation until a trusted device is available.

In some exemplary embodiments, the privacy policy may define a privacy score that may be associated with a task. Additionally, or alternatively, the privacy policy may define a trust score that may be associated with each device that may execute tasks. In some exemplary embodiments, an AR device may be configured to execute a task associated with a privacy score on a device with a higher trust score than the privacy score.

In some exemplary embodiments, the privacy policy may comprise a privacy context. The privacy context may comprise data such as a location in which the privacy policy is valid, a duration in which the privacy policy is valid, other people that at their presence the privacy policy should be enforced, or the like.

In some exemplary embodiments, a user may wish to hide from a third party an execution of a skin at an AR device. Hence, the privacy policy may comprise that the skin on a trusted device.

On Step 1110, a frame is obtained. The frame may be obtained from at least one frame sensor that is operationally coupled with an AR device. In some exemplary embodiments, a frame may be obtained every short period of time, e.g., every 90 milliseconds, every 60 milliseconds, every 50 milliseconds, every 30 milliseconds, or the like.

On Step 1120, based on the privacy policy, a private task and a non-private task may be determined. In some exemplary embodiments, the private task may be a task comprising processing private data. Additionally, or alternatively, the private task may comprise sending private information. Additionally, or alternatively, the private task may comprise sending private information over a trusted network. Additionally, or alternatively, the private task may relate to an output of a skin, such as an output that was declared to be private.

On Step 1130, an overlay display for the frame may be generated. In some exemplary embodiments, an overlay display may be based on execution of private and non-private tasks. Additionally or alternatively, an overlay display may comprise outputs of the private task, output of the non-private task, the original frame, a portion of the original frame, or the like. In some exemplary embodiments, the overlay display may be generated after performing Step 1133, Step 1135, or any combination thereof.

On Step 1133, the non-private task may be executed by a non-trusted device.

On Step 1135, the private task may be executed by a trusted device. In some exemplary embodiments, the trusted device may be the AR device. Additionally, or alternatively, the AR device may be a non-trusted device. As an example, a user may rent an AR device, borrow an AR device, or the like. The owner of the AR device may be able to obtain a portion of the data from the AR device. Hence, the AR device may not be considered as a trusted device. In some exemplary embodiments, an edge device may be a trusted device. The edge device may be a personal computer, a smart phone of the user, or the like. Additionally or alternatively, the edge device may be a non-trusted device. As an example, a user may rent a car. The car infotainment system may be the edge device. As the user has no control over the data that the car infotainment system may collect, the edge device may be a non-trusted device.

In some exemplary embodiments, in case that the private task comprises private data that should be sent to a trusted device, executing the private task by a trusted device may refer to sending the sensitive data to a trusted device.

In some exemplary embodiments, the non-private task may be configured to determine a high-resolution overlay of the frame. Additionally, or alternatively, the private task may be configured to determine a low-resolution overlay of the frame.

On Step 1140, the overlay display may be displayed by the AR device to a user. In some exemplary embodiments, the overlay display may comprise the first overlay that is the output of the non-private task, the second overlay that is the output of the private task, or the like.

Steps 1100-1140 may be performed repeatedly, for a stream of frames. In some exemplary embodiments, Step 1100 may be followed by Step 1120. Once the privacy policy is obtained and the private task and the non-private task have been determined, Steps 1130 and 1140, may be repeated for a stream of frames.

It is noted that Step 1135 may be executed prior to Step 1133, in parallel to Step 1133, or after Step 1133.

Figure 11B:
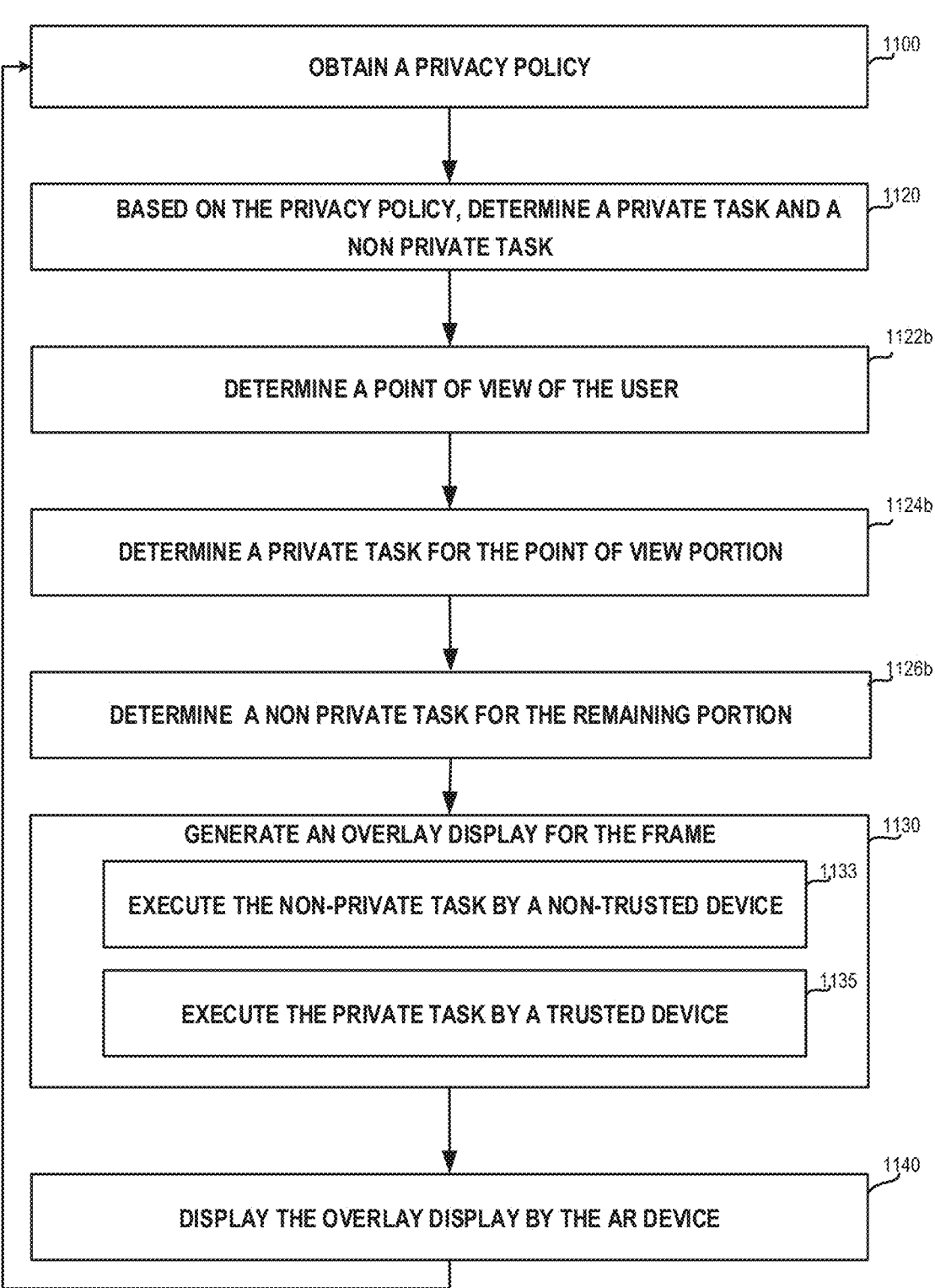

Referring now to FIG. 11B showing a flowchart diagram of a method, in accordance with some exemplary embodiments of the disclosed subject matter.

On Step 1122b, information about a field of view of the user may be determined. In some exemplary embodiments, a point of fixation of the user may be determined. The point of fixation may be an area in the frame at which the user is looking. In some exemplary embodiments, it may be desired to hide images and objects that the user is fixating at from non-trusted devices. As an example, the user may be on a date, watching a show. The user may be staring at an actress' bosom, not paying any attention to the show. The user may wish to hide it from his date. In some exemplary embodiments, it may be desired to hide the point of fixation of a user from any device in order to minimize the ability of third parties to create a psychological profile of the user. In some exemplary embodiments, hiding the point of fixation of the user may harden advertisers to create focused profile of the user for purposes of advertisement optimizations.

On Step 1124b, a private task may be determined for the point of fixation portion of the frame. Determining the private task may comprise determining a trusted device on which the private portion of the frame may be processed.

On Step 1126b, a non-private task for the remaining portion may be determined. The remaining portion may include areas in the frame that are not the private portion. Determining the non-private task may comprise determining a non-trusted device by which the non-private portion may be processed.

Figure 11C:
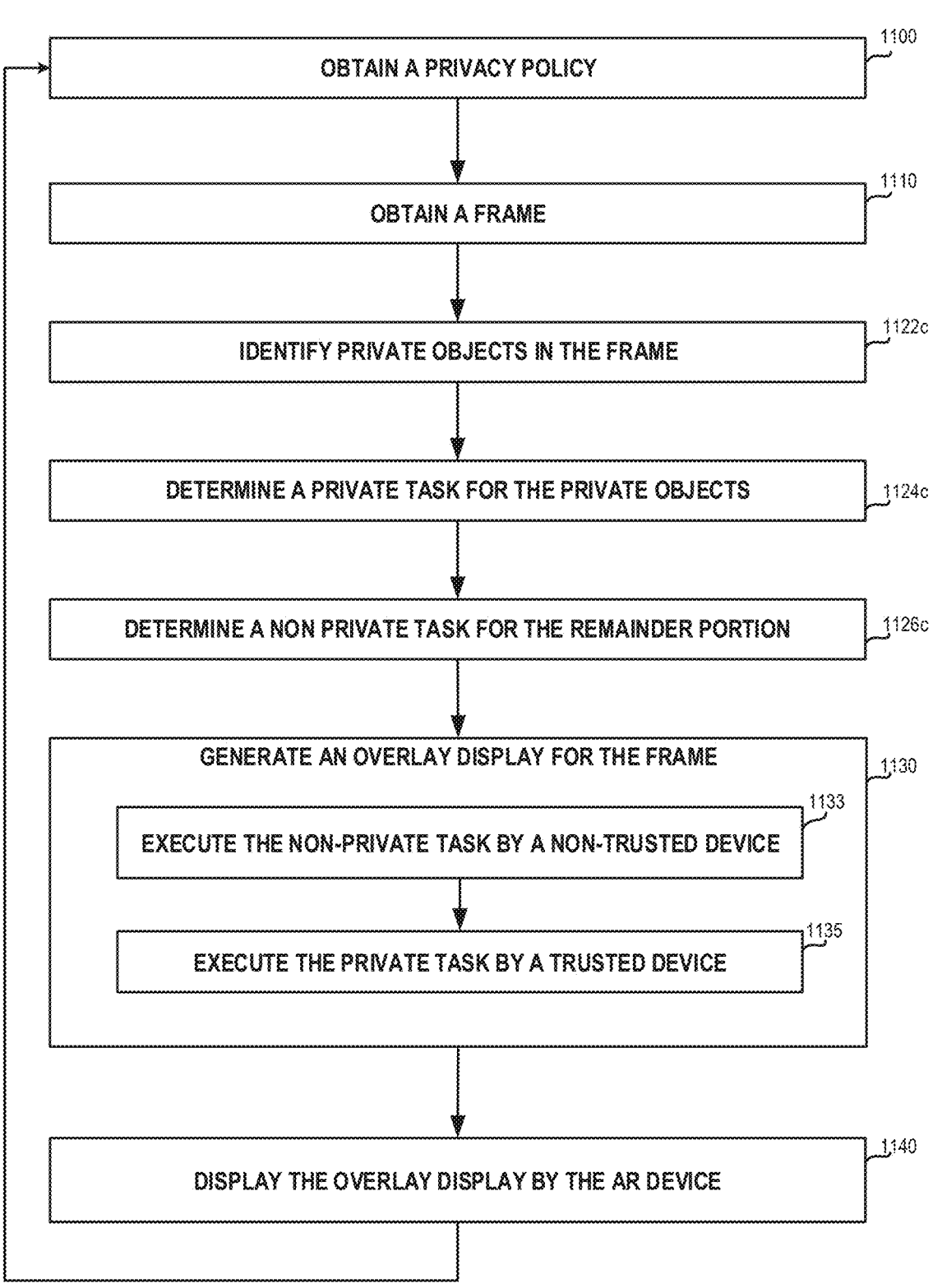

Referring now to FIG. 11C showing a flowchart diagram of a method, in accordance with some exemplary embodiments of the disclosed subject matter.

On Step 1122c, private objects in the frame may be identified. In some exemplary embodiments, private objects may include objects that the user would prefer not to reveal to a third party. The user may not want that the third party will know with whom he is talking, his location, at what objects he is looking, or the like. As an example, the private objects may be faces of people, intimate body parts, a document having a "confidential" title, a screen showing source code of a program, or the like.

It is noted that in some exemplary embodiments, a skin that a user is using may be considered as private data. As an example, a user may pay for a skin that undresses people. Although a frame may not comprise private data the user may wish that the skin will be executed on a trusted device in order to not reveal that he is using the skin. Hence, executing the skin may be a private task.

In some exemplary embodiments, a user may wish to hide the fact that she utilizes a certain skin. The skin may be considered as a private information and the execution thereof may be a private task, to avoid revealing the user's usage of the private skin. As an example, the skin may be a dating skin, a skin that performs unethical operations, such as undressing bystanders, a skin that accesses non-legitimate data sources, such as dark web or illegal databases, or the like.

In some exemplary embodiments, the fact that the user utilizes a skin may be, generally, disclosable information. However, the specific configuration of the skin may be considered as private information. For example, the user may provide parameters to a skin that affect its operation.

The user may wish to conceal the parameters. Additionally or alternatively, the user may wish to conceal some operation of the skin, such as when operating on a specific object, a specific type of object, or the like. Accordingly, execution of the skin may be considered as private tasks depending on the operation of the skin, on whether or not the parameters are provided to the execution environment, on whether the content of the parameters is reflected by the objects being processed, or the like. As an example, the user may configure a skin to operate on both minors and adults, and may wish to conceal the fact that the skin is being applied on minors. Hence, execution of the skin on an object representing an adult may be considered a non-private task, while execution of the skin on an object representing a minor may be considered as a private task. Additionally or alternatively, the application of a skin on a minor may be considered as a private task to avoid divulging information regarding minors to untrusted parties, such as information reflected from the frame or obtained by the skin when operating. As another example, the user may utilize a blocking skin that removes or otherwise redacts an image of a person from a frame. However, the user may wish to conceal from third parties the identity of the people being removed, e.g., her ex-boyfriend, a stalker, or the like.

In some exemplary embodiments, the AR framework may be configured to query a skin whether the skin is a private task or a non-private task. Additionally, or alternatively, as the privateness of the skins may change based on a frame, the framework may query the skin every second, every two seconds, every five seconds, or the like. Additionally, or alternatively, the framework may track objects and in response to identifying that there is a new object in the frame that the skin is registered on, the framework may query the skin whether executing the skin on that object is private task or non-private task.

On Step 1124c, a private task for the private objects may be determined. The private task may comprise processing the private objects on a trusted device, sending the private object over a trusted network, or the like. As an example, a skin that is configured to perform facial recognition may be considered a private task in order to avoid sending faces of people to a non-trusted device. As another example, the private task may be to blur the confidential document.

On Step 1126c, a non-private task for the reminder portion of the frame may be determined. The reminder portion may be areas in the frame that are private, that comprise private objects, or the like. The non-private task may comprise processing the non-private data on any device that is available, sending the data over any network, or the like.

Figure 11D:
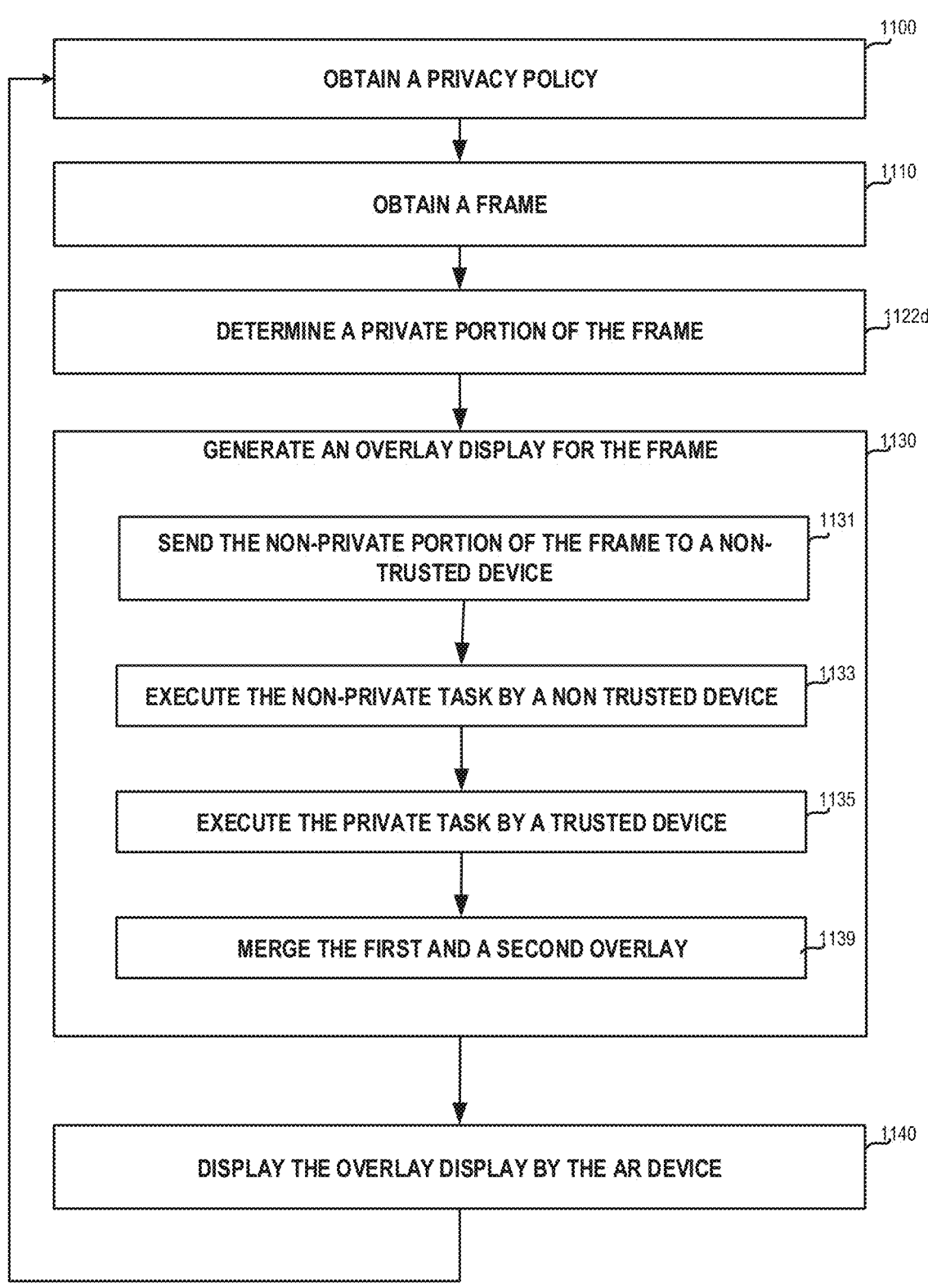

Referring now to FIG. 11D showing a flowchart diagram of a method, in accordance with some exemplary embodiments of the disclosed subject matter.

On Step 1122d a private portion of the frame may be determined. In some exemplary embodiments, the private portion of the frame may be determined based on the content of the frame, such as comprising confidential objects, based on information embodied therein, or the like.

On Step 1131, a non-private portion of the frame may be sent to a non-trusted device. The non-private portion may be the frame without the private portion. The non-trusted device may be an edge computer, a cloud server, or the like.

On Step 1135, the non-private task may be executed by the non-private device in order to determine a first overlay. The first overlay may be the output of the non-private task, such as the output of a skin.

On Step 1135, the private task may be executed by a trusted device in order to determine the second overlay. In some exemplary embodiments, the AR device may be the trusted device. As the private task may comprise processing a portion of the frame comprising an object that the user is looking at, it may be desired to avoid sending that portion to a non-trusted device.

It is noted that the non-private task and the private task may comprise invoking the same skin on different portions of the frame.

On Step 1139, the first and second overlays may be merged after being received from the trusted device and non-private device, respectively.

Figure 11E:
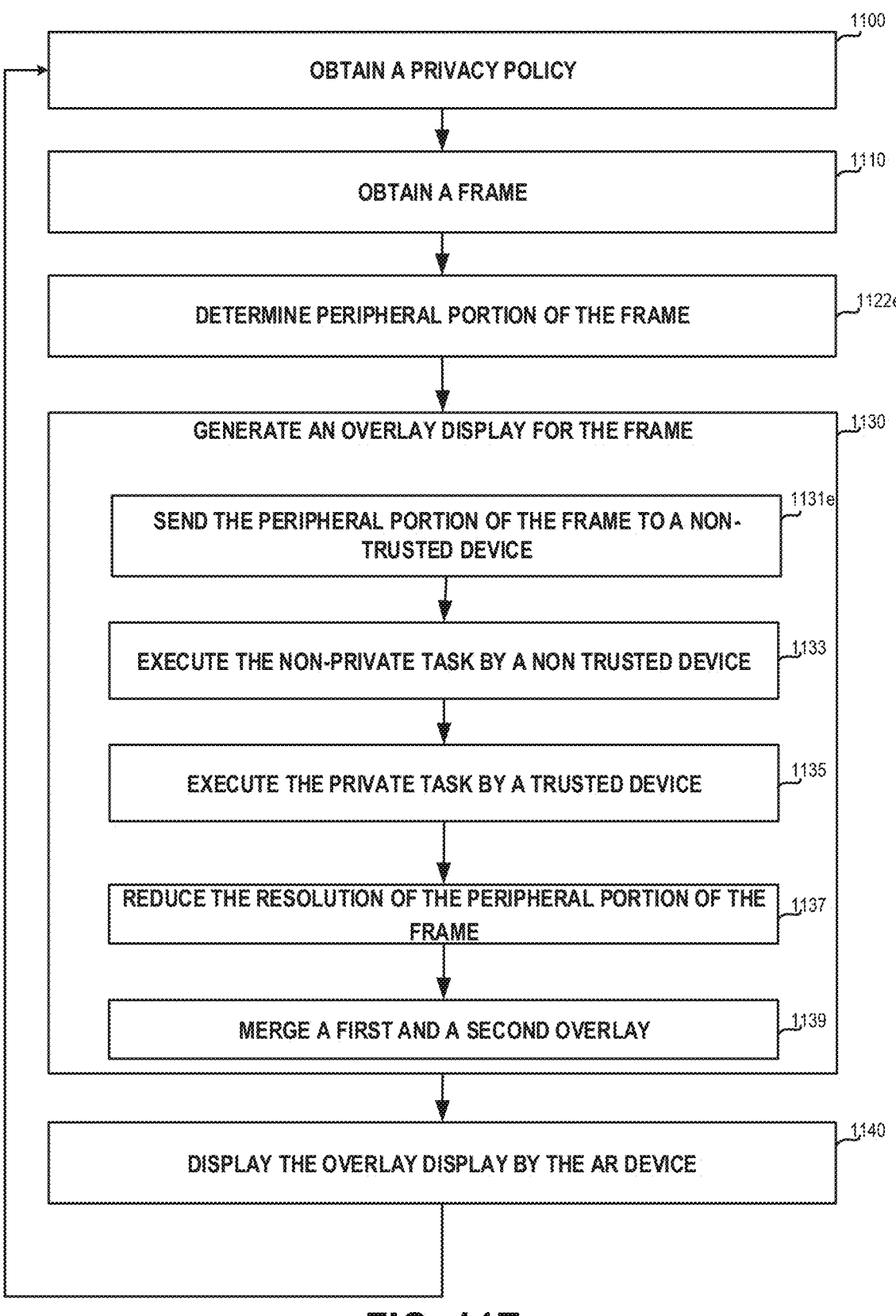

Referring now to FIG. 11E, showing a flowchart diagram of a method, in accordance with some exemplary embodiments of the disclosed subject matter.

On Step 1122e, a peripheral portion of the frame may be determined. In some exemplary embodiments, the peripheral portion of the frame may a portion that is sensed by the user's peripheral vision. The frame may be divided to peripheral portion and non-peripheral portion. In some exemplary embodiments, the non-peripheral portion of the frame may be an area in the frame corresponding to the area on which the user is looking. Identifying a direction to where the user is looking within the frame may be performed using a camera coupled with the AR device, an IR camera coupled with the AR device, or the like. In some exemplary embodiments, the non-peripheral portion of the frame may be a private portion of the frame. As an example, a user may wish that an AR framework will process areas on which he as looking as a private portion of the frame. In some exemplary embodiments, processing areas of the frame as private tasks may comprise not sending the private areas to a non-trusted device, sending the private areas over a trusted network, or the like. In some cases, peripheral portions of frames may be processed differently, such as in a lower resolution to conserve resources.

On Step 1131e, the peripheral portion of the frame may be sent to a non-trusted device. Step 1131e may be performed similarly to Step 1131 of FIG. 11A.

On Step 1137, the resolution of the peripheral portion of the frame may be reduced, yielding power saving while not compromising the privacy of the user. Additionally or alternatively, the resolution of the first overlay may be reduced. Additionally or alternatively, a user may be indifferent to reducing the resolution of the peripheral areas of the frame due to the peripheral areas being sensed by the user's peripheral vision.

Figure 12:
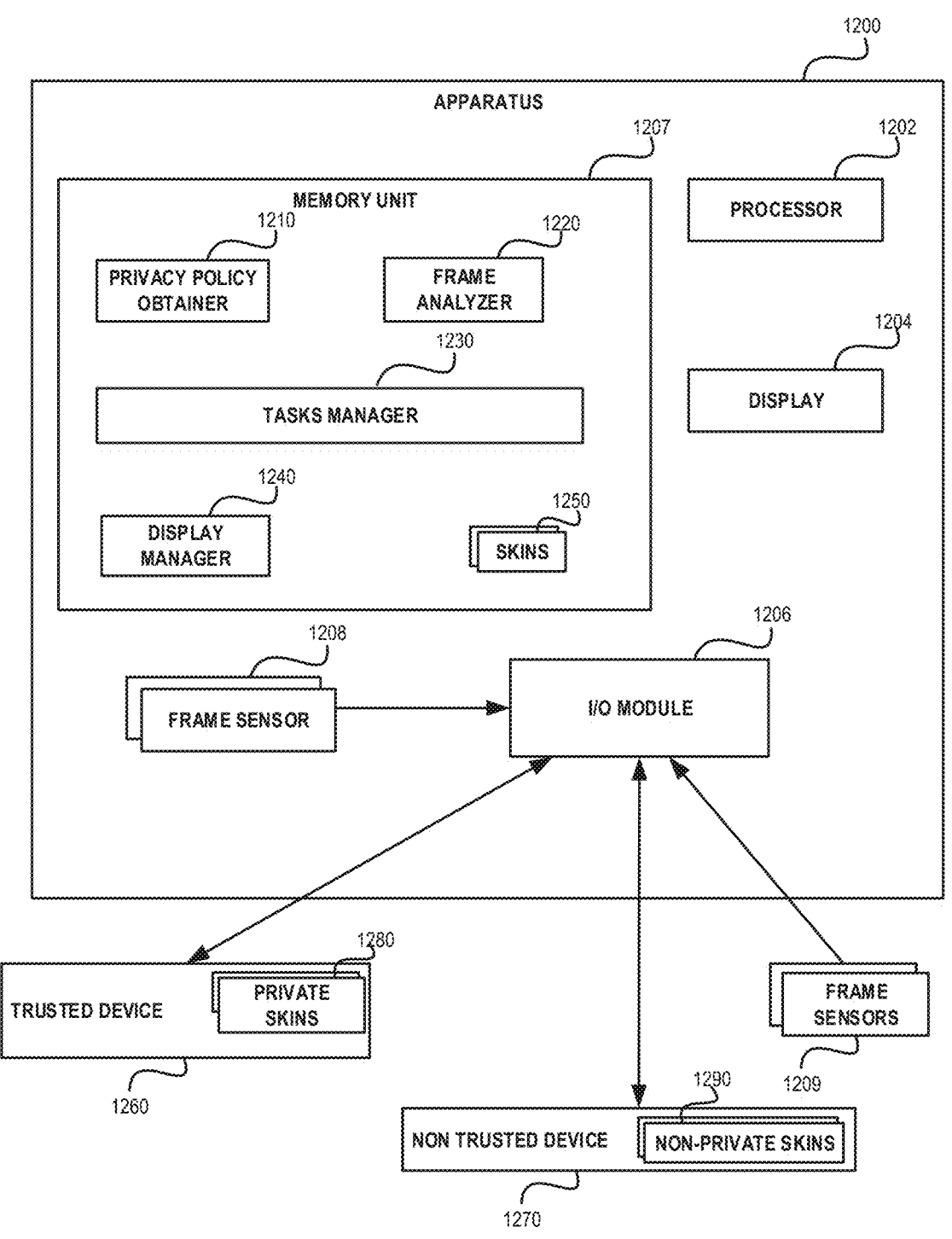
FIG. 12 shows an apparatus, in accordance with some exemplary embodiments of the disclosed subject matter.

Referring now to FIG. 12 showing an apparatus, in accordance with some exemplary embodiments of the disclosed subject matter.

In some exemplary embodiments, Apparatus 1200 may comprise Processor 1202. Processor 1202 may be a Central Processing Unit (CPU), a microprocessor, an electronic circuit, an Integrated Circuit (IC) or the like. Additionally or alternatively, Apparatus 1200 can be implemented as firmware written for or ported to a specific processor such as Digital Signal Processor (DSP) or microcontrollers, or can be implemented as hardware or configurable hardware such as Field Programmable Gate Array (FPGA) or Application Specific Integrated Circuit (ASIC). Processor 1202 may be utilized to perform computations required by Apparatus 1200 or any of its subcomponents.

In some exemplary embodiments, Processor 1202 may be configured to determine a trust score for an external computerized environment. The external computerized environment may be an edge device, a cloud server, or the like. In some exemplary embodiments, a privacy score may be associated with a frame. Processor 1202 may be configured to process a frame on an external device that has a trust score that is equal to or greater that the privacy score of the frame. Additionally, or alternatively, Processor 1202 may be configured to execute a private task on an external device that a trust score above a predetermined value. Additionally, or alternatively, a task may have a privacy score. Processor 1202 may be configured to execute a task on an external device if the trust score of the device is greater than or equal to the privacy score of the task.

In some exemplary embodiments, based on the trust score and on the privacy policy, Processor 1202 may be configured to determine a first set of skins as private skins. The private skins may be applied on frames by a first external device having a trust score above a threshold. Additionally, or alternatively, Processor 1202 may be configured to determine a second skins as non-private skins. The non-private skins may be applied on frames by a second external device having a trust score that is below the threshold.

In some exemplary embodiments, Apparatus 1200 may comprise a Display 1204. Display 1204 may display augmented images to a user. The augmented images may be the result of frames captured by Frame Sensor 1208, 1209 and processed by the apparatus.

In some exemplary embodiments, Apparatus 1200 may comprise a Frame Sensor 1208. In some exemplary embodiments, Frame Sensor 1208 may be an integral part of an augmented reality glasses worn by the use.

In some exemplary embodiments, Apparatus 1200 may comprise a Frame Sensor 1209. Frame Sensor 1209 may be external to Apparatus 1200.

In some exemplary embodiments, Apparatus 1200 may comprise an I/O Module 1206. Apparatus 1200 may utilize I/O Module 1206 as an interface to transmit and/or receive information and instructions between Apparatus 1200 and external I/O devices such as, Trusted Device 1260, Non-Trusted Device 1270, Frame Sensors 1209, or the like. Additionally, or alternatively, I/O Module 1206 may be used by Apparatus 1200 in order to send frames to Trusted Device 1260, to Non-Trusted Device 1270, or the like. Additionally, or alternatively, I/O Module 1206 may be utilized in order to obtain overlays from Trusted Device 1260, from Non-Trusted Device 1270, or the like.

In some exemplary embodiments, Trusted Device 1260 may be connected to Apparatus 1200. Apparatus 1200 may utilize Trusted Device 1260 in order to invoke skins thereon, in order to execute a private task thereby, or the like. Executing a private task on Trusted Device 1260 may yield power saving compared to executing the private task locally, on Apparatus 1200.

In some exemplary embodiments, Non-Trusted Device 1270 may be a remote cloud server. I/O Module 1206 may be connected to Non-Trusted Device 1270 via a Wide Area Network (WAN) such as the Internet. Additionally, or alternatively, I/O Module 1206 may connect with Non-Trusted Device 1270 via Edge 1260. Apparatus 1200 may utilize Non-Trusted Device 1270 in order to invoke skins thereon.

In some exemplary embodiments, Apparatus 1200 may comprise a Memory Unit 1207. Memory Unit 1207 may be persistent or volatile. For example, Memory Unit 1207 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or the like; a semiconductor storage device such as Flash device, memory stick, or the like. In some exemplary embodiments, Memory Unit 1207 may retain program code to activate Processor 1202 to perform acts associated with any of the steps shown in FIG. 11A-11E. In some exemplary embodiments, Memory Unit 1207 may be configured to retain a privacy policy of a user of the apparatus.

In some exemplary embodiments, Skins 1250 may be executed locally in Memory Unit 1207 or remotely on a computerized environment such as Trusted Device 1260, Non-Trusted device 1270, or the like. In some exemplary embodiments, Apparatus 1200 may be configured to decide whether a skin is to be executed on a non-trusted device or on a trusted device based on a privacy policy. As an example, a user may be in a private meeting, not wishing that data regarding the meeting is processed remotely.

The components detailed below may be implemented as one or more sets of interrelated computer instructions, executed for example by Processor 1202 or by another processor. The components may be arranged as one or more executable files, dynamic libraries, static libraries, methods, functions, services, or the like, programmed in any programming language and under any computing environment.

In some exemplary embodiments, Apparatus 1200 may comprise a Privacy Policy Obtainer 1210. Privacy Policy Obtainer may obtain a privacy policy from a remote cloud server. Apparatus 1200 may be configured to decide where to execute Skins 1250, Private Skins 1280, non-private Skins 1290 based on the privacy policy.

In some exemplary embodiments, Apparatus 1200 may comprise a Frame Analyzer 1220. Frame Analyzer 1220 may be configured to analyze frames in order to determine a private portion of the frame. Additionally, or alternatively, Frame Analyzer 1220 may be configured to determine a private object therein. A private portion of the frame, based on the privacy policy, may be a portion displaying a face of a person, intimate body parts, private or confidential objects such as documents, a person's belongings, or the like. Additionally, or alternatively, Frame Analyzer 1220 may be configured to analyze frames in order to determine a point of fixation of the user.

In some exemplary embodiments, Apparatus 1200 may comprise a Tasks Manager 1230. Tasks Manager 1230 may be configured generate a private task, to generate a non-private task, or the like. Additionally, or alternatively, Tasks Manager 1230 may be configured to determine a private skin from Skins 1250 and to execute the skin by Trusted Device 1260. Additionally, or alternatively, Tasks Manager may be configured to determine a non-private skin from Skins 1250 and execute it by Non-Trusted Device 1270. In some exemplary embodiments, Trusted Device 1260 may hold and execute Private Skins 1280. Additionally, or alternatively, Non Trusted 1270 may hold and execute Non Private Skins 1290. Private Skins 1280 and Non-Private Skins 1290 may run regardless with the operation of Apparatus 1200. Executing the private task may comprise sending private data to the private skin and obtaining a second overlay therefrom. The private data may comprise a private portion of the frame, a private object, or the like. Additionally, or alternatively, executing the non-private task may comprise sending a non-private portion of the frame to Non Private Device 1290 and obtaining the first overlay.

In some exemplary embodiments, Apparatus 1200 may comprise a Display Manager 1240. Display Manager 1240 may be configured to obtain a first overlay. Additionally, or alternatively, Display Manager may be configured to obtain a second overlay. Display manager may be configured to merge the first and the second overlay to form the overlay display and to provide the overlay display to Display 1204. Additionally, or alternatively, Display Manager may be configured to provide the first overlay, the second overlay, or the like to Display 1204. In some exemplary embodiments, Display Manager 1240 may be configured to reduce the resolution of the first overlay prior to providing the first overlay to Display 1204, prior to forming the overlay display, or the like.

Figure 13:
FIG. 13 shows a schematic illustration of an exemplary environment and architecture in which the disclosed subject matter may be utilized, in accordance with some exemplary embodiments of the disclosed subject matter.

Referring now to FIG. 13 showing an environment, in accordance with some exemplary embodiments of the disclosed subject matter. Environment 1300 may be an environment where an AR framework is implemented. The AR framework may be a framework for providing augmented reality experience to a user, by executing skins. Skins and AR frameworks are disclosed, inter alia, in U.S. Pat. No. 9,865,088, entitled "Evaluation of Augmented Reality Skins", dated Jan. 9, 2018, U.S. Pat. No. 9,953,462, entitled "Augmented Reality Skin Manager", dated Apr. 24, 2018, U.S. Pat. No. 9,990,772B2, entitled "Augmented reality skin evaluation", dated Jun. 5, 2018, and U.S. Pat. No. 10,192, 359B2, entitled "Subject selected augmented reality skin", dated Aug. 18, 2016, all of which are incorporated herein by reference in their entirety without giving rise to disavowment.

Environment 1300 may comprise a Person 1310. Person 1310 may be wearing AR Glasses 1320. AR Glasses 1320 may comprise a frame sensor such as Camera 1324 for capturing images that are processed by the AR framework. Lenses of the AR Glasses 1320 may be configured to display an overlay display that is seamlessly interwoven with the physical world as perceived by Person 1310, such as by adding layers over perceived objects, modifying perceived objects, removing perceived objects, or the like. Environment 1300 may comprise a Car 1380. Car 1380 may be driven by a Person 1370. Car 1380 may comprise a Frame Sensor 1350. Frame Sensor 1350 may be associated with the field of view of Person 1370.

Car 1380 may comprise an AR Display 1360 embedded within the windshield of Car 1380. An AR framework may display the overlay display using AR Display 1360, so as to provide an augmented display of the physical world. In some exemplary embodiments, frames from Frame Sensor 1350 may be analyzed by the AR framework, which may generate overlay display to be presented using AR Display 1360.

In some exemplary embodiments, Skins 1325 may be utilized to provide the augmented display. Skins 1325 may comprise a plurality of skins, e.g., Skin 1325a, Skin 1325b, and Skin 1325n, or the like, each of which configured to analyze the frame or portion thereof and provide an overlay display thereon. The overlay displays may be combined, on top of each other, to provide the final overlay display that is presented to the user (e.g., Person 1310, Person 1370) to provide augmented reality experience. In some exemplary embodiments, the AR framework may be configured to analyze the frame, identify objects therein, invoke the Skins 1325 or portion thereof, collect output therefrom, and provide the final output for display. In some exemplary embodiments, the AR framework may be configured to invoke a skin, schedule an invocation of a skin, determine the order in which skins are invoked, determine which execution environment would execute each skin, or the like.

Environment 1300 may comprise an Edge 1330. Edge 1330 may comprise a processor, a receiver, a transmitter, a memory, or the like. Edge 1330 may be a computer, a smartphone, or the like. Similarly, an Edge 1330' may be an edge computer that is installed within Car 1380. Additionally, or alternatively, Edge 1330' may be a smartphone of Person 1370, the infotainment system of Car 1380, or the like. Edges 1330, 1330' may be utilized by the AR framework to execute one or more skins. In some exemplary embodiments, Edges 1330, 1330' may constitute an execution environment for executing skins. Edges 1330, 1330' may communicate with the AR framework, or components via a computerized network.

Environment 1300 may comprise Server 1340. Server 1340 be a remote cloud server and/or any other network server. In some exemplary embodiments, Server 1340 may be configured to obtain information from the AR framework, execute a skin, provide the output of the skins to the AR framework, or the like. Additionally, or alternatively, Server 1340 may be utilized by the AR framework to execute one or more skins. In some exemplary embodiments, Server 1340 may constitute an execution environment for executing skins.

Environment 1300 may comprise Frame Sensor 1390 that is external to AR Glasses 1320 and to Car 1380. Frame Sensor 1390 may be associated with the field view of Person 1370 or Person 1320. Frame Sensor 1390 may transmit frames to Edge 1330, 1330' or to Server 1340. An AR framework may utilize frames sent from Frame Sensor 1390, such as to augment the display of the user, to identify objects to be analyzed, or the like.

In some exemplary embodiments, the AR device, such as AR Glasses 1320, AR Display 1360, or the like, may be connected to an edge computer, such as Edges 1330, 1330', and to cloud server, e.g., Server 1340. The edge computer, however, may be closer to the AR device than the cloud server, such as having a reduced latency thereto, requiring reducing power consumption to reach it, or the like. For example, the edge computer may be directly connected, such as using a BLUETOOTH™ connection, using WIFI™ connection, using local cellular connection, or the like. Additionally, or alternatively, the edge computer may be connected to a same Local Area Network (LAN) as the AR device, may be physically connected thereto using a cabled connection, or the like. In some exemplary embodiments, communication to Server 1340 may be provided through a Wide Area Network (WAN), through the Internet, or the like. For example, Server 1340 may be a cloud computing platform that is used by various AR devices that are located remotely therefrom and from one another.

In some exemplary embodiments, different execution environments may have different resources. For example, Server 1340 may have more computational resources, memory resources, or the like than Edge 1330. Additionally, or alternatively, each execution environment may have different power resources. The AR device, such as AR Glasses 1320 may have limited power supply. Additionally, or alternatively, Edge 1330, which may be implemented by a mobile device, may also have limited power supply. Additionally, or alternatively, different execution platforms may retain, locally, or have connectivity to, different data storages. For example, a database used for identifying a person using facial recognition may be retained on Server 1340, or on any other device or location. AR Glasses 1320 may have limited memory capacity and may be able to retain only a portion of such database, such as a portion comprising frequently identified persons, people who are known to be at the same location, people that are deemed VIPs for the user, or the like. As a result, it may be desired to perform some computations off-device, on Edge 1330 or on Server 1340. As an example, Skin 1325a may be executed on AR Glasses 1320, Skin 1325b may be executed on Edge 1330 and Skin 1325n may be executed on Server 1340. In some exemplary embodiments, each skin, or a portion thereof, may receive, as input, the output of the previous skin, in accordance with an order of execution, so as to add a layer on top thereof. As an example, Skin 1325a may add an image of a cat, and Skin 1325b may process the image of the cat and modify its appearance. The AR framework may be configured to invoke execution of each skin, in accordance with predetermined rules and based on the content of the frame, to select for each skin an execution environment, to gather input for the skin and obtain the output of the skin, and generate the final overlay display to be displayed by the AR device.

Figure 14:
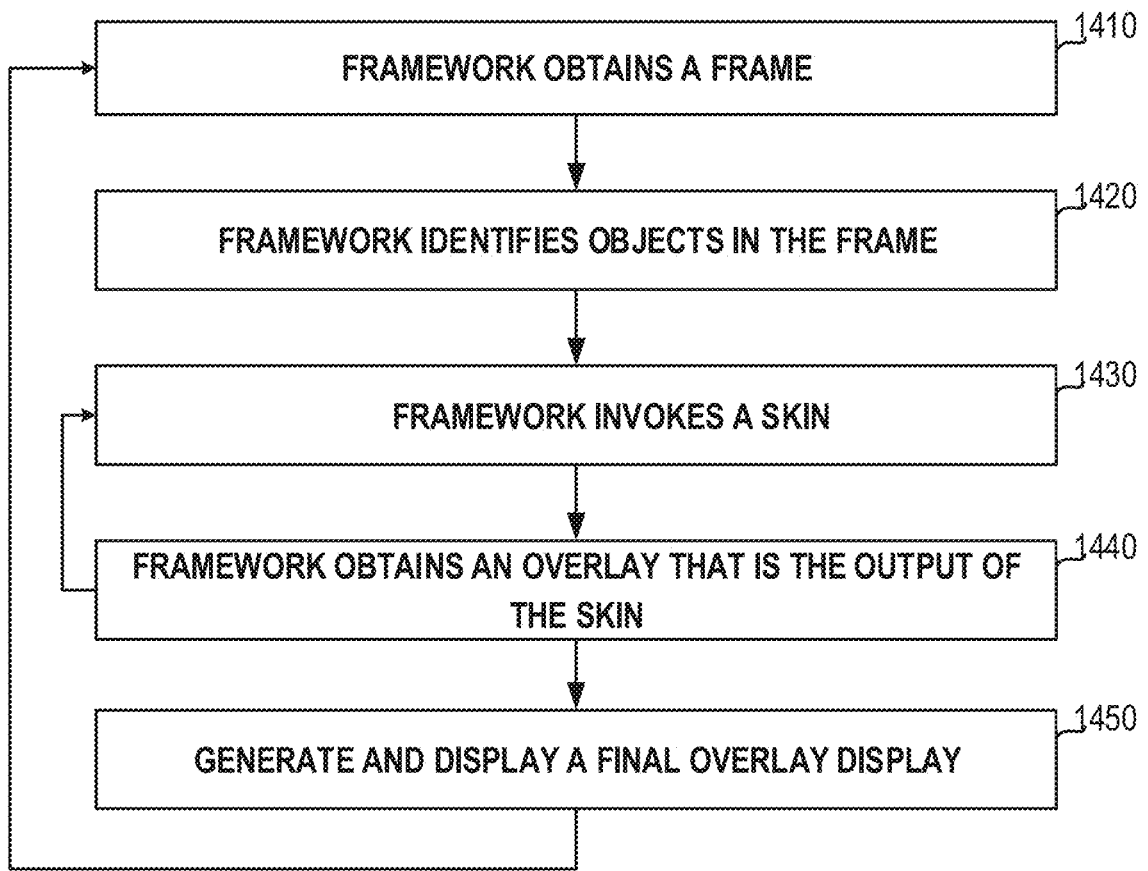
FIG. 14 shows a flowchart diagram of a method, in accordance with some exemplary embodiments of the disclosed subject matter.

Referring now to FIG. 14 showing a flowchart diagram of a method, in accordance with some exemplary embodiments of the disclosed subject matter.

On Step 1410, the framework obtains a frame. The frame may be obtained by a frame sensor, such as camera, that may be operatively coupled with the framework. The frame may be obtained directly from a frame sensor that is associated with a view of a user, such as a camera embedded in AR glasses (e.g., AR Glasses 1320 of FIG. 13). Additionally or alternatively, the frame may be obtained from a computerized environment such as an edge device, a remote cloud server, or the like. Additionally or alternatively, the frame may be obtained from an external frame sensor, such as sensor 1390 of FIG. 13, that may be utilized to capture information that may be obscured and blocked from the view of the user. In some exemplary embodiments, images may be obtained from a plurality of sources and may be integrated together to create the frame.

On Step 1420, the framework identifies objects that are in the frame. The framework may be configured to identify objects using object recognition algorithms such as Regions Convolutional Neural Network (RCNN), Faster RCNN, Scale-Invariant Feature Transform (SIFT), template matching, edge matching, or the like. In some exemplary embodiments, each skin may register on one or more object type. In some exemplary embodiments, in order to improve performance, the framework may only try to identify objects on which at least one skin is registered. As an example, in case that skins are registered on objects of type "face" and "hat", the framework may skip large objects such as a car, a house, or the like. In some exemplary embodiments, the framework may analyze the frame and maintain a metadata record representing the frame identifying each object appearing in the frame. Additionally or alternatively, the metadata may be indicative to the surrounding of the user, to people that may be with the user, or the like.

On Step 1430, the framework may invoke a skin. The framework may hold a list of available skins and corresponding objects and pull information regarding the identified faces from a social network database, or from any other database. Each skin may be executed on its registered object and provide an overlay based thereon. In case more than one skin is registered on a same frame object, the AR framework may determine whether sequential execution is necessary or whether non-sequential execution is to be performed. In case non-sequential execution is performed, resulting overlays are to be examined to identify whether they are inconsistent or conflict each other, which may result with additional processing.

On Step 1440, the framework obtains an overlay that is the output of the skin. In some exemplary embodiments, in case that the skin was not executed locally (e.g. executed on an edge computer, on a cloud server, or the like), the overlay may be obtained therefrom via a communication channel. In some exemplary embodiments, the skin may be executed locally as function. The overlay may be the output of the function. Additionally or alternatively, the skin may be executed remotely. The overlay may be provided to the AR framework as a stream. Additionally or alternatively, the overlay may comprise a bitmap image and a bitmap mask. The bitmap image may comprise the content of the pixels to be drawn, while the bitmap mask may comprise a corresponding bitmap, where each cell corresponds to a bit. The value of the bit in the bitmap mask may indicate whether or not the value of the overlay is to be used. As an example, consider a frame f, an overlay bitmap image, o, and a mask, m. For each pixel (x,y), the output value (out) representing the AR final display may be computed as dis (x,y)=o(x,y)·m(x,y)+f(x,y)·(1−m(x,y)). The overlay display (od), however, may be computed as od(x,y)=o(x,y)·m(x,y). Bitwise operations may be performed on the bitmasks, such as dis=(o AND m)XOR (f AND ¬m), and od=o AND m. In some exemplary embodiments, the mask may be either 0 (do not use the overlay bit) or 1 (use the overlay bit). Additionally or alternatively, values in between 0 and 1 may be used to provide for opaqueness and transparency properties.

In some exemplary embodiments, the overlay may be an image in the size of the frame, or a smaller sized image that is configured to be presented in front of the frame. In some exemplary embodiments, the AR framework may combine the overlay with the frame at an end phase, or alternatively, the processing skin may combine the overlay with the frame. In some exemplary embodiments, in case the overlay is of the size of the image, the overlay may comprise certain pixels from the output of the skin and transparent pixels when no skin output is received for a certain location in the frame. Additionally or alternatively, the overlay may comprise an image that may be the output of the skin and its relative position in the frame. In some exemplary embodiments, in case the AR framework is to combine the overlay with the frame, the overlay may comprise information or metadata regarding the importance the position of the skin output in the frame. As an example, an informative skin that adds labels to objects may be agnostic regarding the position of the label. Additionally or alternatively, a skin that adds location-sensitive information such as a skin applying lipstick to lips may be configured to set its location requirement to a high and/or maximal score, e.g., such as "high", "1", or the like.

In some exemplary embodiments, if the view of the AR device is shared, the overlay display may be overlaid over the frame to generate the AR frame, which represents the view that is perceived by the user using the AR device.

In some exemplary embodiments, Steps 1430-1440 may be performed iteratively, or in a non-sequential manner such as simultaneously, until all skins that are registered on available objects or skins that are estimated to be created are invoked. In some exemplary embodiments, each overlay may be obtained and added to the frame subsequently. Additionally or alternatively, the overlays may be combined with one another, and maintained separately from the frame itself. The skins may receive the frame and the combined (previous) overlays. Additionally or alternatively, the skins may receive an augmented frame, comprising the frame and combined (previous) overlays, for processing. Additionally or alternatively, skins may be processed on the same frame in a non-sequential manner, without waiting for an overlay input or an overlay-combined frame from the previous skin.

On Step 1450, the final overlay display that is generated, based on the combined overlays of the invoked skins, may be displayed. It is noted that the overlay is configured to be seamlessly interwoven with the physical world, which is represented by the original frame of Step 1410. As a result, the overlay display is overlaid over the physical world, without combing the frame itself. In some exemplary embodiments, the AR glasses may not be transparent, but rather may include screen-lenses that hide the real environment from the user. In such cases, the AR glasses may combine the captured frame, which may be captured from any location, with the AR view and display both on the glasses' screens. In some exemplary embodiments, in case the AR device comprises a non-wearable device such as a user device with a screen, the device may capture the real-world surroundings and combine it with artificial overlays.

In some exemplary embodiments, an AR framework may be operatively coupled with one or more frame sensors. The frame sensors may produce a stream of frames. The AR framework may obtain the streams. In the case that there are several frame sensors, the AR framework may combine multiple streams of frames into a single stream. In case that a skin is registered on types of objects that the single stream comprises, the AR framework may apply the skin on an appropriate object for each frame. In some exemplary embodiments, steps 1410-1450 may be repeated.

In some exemplary embodiments, a user may configure the AR framework to execute a skin at a specific location, for a specific time duration, or the like. As an example, a user may be using his AR glasses constantly. When he enters the supermarket, a skin that shows prices of products may be added to the list of active skins and may be invoked as long as the user is in the supermarket. When the user leaves the supermarket, the skin may be deactivated. In some cases, the user may set his personal preferences for activation or deactivation of skins, such as based on his location, based on a context, based on a time of day, based on a social environment in which he his located, based on activations of other skins, or the like. In some exemplary embodiments, a user may configure the AR framework to prefer certain layers over others, e.g., in case not all the skins can be executed. In some exemplary embodiments, a user may configure the AR framework to retain a privacy of one or more skins. In some exemplary embodiments, a user may configure the AR framework to implement one or more constraints.

Figure 15:
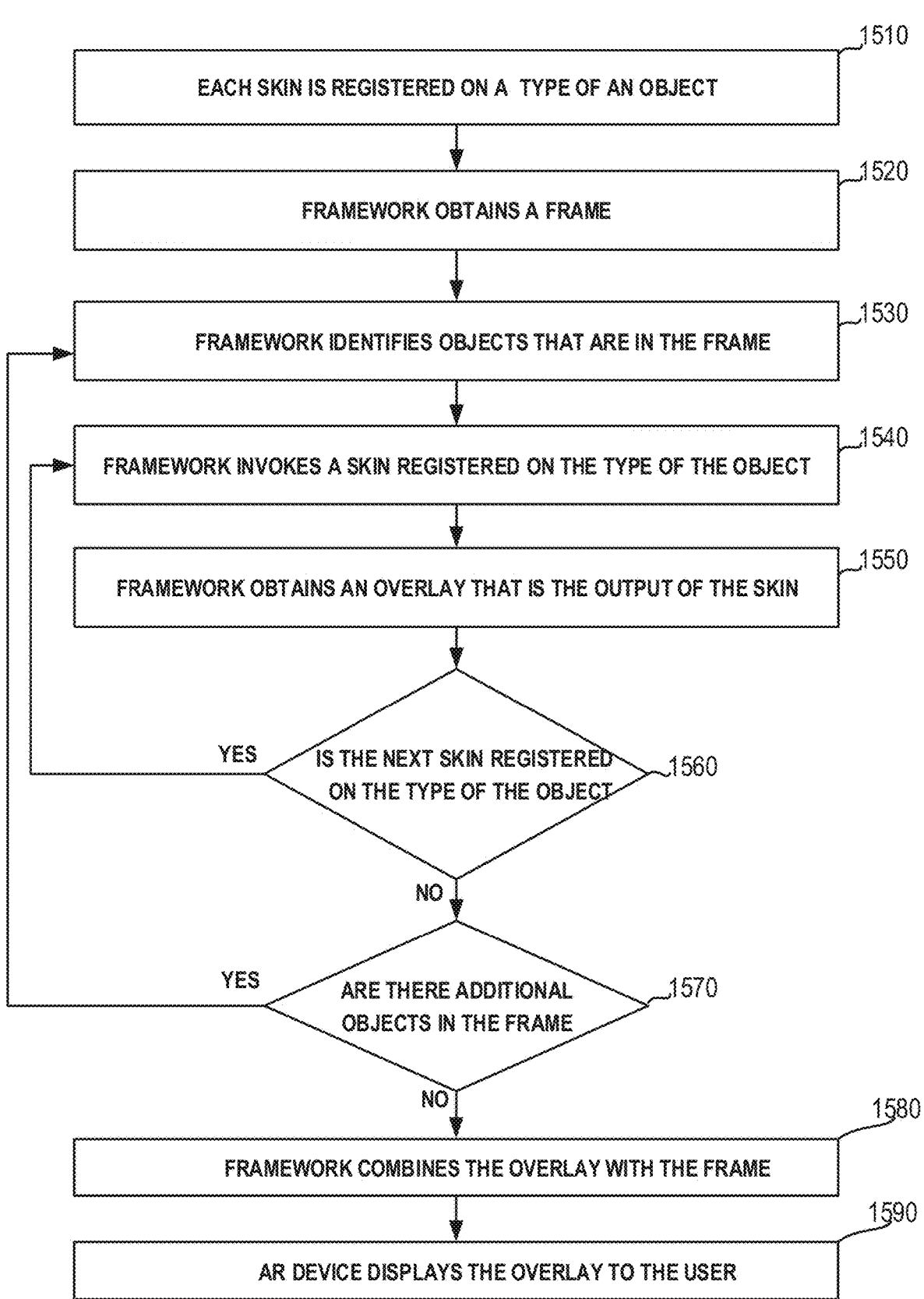
FIG. 15 shows a flowchart diagram of a method, in accordance with some exemplary embodiments of the disclosed subject matter.

Referring now to FIG. 15 showing a flowchart diagram of a method, in accordance with some exemplary embodiments of the disclosed subject matter.

On Step 1510, each skin is registered on a type of an object. In some exemplary embodiments, each skin may register with the AR framework to receive notification and handle specific types of objects. In some exemplary embodiments, some skins may not utilize or rely on the AR framework, and may identify frame objects independently or using alternative resources. In some exemplary embodiments, some skins may not be registered to objects but to the frame itself, such as skins enhancing a lighting of a frame, thereby automatically registering to every frame without relying on classifications of the AR framework. The AR framework may support a variety of objects types, such as but not limited to a person, an animal, a house, a road, a plant, a tree, a face, an eye, or the like. In some exemplary embodiments, an object may be classified as having a plurality of object types, such as objects that are an abstraction or instantiation of one another (e.g., a police officer may be an instantiation of an abstract person type), objects that have more than one attribute corresponding to an object type (e.g., a person may be both an adult, a female and a Caucasian), or the like. In some exemplary embodiments, an object may comprise other objects. As an example, an object of type person may comprise objects of type face, eyes, arms, clothes, or the like.

On Step 1520, the AR framework obtains a frame. The frame may be obtained from a frame sensor such as a camera that is embedded in an AR Glasses, from a camera that is embedded in a mobile phone, from a surveillance camera, from a thermographic camera, from an infrared camera, or the like. The frame sensor may capture one frame after the other and produce a stream of frames. The frame sensor may obtain frames that may be processed to generate output overlays for the frames in a rate such as 90 Frames per Second (FPS), 60 FPS, or the like. In some exemplary embodiments, a rate which is lower than 60 may result in a quality which may be poor for human users.

The AR framework may obtain a frame from a frame sensor and may send the frame, transmit the frame, save the frame, or the like for future processing. In some exemplary embodiments, the AR framework may obtain several frames from multiple sources in a single time unit and merge the frames to a single frame prior to processing the frame. As an example, the AR framework may not have access to a frame as viewed from the field of view of the user. Using a plurality of cameras, several different images may be transformed and merged together to provide an estimated frame of the view of the user. The image of the room or of the person may be taken from several image sensors. Frames from different image sensors may be merged to a single frame. Combining images from different viewpoints may enable to enhance the user's AR vision, such as by enabling the user to see "through" objects, e.g., using one or more skins that utilize the additional fields of view. Additionally, in a configuration that combines different fields of view, the combined frame may be used for a plurality of nearby AR devices of different users.

On Step 1530, the AR framework identifies objects that appear in the frame. An object appearing in the frame may be identified and classified to a type. The AR framework may employ object recognition, computer vision techniques, Artificial Intelligent (AI) algorithms, or the like, to identify the objects in the frame. Additionally or alternatively, metadata about objects may be available in other manners, such as using wireless transmission, RFID, consultation with 3D maps, or the like. In some exemplary embodiments, objects not appearing in the frame may be identified too, e.g., in case a skin is estimated to add such an object.

In some exemplary embodiments, the AR framework may classify the objects to types and may build a list comprising the types of the objects that comprised by the frame. In some exemplary embodiments, the AR framework may create or maintain a metadata record. The metadata record may be updated to comprise each identified object and properties thereof. For example, the metadata record may indicate for an object its type, its location in the frame, its dimensions, or the like. In some exemplary embodiments, skins that are executed by the AR framework may access the metadata record, utilize its content, and potentially update it.

In some exemplary embodiments, an object may not have existed in the frame as captured by the frame sensor. A skin may process the frame or portion thereof and add an object record to the metadata record to indicate the existence of the new object, to ensure it is processed correctly. As an example, a skin may add a label to be presented near an existing object, a skin may add an object of a cat, a navigation skin may add a graphical representation of a route on top of the road, or the like. As another example, the AR framework may add images of family members of a person that is shown in a frame, a garden near a house, or the like.

On Step 1540, the AR framework invokes a skin which is registered on the type of the detected object in the frame. As each skin may have registered on types of objects which are of interest to it (e.g., Step 1510), the AR framework may invoke only skins that have objects of interest in the frame to avoid having each skin determine, dynamically, whether objects of interest appear in the frame, requiring resource consumption, such as energy and processing resources.

In some exemplary embodiments, the AR framework may be executed by a device, such as but not limited to the AR device (e.g., AR Glasses 120) itself, an edge computer (e.g., Edge 1330, 1330' of FIG. 13), a server (e.g. Server 1340 of FIG. 13), or a combination thereof. In some cases, each skin may be executed on a different device, for example, on an AR device (e.g., AR Glasses 1320 of FIG. 13), on an edge computer (e.g., Edges 1330,1330' of FIG. 13), on a server (e.g., Server 1340 of FIG. 13), or the like. The AR framework may invoke the skin on the relevant computing environment to process the objects of interest. As an example, the skin may begin execution upon a command of the AR framework. As another example, the skin may be executed by a daemon process that pre-exists and begins processing in response to a command from the AR framework. In some cases, if several skins are registered on the same object, the AR framework may invoke them one after the other.

In some exemplary embodiments, the AR framework may provide the invoked skin with a frame, a portion of the frame (also referred to as a "sub frame" or "patch"), or the like. In some exemplary embodiments, the AR framework may provide the skin with the sub frame that comprises the object of interest. If several objects appear, the AR framework may invoke the skin a plurality of times, each of which with a different sub frame. Additionally or alternatively, the AR framework may provide the skin with the metadata of the object, for accessing and potentially for updating. For example, if the skin performs facial recognition, the skin may update the metadata properties of the object to indicate the identified person of the object. Other skins that perform facial recognition may avoid performing facial recognition and rely on the output of a previous skin. Additionally or alternatively, the output of the previous skin may be verified prior to being relied upon.

Additionally or alternatively, the AR framework may provide the skin as an input an editable section of the frame. The editable section may be an area in the frame or patch on which the output of the skin may be drawn.

Additionally or alternatively, the input provided to the skin may comprise the metadata record. The metadata record may comprise data such as a list of objects that are in the frame or patch, properties of the objects, coordinates on which the skin is allowed to draw on, the context in which the frame was taken, properties regarding the person using the AR device, or the like. Additionally or alternatively, due to privacy and security considerations, the metadata record may not be supplied to the skin directly, but may be made accessible thereto, such as by a mechanism of queries that the skin may invoke. In some exemplary embodiments, a context of the frame may comprise the location in which the frame was taken, information about the location (e.g. a private house, a work place, information from Geographic Information System (GIS), or the like), the date in which the frame was taken, data regarding the date (e.g. a birthday, an anniversary, or the like), data regarding the frame sensor used to obtain the frame, or the like.

In some exemplary embodiments, the skin may modify the object in a constructive manner, such as by augmenting the object with additional objects, decorations, ornaments, or the like. Additionally or alternatively, the skin may modify the object in a destructive manner, such as painting over the object to remove the object, replacing the object by another object, or the like.

In some exemplary embodiments, the skin may provide an output. The output may comprise an overlay to be displayed over the frame or provided patch, as determined by the skin. As an example, a skin may add a balloon to appear in a hand of a child. The output may thus by an overlay that, when applied over the frame, adds the balloon at the determined location. As another example, a skin may add a green line on a road, indicating a route on the road. In that case, the output of the skin may be provided using a set of coordinates and a corresponding color, defining the overlay implicitly. As yet another example, the output of the skin may comprise a label with text comprising information about the input object.

Additionally, or alternatively, the skin output may comprise the metadata record. In some cases, the metadata record may be updated by the skin to add information gathered by the skin to existing objects, to add new objects (e.g., the balloon added in the example above), or the like. Additionally, or alternatively, the metadata record may comprise painting instructions to be implemented by the AR framework. As an example, if a skin paints a label before having the final augmented frame, labels may be positioned in a sub-optimal location, such as in a distribution that is too dense, blocking important objects or other visual information, or the like. The skins may add instruction for the AR framework to add labels to objects, such as a name near a person, a material of a structure near the structure, a price tag near a merchandise, a speed indication near a windshield, or the like. After all the skins are executed, and after the overlay display is generated (Step 1580), the AR framework may determine the location, size, and other visual properties of the labels, and draw them, to add an additional overlay layer, referred to as a label overlay.

In some exemplary embodiments, the metadata record outputted by the skin may be the updated metadata record. Additionally, or alternatively, the metadata record may comprise the added information only, so as to allow the AR framework to modify the metadata record accordingly at its discretion.

On Step 1550, the AR framework obtains an overlay that is the output of the skin. In case that the skin is being executed in the same apparatus as the AR framework, the overlay may be pointed by a pointer that was the input of the skin, or the like. In some exemplary embodiments, the skin may be executed on a different execution platform, such as an edge computer, a server, or the like. The remote platform may send, transmit, or the like, its output as a stream to the AR framework. Additionally or alternatively, the executing platform may store the output of the skin on a local storage device, on a remote cloud server, or the like. The AR framework may access the medium on which the output of the skin is retained and pull the overlay.

In some exemplary embodiments, the skin may output the first overlay followed by outputting updates when its output changes. Each output beside the first overlay may be the delta from the previous output.

As explained above, in some cases, labels may be added at a later stage, allowing other objects to be drawn, as the location of the label may be less important compared to the location of other objects. As an example, in some cases, the label may be drawn far from the object it is associated with and connected thereto using an arrow, a line, or the like. As an example, a label with information about an historical place may be above, below, on the left or on the right of the image of that place. The AR framework may determine the exact location of the label, its size, and other graphical properties after the overlay display is generated.

On Step 1560, it may be determined if there is another skin that is registered on the same type of object. If so, Steps 1540 and 1550 may be performed again with the respect to the next skin, which may process the same objects. Otherwise, Step 1570 may be performed.

On Step 1570, in case there is another object in the frame that was not yet processed, Steps 1530-1560 may be repeated with respect to the additional object. As a result, the AR framework may iterate over each object that is in the frame and invoke skins thereon. Otherwise, Step 1580 may be performed.

It may be noted that in some cases, skins may be executed in parallel. In some cases, skins that are registered on different types of objects may be executed in parallel to reduce overall computation time. In some cases, a first skin may be registered on a first type of object before a second skin. The second skin may also be registered on another type of object. The first skin may process an object of the first type in parallel to the second skin processing an object of the second type. After the first skin completes its processing, the second skin may process the object of the first type. As another example, if there are a plurality of objects of the first type, the first skin may process the first object, provide an output for the second skin to process the first object sequentially. While the second skin processes the first object, the first skin may continue to process, in parallel, a next object of the same type, creating a pipeline between the first skin and the second skin. In some exemplary embodiments, parallel execution may be performed on different execution platforms. Additionally or alternatively, parallel execution may be useful to reduce latency which may be caused by extra processing time. In some exemplary embodiments, the final output may be provided within a target time, so as to enable an output display stream at a desired rate, such as for example, a rate of 20 FPS, 60 FPS, 90 FPS, or the like (e.g., ±10%).

On Step 1580, the AR framework may combine overlays from different skins to provide an output overlay. The output overlay may be displayed to the user, providing an augmented reality experience with augmentation over the frame viewed by the user. Additionally or alternatively, a label overlay may be generated by the AR framework and combined with the skin-generated overlays.

In some exemplary embodiments, the AR framework may add the overlay of each skin to the overlay as soon as the overlay is available. Additionally or alternatively, it may be useful to postpone adding an overlay in order to save processing time. A second skin may be registered on an object that is the output of the first skin. The second skin may change the objects that the first skin generated. Hence, there may be no need to draw the output of the first skin, and any computation time spent in adding it may be wasted.

In some exemplary embodiments, the metadata record which may be passed between the skins and the framework and potentially modified by the skins, may comprise privacy settings. The privacy settings may be settings of an object appearing in the frame or in the overlay display. As an example, the privacy settings may indicate whether the image may be retained, may be shared with other people, or the like. Privacy settings may be defined by the user, may be updated by the skins, or the like. In some exemplary embodiments, the AR framework may enforce the restrictions defined by the privacy settings. For example, if the privacy settings allow retaining and sharing of the frame, the frame may be retained and shared. Additionally or alternatively, the AR framework may combine the frame and display overlay for generating the AR view to be shared and retained for future use. If the privacy settings do not allow sharing of the frame, the frame itself may not be shared with others. Additionally or alternatively, if the privacy settings prevent the sharing or storage of specific objects in the frame, the AR framework may edit and redact portions of the frame, of the display overlay, combination thereof, or the like, based on the privacy settings.

On Step 1590, the overlay display is displayed using the AR device. As a result, the overlay display is overlaid over the physical world, without combining the frame itself. In some exemplary embodiments, the overlay display is displayed by the AR glasses, providing personalized AR view of the world to the user. Additionally or alternatively, the AR device may be the windshield of a vehicle, providing a passenger of the vehicle with an augmented view of the surroundings of the vehicle. In other embodiments, the AR device may be located at any other location and/or device.

Figure 16:
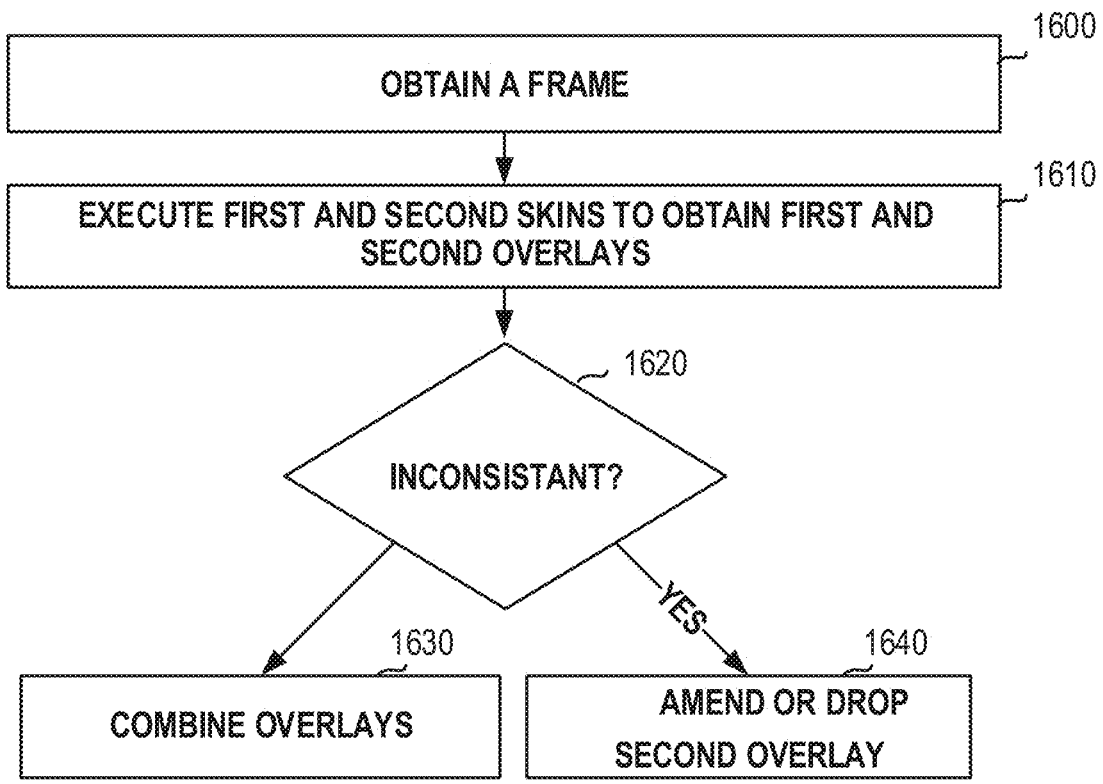
FIG. 16 shows a flowchart diagram of a method, in accordance with some exemplary embodiments of the disclosed subject matter.

Referring now to FIG. 16 illustrating a flowchart diagram of a method, in accordance with some exemplary embodiments of the disclosed subject matter.

On Step 1600, a frame may be obtained by an AR system, an AR framework, or the like, which may be configured to provide an AR view. In some exemplary embodiments, the frame may be obtained from one or more frame sensors of the AR system such as a camera of an AR device, an indoor camera, a street camera, or the like. In some exemplary embodiments, the AR device of system may comprise AR glasses, which may enable to display augmented overlays that combine naturally with the surroundings of the user. In some exemplary embodiments, an AR device may include a user device with a screen and a camera, such as a camera device, a personal computer, a television, a mobile device, a Tablet, or the like. In such cases, applications in the user device may be used to capture photos or videos, and augment thereto virtual overlays. For example, a television may obtain television frames from a content source, and utilize one or more skins to generate and display one or more virtual overlays over the television frames. As another example, a mobile device application such as the ZOOM™ application may utilize one or more skins to generate and display one or more virtual overlays over the rendered ZOOM™ videos, e.g., changing a background of a video, changing a human depicted in a video, or the like.

In some exemplary embodiments, the frame may be obtained in a similar manner to Step 1410 of FIG. 14, to Step 1520 of FIG. 15, or the like. In some exemplary embodiments, one or more objects in the frame may be identified. In some exemplary embodiments, each identified object may or may not have one or more registered layers, skins, or the like. In some exemplary embodiments, the AR system may be configured to utilize or invoke one or more registered skins on the frame or portion thereof, each of which may be configured to provide an augmented overlay or an indication thereof to be used by the AR system for generating the AR view. In some exemplary embodiments, the registered skins may include at least a first skin and a second skin that are both registered on a same object, portion, overlapping objects, or the like, of the frame. In some exemplary embodiments, an identified object in the frame that has at least two registered skins may have a skin execution order between the registered skins, indicating that the first skin is to be executed before the second skin.

On Step 1610, in spite of the order of execution, at least a portion of the skins may be executed in a non-sequential order by one or more devices such as a remote server, an edge device, the AR device, or the like. In some exemplary embodiments, the first skin may be executed on a frame, on one or more patches thereof, one or more objects thereof, or the like, e.g., in order to obtain a first overlay. In some exemplary embodiments, the frame may comprise an original captured frame or a processed frame which may comprise a frame that has gone through execution of one or more skins and has one or more overlays, instructions, labels, or the like as outcome from the execution. In some exemplary embodiments, the second skin that is subsequent to the first skin may be executed on the same frame or patch as the first skin, e.g., in order to obtain a second overlay. In some exemplary embodiments, the first and second skins may be executed in a non-sequential manner, e.g., simultaneously, in parallel, in partially overlapping times, or the like. In some exemplary embodiments, executing the second skin may be performed without obtaining the first overlay from the first skin, e.g., in contrary to the skin execution order that requires to first obtain the previous overlay before generating a next overlay. In some exemplary embodiments, the first skin and the second skin may be executed in parallel, simultaneously, in timeframes that have one or more overlaps, or the like, e.g., in order to reduce a computational time.

In some exemplary embodiments, the determination as to whether the first and second layers should be executed in a non-sequential way, or whether they should be executed sequentially one after the other may be ruled by a predictor. In some exemplary embodiments, the predictor may be trained to estimate outcomes of each layer and estimate whether or not they conflict, are inconsistent, or the like. In some exemplary embodiments, the predictor may be data-driven, configured based on heuristics, or the like. In some exemplary embodiments, in case the estimations of outcomes are determined by a data-driven predictor such as a machine learning classifier, the estimations' accuracy may improve over time as more data regarding success of previous estimations may be gathered. In some exemplary embodiments, the predictor may be utilized for a single object that has different registered layers, and for different objects that may overlap, e.g., two people hugging each other. In some exemplary embodiments, the predictor may provide a predication as to what is the probability that a skin will be inconsistent with another skin. In case the probability indicates that the skins will be inconsistent, the skins may be processed sequentially. Otherwise, they may be processed in a non-sequential manner. For example, a predictor may indicate to a third layer that is registered on an object that certain portions of the object will probably not be affected by the two previous layers, e.g., in case a probability is below a threshold. In such cases, the frame may be processed by the third layer prior to obtaining a second overlay from the second layer, with a small chance of requiring further amendments or processing.

In some exemplary embodiments, the predictor may be configured to predict whether or not objects are added or removed by a skin in a manner that affects subsequent skins. In some exemplary embodiments, in case the predictor indicates that the first overlay and the second overlay are consistent, the first and second skins may be executed in a non-sequential manner. In some exemplary embodiments, in case the predictor indicates that the first overlay will be inconsistent with a small portion of the second overlay, e.g., below a threshold, a partial execution of the second skin may be performed, e.g., in areas that are not predicted to be affected by the first overlay. In some exemplary embodiments, performing the partial execution may comprise generating a partial second overlay that is predicted to have a low probability of overlapping with pixels of the first overlay. In some exemplary embodiments, the AR view may be generated by utilizing the first overlay, utilizing the partial second overlay, and completing execution of the second overlay based on the first overlay. In some exemplary embodiments, the predictor may predict which pixels are most likely to be affected by the previous layers, and those pixels may not be processed until the previous layer's execution is completed. For example, a predictor may indicate to a third layer that is registered on an object that certain portions of the object are probably not going to be affected by the two previous layers, and thus those portions may be processed by the third layer prior to obtaining the previous overlay. In some exemplary embodiments, in case the predictor indicates that the first overlay will be inconsistent with a large portion of the second overlay, e.g., above a threshold, the skins may be executed sequentially.

As an example, the first layer may be configured to modify a hairstyle of people objects to a funky hairstyle with spiky hair, while the second layer may be configured to place a hat on human heads. For bold people, the skins may be estimated to be consistent as there may be no overlap between affected pixels by the layers. For people with short hair that does not stick out of the intended hat's boundary, the skins may be determined to be mildly inconsistent as a conflicting area may require a minor amendment that places that hat above the spiky hair. For people with long hair that sticks out of the intended hat's area after being processed by the first layer, the skins may be determined to be largely inconsistent as the conflicting area is complex and large. In such cases, sequential execution may be advantageous.

On Step 1620, the first and second overlays that are outputted from the first and second skins may be compared to each other in order to identify whether they are inconsistent with each other. In some exemplary embodiments, an inconsistency or a consistency between the first overlay and the second overlay may be measured. In some exemplary embodiments, in case the first and second overlays are inconsistent with each other, the inconsistency measurement may be compared to an inconsistency threshold. In some exemplary embodiments, in case the inconsistency measurement is smaller than the inconsistency threshold, the second overlay may be modified. Additionally or alternatively, in case that inconsistency measurement complies with the inconsistency threshold, the second overlay may be regenerated. In some exemplary embodiments, the inconsistency measurement may comprise a ratio given by the following formula:

(overlap area)/(area of the first overlay+area of the second overlay)

In some exemplary embodiments, the overlap area may be the area in which the first overlay and the second overlay overlap. Additionally or alternatively, the inconsistency function may be configured to measure a ratio based on the number of pixels affected by each overlay as given by the following formula:

(number of pixels in the overlapping area)/(number of pixels comprised by the first overlay+number of pixels comprised by the second overlay)

In some exemplary embodiments, the output overlays from each skin may be analyzed to determine whether the output of a skin can be utilized in combination with the previous skin, e.g., to comply with the required outcome according to the order of execution. In some exemplary embodiments, the pixels or objects that were added or modified by each skin may be compared to identify any overlaps, same affected areas in the frame, semantic modification, or the like. In some exemplary embodiments, based on the comparison between the overlays, it may be determined whether or not the second overlay can be utilized as is for providing the AR view. In some exemplary embodiments, the AR view may be generated based on the first overlay and based on the determination as to whether the second overlay can be utilized for providing the AR view.

In some exemplary embodiments, a computation may be performed to determine whether new objects to which the second skin is registered were added to the frame by the first skin.

In some exemplary embodiments, overlays may be determined to be inconsistent with each other in case they increase a latency above a threshold. In some exemplary embodiments, in some cases, the second skin may be configured to be executed on a first execution platform, and a first latency of a communication between the AR device to the first execution platform may be determined to be above a latency threshold, e.g., indicating the latency is unacceptable. In some exemplary embodiments, a second latency of a communication between the AR device and a second execution platform may be determined to be below the latency threshold, e.g., complying therewith. In some exemplary embodiments, in such a case, determining whether the second overlay can be utilized for providing the AR view may comprise determining that the second overlay cannot be utilized for providing the AR view. In some exemplary embodiments, executing the second skin may comprise executing the second skin on the second execution platform. In some exemplary embodiments, generating the AR overlay for the frame may be based on the second overlay.

On Step 1630, in case the comparison indicates that the first and second overlays are consistent with each other, do not overlap, do not comprise overlapping pixels, or the like, the second overlay may be determined to be utilized for generating the AR view. In some exemplary embodiments, the output overlays of both skins may be utilized by the AR system in order to display an AR view, e.g., in combination. In some exemplary embodiments, the first and second overlays may be applied to the frame as part of generating the AR view. In some exemplary embodiments, a latency of the AR framework may be reduced, as there may be no need for sequential execution. Specifically, instead of waiting for the output of the first skin prior to starting execution of the second skin, both skins are executed in the same time. In some exemplary embodiments, any other number of skins may be executed in parallel. For example, three skins, four skins, or the like.

On Step 1640, in case the comparison indicates that the first and second overlays are inconsistent with each other, or that new objects were created that invoke the second skin, the second overlay may be amended or dropped. In some exemplary embodiments, upon determining that the first and second overlays comprise a small number overlapping pixels, or that amending the second overlay to become consistent with the first overlay utilizes minor resources, the second overlay may be modified to obtain a modified second overlay that may be utilized for generating the AR view. In some exemplary embodiments, modifying the second overlay may comprise executing the second overlay on portions of the frame using the first overlay, executing an image processing algorithm on the frame, or the like. In some exemplary embodiments, in case modifying the second overlay is infeasible, e.g., due to the second overlay affecting large pixel areas, or the like, the second overlay may be dropped to be later re-computed, regenerated, or the like, and the new overlay may be utilized for generating the AR view.

In some exemplary embodiments, modifying the second overlay may include regenerating a portion of the second overlay, e.g., an overlapping pixel area that overlaps with the first overlay, or any other portion of the second overlay, and utilizing the regenerated portion as well as the remaining original second overlay as the modified second overlay. In some exemplary embodiments, in case a new object was created by the first skin to which the second skin is registered, the second overlay may be amended by regenerating the second skin only on the new object, without regenerating the entire second overlay. In some exemplary embodiments, the AR view may be generated by utilizing the modified second overlay.

In some exemplary embodiments, in case the overlapping pixels comprises a large number of pixels that is above a threshold, or amending the inconsistency is determined to be resource consuming, an amendment may not be advantageous. In some exemplary embodiments, a new overlay or portions thereof may be generated by the second layer based on the first overlay, e.g., in accordance to the order of execution. In some exemplary embodiments, the AR view may be generated by utilizing the regenerated second overlay.

In some exemplary embodiments, the AR overlay may be generated. The AR overlay may be generated base on the frame. In some exemplary embodiments, the AR overlay may comprise a combination of the first overlay, the second overlay in its original or amended version, and any other layer that registered to the frame or portions thereof In some exemplary embodiments, the AR overlay may be displayed by the AR device to a user.

Steps 1600-1640 may be performed repeatedly, iteratively, or the like, for a stream of frames captured by one or more frame sensors. In some exemplary embodiments, Steps 1600-1640 may be performed for each frame that is obtained by the AR device that has one or more layers that are registered on a same object, on overlapping objects, or the like.

Referring now to FIG. 17A-17E illustrating an exemplary scenario according to the method of FIG. 16, in accordance with some exemplary embodiments of the disclosed subject matter.

In some exemplary embodiments, a first skin may be configured to provide an overlay that adds a hat on top of human objects' heads. In some exemplary embodiments, a second skin may be configured to provide an overlay that colors hair of any object, e.g., human or non-human, to blond.

Figures 17A, 17B, 17C, 17D, 17E:
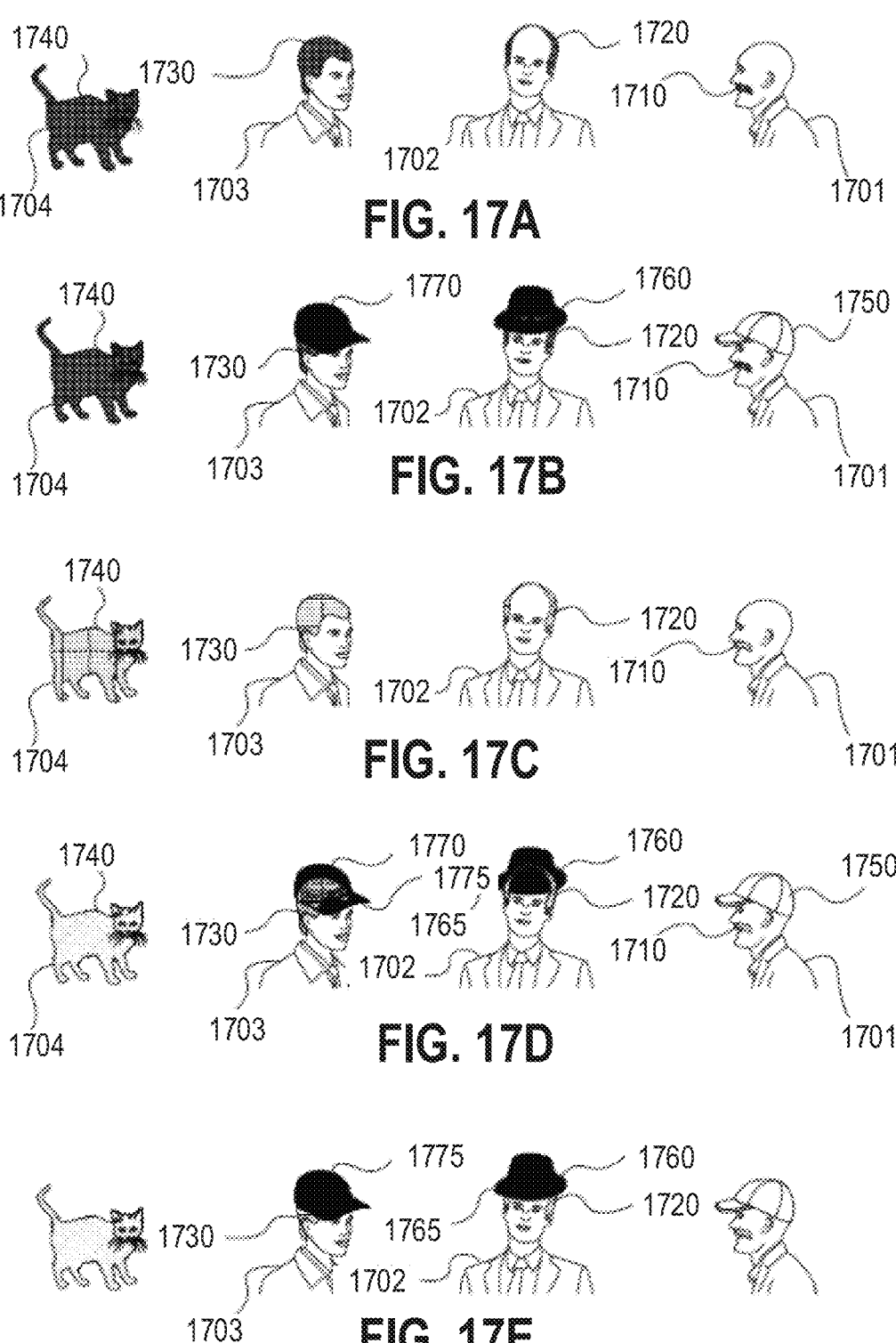
FIGS. 17A-17E show a schematic illustration of an exemplary scenario in which the disclosed subject matter may be utilized, in accordance with some exemplary embodiments of the disclosed subject matter.

FIG. 17A illustrates a raw-data frame that was not yet processed by layers. The frame may be captured by a frame sensor. As illustrated in FIG. 17A, the frame includes a Person 1701 having a Mustache 1710, a Person 1702 having Hairstyle 1720, a Person 1703 having Hairstyle 1730, and a cat 1704 Having Fur 1740. In some exemplary embodiments, Mustache 1710, Hair 1720, Hair 1730, and Fur 1740 may be black.

FIG. 17B illustrates the frame of FIG. 17A after being processed by the first skin that is configured to add hats, e.g., providing a first overlay. As illustrated in FIG. 17B, the first overlay added Hat 1750, Hat 1760 and Hat 1770 to Person 1701, Person 1702, and Person 1703, respectively.

FIG. 17C illustrates the frame of FIG. 17A after being processed by the second skin that is configured to color hair or fur, e.g., providing a second overlay. The second skin may be processed in a non-sequential manner, without obtaining the first overlay from the first skin. As illustrated in FIG. 17C, the second overlay colored the hairs of Mustache 1710, Hair 1720, Hair 1730, and Fur 1740, to a blond color.

FIG. 17D illustrates an inconsistency between the first overlay of FIG. 17B and the second overlay of FIG. 17C. As illustrated in FIG. 17D, a first inconsistency 1765 occurs when the second overlay overlaps with pixels of Hat 1760 that was modified by the first overlay. As illustrated in FIG. 17D, a second inconsistency 1775 occurs when the second overlay overlaps with pixels of Hat 1770 that was modified by the first overlay.

FIG. 17E may illustrate a correction of FIG. 17D. As illustrated in FIG. 17E, conflicting pixels between the first and second overlays such as inconsistencies 1765 and 1775 are amended. In some exemplary embodiments, the inconsistency between the layers may be determined to be relatively minor, so that an amendment of the conflicting pixels may suffice for solving the inconsistency. In some exemplary embodiments, in case the inconsistency between the layers is determined to be major, the second overlay of FIG. 17C may be dropped, and the second skin may be executed again on the first overlay of FIG. 17B.

In case that modifying the second overlay is determined to be more efficient than regenerating the entire second overlay, the inconsistency may be determined to be minor. In case that modifying the second overlay is determined to be less efficient than regenerating the entire second overlay, the inconsistency may be determined to be major.

Figure 18:
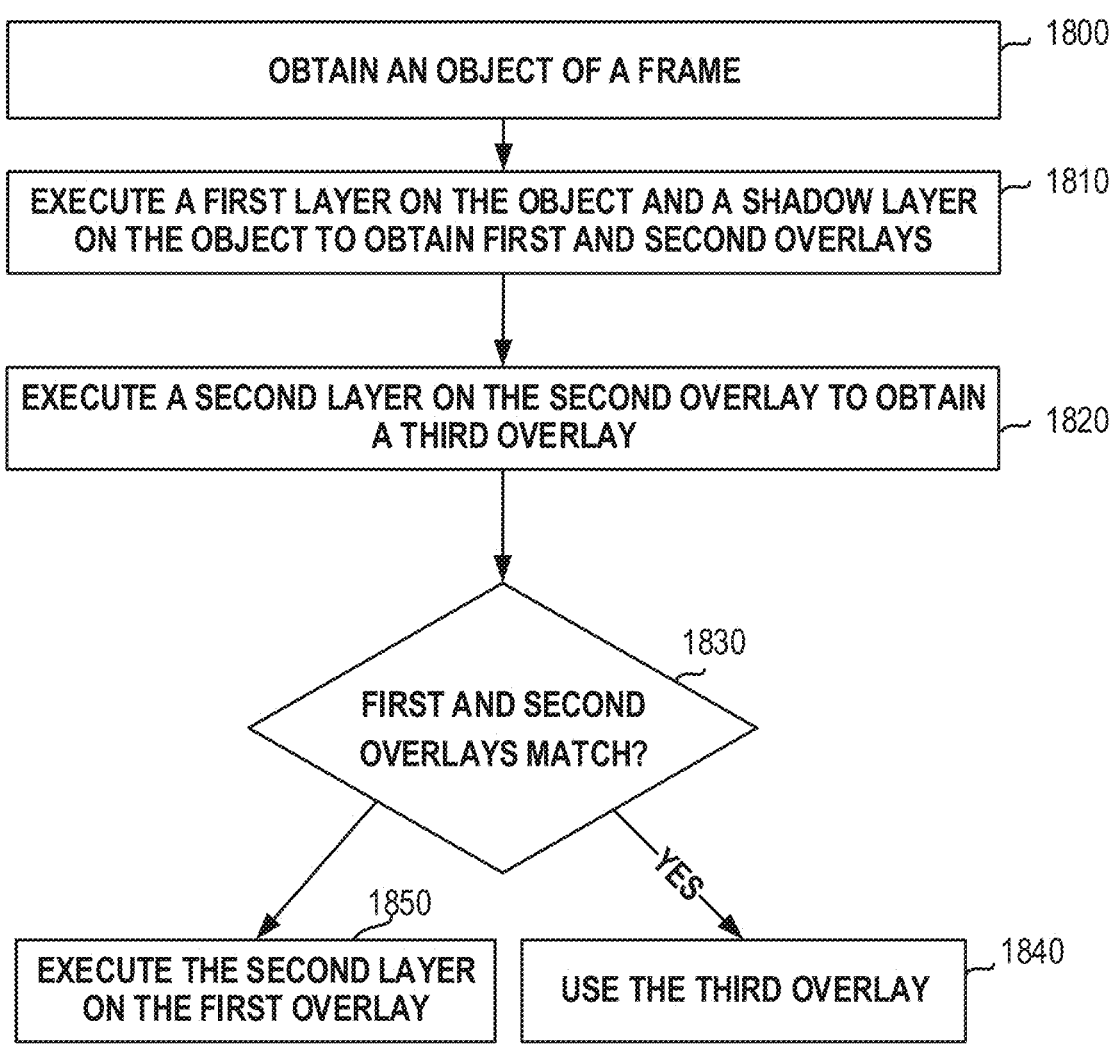
FIG. 18 shows a flowchart diagram of a method, in accordance with some exemplary embodiments of the disclosed subject matter.

Referring now to FIG. 18 illustrating a flowchart diagram of a method, in accordance with some exemplary embodiments of the disclosed subject matter.

On Step 1800, an object depicted in a frame may be obtained. In some exemplary embodiments, the frame may include a raw-data frame, a partially processed frame, or the like, which may depict at least one object. In some exemplary embodiments, at least a first layer and a second layer may be registered on the object.

On Step 1810, the first layer may be executed on the frame at a first execution platform, and simultaneously the first layer may be executed on the frame at a second execution platform (referred to as "shadow layer" or "shadow skin"). In some exemplary embodiments, a skin execution order may define that the first layer is to be executed at the first execution platform, and that the second layer is to be executed at the second execution platform, e.g., after obtaining the overlay of the first layer form the first execution platform. In some exemplary embodiments, the shadow layer, which may be executed at the second execution platform, may comprise a layer that is identical to the first layer. In some exemplary embodiments, the shadow layer may be a copy of the first layer, that is configured to perform the same operation as the first skin while running on a different execution platform, e.g., the second execution platform.

In some exemplary embodiments, the execution of the first layer on the object may provide a first overlay at the first execution platform, and execution of the shadow layer on the object may provide a second overlay that may be a shadow overlay of the first overlay. In some exemplary embodiments, the execution of the shadow layer may be performed in addition to the regular execution of the first layer, e.g., in a non-sequential manner, in overlapping time-frames, simultaneously, or the like.

In some exemplary embodiments, shadow layers may be determined to be executed in case two subsequent layers are configured to be executed at different execution platforms, and a shadow layer of the first layer is enabled to be executed at the second platform. In some exemplary embodiments, shadow layers may be executed in case the second execution platform is at least partially idle during an execution of the first layer or has extra computational power that can be utilized for the task. In some exemplary embodiments, shadow layers may be executed at a server or any other second execution platform while the original first layer may be processed at the first execution platform, e.g., the AR device, a cloud server, or the like. In some cases, a shadow layer may be preferably executed at a server or edge device, e.g., since the AR device may have less resources available compared to a server or an edge device. In other cases, shadow layers may be executed at any other device.

On Step 1820, the second layer may be executed at the second execution platform, e.g., based on the second shadow overlay. In some exemplary embodiments, the execution of the second layer may provide a third overlay that is based on the output of the shadow layer, e.g., which is immediately available at the second execution platform upon completion of execution of the shadow layer. In some exemplary embodiments, the shadow overlay may be utilized as an input to the second skin, which may be executed at the second execution platform.

In some exemplary embodiments, in order to reduce a latency of executing the first layer at the first execution platform, e.g., the AR device, and communicating the output overlay of the first layer to the second execution platform, e.g., the server, prior to starting to execute the second layer, the second execution platform may execute the second layer immediately using the shadow overlay. In some exemplary embodiments, utilizing the shadow overlay may eliminate any waiting time for obtaining the first overlay from the first execution platform.

On Step 1830, the first and second overlays may be compared to determine whether they are consistent, match, are identical, or the like. In some exemplary embodiments, after executing the first layer at the first execution platform to produce a first overlay, the first overlay may be communicated to the second execution platform. In some exemplary embodiments, the second execution platform may compare the first overlay with the second shadow overlay, to determine whether the second overlay can be utilized for providing the AR view. In some exemplary embodiments, in case the second overlay of the shadow layer is consistent with the first overlay of the first execution platform, this may indicate that the shadow layer was successful in imitating the first overlay and can therefore be utilized instead of the first overlay. In such a case, the flow may continue to Step 1840. In some exemplary embodiments, in case the second overlay of the shadow layer is not consistent with the first overlay of the first execution platform, this may indicate that the shadow layer was unsuccessful in imitating the first overlay and can therefore not be utilized instead of the first overlay. In such a case, the flow may continue to Step 1850.

On Step 1840, in case the first and second overlays are determined to be consistent with each other, match each other, or the like, the third overlay may be determined to be accurate, and may be utilized to provide the AR view. It is noted that overlays may be considered as matching if they are identical, if they are semantically identical, or the like. In some exemplary embodiments, the matching may be determined based on a pixel by pixel comparison. Additionally or alternatively, the matching may be determined using semantic comparators determining that two images are semantically identical. As an example, a semantic comparator may be implemented using an ANN that is trained to receive two images and predict if they are semantically identical or not. In some exemplary embodiments, images may be manipulated in a manner retaining semantic meaning as well as in a manner modifying semantic meaning. Such images may be utilized as part of a training set that can be utilized to train the ANN. Other machine learning methods may be utilized to implement the semantic comparator. Additionally or alternatively, semantic comparator may be implemented using computer vision specific algorithms that are aimed at identifying semantic difference.

On Step 1850, in case the first and second overlays are determined to be inconsistent, different from each other, not matching, or the like, the second layer may be re-executed on the first layout from the first layer, on a portion of the first layout, or the like, e.g., instead of using the second shadow overlay. In case a difference is found between the outcomes, the second execution platform may reprocess the second layer on the first overlay, or perform minor amendments to the third overlay, e.g., if possible.

In some exemplary embodiments, a schedule allocator may be configured to determine whether or not shadowing should be performed for a certain layer based on a schedule of layer executions at each execution platform, device, or the like, based on technical layer constraints, based on user constraints, privacy constraints, or the like. In some exemplary embodiments, shadow layers may be generated at a variety of devices, e.g., a cloud server, an edge device, the AR device, a combination thereof, or the like. In some exemplary embodiments, the schedule allocator may utilize one or more optimization algorithms, resource allocation solvers, or the like, to determine whether or not shadowing of a skin is advantageous.

In some exemplary embodiments, the schedule allocator may utilize a classifier, a predictor, or the like, such as a same classifier as described previously or a different one. In some exemplary embodiments, the classifier may be deployed to determine which layers perform well when being shadowed, e.g., based on information gathered over time, success rates of previous classifications, success rates of previous shadowing, locations of frame sensors, heuristics, metadata of layers, or the like. For example, layers that require personal information, e.g., a database of friend images, may not shadow well at a server that has no access to such personal information databases. As another example, a layer that requires certain resources that are not available in the shadowing platform may not be successfully shadowed. In some exemplary embodiments, the classifier may comprise a data-driven classifier or any other classifier that is trained generally for all clients, personally for each client based on the client's history data, or the like. In some exemplary embodiments, the classifier may be trained based on any other information, using any classification technique.

In some exemplary embodiments, the classification may indicate attributes that enhance shadowing, such as location, weather, or the like. For example, a mushroom layer that is applied to tree frames only, e.g., adding mushrooms to tree images, can be shadowed well when after a first layer that replaces trees with frogs, providing an overlay without any trees, so that the mushroom layer will not be applied at all. This may save calculation time and reduce latency. In some exemplary embodiments, skin metadata may indicate what objects are modified and in what way, enabling the classifier to enhance its predictions.

Figure 19:
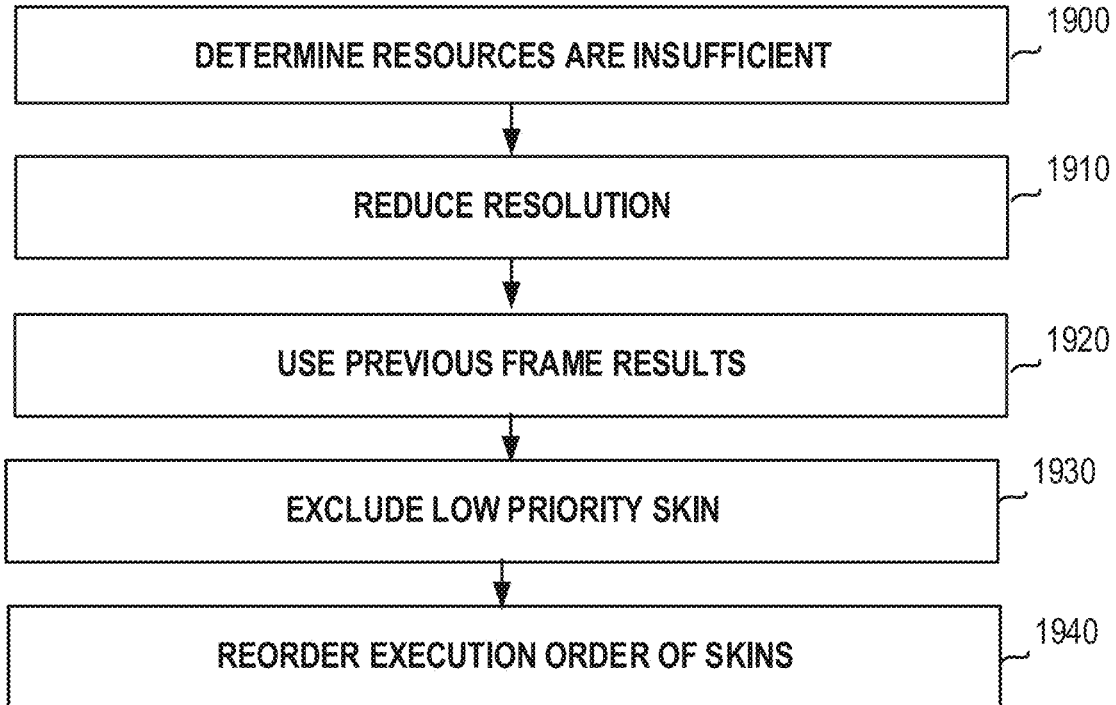
FIG. 19 shows a flowchart diagram of a method, in accordance with some exemplary embodiments of the disclosed subject matter.

Referring now to FIG. 19 illustrating a flowchart diagram of a method, in accordance with some exemplary embodiments of the disclosed subject matter.

On Step 1900, resources for executing at least one layer on one or more defined execution platforms, devices, or the like, may be determined to be insufficient. In some exemplary embodiments, the resources may include time resources, computational resources, battery or power resources, CPU resources, or the like, which may be required for completing executing the at least one layer. In some exemplary embodiments, in case the resources are determined to be insufficient for executing the at least one layer, a limited version of the at least one layer may be determined and executed. In some exemplary embodiments, the limited version may include performing partial computations, limiting resolution levels, or the like, according to at least one of Steps 1910-1940.

On Step 1910, a resolution level of frame provided to a layer may be reduced. In some exemplary embodiments, an entire or partial resolution level of the frame may be degraded or reduced, e.g., by 10 percent, 5 percent, or by any other percentage, during execution of the at least one layer. In some exemplary embodiments, a resolution of a frame portion may be reduced in case it is considered to be a low-priority portion, e.g., in case the frame portion does not depict a person or a high-priority object, in case the frame portion is not part of the user's field of view, or the like. In some exemplary embodiments, a resolution of the frame may be reduced prior to the layer processing. After execution, the resolution may or may not be restored, e.g., to an HD level, or to any other resolution level. In some exemplary embodiments, for a frame having one or more skins that are registered thereto, a resolution level of the frame may be reduced prior to executing the skins at one or more execution platforms. In some exemplary embodiments, the resolution level may be restored after executing the skins. In some exemplary embodiments, the resolution of the peripheral portion of the frame may be reduced, saving power while not compromising the privacy of the user. Additionally or alternatively, the resolution of one or more overlays of the frame may be reduced.

In some exemplary embodiments, a resolution level of a frame may be reduced prior to executing a first skin on the frame, thereby providing to the first skin a low-resolution frame. In some exemplary embodiments, the first skin may be executed on the low-resolution frame. In some exemplary embodiments, the resolution level may be restored after executing the first skin on the low-resolution frame. In some exemplary embodiments, a resolution level of a frame may be reduced for all registered skin, for some registered skins, or the like.

In some exemplary embodiments, instead of reducing a resolution level of the entire frame, only portions of the frame may be reduced in resolution. In some exemplary embodiments, a portion of the frame that is converted to lower resolution may comprise a randomly selected portion with a random size, a randomly selected portion with a defined size, a portion selected based on an importance score of frame objects, a portion selected based on a field of view of the user, or the like. In some exemplary embodiments, an importance score of objects may be assigned by the user, by an operator, based on rules, or the like. For example, a program developer or a classifier may define that human objects that are dancing should be allocated a higher importance score than a street sign, e.g., since their resolution level may be more noticeable. According to this example, a frame depicting a human dancer and a street sign may convert the street sign to lower resolution while retaining high resolution for the dancer.

In some exemplary embodiments, in order to provide an overall high-resolution average in which the degradation is hardly or not noticeable, the degradation may be performed in a different portion of the image every frame, instance, or the like. For example, a portion of 2/50, or any other percentage, of the frame may be degraded in a first frame, a different portion of the frame may be degraded in the next frame, or the like. In some exemplary embodiments, the same percentage of the frame may be degraded every frame at a different portion of the frame, or alternatively, a different portion size may be utilized for different frames.

On Step 1920, in order to reduce resource utilization, partial object recognition computations may be performed. In some exemplary embodiments, instead of implementing object recognition functionality such as facial recognition for each frame separately before providing the frames to registered layers, results of a previous object recognitions that were determined for one or more previous frames may be utilized. For example, object recognition results of a previous frame that indicate types of objects in a frame may be used for one or more subsequent frames. In some exemplary embodiments, using already existing results may reduce usage of resources such as time and computational resources. In some exemplary embodiments, typically, subsequent frames do not depict entirely different objects, thus performing object recognition for each frame may not be necessary.

In some exemplary embodiments, object recognition may be performed on a first frame to detect or identify one or more object types of objects in the first frame, object boundaries, object segmentations, or the like. In some exemplary embodiments, based on the object recognition results, one or more layers that are registered to the identified objects may be identified. In some exemplary embodiments, the object recognition may be performed at one or more execution platforms, e.g., at a server, an edge device, an AR device, or the like. In some exemplary embodiments, after recognizing the one or more object boundaries, one or more subsequent frames may be obtained from at least one frame sensor. In some exemplary embodiments, the one or more subsequent frames may include frames that are captured in subsequent time periods. In some exemplary embodiments, the one or more object types determined for the first frame may be utilized for the one or more subsequent frames.

In some exemplary embodiments, object recognition calculations may be performed statically every defined timeframe or number of frames, so that the object recognition results will be refreshed and new objects that enter the user's AR view will be detected. In some exemplary embodiments, new object recognition calculations may be performed every defined number of frames, every defined time period, upon identifying changes in the user's field of view, or the like.

In some exemplary embodiments, object recognition calculations may be performed dynamically according to a dynamic schedule, e.g., using a classifier, a predictor, or the like. In some exemplary embodiments, a classifier or predictor may be deployed to determine when new object recognition calculations should be performed, e.g., based on captured frames, information gathered over time, success rates of previous classifications, locations of frame sensors, heuristics, or the like. For example, a person that is sitting in a lecture is not predicted to view new objects for a long period of time, e.g., at least 10 minutes in average, while a person that is looking out of a train window is predicted to view a large number of different objects changing swiftly. In some exemplary embodiments, the classifier may be trained based on a historic dataset, based on heuristics, based on any other information, using any classification technique, or the like.

On Step 1930, in order to reduce resource utilization, low priority skins may be excluded from the AR framework. In some exemplary embodiments, in case not all layers can be implemented due to a lack of resources, layers may be prioritized and selected to be executed accordingly. In some exemplary embodiments, a lack of resources may slow a performance, enlarge a latency, an unsmooth AR view, or the like, which may downgrade the AR experience. In some exemplary embodiments, in order to avoid such setbacks, some skins that are registered to one or more objects of a frame may not be executed.

In some exemplary embodiments, skins may be determined to have a low priority based on implicit or explicit user indications, based on heuristics, default settings, or the like. In some exemplary embodiments, a user may indicate his priority scores regarding his installed layers explicitly or implicitly, e.g., via a user interface. In some exemplary embodiments, an explicit indication may include a selection of priorities by the user. In some exemplary embodiments, an implicit indication may include other settings of the user that may indicate his priorities, e.g., muting certain layers for long periods of time, reactivating a layer, or the like. In some exemplary embodiments, an implicit indication may include a user feedback to priorities that were automatically determined by the AR framework. For example, the AR framework may determine that some layers should be considered of low priority, and deactivate those layers. In return, the user may indicate that the priorities were wrongly considered of low priority, e.g., by reactivating deactivated layers, by indicating low levels of satisfaction, or the like. Alternatively, the user may indicate that the priorities were correctly considered of low priority, e.g., by ignoring the new settings that omit the layers, by indicating high levels of satisfaction, or the like.

In some exemplary embodiments, a classifier or predictor may be deployed to determine priority ranks of layers, e.g., based on user explicit or implicit indications, feedbacks from a plurality of clients, layer-related information such as layer metadata gathered over time, an environmental context, success rates of previous classifications, heuristics, or the like. In some exemplary embodiments, a layer that is determined to have a low impact on the AR view on one or more contexts may be classified as having a low priority. In some exemplary embodiments, an impact of a layer may correspond to a probability that the layer will make a difference in the AR view, may correspond to an importance of the functionality of the layer, or the like. For example, a layer that is estimated to be overwritten by a subsequent layer may be estimated to have no impact on the AR view. As another example, a layer that adds long fluffy fur to animals for entertainment purposes may be considered to have an objective that is less important than a layer that is configured to alert the user of dangers or translate a spoken language to assist a user. Upon executing the layer, the classifier may identify whether or not the prediction was accurate, e.g., whether or not the layer had a low impact on the AR view. For example, a layer that changes an eye color of detected humans may be determined to have a low impact in case that observed human are far away and their eye color is not noticeable. According to this example, the classifier may assign such a layer with a low priority when humans in the environment are identified as being far from the user.

In some exemplary embodiments, the AR framework may obtain priority ranks of the plurality of skins, and refrain from executing a low priority skin upon determining that execution of all of the plurality of skins is not advantageous, is not supported, may increase a latency, or the like. For example, lower priority layers may not be performed in case a time limit is not estimated to be sufficient to perform all registered layers, but the time limit is estimated to be sufficient when refraining from executing the low priority skin, the low priority skin may not be executed. As another example, in case the system is determined to be lacking sufficient CPU resources to perform all layers, but the CPU resources are estimated to be sufficient when refraining from executing the low priority skin, the low priority skin may not be executed.

On Step 1940, in order to reduce resource utilization, an execution order of skins may be reordered. In some exemplary embodiments, layers that are registered on a same object or portion of a frame, may have a defined order of execution. In some exemplary embodiments, the order of execution may define which output of which skin is to be utilized as an input of another skin. In some exemplary embodiments, an order of execution may not necessarily be optimal in terms of resource utilization.

In some exemplary embodiments, for layers registered on overlapping objects, same objects, or the like, the order of execution may affect the outcome. For example, an object of type "cat" may be registered to a first layer that colors the cat in purple, and to a second layer that generates a new cat object. According to this example, changing the order of the layers may provide different results; in the correct order one cat will be colored purple while the second cat will not, and in the wrong order both cats may be colored. In some exemplary embodiments, layers that create or delete new objects may introduce further complications, e.g., as their order may cause new layers to register thereto. In some exemplary embodiments, the order of execution may define that an object that is created by a layer will not be processed by any previous layer.

In some exemplary embodiments, although an order of execution may be defined, it may be desired to identify alternative ordering that may provide the same result or a similar result while using less resources. Specifically, a more efficient order of layer executions may be desired. In some exemplary embodiments, the order of execution may be obtained from a user, determined based on default settings, determined based on an order of layer activations by the user, determined based on an order of layer installation, determined based on heuristics, or the like. In some exemplary embodiments, a user may define one or more orders of execution. Alternatively, one or more orders of execution may be obtained, determined by the AR framework, or the like.

In some exemplary embodiments, an attempt of modifying the order of execution may be performed. In some exemplary embodiments, the attempt may include grouping non-consecutive layers in a consecutive order, reordering the order of execution, or the like. In some exemplary embodiments, the modified order may be selected based on determining an order with reduced resource utilization, an enhanced speed, or the like, which may be determined based on one or more classifiers, predictors, or the like, to provide the same result as the original order of execution. For example, layer metadata may be utilized to determine which layers influence each other, perform actions that influence each other, or the like, and based on the identified influences, a modified order of execution may be determined that is expected to provide the same resulting AR view. In some exemplary embodiments, in addition to utilizing predictors or classifiers, the modified order may be determined using any other mechanism such as randomly, based on instructions, rules, or based on any other information.

In some exemplary embodiments, two or more subsequent layers that are registered to an object may be executed according to their order of execution, and according to a different order as part of a new ordering attempt. In some exemplary embodiments, the new attempt may be performed simultaneously to the execution that uses the original order, in a non-sequential manner thereof, or the like. Alternatively, the new attempt may be performed at a different time period from the execution using the original order, e.g., after the original execution. For example, for an original order of layers from L1-L3, two executions may be performed: one execution may include a sequential execution of L1-L3 according to the defined order, and a second newly-ordered execution may include a sequential execution according to an alternative order, e.g., L2, L1, L3, or any other alternative order. In some exemplary embodiments, the alternative executions may be performed at a same platform, at different platforms, portions thereof may be distributed for execution to different devices, or the like. In some exemplary embodiments, the alternative executions may be performed upon identifying sufficient resources for an additional frame execution that are not determined to be used for a sufficient period of time.

In some exemplary embodiments, a first order of execution that defines an order of skin executions of a plurality of skins that are registered on a same object in the frame, may be obtained. In some exemplary embodiments, the first order of execution may define an order of skin executions between at least first and second skins. In some exemplary embodiments, the first order of execution may define that the first skin is to be executed before the second skin. In some exemplary embodiments, the first skin may be determined to be executed right before the second skin, a few skins before the second skin, or the like.

For example, the plurality of skins may include four skins: L1, L2, L3, and L4, and the first order of execution may define an order of L1, L4, L3, and L2 (starting at L1). In some exemplary embodiments, a second alternative order of execution between the plurality of skins may be determined, obtained, or the like, e.g., at the AR framework. In some exemplary embodiments, the second order of execution may define that the second skin, e.g., L2, is to be executed before the first skin, e.g., L1. For example, instead of the defined order of L1, L4, L3, and L2, the second order of execution may define an alternative order L2, L3, L1, and L4.

In some exemplary embodiments, the plurality of skins may be executed according to the first order of execution to obtain a first result, e.g., a first overlay. In some exemplary embodiments, the plurality of skins may be executed according to the second order of execution to obtain a second result, e.g., a second overlay. In some exemplary embodiments, the executions may be performed in overlapping timeframes, in different timeframes, or the like, at one or more execution platforms, e.g., at a same device, at different devices, portions thereof may be distributed for execution to different devices, or the like. In some exemplary embodiments, the execution according to the second order of execution may be performed upon identifying idle or sufficient computational power at one or more execution platforms that can be utilized for the task.

In some exemplary embodiments, the results from both executions may be compared, e.g., to identify any differences between the resulting layouts. In some exemplary embodiments, in case a resulting overlay of the original execution is identical or matches to the resulting overlay of the modified order, the new order may be determined to be replaceable with the original execution. In some exemplary embodiments, results may be determined to match based on a difference in pixels that is below a threshold, based on a classifier determining that they are identical, or the like. In some exemplary embodiments, in case the modified order is determined to utilize less resources than the original order, and they are determined to be replaceable, the modified order may be utilized in future executions instead of the original order. In some exemplary embodiments, in case the second order of execution is determined to utilize less computational resources than the first order of execution, the skin execution order may comprise the second order of execution instead of the first order of execution, e.g., thus replacing the execution order without changing the user's AR view in a noticeable manner.

In some exemplary embodiments, upon identifying within an order of execution a sub-order that was previously determined to be replaceable with a more efficient alternative order, the sub-order may be replaced with the alternative order.

In some exemplary embodiments, upon identifying that resources are not sufficient, at least one of Steps 1910-1940 may be selected and performed, e.g., based on a predictor, a classifier, user input, heuristics, or the like. In some exemplary embodiments, a predictor may be configured to predict which one or more of Steps 1910-1940 should be performed, e.g., based on information gathered over time regarding resource reduction rates from previous steps, success rates of previous classifications, heuristics, or the like. Based on such a prediction indicating which steps are to be taken, the steps may be executed by the AR framework. In some exemplary embodiments, the predictor may predict an estimated outcome of performing each of Steps 1910-1940, e.g., in terms of resource utilization, and perform the minimal number of steps that are estimated to comply with the available resources. Upon executing steps that were selected based on the predictor, the predictor may identify whether or not the prediction was accurate, e.g., whether or not the steps used the estimated amount of resources that was predicted, whether or not the steps reduced the resource utilization in a predicted manner, or the like. In some exemplary embodiments, failure and success rates of the predictor may be utilized to further enhance precision and accuracy of the classifier's predictions.

Figure 20:
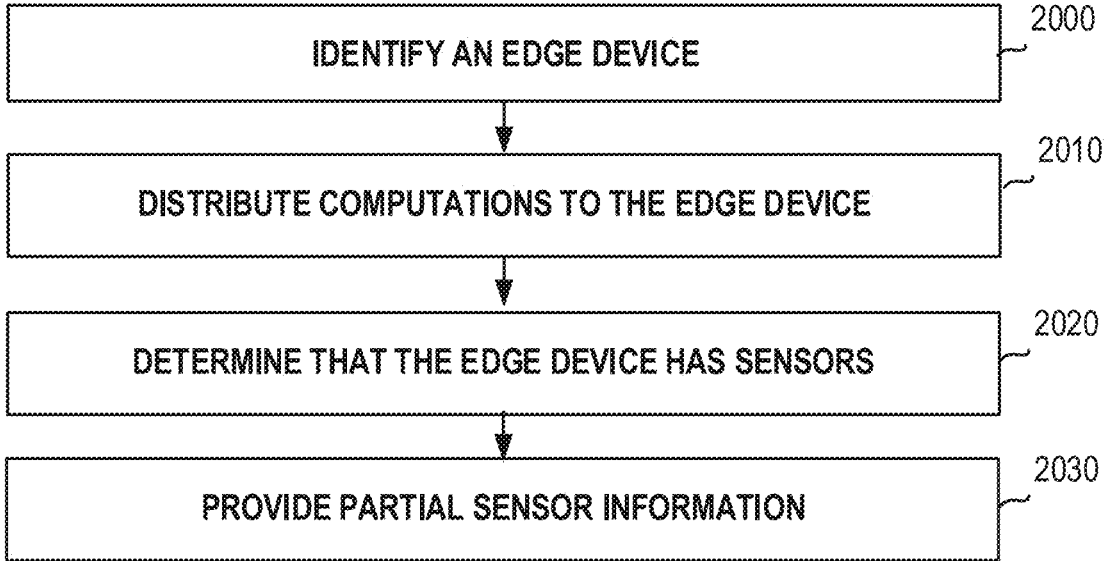
FIG. 20 shows a flowchart diagram of a method, in accordance with some exemplary embodiments of the disclosed subject matter.

Referring now to FIG. 20 illustrating a flowchart diagram of a method, in accordance with some exemplary embodiments of the disclosed subject matter.

On Step 2000, an edge device may be identified. In some exemplary embodiments, one or more edge devices may be utilized for distributing skin executions, object recognition, facial recognition, or any other computation task. In some exemplary embodiments, an edge device may include a user's car's computer, a computing device of the user, e.g., at his home, an office device, a nearby mini tower of a smart city, or the like, that is nearby the user, or any other user-owned or user trusted device.

In some exemplary embodiments, the AR device that the user is using may be limited in terms of CPU, battery, or the like. The CPU of the AR device may not be fast enough to execute a large number of skins simultaneously, per frame, in compliance with strict latency requirements, or the like. Additionally or alternatively, executing a skin may require graphical calculations that may cause high power consumption resulting in battery drain. In some exemplary embodiments, since the AR device may be comparatively weak, and communicating with a remote cloud server to distribute executions thereto may consume long periods of time and utilize much battery power, it may be advantageous to at least partially execute skins on a nearby edge device that has more computational power that the AR device, enables swift communications with the AR device and does not drain the battery for communication purposes.

In some exemplary embodiments, in order to enhance a computational speed of executing a layer, a frame or different portions thereof may be cropped and processed separately at different execution platforms, devices, or the like, and then returned to form the full overlay output of the layer. For example, an object of a frame may be cropped and processed at the edge device, while a remaining object may be processed at the AR device.

On Step 2010, computations of the AR device may be distributed at least in part to the edge device. In some exemplary embodiments, the distributed computations may include object recognition computations, facial recognition computations, skin executions, scheduler computations, classifier training or inferences, or the like. In some exemplary embodiments, the distributed computations may be executed by a combination of the AR device and the edge device, by one or them alone, or the like.

In some exemplary embodiments, performing collaborative execution may constitute a privacy issue, as the user may wish his private information to be retained in the AR device, or at trusted devices only. In some exemplary embodiments, in order to comply with privacy requirements, the AR device may perform a collaborative execution with the edge device in case the edge device is a trusted device. For example, the edge device may include a laptop of the user that is trusted by the user, a Tablet of the user, a smartphone of the user, or the like. In some exemplary embodiments, an AR device, such as AR glasses, a VRD, or the like, may be owned and controlled by the user, as opposed to other external devices which are not owned or controlled by the user and may not be trusted. As a result, the AR device may be considered as the most trusted device. In some exemplary embodiments, in addition to the AR device, an edge device may be determined to be trusted based on a user's indication, upon identifying that a same user owns both the AR device and the edge device, or the like.

In some exemplary embodiments, skins may be executed on different execution platforms, e.g., while complying with one or more constraints such as privacy constraints, time requirements, or the like. In some exemplary embodiments, privacy constraints may define that certain skins, types of objects, or the like, may be executed only on trusted devices. In some exemplary embodiments, time requirements may define that an execution of a layer, including the roundtrip between the executing device and the AR device, will be performed swiftly, e.g., not longer than $\frac{1}{50}$ of a second or than any other time threshold.

In some exemplary embodiments, in case the edge device is not determined to have its own sensors, or in case utilizing the edge device's sensors is not estimated to be useful, Step 2020-2030 may not be performed.

On Step 2020, the edge device may be determined to have its own sensors, e.g., a camera. In some exemplary embodiments, in case the edge device is located near the AR device, the edge device may utilize its sensors in order to capture frames depicting the same objects as the AR device. For example, a user may wear AR glasses and observe a neighbor that came for a visit, while the user's cellphone that may be held by the user, may function as an edge device, and may capture the same neighbor from a slightly different angle.

On Step 2030, partial sensor information may be provided to the edge device. In some exemplary embodiments, in case the edge device has its own sensors, not all the sensor data from the AR device may be necessarily provided to the edge device, e.g., since the edge device may be able to independently accumulate supplement sensor information to restore the original frame based thereon. For example, the AR device may provide the edge device a portion of the captured frame, and the edge device may complete the missing frame information based on sensor information gathered at the AR device depicting the same area, e.g., in a slightly different angle. In some exemplary embodiments, image processing techniques may be utilized by the edge device to match its sensor information with the captured angle of the AR device. In some exemplary embodiments, the AR device may provide sufficient sensor information so that an angle of the AR device may be determinable based thereon. In some exemplary embodiments, distributing only a portion of the AR device's sensor information may save time and transmission costs.

Figure 21:
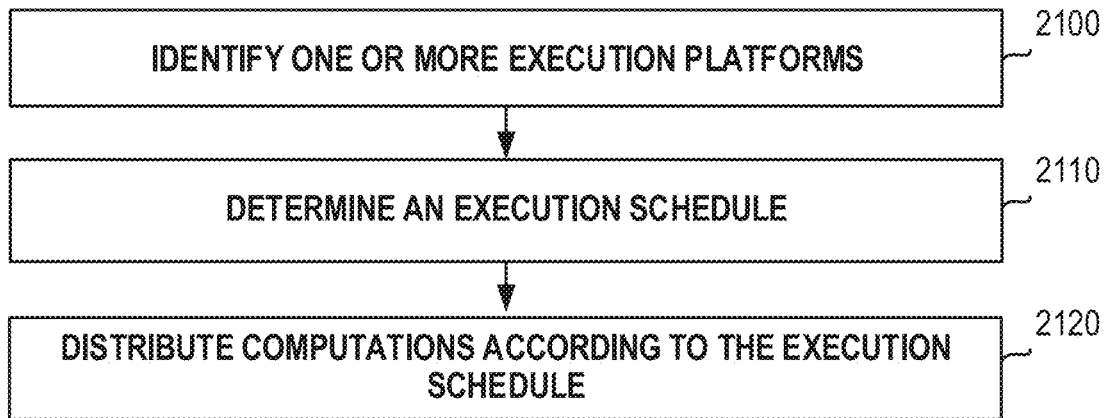
FIG. 21 shows a flowchart diagram of a method, in accordance with some exemplary embodiments of the disclosed subject matter.

Referring now to FIG. 21 illustrating a flowchart diagram of a method, in accordance with some exemplary embodiments of the disclosed subject matter.

On Step 2100, one or more devices or execution platforms may be identified, e.g., an edge device, a remote cloud server, a nearby server, or the like. In some exemplary embodiments, it may be desired to reduce a battery drain of the AR device by executing some tasks on one or more other execution platforms, devices, or the like. Additionally, or alternatively, some tasks may require a large amount of computational power that the AR device may lack. Hence, it may be desired to execute some tasks on another computerized device or platform.

In some exemplary embodiments, a distributed execution of one or more skins may be performed by distributing an execution of a layer on an object of a frame, a portion of a frame, an entire frame, a portion of the layer's functionality, a full layer's functionality, or the like, to the one or more devices. In some exemplary embodiments, a skin in a distributed AR system may be applied locally on the AR device, applied on an edge server which may be trusted or not, applied on a remote cloud server, or the like.

In some exemplary embodiments, a user may indicate preferred or required execution locations indicating which devices are to execute which layers, which objects, or the like, thus constituting a user constraint of the AR framework. In some case, a user preference may constitute a soft constraint, e.g., which may be overwritten in some cases, while in other cases a user preference may constitute a hard constraint, e.g., which must be fulfilled. In some exemplary embodiments, certain layers can only be executed on a certain platforms, e.g., for technical reasons, which may constitute an additional technical constraint. For example, a layer of facial recognition configured to recognize the user's friends may require access to a personal database of images, which may only be accessible to any device. According to this example, in case only the AR device has access to the personal database, the layer may be executed on the AR device alone, in order to comply with the technical constraint. In other cases, any other platform or device may have access to the personal database. As another example, a skin may be installed on a first platform and not on a second platform, adding a technical constraint as the skin can only be executed where it is installed. It may be desired to find an enhanced distribution of execution platforms, e.g., in terms of resource utilization such as latency and execution time, while complying with one or more privacy constraints, user constraints, technical constraints, or the like.

On Step 2110, a schedule of executions may be determined, obtained, or the like. A schedule allocator may determine a schedule of distributed executions while taking into consideration the user defined constraints, the technical constraints, as well as expected power usage (battery), computational resources, privacy requirements, speed, communication costs, or the like. In some exemplary embodiments, the schedule allocator may determine an execution schedule that is configured to minimize the computational cost, battery usage, overhead, and the like, maximize the performance speed, the AR quality, or the like, while complying with the constraints.

In some exemplary embodiments, the schedule allocator may be configured to schedule an execution platform for each layer or portion thereof that is to be executed. In some exemplary embodiments, the schedule allocator may utilize one or more optimization algorithms, resource allocation solvers, or the like, to determine an execution schedule that complies with the constraints and enhances a performance of the AR framework, e.g., timewise, computational-wise, resolution-wise, or the like. In some exemplary embodiments, the schedule allocator may utilize a classifier, a predictor, or the like.

In some exemplary embodiments, the schedule allocator may determine an execution schedule based on a predicted execution time of each layer. In some exemplary embodiments, a predictor may be deployed to estimate an execution time of different layers at different execution platforms, a communication time between devices, a quality of outcome associated with executing layers on certain execution platforms, or the like. In some exemplary embodiments, an estimated execution time for a frame may be determined, e.g., based on a plurality of identified objects in the frame and based on corresponding layers that are registered on each of the identified objects. In some exemplary embodiments, determining the estimated execution time may comprise determining for each identified object corresponding execution times of registered layers that are registered on the each identified object.

In some exemplary embodiments, upon identifying that an object of the plurality of identified objects has an execution time that is greater than execution times of remaining objects from the plurality of the identified objects, the object may be determined to be an execution bottleneck. In some exemplary embodiments, execution of registered layers that are registered on the object may be distributed to an execution platform. In some exemplary embodiments, the execution platform may be selected in case it has greater computational resources than the AR device.

In some exemplary embodiments, an object that has a large number of registered layers and is predicted to have a long execution time, may be identified as a bottleneck, and may be sent to a device with a strong CPU so that the execution may be completed in the desired timeframe. For example, the schedule allocator may consider that a certain device, e.g., the user's laptop, has a strong CPU and based on this consideration, allocate computationally challenging tasks to the laptop, e.g., in case the privacy constraints and technical constraints enable the schedule allocator to do so.

On Step 2120, computations of registered layers may be distributed according to the execution schedule. In some exemplary embodiments, the schedule allocator may schedule executions of layers that are registered on a current frame, of pre-processing tasks such as facial recognition tasks, of post-processing tasks such as combining different overlay outputs to create an AR view, or the like. In some exemplary embodiments, an execution of the layers may be configured to be distributed according to the schedule.

Figure 22:
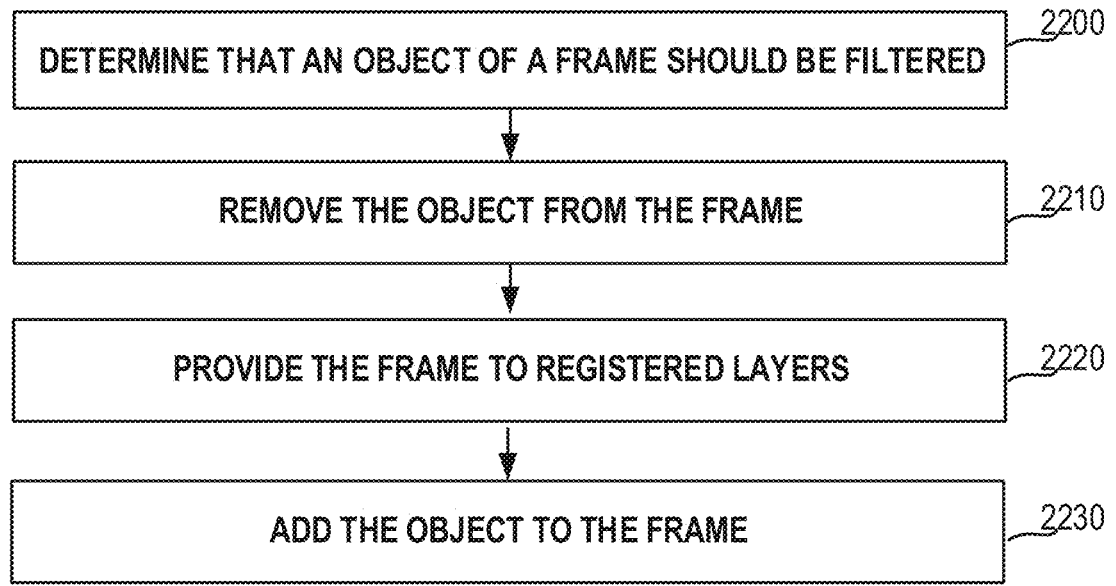
FIG. 22 shows a flowchart diagram of a method, in accordance with some exemplary embodiments of the disclosed subject matter.

Referring now to FIG. 22 illustrating a flowchart diagram of a method, in accordance with some exemplary embodiments of the disclosed subject matter.

On Step 2200, an object in a frame may be determined to be filtered. In some exemplary embodiments, a filtering technique may be used for hiding sensitive information from non-trusted computerized devices. In some exemplary embodiments, filtering may be used to preserve a user's privacy so that untrusted devices or software will not process private information, gain access to private information, or the like. In some exemplary embodiments, a filtering technique may be used to filter an object with regard to one or more skins alone, e.g., in order to enhance a computational performance. For example, a layer that is estimated to have no impact and to be overrun by a subsequent layer, may be configured to obtain a filtered frame that does not enable it to perform any processing. It is noted that the filtering may be for specific objects and not necessarily all objects of the same type. As an example, if a first skin is configured to color pets in red, and a second skin is configured to color all cats in blue, cats in the frame may be filtered out for the first skin, as its activity on them will not have an impact in the final output.

In some exemplary embodiments, skins may not be enabled to register to objects that are determined to be filtered. In some exemplary embodiments, objects that are assigned to be filtered may be automatically filtered by removing or cropping the object from the image so that the layers will not be executed on the filtered object. In some exemplary embodiments, objects may be filtered when belonging to a category that was selected to be filtered, when classified as sensitive, or the like.

In some exemplary embodiments, facial recognition may be performed to a human object to classify him to a defined group, e.g., of acquaintances, friends, strangers, romantic partners, or the like. In some exemplary embodiments, non-human objects may be classified according to any image processing technique to categories such as intimate objects, dangerous objects, or the like, which may be default categories, user-defined categories, or the like. In some cases, certain categories may be determined as sensitive categories by default. In some exemplary embodiments, a classification of objects may be performed based on databases, facial recognition techniques, object recognition techniques, or the like. In some exemplary embodiments, a user may indicate a group identity or category of different objects, e.g., human or non-human. For example, a user may indicate that a certain human object in a database is his friend, is a stranger, or the like. Additionally or alternatively, detected human or non-human objects may be classified according to a context such as identified behavior or attributes. For example, a human object that passes by in a public area may be classified as a stranger, a human object that is viewed often may be classified as an acquaintance, a non-human object that is recognized as a gun object may be classified as dangerous, or the like.

In some cases, the user may select certain classifications to be filtered, or indicate what classifications should be filtered. In some exemplary embodiments, certain types of private or non-private information may be determined to be filtered, e.g., a head of human objects, private body parts, or the like. In some exemplary embodiments, one or more categories may be filtered automatically, unless indicated otherwise by the user. In some exemplary embodiments, a classifier may be applied on a captured frame to classify one or more objects in the frame as sensitive objects, to identify one or more categories of the object, or the like, to which the filtering may be applied according to the user's choice.

For example, a lawful user may indicate that dangerous objects such as guns should not be classified as sensitive, as he may not be concerned that images depicting such objects may be used against him. However, a criminal user may wish to hide his weapon-based crimes and indicate that dangerous objects are sensitive and should not be shared with other devices or software.

On Step 2210, an object that is determined to be filtered may be removed from the frame, e.g., prior to executing registered skins of the frame. In some exemplary embodiments, filtered objects or frame portions may be cropped out of the frame, may be indicated as such, may be assigned a bit representation of zero in a bitmap of a frame, or the like, so they will not be processed by the skins. In some exemplary embodiments, a patch including a filtered object may be cropped out of the frame. In some exemplary embodiments, the patch may have a geometrical shape such as a square or any other shape non-geometrical that does not comprise an outline of the object, thus disabling a receiving party to determine an identity of the cropped object based on the outline of the missing patch. In some cases, a geometrical shape for the patch may be selected based on the dimensions of the object. For example, in case the filtered object is a thin and long gun, the cropped patch may be selected to have a shape of a rectangle that covers the gun, thereby preventing others from identifying the gun's outline while reducing an amount of excess cropping.

On Step 2220, the frame may be provided to registered layers, e.g., without the filtered object. In some exemplary embodiments, skins may only register to objects that remain in the frame after filtering out the one or more filtered objects.

For example, a law may require that driving signs will not be processed with AR layers at all. According to this example, driving signs may be configured to be filtered, e.g., automatically, based on user indications, or the like. In some exemplary embodiments, upon identifying a driving sign in a frame, the driving sign may be filtered out from the frame prior to forwarding the frame to be processed by any layer. According to this example, after processing remaining portion of the frame that do not depict a driving sign, the driving signs may be inserted back to the frame as part of the AR view. In some exemplary embodiments, a layer that registers to all types of signs may not register to the frame, as the sign was filtered out.

On Step 2230, the object may be added to the frame. In some exemplary embodiments, after executing the skins and obtaining a resulting overlay, the filtered objects may be added back to the AR view, together with the resulting overlay. In some cases, an end stage of the frame execution may be configured to ensure that the overlays obtained from the skins do not overlap with the area of the filtered object or with pixels thereof, e.g., using a bitmap representation of the filtered areas.

Figure 23:
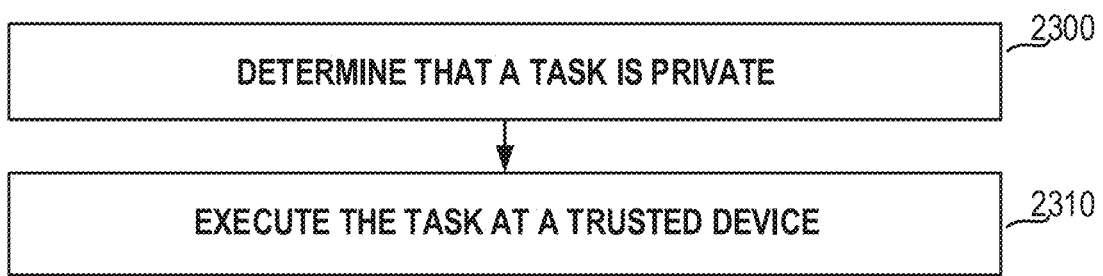
FIG. 23 shows a flowchart diagram of a method, in accordance with some exemplary embodiments of the disclosed subject matter.

Referring now to FIG. 23 illustrating a flowchart diagram of a method, in accordance with some exemplary embodiments of the disclosed subject matter.

On Step 2300, a task associated with an object in a frame, an entire frame, a portion of the frame, or the like, may be determined to be private. In some exemplary embodiments, a user may not want untrusted devices to receive access to private information such as data indicating sensitive objects, his field of view, the object he is viewing, an active layer, or the like. For example, an active layer may include an embarrassing layer such as an undressing application which may be desired to remain private. In some exemplary embodiments, private objects may include objects that the user would prefer not to reveal to a third party, not to enable leakage thereof, or the like. In some exemplary embodiments, the user may not wish that a third party will know with whom he is talking, his location, at what objects he is looking at, or the like. As an example, the private objects may be faces of people, intimate body parts, a document having a "confidential" title, a screen showing source code of a program, or the like. In some cases, certain defined locations may be determined or defined to be confidential, e.g., a home location, a work location, or the like.

In some exemplary embodiments, a user may wish to hide the fact that she utilizes a certain skin. The skin may be considered as a private information and the execution thereof may be a private task, to avoid revealing the user's usage of the private skin. As an example, the skin may be a dating skin, a skin that performs unethical operations, such as undressing bystanders, a skin that accesses non-legitimate data sources, such as dark web or illegal databases, a skin that is ethical but may be embarrassing to the user such as a memory aid skin, a translation skin, or a social aid skin for socially awkward people, or the like. In some exemplary embodiments, the fact that the user utilizes a skin may be, generally, disclosable information. However, the specific configuration of the skin may be considered as private information. For example, the user may provide parameters to a skin that affect its operation. The user may wish to conceal the parameters. Additionally or alternatively, the user may wish to conceal some operation of the skin, such as when operating on a specific object, a specific type of object, or the like. Accordingly, execution of the skin may be considered as private tasks depending on the operation of the skin, on whether or not the parameters are provided to the execution environment, on whether the content of the parameters is reflected by the objects being processed, or the like. As an example, the user may configure a skin to operate on both minors and adults and may wish to conceal the fact that the skin is being applied on minors. Hence, execution of the skin on an object representing an adult may be considered a non-private task, while execution of the skin on an object representing a minor may be considered as a private task. Additionally or alternatively, the application of a skin on a minor may be considered as a private task to avoid divulging information regarding minors to untrusted parties, such as information reflected from the frame or obtained by the skin when operating.

In some exemplary embodiments, in order to prevent private information from being accessed by untrusted devices, AR tasks may be classified to private tasks and to non-private tasks. The non-private tasks may be executed by any available device, including non-trusted devices, while the private tasks may be executed by a trusted device. In some exemplary embodiments, private tasks may include any task that involves private information. In some exemplary embodiments, classifying the private tasks and the non-private tasks may be based on a privacy policy. In some exemplary embodiments, the privacy policy may define private information, private information that is to be executed on trusted devices alone, non-private information that is to be executed on trusted devices alone, or the like. As an example, the privacy policy may require executing a skin that is configured to identify faces, on a trusted device such as an edge server, the AR device, or the like. Additionally or alternatively, a non-private task may comprise executing non-private skins registered on non-private objects, on non-trusted devices.

In some exemplary embodiments, based on the privacy policy, the skins may be distributed to execution platforms that match the privacy constraints of the user. In some exemplary embodiments, the privacy policy may indicate for each skin whether or not it is defined as a private skin, for each object whether or not it is defined as a private, or the like. In some exemplary embodiments, for each new object, new frame, new implementation of object recognition techniques, or the like, the framework may determine whether or not they are classified by the privacy policy as comprising private information, being a private task, or the like.

On Step 2310, a schedule allocator may allocate a private task may be executed on a trusted device, e.g., the AR device, the edge device, or the like. In some exemplary embodiments, upon identifying that a certain task is private, the task may be executed on trusted devices alone. In some exemplary embodiments, the trustiness property of a device may be determined by the user, determined based on rules such as ownership of the device, or the like. In some exemplary embodiments, the trustiness property of a device may differ based on context. For example, an AR device that is lent to the user by third parties may be considered a non-trusted device. An edge device that is owned by the user, such as an edge device installed in his car or in his home or a mobile device acting as an edge device, may be considered as a trusted device, while an edge device installed in a rental car, in a hotel room, in a shopping mall, or the like, may be considered as a non-trusted device. As another example, the trustiness property of the cloud server may differ. In some cases, the user may trust the cloud server as it is owned and controlled by a company that he trusts, even more so than an edge device controlled by a third party. In other cases, the cloud server may not be trusted.

In some exemplary embodiments, the AR device, along with one or more additional devices such as edge device owned by the user, may be considered as trusted devices. In some exemplary embodiments, the AR device may be a trusted device. Additionally, or alternatively, the AR device may be a non-trusted device. As an example, a user may rent an AR device, borrow an AR device, or the like. The owner of the AR device may be able to obtain a portion of the data from the AR device. Hence, the AR device may not be considered as a trusted device. In some exemplary embodiments, an edge device may be a trusted device. The edge device may be a personal computer, a smart phone of the user, or the like. Additionally or alternatively, the edge device may be a non-trusted device. As an example, a user may rent a car. The car infotainment system may be the edge device. As the user has no control over the data that the car infotainment system may collect, the edge device may be a non-trusted device.

In some exemplary embodiments, trust levels that are required from computerized devices may be defined in order to execute tasks with corresponding privacy levels. In case that there are no computerized devices having a trust score that is above a determined threshold for executing a private skin on object thereon, the AR system may exclude that skin from the set of skins, exclude the object from the set of objects, or the like.

Figure 24:
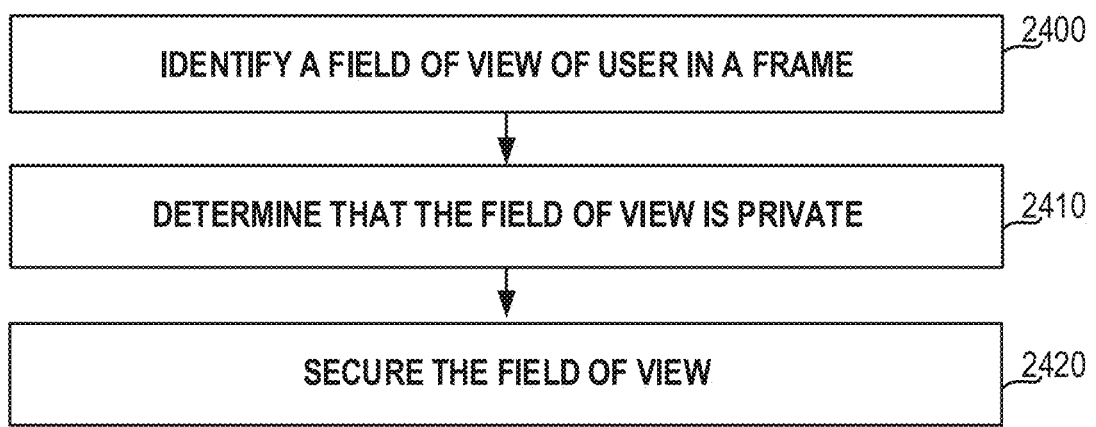
FIG. 24 shows a flowchart diagram of a method, in accordance with some exemplary embodiments of the disclosed subject matter.

Referring now to FIG. 24 illustrating a flowchart diagram of a method, in accordance with some exemplary embodiments of the disclosed subject matter.

On Step 2400, a field of view of a user may be identified. In some exemplary embodiments, an AR device may be configured to monitor the point of fixation of the user, e.g., using a sensor, an eye tracking device, a camera, an infrared camera, or the like. The point of fixation may be an area in the frame at which the user is looking. In some exemplary embodiments, it may be desired to hide images and objects that the user is fixating at from non-trusted devices. As an example, the user may be on a date, watching a show. The user may be staring at an actress' bosom, not paying any attention to the show. The user may wish to hide it from his date. In some exemplary embodiments, it may be desired to hide the point of fixation of a user from any device in order to minimize the ability of third parties to create a psychological profile of the user.

In some exemplary embodiments, based on the field of view of the user, a peripheral portion of the frame may be determined. In some exemplary embodiments, the peripheral portion of the frame may a portion that is sensed by the user's peripheral vision. The frame may be divided to peripheral portion and non-peripheral portion. In some exemplary embodiments, the non-peripheral portion of the frame may be an area in the frame corresponding to the area on which the user is looking. In some cases, peripheral portions of frames may be processed differently, such as in a lower resolution to conserve resources.

In some exemplary embodiments, the AR device may be configured to utilize field of view information in preparing the AR display. For example, in order to decrease battery consumption of the AR display, resolution of the AR display may be reduced in the areas of a frame that are outside the point of fixation of the user or are captured by the peripheral vision of the user. As another example, in some cases, objects that are not in the point of fixation of the user, may not be processed by skins. As an example, a skin may analyze people and provide additional information about that person, such as name, position, or the like. It may be desired to only process people that the user is looking at, e.g., within the user's focal point.

Although the eye tracking information may be useful and required for such processing, the user may wish to guard his privacy and avoid sharing such information. As an example, a person looking at a crowd, may not wish to share with third parties the fact that he is looking at a woman's bosom. In some exemplary embodiments, a skin may register on an object in case the object is not in a peripheral view of the user, or vice versa. In some exemplary embodiments, a user or any other entity may decide that a skin is only to be registered on a non-peripheral view of the user. As an example, a user may decide that low-priority skins, entertainment skins, or the like, are only to be processed in case their registered object is in the focus of the user, is in his direct field of view, or the like.

On Step 2410, it may be determined whether the field of view of the user is private in a certain frame, e.g., based on the content of the frame, such as comprising confidential objects, based on information embodied therein, or the like. In some exemplary embodiments, the frame's field of view portion may be automatically determined to be private, e.g., regardless of the frame's content.

On Step 2420, in case the user's the field of view is determined to be private, the user's field of view may be secured. In some exemplary embodiments, in case the frame is configured to be executed at a trusted device, e.g., by the execution schedule, the field of view of the user may be fully shared with the trusted device. In some exemplary embodiments, in case the frame is configured to be executed at a non-trusted device, the viewing direction may not be shared in order to ensure that a viewing direction of the user is not accessed by untrusted devices. I In some exemplary embodiments, in order to conceal the user's field of view, information about the field of view may be disabled, may not be shared, may be shared in part, or the like. In some cases, while using untrusted devices to execute a layer, the viewing direction may not be shared at all. In some exemplary embodiments, in order to conceal the user's field of view, information about the field of view may be provided implicitly to processing layers, e.g., in an unrestorable manner. As an example, the AR device may provide an indication of a number of portions of the frame that are to be processed in high resolution, while the portions include the field of view portion of the frame. In some cases, the additional portions may comprise randomly selected portions, or any other portions, thereby reducing an ability to track the user's field of view.

In some exemplary embodiments, in case the viewing direction is configured to be used to enhance a resolution of the viewed area, and the frame is configured to be executed at a non-trusted device, a resolution of the frame including the viewing direction may be downscaled or retained prior to being sent to the untrusted device, and after receiving the output overlay, the resolution of the viewing direction may be enhanced at a trusted device such as the AR device.

Additionally or alternatively, in case the viewing direction is configured to be used to enhance a resolution of the viewed area, a number of areas, including the viewing direction, may be randomly selected to have an enhanced resolution so that the viewing direction may not be determinable at the untrusted device. In some exemplary embodiments, a number of areas may be randomly determined to have an enhanced resolution, including the viewing direction, so that the viewing direction may not be determinable at the untrusted device. In some exemplary embodiments, the AR device may downscale a resolution of the additional portions upon receiving results from the layers.

In some exemplary embodiments, in case the viewing direction is configured to be used to process viewed objects, the AR device may provide one or more additional patches of the frame to be processed, in addition to patches depicting the objects that are included in the user' field of view. In case only objects that are in the field of view of the user are to be processed, the AR device may provide one or more additional patches of the frame to be processed, in addition to patches depicting the objects that are included in the user' field of view.

Figure 25:
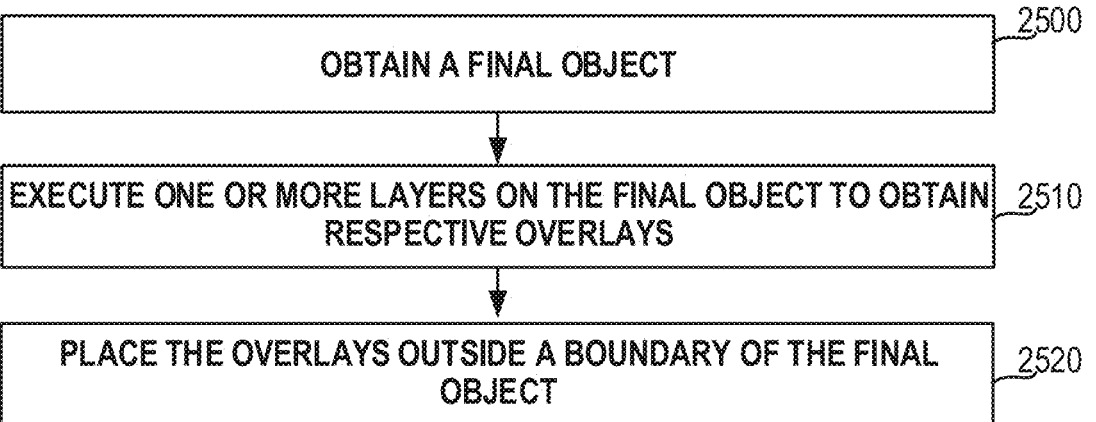
FIG. 25 shows a flowchart diagram of a method, in accordance with some exemplary embodiments of the disclosed subject matter.

Referring now to FIG. 25 illustrating a flowchart diagram of a method, in accordance with some exemplary embodiments of the disclosed subject matter.

On Step 2500, objects or frame portions that are unchangeable, untouchable, final, or the like, may be determined, defined, indicated, obtained, or the like. In some exemplary embodiments, regions of a frame may be defined as frame portions that are final and thus are untouchable, unmodifiable, or the like. In some exemplary embodiments, one or more defined portions of a frame may be defined as non-touchable portions, e.g., in order to enhance an AR experience of the user, enhance a privacy of the user, or the like.

In some exemplary embodiments, layers may be assigned with different permissions relating to permitted access to data, permitted actions, permission to assign an object as final, permission to filter an object. In some exemplary embodiments, layers that have permission to assign objects as final may include, for example, layers that create real-time alerts, layers that detect or create objects that should be untouchable, or the like. In some exemplary embodiments, objects may be assigned as final in any other manner, e.g., by user instructions, designer indications, default settings, rules, classifiers, heuristics, or the like. For example, a graphic designer may determine that certain objects should be considered to be final and should not be modified, e.g., in order to enhance an esthetic aspect of the AR experience, or for any other reason. As another example, a layer may be configured to create a new object such as a label and assign it to be final.

On Step 2510, one or more layers of the final object may be executed on the final object to obtain respective overlays. In some exemplary embodiments, layers that are registered on objects or frame portions that are final may nevertheless be executed on the final objects to provide output overlays. In some exemplary embodiments, in contrary to filtered objects that are not to be processed by any layer, an area that is indicated as final may be processed, but no output of any layer may be enabled to overwrite on any part of the final object.

On Step 2520, the overlays may be placed outside of a boundary of the object. In some exemplary embodiments, a final object or frame portion may be implemented by a bitmap indicating which pixels are not final and can be modified (having a value of "0") and which pixels are final and thus cannot be modified (having a value of "1"). In some cases, the bitmap may be implemented in an opposite manner (a value of "1" for non-final portions, a value of "0" for final portions), or in any other manner. For example, instead of indicating every pixel as final or not final, only borders of final objects may be indicated. In some exemplary embodiments, during a final phase of generating the AR view, the final objects may be verified to be fully untouched and unmodified.

As an example, an AR application that attaches definitions of objects as labels may process balloon objects that are defined to be final and add the label "balloons" near the balloons without modifying the balloons themselves. Specifically, the label may be attached to an outer boundary of the balloons, but since they are defined as final, the label may not overwrite any pixel of the balloons. As another example, a highlighting application may be configured to generate a thick visible border around a final object, e.g., in order to highlight an identified final object such as chameleon during a walk in nature.

Figure 26:
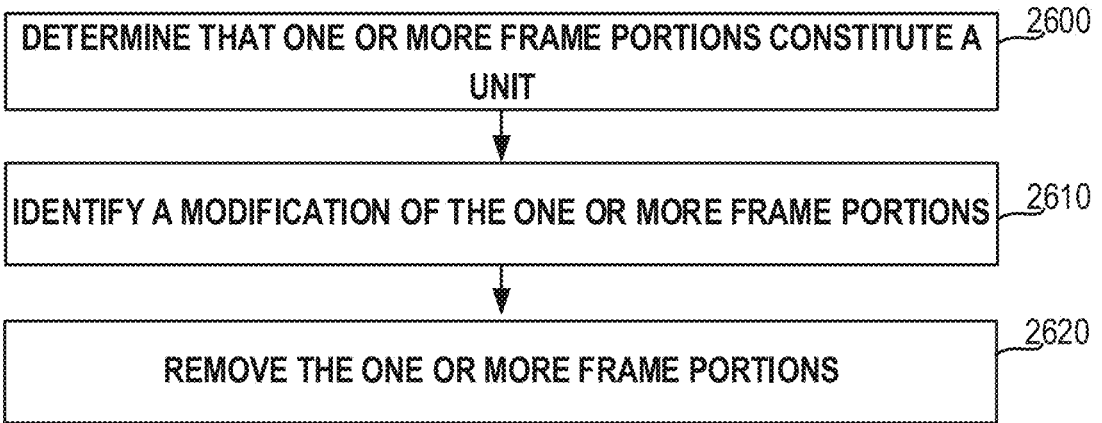
FIG. 26 shows a flowchart diagram of a method, in accordance with some exemplary embodiments of the disclosed subject matter.

Referring now to FIG. 26 illustrating a flowchart diagram of a method, in accordance with some exemplary embodiments of the disclosed subject matter.

On Step 2600, one or more frame portions may be determined to constitute a single closed unit, e.g., that depends logically on each other. In some exemplary embodiments, the unit may include a group of objects, a single object, one or more frame portions that are not an object, or the like. In some exemplary embodiments, one or more objects or other frame portions may be identified as a closed unit that must be kept together in its entirety, or at least partially. For example, a text that is placed near an object to display the object's definition is useless if part of the text is hidden, if the object is hidden, or the like, e.g., making the text unreadable or meaningless. In such cases, when only a portion of the unit is available or remains, the entire unit should be removed.

In some exemplary embodiments, a closed unit may be entirely dependent on each other, or may have any other dependency relationship. In some exemplary embodiments, in case each portion of the unit depends on each other portion, a modification of one portion may cause the entire unit to become meaningless. In some exemplary embodiments, in case a first portion of the unit depends on a second portion, a modification of the first portion may cause the first portion to become meaningless, and a modification of the second portion may cause the first portion to become meaningless, but a modification of both portions may not cause the second portion to become meaningless.

In some exemplary embodiments, a closed unit may be defined in a more specific or detailed dependency level. In some cases, only a certain portion of the unit may be defined as a necessary portion, and a modification of a remaining portion that is not obligatory may not be considered sufficient to remove the entire unit. For example, for a label that has a thick surrounding boundaries, the label's text may be defined as necessary, while modifications that effect the boundaries but do not affect the text may not be regarded as a meaningful modification.

On Step 2610, a modification or change to the one or more frame portions of the unit may be identified. In some exemplary embodiments, the modification may modify a dependent portion of the unit, an independent portion thereof, or the like.

On Step 2620, a modification of the one or more frame portions may be determined. In some exemplary embodiments, the one or more frame portions may be removed, e.g., in response to identifying the modification. In some exemplary embodiments, in case the one or more frame portions are determined to be part of a unit that is only meaningful together, and at least one portion thereof is modified, the entire unit may be removed. In some exemplary embodiments, the modification may be due to a final object overwriting a unit portion, due to one or more layers modifying a unit portion, due to a high priority object hiding a portion of the unit, or the like.

As an example, the unit may comprise a "balloons" label placed near a balloon object, e.g., as a descriptive label. A peanut alert may be indicated as a final portion or as an untouchable portion that cannot be overwritten and thus has priority over a portion of the "balloons" label. According to this example, since the "balloons" label is only meaningful when all the words are visible, and since the "balloons" label has lower priority than the final peanut alert, the entire label will be removed.

In some exemplary embodiments, in case the modified portion is a dependent portion that depends on the remaining unit, only the modified portion may be removed. For example, a first layer may generate a tree object replacing a car object, and a second layer may add a bird nest to the tree of the first layer. In such a case, the bird nest is dependent on the tree should not be visible without the tree, e.g., since the tree is where the nest can be located. According to this example, in case a third layer replaces the tree object with a bicycle, the bird nest should be removed as well.

In some exemplary embodiments, in case the modification is a minor modification that does not modify a meaning of the modified portion, the unit may not be removed. For example, in the example above where the first layer generates a tree object and the second layer adds a bird nest to the tree of the first layer, the bird nest and the tree may be determined to be a unit. In case the bird nest or the tree are mildly modified by a subsequent layer, e.g., removing one branch of the tree, the unit may not lose its meaningfulness and may not be removed.

Figure 27:
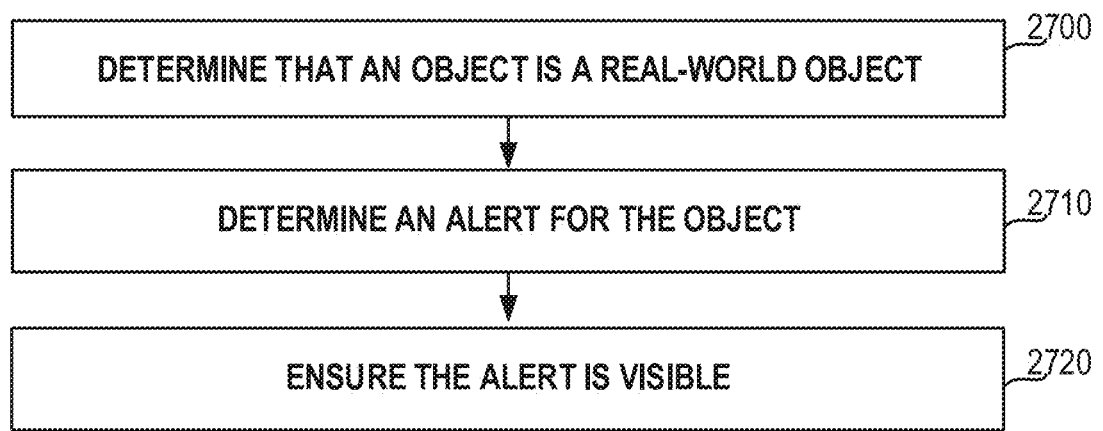
FIG. 27 shows a flowchart diagram of a method, in accordance with some exemplary embodiments of the disclosed subject matter.

Referring now to FIG. 27 illustrating a flowchart diagram of a method, in accordance with some exemplary embodiments of the disclosed subject matter.

On Step 2700, an object may be determined to be a real-world object, e.g., being in a non-virtual surroundings of the user. In some exemplary embodiments, a "realness" attribute may refer to the object being real, e.g., not being created by a software, a layer or the like, the object not being displayed on a displaying platform such as a screen or sign, or the like. Alternatively, the "realness" attribute may refer to information associated to the frame being real, such as real-time communicated information that may be processed by a skin and displayed as an overlay, driving information that is indicated by a road sign, or the like. In some exemplary embodiments, an object may be classified as real or not, or as indicating real information, in order to provide an alert to the user, perform a real-world functionality, or the like. For example, a layer may wish to add overlay glasses to real-world cats alone. As another example, a layer may wish to add real-time traffic information obtained from the police department. As another example, for a user that is allergic to peanuts, it may be desired to identify whether a displayed peanut or peanut-based snack in a frame is a real world peanut, or whether the peanut is an overlay from a previous layer, is displayed by a real-world screen, is displayed on a real-world sign, or the like. In case the peanut is indeed a real-world non-virtual peanut, it may be required to generate an alert to the user to indicate the immediate danger. Alerting the user of a fake peanut, e.g., that is filmed in a movie, or the like, may not be desired.

In some exemplary embodiments, in order to differentiate between real objects and fake objects, a plurality of techniques may be utilized such as image processing techniques, 3D analysis of distances within the frame, identification of screens, or the like. In some exemplary embodiments, a classifier, a predictor, or the like, may be trained to identify whether or not frame objects or other frame portions are real or not, e.g., based on a tagged dataset of real and non-real objects, information gathered over time, success rates of previous classifications, heuristics, or the like. In some exemplary embodiments, failure and success rates of the classifier may be utilized to further enhance precision of the classifier's predictions. In some exemplary embodiments, the classifier may be trained based on a big data analysis. In some exemplary embodiments, the classifier may be trained based on any other information, using any classification technique, or the like.

In some exemplary embodiments, the classifier may obtain as an input the raw data frame, e.g., which may not comprise processed overlays. In some exemplary embodiments, prior to determining an order of execution of registered layers that are registered on a frame, the layers may be classified as real-world layers that are registered to raw frames, semi real-world layers that are registered to at least some raw portions or indications of a frame, or regular layers that are not sensitive to a realness attribute of the frame. In some exemplary embodiments, real-world layers or applications may be processed based on the original frame alone. In some exemplary embodiments, semi real-world layers or applications may be processed based on a combination of real and artificial data. For example, a layer may obtain a processed frame depicted a colored cat, query the AR framework whether or not a depicted cat is real, and in case that the cat is real, the layer may add glasses to the cat regardless of previous executions that were performed on the cat object such as coloring the cat.

In some exemplary embodiments, real-world object detection may be performed as part of a pre-processing process prior to registering layers to the frame. In some exemplary embodiments, since real-world layers require raw data, they may be executed in parallel, in a non-sequential order, in overlapping timeframes, or the like. In some exemplary embodiments, based on the classification of objects in the frame as real-world objects, an optimization algorithm may be implemented to determine desired execution configurations and locations of the layers, that comply with any user instructions (if exist).

On Step 2710, an alert may be determined for the real-world object. In some exemplary embodiments, based on the classification of the object as a real-world object, layers that are registered to such real-world objects may process them accordingly. In some exemplary embodiments, layers that are not concerned with realness of frame portions may not obtain or determine realness attributes of objects or may ignore such information.

In some exemplary embodiments, some real-world layers may be configured to generate alerts, notifications, warnings, or the like, upon identifying a real-world object that is estimated to be dangerous. For example, a medical real-world layer identifying ingredients that the user is allergic to may generate an alert, a military layer identifying military dangers may generate an alert, or the like. Such layers and overlays may be considered of high priority.

In some cases, real-world layers may not generate or display an alert, have high priority, or the like. For example, a real-world layer that replaces only real-world dogs with rabbits that have a similar color, may not be considered sensitive and may not require an alert.

On Step 2720, the AR framework may ensure that a generated alert is visible, e.g., so that it will not be hidden or modified on the final AR view. In some exemplary embodiments, the alert may be assigned to be final, e.g., according to the method of FIG. 25. In some exemplary embodiments, the alert may not be assigned to be final, but the final or ending stage of the AR view generation may be configured to ensure that the alert is entirely visible. In some exemplary embodiments, the final stage may obtain output overlays from the layers and may be combine the overlays to create the AR display. In some exemplary embodiments, the final stage may include ensuring that the alert is visible and unmodified in the AR display, that the object to which the alert relates is visible and unmodified, or the like.

In some exemplary embodiments, output alerts of real-world layers may have priority over other overlays in the final output, and in some cases, they may cancel at least some of the AR effects that were added by one or more skins. For example, an application may warn a person that is allergic to peanuts that a bag of snacks that is detected includes peanuts. In some cases, the peanut warning may cancel any processing that was done to the bag of snacks, even if modification to the bag of snacks were performed as final unmodifiable changes. In some cases, the final output of all layers may be examined to ensure that the alerted object is not hidden and that the warning or any other sign is visible.

Figure 28:
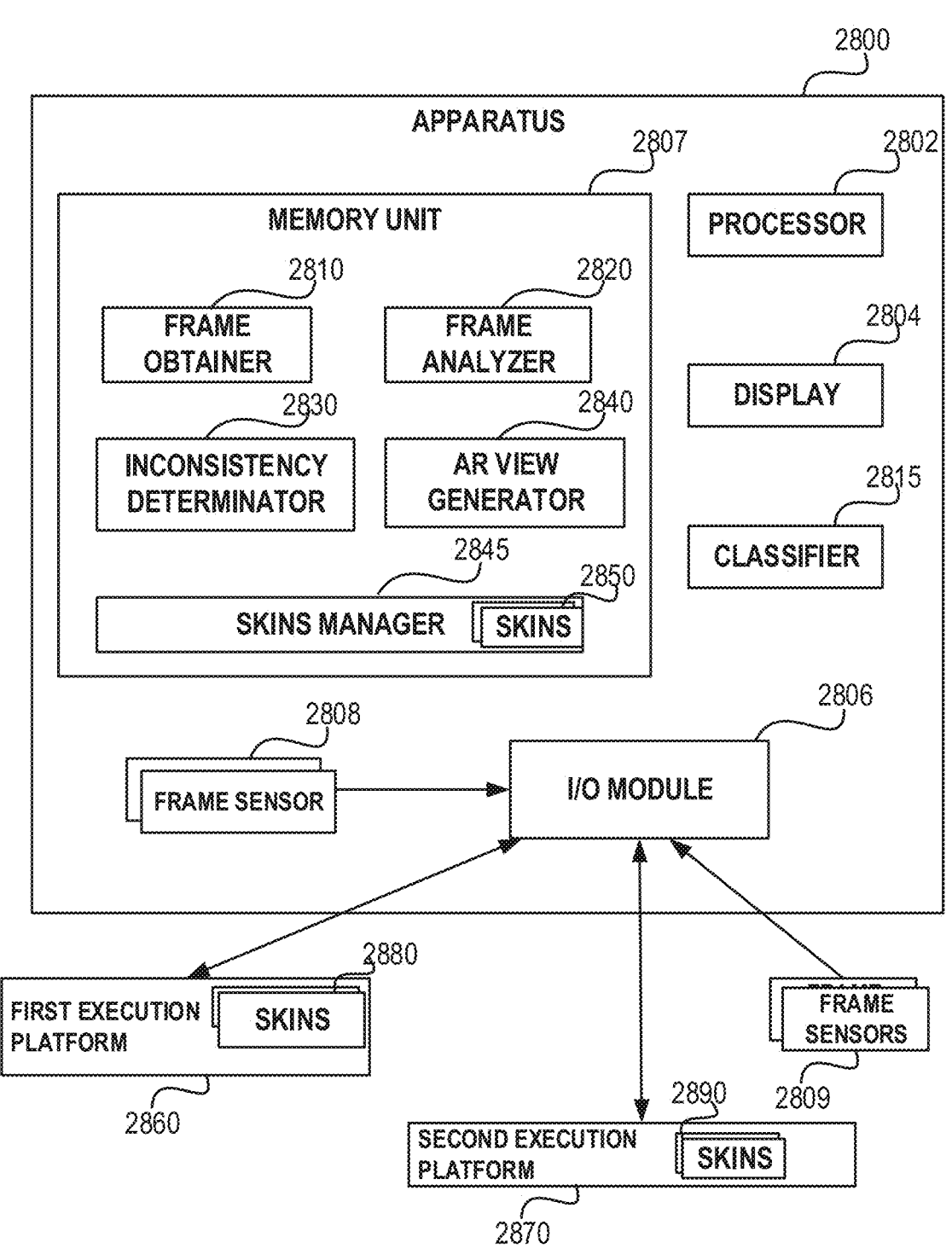
FIG. 28 shows an apparatus, in accordance with some exemplary embodiments of the disclosed subject matter.

Referring now to FIG. 28 showing an apparatus, in accordance with some exemplary embodiments of the disclosed subject matter.

In some exemplary embodiments, Apparatus 2800 may comprise Processor 2802. Processor 2802 may be a Central Processing Unit (CPU), a microprocessor, an electronic circuit, an Integrated Circuit (IC) or the like. Additionally or alternatively, Apparatus 2800 can be implemented as firmware written for or ported to a specific processor such as Digital Signal Processor (DSP) or microcontrollers or can be implemented as hardware or configurable hardware such as Field Programmable Gate Array (FPGA) or Application Specific Integrated Circuit (ASIC). Processor 2802 may be utilized to perform computations required by Apparatus 2800 or any of its subcomponents.

In some exemplary embodiments, Apparatus 2800 may comprise a Frame Sensor 2808. In some exemplary embodiments, Frame Sensor 2808 may include one or more imaging sensors, cameras, or the like, which may be configured to capture one or more frames. In some cases, Frame Sensor 2808 may be an integral part of an augmented reality devices such as AR glasses worn by the use, or any other AR device. In some cases, Frame Sensor 2808 may be external or internal to Apparatus 2800.

In some exemplary embodiments, Apparatus 2800 may comprise a Display 2804. Display 2804 may display augmented images to a user. The augmented images may be the result of frames captured by Frame Sensor 2808 and processed by Apparatus 2800, e.g., by Processor 2802.

In some exemplary embodiments, Apparatus 2800 may comprise an I/O Module 2806. Apparatus 2800 may utilize I/O Module 2806 as an interface to transmit and/or receive information and instructions between Apparatus 2800 and external I/O devices such as, First Execution Platform 2860, Second Execution Platform 2870, Frame Sensors 2809, or the like. Additionally, or alternatively, I/O Module 2806 may be used by Apparatus 2800 in order to send frames to First Execution Platform 2860, Second Execution Platform 2870, or the like. Additionally, or alternatively, I/O Module 2806 may be utilized in order to obtain overlays from First Execution Platform 2860, Second Execution Platform 2870, or the like.

In some exemplary embodiments, Apparatus 2800 may comprise AR glasses, which may enable to display augmented overlays that combine naturally with the surroundings of the user. In some exemplary embodiments, Apparatus 2800 may comprise a user device with a screen and a camera, such as a camera device, a personal computer, a television, a mobile device, a Tablet, or the like. In such cases, applications in the user device may be used to capture photos or videos, and augment thereto virtual overlays. For example, Apparatus 2800 may comprise a television or portion thereof that obtains television frames from a content source, and utilizes one or more skins to generate and display one or more virtual overlays over the television frames. As another example, Apparatus 2800 may comprise a mobile device application such as the ZOOM™ application that may utilize one or more skins to generate and display one or more virtual overlays over the rendered ZOOM™ videos, e.g., changing a background of a video, changing a human depicted in a video, or the like.

In some exemplary embodiments, First Execution Platform 2860 and Second Execution Platform 2870 may be communicate with I/O Module 2806 of Apparatus 2800, e.g., via a medium such as a wireless or wired network, a Wide Area Network (WAN) such as the Internet, a platform, or the like. For example, I/O Module 2806 may connect with Second Execution Platform 2870 via First Execution Platform 2860. In some exemplary embodiments, First Execution Platform 2860 and Second Execution Platform 2870 may be internal components of Apparatus 2800. In some exemplary embodiments, First Execution Platform 2860 and Second Execution Platform 2870 may be remote cloud servers, edge devices, or the like. For example, First Execution Platform 2860 may be an edge device such as a laptop, and Second Execution Platform 2870 may be a remote cloud server. Apparatus 2800 may utilize First Execution Platform 2860, Second Execution Platform 2870, or any other execution platform, in order to invoke skins thereon and obtain overlay results therefrom. Executing a skin on external execution platforms that are external to Apparatus 2800 may yield power saving results compared to executing the skin locally, e.g., at Apparatus 2800.

In some exemplary embodiments, Apparatus 2800 may comprise at least one Classifier 2815, or may have access thereto. In some exemplary embodiments, Classifier 2815 may comprise one or more classifiers, predictors, execution schedulers, resource allocators, or the like. In some exemplary embodiments, Classifier 2815 may comprise a trained Artificial Neural Network (ANN), a data-driven module, a heuristic-based module, an image processing module, or the like. In some exemplary embodiments, Classifier 2815 may be configured to predict outcomes of skins on objects, to predict one or more estimated execution times of skins, or the like.

In some exemplary embodiments, Apparatus 2800 may comprise a Memory Unit 2807. Memory Unit 2807 may be persistent or volatile. For example, Memory Unit 2807 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or the like; a semiconductor storage device such as Flash device, memory stick, or the like. In some exemplary embodiments, Memory Unit 2807 may retain program code to activate Processor 2802 to perform acts associated with any of the steps shown in FIGS. 14-16 and 18-27.

In some exemplary embodiments, Skins 2850 may be executed locally in Memory Unit 2807 or remotely on execution platforms such as First Execution Platform 2860, Second Execution Platform 2870, or the like. In some exemplary embodiments, Skins 2850 may be controlled by Skins Manager 2845, which may be configured to identify for each frame which skins of Skins 2850 are registered thereto, in what order, or the like.

The components detailed below may be implemented as one or more sets of interrelated computer instructions, executed for example by Processor 2802 or by another processor. The components may be arranged as one or more executable files, dynamic libraries, static libraries, methods, functions, services, or the like, programmed in any programming language and under any computing environment.

In some exemplary embodiments, Memory Unit 2807 may comprise a Frame Obtainer 2810. Frame Obtainer 2810 may obtain one or more subsequent frames from Frame Sensor 2808, from Frame Sensor 2809, from a remote cloud server, from an edge device, or the like.

In some exemplary embodiments, Memory Unit 2807 may comprise a Frame Analyzer 2820. Frame Analyzer 2820 may be configured to perform one or more preprocessing calculation of the frame, for example, to analyze frames in order to identify objects therein, e.g., via object recognition techniques, to perform facial recognition, to determine whether one or more depicted objects are artificial or real, to determine types of objects comprised by the frame, to determine a point of fixation of the user in the frame, or the like. In some exemplary embodiments, Frame Analyzer 2820 may provide its initial processing results to Skins Manager 2845.

In some exemplary embodiments, Memory Unit 2807 may comprise a Skins Manager 2845. In some exemplary embodiments, Skins Manager 2845 may be configured to obtain from Frame Analyzer 2820 frame information and identify one or more skins from Skins 2850 that are registered on each object in the frame. In some exemplary embodiments, Skins Manager 2845 may be configured to schedule executions of skins that are registered to a same object, to determine execution platforms for each layer, to determine whether or not speculative execution should be performed for two or more skins, to determine whether shadowing should be performed, to determine whether a reduced version of the skins should be provided, to filter one or more objects, or the like.

In some exemplary embodiments, Skins Manager 2845 may be configured to schedule execution of one or more of Skins 2850 that are registered on a same object, in parallel. For example, two or more skins may be executed in a non-sequential manner at Apparatus 2800 or at any other one or more platforms, e.g., First Execution Platform 2860 or Second Execution Platform 2870, regardless of the defined execution order between the skins. In some exemplary embodiments, Skins Manager 2845 may determine an execution schedule for skins based on predictions from Classifier 2815. In case results from Classifier 2815 indicate that two or more skins will have consistent overlays when processed non-sequentially, Skins Manager 2845 may schedule non-sequential execution for the skins, and vice versa.

In some exemplary embodiments, Skins Manager 2845 may be configured to distribute the execution of Skins 2850 to one or more execution platforms, devices, or the like. In some exemplary embodiments, Skins 2850 may be executed locally at Apparatus 2800, on one or more edge devices such as First Execution Platform 2860, on one or more remote external platforms such as Second Execution Platform 2870, or the like. For example, Skins Manager 2845 may be configured to determine a first skin in Skins 2850 to be executed locally by Apparatus 2800, a second skin in Skins 2880 to be executed on First Execution Platform 2860, a third skin in Skins 2890 to be executed on Second Execution Platform 2870, or the like.

In some exemplary embodiments, Apparatus 2800 may comprise Inconsistency Determinator 2830. Inconsistency Determinator 2830 may be configured to obtain two or more overlays that were generated in a non-sequential execution, and determine whether the overlays are inconsistent, have conflicting pixels, or the like. Inconsistency Determinator 2830 may determine that overlays are inconsistent in case that they are overlapping in pixels, in object areas, in frame regions, modify a semantic meaning of each other, or the like.

In some exemplary embodiments, upon identifying an inconsistency, Inconsistency Determinator 2830 may be configured to determine whether the inconsistency is minor and can be efficiently amended, or whether the inconsistency is major, and the second skin is to be regenerated based on the first overlay. Inconsistency Determinator 2830 may utilize Classifier 2815 in order to classify inconsistencies as minor or major, may utilize a threshold, may determine whether the resources are sufficient for an amendment, or the like.

In some exemplary embodiments, Skins Manager 2845 may be configured to reorder an execution order of Skins 2850, e.g., at an at least partially idle platform. In some exemplary embodiments, an alternative execution order may be determined randomly, based on Classifier 2815 indicating an order that is estimated to reduce resource utilization, or the like. In some exemplary embodiments, Inconsistency Determinator 2830 may determine whether the resulting overlay from the original order of execution is identical to the resulting overlay from the alternative execution order. In case they are identical, and the alternative execution order is determined to reduce resource utilization, the alternative execution order may be replaced with the original order of execution. In some exemplary embodiments, Skins Manager 2845 may be configured to obtain priorities of skins and exclude low priority skins in case the resources are insufficient for executing all of Skins 2850. In some exemplary embodiments, Skins Manager 2845 may be configured to reduce resolutions of one or more frame portions in order to reduce an execution time.

In some exemplary embodiments, Skins Manager 2845 may be configured to schedule executions of private tasks on trusted devices, e.g., Apparatus 2800 or a trusted edge device, and schedule executions of non-private tasks on any available platform. In some exemplary embodiments, Skins Manager 2845 may be configured to determine a schedule for skin execution based on one or more privacy constraints indicating whether a trusted device is required, one or more technical constraints indicating what execution platforms have sufficient data or software to execute a skin, or the like. In some exemplary embodiments, Skins Manager 2845 may be configured to determine the schedule to comply with constraints while reducing a latency, a CPU usage, a battery power usage, or the like.

In some exemplary embodiments, Apparatus 2800 may comprise an AR View Generator 2840. AR View Generator 2840 may be configured to obtain overlays generated by Skins 2850, e.g., according to Skins Manager 2845. AR View Generator 2840 may be configured to merge the overlays in order to form the AR view and to provide the AR view to Display 2804, e.g., while ensuring real-world alerts and final objects are not modified, units are retained fully, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by an Augmented Reality (AR) system, wherein the AR system is configured to provide an AR view, wherein the AR system comprises an AR device and at least one frame sensor, wherein the AR system is configured to utilize a plurality of applications to provide the AR view, the plurality of applications comprising a first application and a second application that are configured to provide respective augmented overlays to be used by the AR system in determining the AR view, wherein an application of the plurality of applications comprises an executable software that, when executed over a given display, generates a corresponding overlay, wherein the first and second applications are configured to process an augmented display according to an application execution order, wherein the application execution order defines that the second application should process an augmented overlay provided by the first application, the method comprising:

obtaining a frame from the at least one frame sensor;

executing the first application on a first portion of the frame to obtain a first overlay;

executing the second application on a second portion of the frame to obtain a second overlay, the first and second portions of the frame at least partially overlapping, wherein said executing the second application is performed without providing the first overlay to the second application, whereby said executing the second application violates the application execution order;

automatically determining whether the second overlay can be utilized for providing the AR view in spite of a violation of the execution order, said automatically determining is performed after said executing the second application;

generating the AR view based on the first overlay and based on said determining that the second overlay can be utilized for providing the AR view; and providing the AR view via the AR device.

2. The method of claim 1, wherein said determining whether the second overlay can be utilized for providing the AR view comprises determining whether the first and second overlays are inconsistent with each other.

3. The method of claim 2, wherein upon determining that the first and second overlays are inconsistent with each other, modifying the second overlay based on the first overlay to obtain a modified second overlay, wherein said generating the AR view comprises utilizing the modified second overlay.

4. The method of claim 3, wherein said modifying the second overlay comprises at least one of: amending pixels of the second overlay, and regenerating the second overlay thus obtaining a new second overlay by executing the second application on the first overlay, thereby disregarding the second overlay that was created without providing the first overlay to the second application.

5. The method of claim 2, wherein upon determining that the first and second overlays are not inconsistent with each other, utilizing the second overlay, without modifications, for generating the AR view.

6. The method of claim 2, wherein said determining whether the first and second overlays are inconsistent with each other comprises utilizing first metadata of the first overlay and second metadata of the second overlay.

7. The method of claim 2, wherein said determining whether the first and second overlays are inconsistent with each other comprises identifying overlapping pixels between the first and second overlays.

8. The method of claim 2, wherein upon determining that the first and second overlays are inconsistent with each other at an inconsistency score lower than a threshold, executing the second application comprises execution of the second application over a part of the frame smaller than the frame.

9. An Augmented Reality (AR) system that is configured to provide an AR view, wherein the AR system comprises:

an AR device; and at least one frame sensor, wherein the AR device is configured to utilize a plurality of applications to provide the AR view, the plurality of applications comprising a first application and a second application that are configured to provide respective augmented overlays to be used in determining the AR view, wherein an application of the plurality of applications comprises an executable software that, when executed over a given display, generates a correspond-
ing overlay, wherein the first and second applications
are configured to process an augmented display accord-
ing to an application execution order, wherein the
application execution order defines that the second
application should process an augmented overlay pro-
vided by the first application, the AR device is config-
ured to:
  obtain a frame from the at least one frame sensor;
  execute the first application on a first portion of the
    frame to obtain a first overlay;
  execute the second application on a second portion of
    the frame to obtain a second overlay, the first and
    second portions of the frame at least partially over-
    lapping, wherein said execute the second application
    is performed without providing the first overlay to
    the second application, whereby said execute the
    second application violates the application execution
    order;
  automatically determine whether to utilize the second
    overlay for providing the AR view in spite of a
    violation of the execution order, said automatically
    determine is performed after said execute the second
    application;
  in response to a determination to utilize the second
    overlay for providing the AR view, generate the AR
    view based on the first overlay and based on the
    second overlay;
  in response to a determination not to utilize the second
    overlay for providing the AR view, execute the
    second application based on the frame and on the
    first overlay to obtain a new second overlay, thereby
    disregarding the second overlay that was created
    without providing the first overlay to the second
    application, and generate the AR view based on the
    first overlay and based on the new second overlay;
    and
  provide the AR view via the AR device.
  10. The method of claim 1,
wherein said determining whether the second overlay can
  be utilized for providing the AR view comprises:
    determining, based on the first overlay, that the second
      overlay is inconsistent with the first overlay;
    wherein said generating comprises executing again the
      second application based on the frame and on the
      first overlay to obtain a new second overlay; and
    wherein said generating the AR overlay for the frame is
      based on the new second overlay.
  11. The method of claim 1, wherein said executing the
first application and said executing the second application
are performed in parallel.
  12. The method of claim 1, wherein said executing the
first application is performed at a first execution platform
and said executing the second application is performed at a
second execution platform.
  13. The method of claim 1 comprising determining, based
on a predictor, whether to perform said executing the second
application, wherein the predictor is configured to predict a
probability that the first overlay will be inconsistent with the
second overlay.
  14. The method of claim 13 comprising performing a
partial execution of said executing the second application,
wherein said partial execution comprises generating a partial
second overlay that is predicted to have a low probability of
being inconsistent with the first overlay, wherein said gen-
erating the AR view comprises utilizing the first overlay, utilizing the partial second overlay, and completing execu-
tion of the second overlay based on the first overlay.
  15. The method of claim 1,
  wherein said executing the first application is performed
    at a first execution platform;
  wherein the method further comprises executing the first
    application on a second execution platform to obtain a
    shadow overlay;
  wherein said executing the second application is per-
    formed at the second execution platform based on the
    shadow overlay.
  16. The method of claim 1, further comprising:
  obtaining a first order of execution, wherein the first order
    of execution defines an order of application executions
    of a second plurality of applications comprising the first
    and second applications, wherein the second plurality
    of applications are registered on a same object in the
    frame, wherein the first order of execution comprises
    the application execution order;
  obtaining a second order of execution between the second
    plurality of applications, wherein the second order of
    execution defines that the second application is to be
    executed before the first application;
  executing the second plurality of applications according
    to the first order of execution to obtain a first result;
  executing the second plurality of applications according
    to the second order of execution to obtain a second
    result; and
  based on a determination that the first and second results
    are identical, determining that the first order of execu-
    tion is replaceable with the second order of execution.
  17. The method of claim 16 comprising determining that
the second order of execution utilizes less resources than the
first order of execution, and based on said determining,
setting the second order of execution for executing applica-
tions instead of the first order of execution.
  18. The method of claim 1 comprises:
  performing object recognition on the frame to obtain one
    or more object types;
  determining a refresh timeframe;
  obtaining one or more subsequent frames from the at least
    one frame sensor during the refresh timeframe;
  estimating that the one or more subsequent frames com-
    prise the one or more object types; and
  utilizing the one or more object types for the processing
    the one or more subsequent frames without performing
    object recognition to the one or more subsequent
    frames during the refresh timeframe.
  19. The method of claim 1 comprising:
  reducing a resolution level of the frame prior to said
    executing the first application, thereby providing to the
    first application a low-resolution frame;
  executing the first application on the low-resolution
    frame; and
  restoring the resolution level after said executing the first
    application.
  20. The method of claim 1 comprising distributing execu-
tion to an edge device in proximity of the AR device,
wherein the edge device has one or more sensors, wherein
said distributing comprises providing partial information of
the frame to the edge device, thereby enabling the edge
device to complete the partial information based on the one
or more sensors.
  21. The method of claim 1 comprising:
  determining that the first application is a real-world
    application that utilizes real-world frames, and that the
    second application is not a real-world application, wherein the first overlay from the first application comprises a real-world alert of a real-world object in the frame, and determining whether to utilize the second overlay based on whether the second overlay is inconsistent with the alert or with the real-world object.

22. The method of claim 1 comprising:

reducing a resolution level of a third portion the frame prior to executing the first and second applications on the frame;

obtaining a subsequent frame from the at least one frame sensor; and reducing a resolution level of a fourth portion the subsequent frame prior to executing applications on the subsequent frame, wherein the third and fourth portions comprise different coordinate areas in a frame structure.

23. The method of claim 1 comprising:

segmenting the frame into two or more patches;

distributing executions of the two or more patches to two or more execution platforms based on an execution schedule;

obtaining from the two or more execution platforms two or more corresponding overlays; and combining the two or more corresponding overlays to generate the AR view.

24. The system of claim 9, the AR device is further configured to perform partial execution of the second application over a part of the frame smaller than the frame upon determining that the first and second overlays are inconsistent with each other at an inconsistency score lower than a threshold.

\* \* \* \* \*